United States Patent [19]

Hong et al.

[11] Patent Number: 5,539,804
[45] Date of Patent: Jul. 23, 1996

[54] COMMON CHANNEL SIGNALLING COMMUNICATION MONITORING SYSTEM

[75] Inventors: Hausting Hong, Germantown; Eric Yam, Potomac; D. P. Patel; Vaikunth Gupta, both of Gaithersburg, all of Md.

[73] Assignee: CTel Compression Telecommunications Corporation, Germantown, Md.

[21] Appl. No.: 201,980

[22] Filed: Feb. 25, 1994

[51] Int. Cl.$^6$ .............................. H04M 1/24; H04M 3/08; H04M 3/22
[52] U.S. Cl. .................................. 379/33; 379/1; 379/9; 379/10; 379/14; 379/34
[58] Field of Search .................................. 379/1, 14, 33, 379/34, 93, 94, 100, 230, 9, 10

[56] References Cited

U.S. PATENT DOCUMENTS

| Re. 34,529 | 2/1994 | Bicknell | 379/230 |
|---|---|---|---|
| 4,513,175 | 4/1985 | Smith | 379/130 |
| 4,672,657 | 6/1987 | Dershowitz | 379/63 |
| 4,932,048 | 6/1990 | Kenmochi | 379/100 |
| 5,086,461 | 2/1992 | Thorn | 379/230 |
| 5,283,638 | 2/1994 | Engberg | 379/100 |
| 5,299,257 | 3/1994 | Fuller | 379/93 |
| 5,309,434 | 5/1994 | Maekawa | 379/34 |
| 5,315,647 | 5/1994 | Araujo | 379/94 |
| 5,317,633 | 5/1994 | Hiraiwa | 379/230 |
| 5,325,423 | 6/1994 | Lewis | 379/93 |
| 5,327,489 | 7/1994 | Anderson | 379/94 |
| 5,333,187 | 7/1994 | Hiraiwa et al. | 379/230 |
| 5,414,754 | 5/1995 | Pugh et al. | 379/211 |

OTHER PUBLICATIONS

Interview 8000 Turbo Series Protocol Analyzer/Emulator (brochure) by Telenex Corporation.

Primary Examiner—Stephen Chin
Assistant Examiner—Vijay Shankar
Attorney, Agent, or Firm—Ladas & Parry

[57] ABSTRACT

A channel monitoring system for monitoring a multiplicity of transmission lines including a plurality of channel monitors, a line assignment controller operative to determine a subset of the plurality of channel monitors to be assigned to monitoring an individual transmission line, an access switch operative, in response to an input from the controller, to connect the individual transmission line to the preferred number of monitors from among the plurality of channel monitors.

20 Claims, 5 Drawing Sheets

COMMON CHANNEL SIGNALLING COMMUNICATION MONITORING SYSTEM

FIELD OF THE INVENTION

The present invention relates to methods and apparatus for monitoring communication networks such as telephone networks.

BACKGROUND OF THE INVENTION

Conventional telephone network monitoring systems are typically intrusive and therefore channels to be monitored are normally put out of service while monitoring is taking place.

Various types of signaling are employed to transmit telephone data, including MFC R2D signalling, CCITT #5 signalling and CCITT #7 signalling.

MFC R2D signalling (also termed herein "R2D") is specified in CCITT Rec. Q. 400 to Q. 490. R2D is a CAS (channel associated signalling) system. Signalling information is transmitted over the same 2.038 Mbit/s trunk as is carrying the voice traffic. Information about telephone digits, also termed address signalling, is transmitted using inband MF tones in the forward and backward directions, information about call setup conditions, also termed line signalling, is transmitted by using the A and B units of time-slot 16 of an E1 carrier.

CCITT #5 signalling (also termed herein "C5" and "SS5") is specified in CCITT Rec. Q.140 to Q.164. As for the R2D, signalling information is transmitted over the same trunk as is carrying the voice traffic. 2400 Hz and 2600 Hz inband signalling tones are used to represent various call setup conditions. Tone durations of 40 ms and 125 msec are used.

CCITT #7 signalling (also termed herein "C7" and "SS7") is specified in CCITT Rec. Q.700 to Q.795 (volume VI.7-9, Blue Book). SS7 is a common channeling signalling system (CCS), in which signalling information is transmitted in dedicated n× 64 kbit/s signalling channels, using data communications protocols. The traffic and the corresponding signalling information for a call are most often transmitted over different E1 carriers. In the present specification and claims, the term "CCITT #7" is intended to include ANSI SS7 signalling.

SUMMARY OF THE INVENTION

The present invention seeks to provide an improved method and apparatus for monitoring a communication network such as a telephone network.

There is thus provided in accordance with a preferred embodiment of the present invention a channel monitoring system for monitoring a multiplicity of transmission lines including a plurality of channel monitors, a line assignment controller operative to determine a subset of the plurality of channel monitors to be assigned to monitoring an individual transmission line, an access switch operative, in response to an input from the controller, to connect the individual transmission line to the preferred number of monitors from among the plurality of channel monitors.

Further in accordance with a preferred embodiment of the present invention each channel monitor includes an in-service channel monitor.

Still further in accordance with a preferred embodiment of the present invention each channel monitor includes a non-intrusive channel monitor.

Additionally in accordance with a preferred embodiment of the present invention each channel monitor includes a channel quality monitor.

Yet further provided in accordance with a preferred embodiment of the present invention is a channel monitoring system for monitoring a multiplicity of transmission lines including at least one channel monitor operative to monitor at least one transmission line, and a channel monitoring operation controller operative to selectably modify the operation of at least one channel monitor.

Additionally in accordance with a preferred embodiment of the present invention the at least one channel monitor includes a plurality of channel monitors.

Further in accordance with a preferred embodiment of the present invention the channel monitoring operation controller is operative to modify the operation of a channel monitor to monitor a channel of a selected signalling type from among a plurality of signalling types.

Also in accordance with a preferred embodiment of the present invention the selected signalling type includes the E & M signalling type.

Further in accordance with a preferred embodiment of the present invention the selected signalling type includes the CCITT #7 signalling type.

Still further in accordance with a preferred embodiment of the present invention the selected signalling type includes the CCITT #5 signalling type.

Yet further in accordance with a preferred embodiment of the present invention the selected signalling type includes the R2D signalling type.

There is additionally provided in accordance with a preferred embodiment of the present invention a channel monitoring system including a lines-to-be-monitored input unit operative to accept input identifying at least one transmission line to be monitored from among a multiplicity of transmission lines whose signalling information is conveyed over at least one transmission link, and a signalling information extractor operative to extract from the at least one transmission link only the signalling information which pertains to at least one transmission line to be monitored.

Further provided in accordance with a preferred embodiment of the present invention is a channel monitoring system including at least one call quality monitor operative to monitor call quality of a plurality of individual telephone calls, and a call type discriminator operative to determine the call type of each of the plurality of individual telephone calls, and a call quality output generator operative to generate an output indication of the call quality and of the type of call, for each of the plurality of telephone calls.

Additionally in accordance with a preferred embodiment of the present invention the call type of each individual telephone call may include any of the following group of call types: voice, fax, digital data, and modem data.

There is still further provided in accordance with a preferred embodiment of the present invention a channel monitoring system including at least one call quality monitor operative to monitor call quality of a plurality of individual telephone calls, and a caller telephone number discriminator operative to determine the caller telephone number for each of the plurality of individual telephone calls, and a call quality output generator operative to generate an output indication of the call quality and of the caller telephone number for each of the plurality of telephone calls.

There is also provided in accordance with a preferred embodiment of the present invention a channel monitoring system including at least one call quality monitor operative to monitor call quality of a plurality of individual telephone calls, and a called party telephone number discriminator operative to determine the called party telephone number for each of the plurality of individual telephone calls, and a call quality output generator operative to generate an output indication of the call quality and of the called party telephone number for each of the plurality of telephone calls.

There is further provided in accordance with a preferred embodiment of the present invention a common channel signalling communication monitoring system including at least one in-service common channel signalling channel monitor operative to monitor a plurality of individual telephone channels having common channel signalling.

Further in accordance with a preferred embodiment of the present invention the channel monitor includes a call quality monitor.

Still further in accordance with a preferred embodiment of the present invention the channel monitor includes a call type monitor.

Additionally in accordance with a preferred embodiment of the present invention each transmission line is characterized by a transmission line code and a signalling code and wherein the input identifying each transmission line to be monitored includes the transmission line code of each transmission line to be monitored, and a range of signalling codes within which the signalling code of the transmission line to be monitored lies.

Further provided in accordance with a preferred embodiment of the present invention is a channel monitoring system for monitoring a transmission line including an audio monitor, a plurality of transmission lines monitored by the audio monitor, and a transmission line assignment controller operative to selectably assign at least one of the plurality of transmission lines to the audio monitor.

Still further in accordance with a preferred embodiment of the present invention the controller is operative in response to a transmission line identifying input provided by a human operator.

There is also provided in accordance with a preferred embodiment of the present invention a channel monitoring system including a call disposition discriminator operative to identify incomplete calls, and an incomplete call diagnostic unit operative to classify incomplete calls into a plurality of categories.

Further in accordance with a preferred embodiment of the present invention the plurality of categories includes at least one of the following categories: a called-party-busy call, a ring-no-answer call, a call misidentified by the call disposition discriminator as an incomplete call, a network-busy call, and a call rejected by a network.

Still further provided in accordance with a preferred embodiment of the present invention is a channel quality monitoring system including at least one in-service non-voice call quality monitor operative to monitor call quality of a plurality of individual non-voice telephone calls, and a call quality output generator receiving input from the quality monitor and operative to generate an output indication of the call quality.

Additionally in accordance with a preferred embodiment of the present invention the call quality monitor is operative to monitor call quality of a plurality of individual fax telephone calls.

Further in accordance with a preferred embodiment of the present invention the call quality monitor is operative to monitor call quality of a plurality of individual modem telephone calls.

Still further in accordance with a preferred embodiment is of the present invention the call quality monitor nonintrusive.

Also in accordance with a preferred embodiment of the present invention the selected signalling type includes a specialized signalling type.

There is further provided in accordance with a preferred embodiment of the present invention a call type discriminating system including a digital communication link operative to carry a digital representation of a plurality of telephone calls, a call type discriminator operative to receive input from the digital communication link and to determine the call type of each of the plurality of telephone calls.

Still further in accordance with a preferred embodiment of the present invention the channel monitor is operative to monitor telephone calls employing channel associated signalling.

Additionally in accordance with a preferred embodiment of the present invention the channel monitor is non-intrusive.

Also in accordance with a preferred embodiment of the present invention each channel monitor includes an in-service channel monitor.

Yet further in accordance with a preferred embodiment of the present invention the type of transmission line handled by the system includes at least one of the following: an E1 carrier, a T1 carrier, a 2-wire, and a 4-wire.

Additionally in accordance with a preferred embodiment of the present invention the call quality output generator is operative to provide a general indication of call quality for a time interval including a multiplicity of calls.

There is further provided in accordance with a preferred embodiment of the present invention a channel monitoring method for monitoring a multiplicity of transmission lines, the method including generating a control signal indicating a subset of a plurality of channel monitors to be assigned to monitoring an individual transmission line, and connecting the individual transmission line to the preferred number of monitors from among the plurality of channel monitors.

There is additionally provided in accordance with a preferred embodiment of the present invention a channel monitoring method for monitoring a multiplicity of transmission lines, the method including providing at least one channel monitor operative to monitor at least one transmission line, and selectably modifying the operation of at least one channel monitor.

There is further provided in accordance with a preferred embodiment of the present invention a channel monitoring method including accepting input identifying at least one transmission line to be monitored from among a multiplicity of transmission lines whose signalling information is conveyed over at least one transmission link, and extracting from the at least one transmission link only the signalling information which pertains to at least one transmission line to be monitored.

Further in accordance with a preferred embodiment of the present invention there is provided a channel monitoring method including monitoring call quality of a plurality of individual telephone calls, discriminating the call type of each of the plurality of individual telephone calls, and generating an output indication of the call quality and of the type of call, for each of the plurality of telephone calls.

Additionally provided in accordance with a preferred embodiment of the present invention is a channel monitoring method including monitoring call quality of a plurality of individual telephone calls, and generating a signal indicating the caller telephone number for each of the plurality of individual telephone calls, and generating, according to the signal and the monitoring output, an output indication of the call quality and of the caller telephone number for each of the plurality of telephone calls.

There is further provided in accordance with a preferred embodiment of the present invention a channel monitoring method including monitoring call quality of a plurality of individual telephone calls, and generating a signal indicating the called party telephone number for each of the plurality of individual telephone calls, and generating, according to the signal and the monitoring output, an output indication of the call quality and of the called party telephone number for each of the plurality of telephone calls.

There is still further provided in accordance with a preferred embodiment of the present invention a common channel signalling communication monitoring method including in-service monitoring of a plurality of individual telephone channels having common channel signalling, and providing an output indication of at least one characteristic of the plurality of individual telephone channels.

There is also provided in accordance with a preferred embodiment of the present invention a channel monitoring method for monitoring a transmission line, the method including providing an audio monitor to monitor a plurality of transmission lines, and selectably assigning at least one of the plurality of transmission lines to the audio monitor.

Further in accordance with a preferred embodiment of the present invention there is provided a channel monitoring method including identifying incomplete calls, and classifying incomplete calls into a plurality of categories.

Still further in accordance with a preferred embodiment of the present invention there is provided a channel quality monitoring method including monitoring call quality of a plurality of individual non-voice telephone calls, and on the basis of input from the quality monitor, generating an output indication of the call quality.

There is also provided in accordance with a preferred embodiment of the present invention a call type discriminating method including providing a digital communication link operative to carry a digital representation of a plurality of telephone calls, and receiving input from the digital communication link and determining the call type of each of the plurality of telephone calls.

BRIEF DESCRIPTION OF THE DRAWINGS AND APPENDICES

The present invention will be understood and appreciated from the following detailed description, taken in conjunction with the drawings in which.

Figure 1:
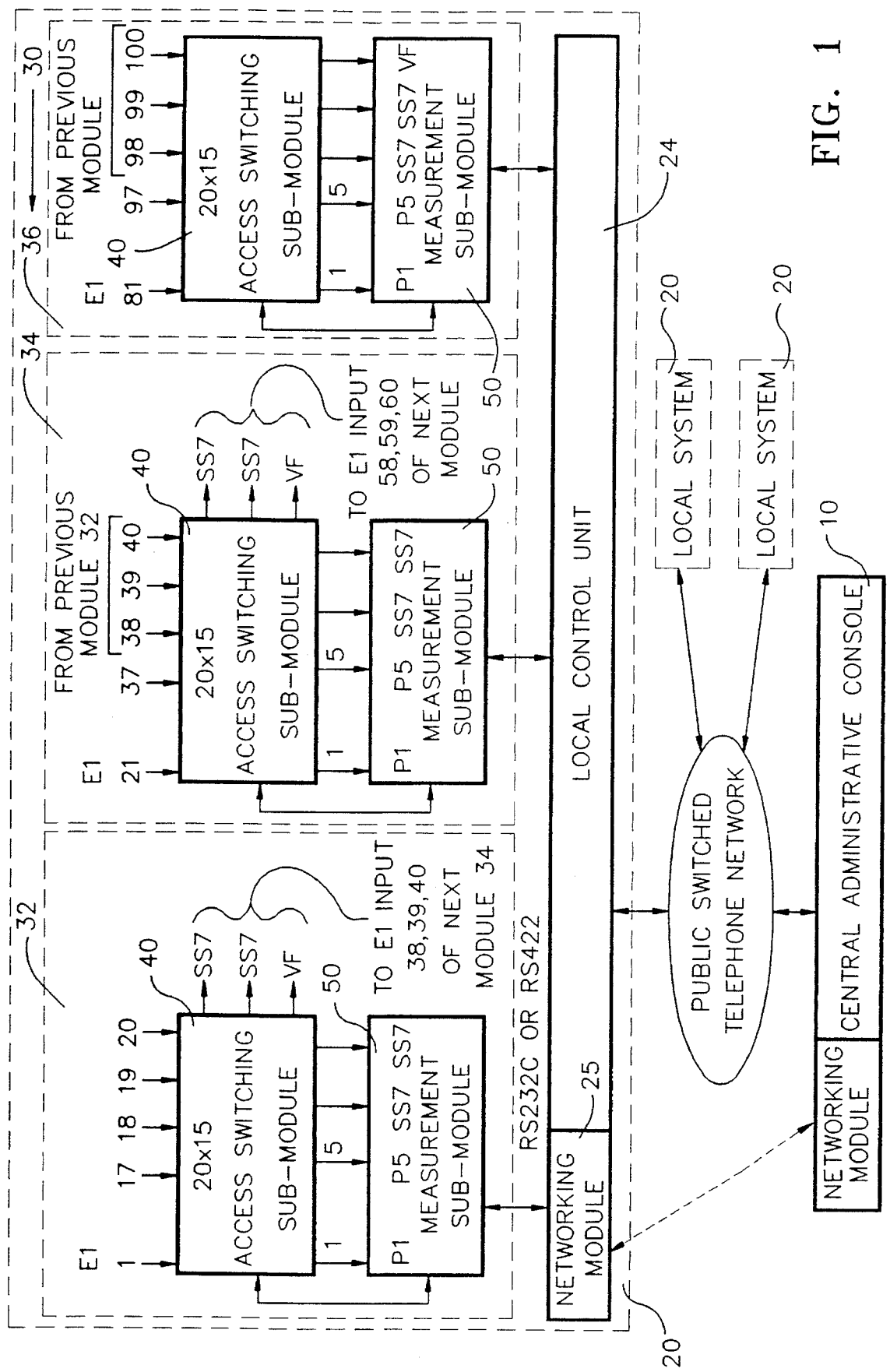
FIG. 1 is a simplified functional block diagram of a communication network monitoring system constructed and operative in accordance with a preferred embodiment of the present invention.
Figure 2:
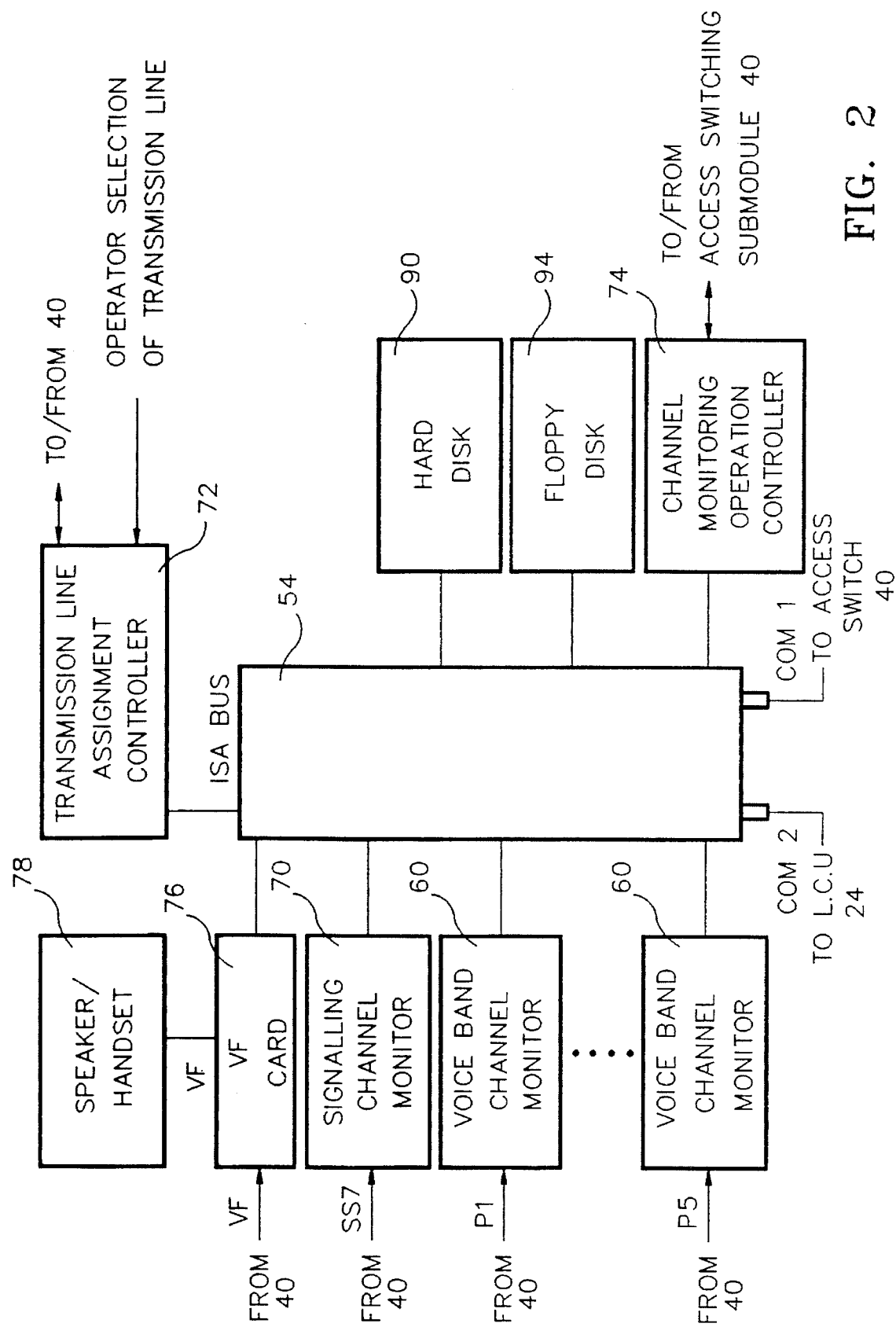
FIG. 2 is a simplified functional block diagram of an individual one of the measurement submodules of FIG. 1.
Figure 4:
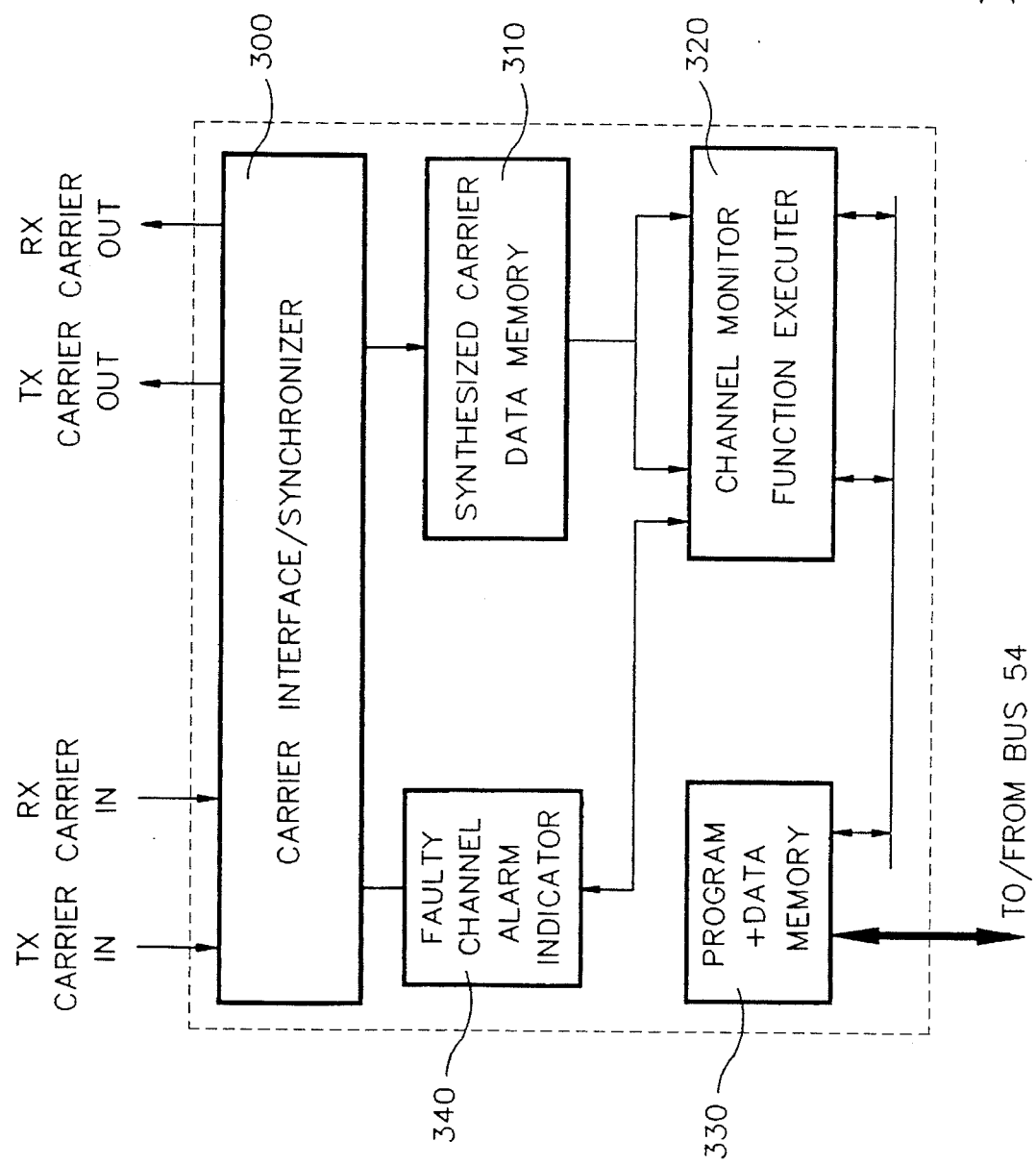
FIG. 4 is a simplified functional block diagram of an individual voiceband channel monitor forming part of the apparatus of FIG. 2.

Attached herewith are the following appendices which aid in the understanding and appreciation of one preferred embodiment of the invention shown and described herein:

Appendix 1 is a netlist, including a parts list, of an individual one of the voiceband channel monitors 60 of FIGS. 1 and 4;

Appendix 2 is a netlist, including a parts list, of the SS7 card 70 of FIG. 2;

Appendix 3 is a netlist, including a parts list, of an individual one of the access switching sub-modules 40 of FIG. 1; and Appendix 4 is a netlist, including a parts list, of the VF card 76 of FIG. 2.

DETAILED DESCRIPTION OF A PREFERRED EMBODIMENT

Reference is now made to FIG. 1 which is a simplified block diagram of a communication network monitoring system, such as a telephone network monitoring system, constructed and operative in accordance with a preferred embodiment of the present invention. The system of FIG. 1 is preferably operative to provide in-service nonintrusive monitoring of performance (call quality) and/or traffic characteristics, for multiple carriers, such as but not limited to 2048 kbit/s E1 carriers.

Traffic monitoring includes monitoring of any or all of the following: calling party number, called party number, call duration, call type (voice, fax or data), call initiation time and date, call completion time and date, etc. Performance monitoring includes monitoring of any or all of the following: speech level, noise level, SNR (signal to noise ratio), echo characteristics such as echo path loss and echo path delay, and PCM code errors.

The system of FIG. 1 preferably supports a plurality of signalling types, such as MFC R2D, CCITT #5 and CCITT#7. Monitoring, including channel quality monitoring, preferably takes place substantially without human intervention or even entirely without human intervention. Processing functionality for each channel monitor is preferably not fixed but is, instead, assigned to individual channel monitors according to an operator's demand.

The communication network monitoring system of FIG. 1 preferably includes a central administrative console (CAC) 10 which may, for example, comprise a UNIX-based computer and which is typically located on the premises of a central office or international gateway which wishes to monitor channel quality and/or channel traffic characteristics, for calls going through its equipment.

The system of FIG. 1 also preferably comprises a plurality of local systems 20, of which three are illustrated, which are to be monitored by the central console 10. Each local system 20 is typically located at a suitable switch center facility such as, for example, an international gateway. Typically, the CAC includes a memory of any suitable type, such as a hard disk, which stores traffic and performance information.

The central console 10 is preferably operative to perform some or preferably all of the following functions:

a. Interactive, real-time provision of alarms which indicate to an operator that an individual telephone signal carrier is providing such poor quality transmission that the monitoring results therefor are unusable. In response to an alarm, the carrier may be identified and fixed.

b. Accepting an operator's scheduling of monitoring intervals and/or of monitoring reports. A monitoring interval schedule may be a time sharing schedule, i.e. the same monitor monitors different channels at different times of day, preferably such that channels are monitored only when they are highly utilized. A monitoring interval schedule may also be a continuous schedule, i.e. an individual monitor monitors the same channel continuously, for example, if a particular channel is never underutilized. The operator may also schedule provision of monitoring reports. For example the operator may request that reports be provided either periodically or on demand.

c. Providing an output indication of monitored data, on a suitable display such as a screen and/or in hard copy form, as by means of a printer.

d. Reconfiguration of specific telephone signal carriers to be monitored and allocation of monitoring resources between channels and between monitoring tasks; and e. Data transfer between the CAC 10 itself and local systems 20, e.g. via a local area network.

f. Interactive, real time monitoring of traffic patterns.

Each local system 20 comprises, typically, a local control unit (LCU) 24, and a plurality 30 of monitoring modules which are each preferably operative to provide in-service nonintrusive monitoring of traffic and performance.

Each local control unit 24 typically includes a networking module 25 such as a token ring networking module and preferably communicates with the central console 10 via a dial-up modem link or via a local area network (LAN) link. An individual local control unit 24 receives a monitoring schedule direct from an operator or from CAC 10 and is preferably operative to automatically activate monitoring, to store measurement results, to generate on-site reports and to interact with the central console 10. The local control unit 24 typically includes a user interface which enables a local administrator to control the local system 20 of which the local control unit 24 forms a part.

Control of local systems 20 may be provided entirely by local control unit 24, entirely by CAC 10, or, as is typical, partly by local control unit 24 and partly by CAC 10. Each LCU 24 may in fact be identical to the CAC 10. In the present specification and claims, each indication that a particular control instruction arrives from LCU 24 or arrives from CAC 10 implies that the same control instruction may alternatively be provided by CAC 10 via LCU 24 or directly by CAC 10 or directly by LCU 24.

Figure 5:
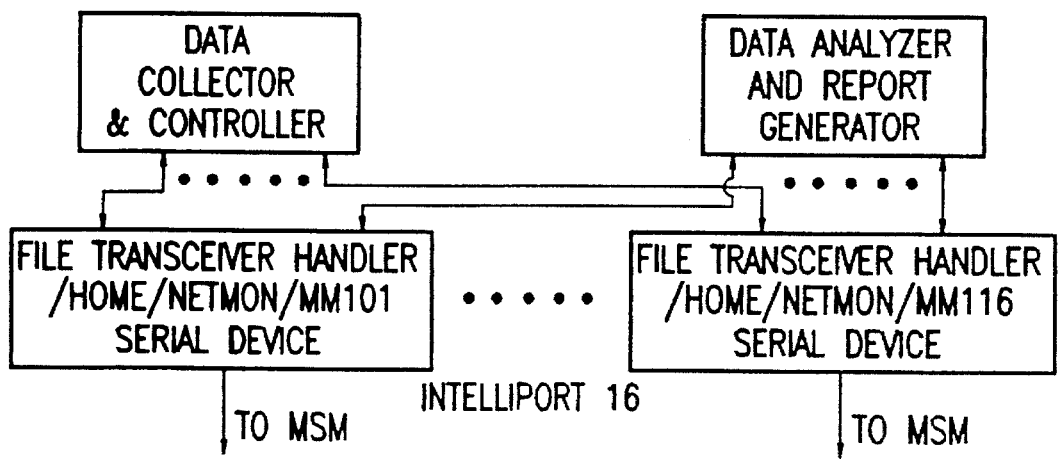
FIG. 5 is a simplified functional block diagram of an individual one of the LCU's of FIG. 1.
Figure 6:
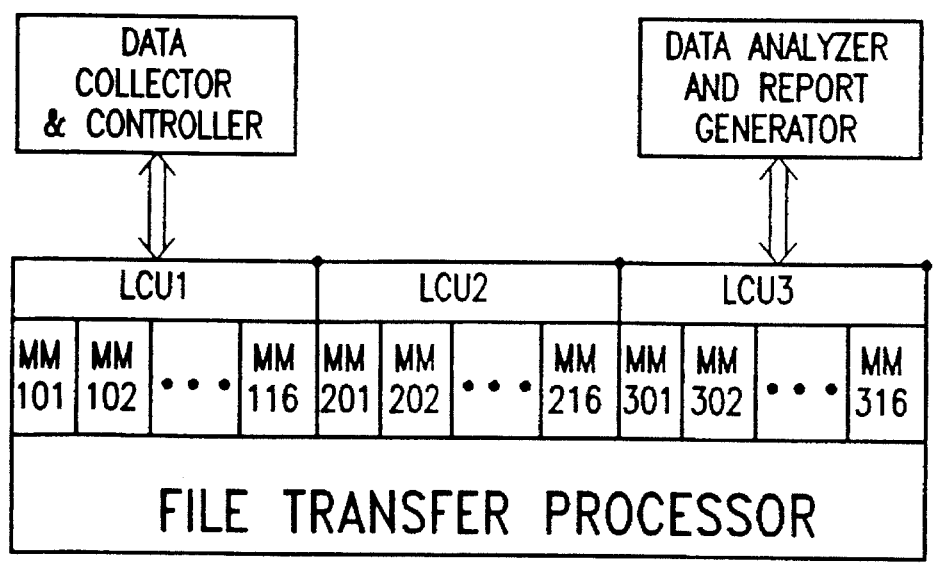
FIG. 6 is a simplified functional block diagram of the central administrative console of FIG. 1.

Preferred functions of LCU 24 and CAC 10 are illustrated in FIGS. 5 and 6 respectively.

Preferably, the local control unit 24 is connected, via a suitable interface such as an RS232C or an RS422A interface, to a plurality of DOS windows corresponding in number to the plurality 30 of monitoring modules. Each DOS window is dedicated to an individual one of the monitoring modules 30.

For simplicity, FIG. 1 illustrates three monitoring modules 32, 34 and 36 from among a total of five monitoring modules which are each shown monitoring 20 bidirectional E1 carriers, each E1 carrier including 30 telephone lines. In other words, the system of FIG. 1 monitors a total of 100 bidirectional E1 carriers corresponding to a total of 3000 telephone lines.

However, more generally:

a. Any suitable number of modules 30, such as less or much more than 5 modules, may be provided if it is desired to restrict or expand monitoring capacity.

b. Each module may monitor any suitable number of carriers, such as less or more than the 20 illustrated carriers.

c. Each module may monitor any type of telephone signal carrier, such as E1 carriers, T1 carriers, 2-wires or 4-wires.

Each monitoring module 30 accesses multiple telephone signal carriers and performs at least one measurement thereupon, and generates output information which is provided to the local control unit 24. Output information pertaining to an individual call is preferably generated while the call is taking place.

Typically, the total number of telephone lines monitored by the system of FIG. 1 includes two or four signalling links, i.e. lines along which the signalling information for all remaining telephone lines are transmitted. These links are preferably monitored by channel monitors 70 which are described in detail below. Each such link is preferably sent to an individual switch 40, described below, and is then regenerated for sending to subsequent switches 40. Monitoring modules other than the first monitoring module, such as modules 34 and 36, preferably receive signalling links from the monitoring module preceding them. For example, as shown, signalling links 38 and 39 for module 34 are received from SS7 signalling link outputs of module 32.

Each monitoring module 30 includes an access switching submodule 40 which is controlled by a transmission line assignment controller 72 in a measurement submodule 50, described in detail below with reference to FIG. 2. The interface between submodules 40 and 50 may, for example, comprise an RS 232C interface.

Each access switching submodule 40 typically comprises a cross point matrix device which flexibly supports a wide range of monitoring configurations and enables the local system 20 to monitor in accordance with an operator-designated time-sharing schedule. The access switching submodule 40 may, for example, comprise a rack-mountable 20×15, cross-point switch matrix device.

Preferably, the access switching submodule 40 includes circuitry for detecting malfunctioning of local system 20 and for providing a suitable alarm, as by means of light provided on a front panel of the local system 20.

Reference is now made to FIG. 2 which illustrates a preferred individual measurement submodule 50. Each measurement submodule 50 typically includes a chassis, including a suitable bus 54 such as an ISA bus, which connects some or preferably all of the following elements to the local control unit 24 and the access switching submodule 40 of FIG. 1:

a. A plurality of telephone communication channel monitors operative to monitor channels arriving via access switch 40. The plurality of channel monitors typically includes a plurality of voiceband channel monitors 60 and one or more signalling channel monitors 70, both of which are described in detail below with reference to FIGS. 3 and 4. Preferably, each voiceband channel monitor 60 and each signalling channel monitor 70 comprises a suitable card which is installed onto the chassis of FIG. 2 such that the outputs of switch 40 feed into the inputs of the cards.

b. A transmission line assignment controller 72 which is operative to control a corresponding access switching submodule 40 by providing to submodule 40 an indication of a preferred subset of monitors 60 or 70 to be assigned to monitoring each individual incoming transmission line to be monitored. In response, access switching submodule 40 acknowledges the command, typically, and connects each individual transmission line to each individual channel monitor from among the subset of channel monitors assigned to that transmission line.

Typically, any telephone signal carrier connected to an access switching submodule 40 may be connected to a channel monitor for traffic measurement, or traffic and performance measurement, for any of a plurality of signalling types. For example, if only traffic is measured, using MFC R2D or CCITT #7 signalling types, it is typically sufficient to allocate only one channel monitor per telephone signal carrier to be monitored. If only traffic is measured, using the CCITT #5 signalling type, two channel monitors are typically employed. Each telephone signal carrier for which performance is measured typically requires an additional channel monitor.

c. A channel monitoring operation controller 74, which is operative to determine, for each channel monitor, the channel monitoring function/s or operations which it is to perform, as described in more detail below, depending on the operator-defined channel monitoring requirements for each channel as transmitted to the apparatus of FIG. 2 via LCU 24. Typically, the channel monitor operation controller 74 is operative to determine the channel monitoring functionality of each channel monitor by downloading a suitable software program onto that channel monitor.

d. Optionally, the measurement submodule 50 for each monitoring module 30, or, as shown in FIG. 1, for only the last module 36 from among the monitoring modules 30, includes a voice frequency (VF) monitoring card 76. VF monitoring card 76 is operatively associated with a human operator-manned audio monitor 78 such as a speaker and/or handset. If a VF monitoring card is provided, transmission line assignment controller 72 selectably assigns one of the plurality of incoming transmission lines to the audio monitor 78 via VF monitoring card 76. Typically, an indication of the incoming transmission line to be monitored by audio monitor 78 is provided by a human operator via LCU 24. The transmission line assignment controller 72 provides a suitable input to the access switching submodule 40 which acknowledges the command, typically, and connects the individual transmission line to the VF monitoring card which selects an individual channel to be monitored by the human operator.

The optional VF voice monitoring card is operative to monitor audio quality of individual time-slots within telephone signal carriers. The VF voice monitoring card is preferably installed only on the last monitoring module of each local system (module 36 in FIG. 1) so that any of the carrier inputs connected through the access switching submodule 40 may be accessed for audio monitoring.

e. A secondary memory 90 such as a hard disk which may store:
  (i) programs to be downloaded onto individual channel monitors by channel monitor operation controller 74;
  (ii) channel monitoring information gathered by submodule 50 for submission to CAC 10 via LCU 24; and/or
  (iii) A channel monitoring schedule provided by LCU 24 or CAC 10 which determines transmission line assignment and monitor operation assignment. Typically, the channel monitoring schedule includes an operator-determined schedule of the times at which each channel is to be monitored and the channel monitoring functions which are to be performed at each such time.

f. An insertable memory element 94, such as a floppy disk, which may be used to insert programs and data as appropriate.

Figure 3:
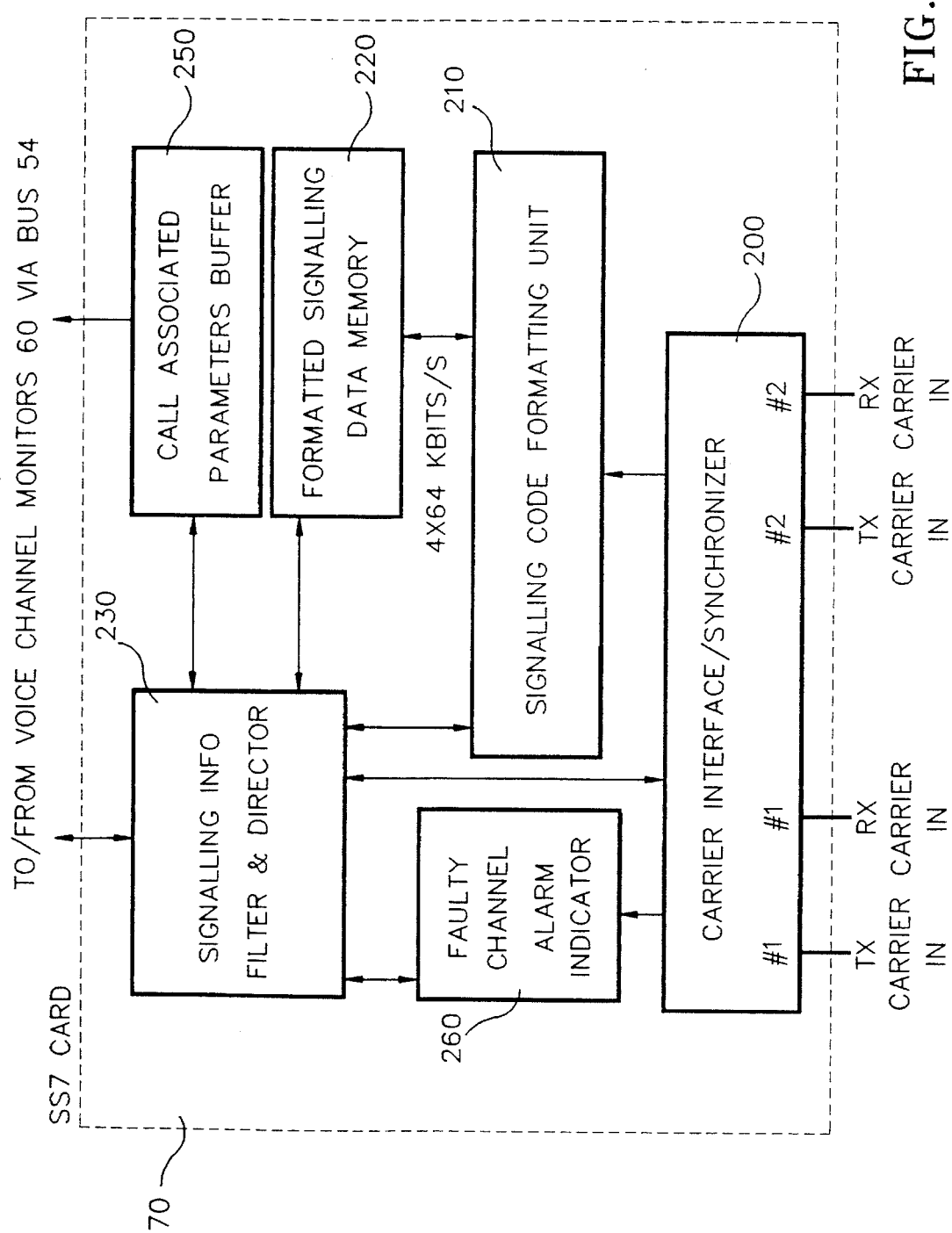
FIG. 3 is a simplified functional block diagram of an individual signalling channel monitor forming part of the apparatus of FIG. 2.

Reference is now made to FIG. 3 which is a simplified block diagram of an individual signalling channel monitor 70 typically included in the apparatus of FIG. 2 which serves to monitor a signalling channel, when common-channel signalling is employed as for example in CCITT #7 signalling. Signalling channel monitor 70 extracts signalling information regarding each of a multiplicity of telephone calls from the signalling channel, and provides the signalling information for each individual telephone call to the voiceband channel monitor monitoring that telephone call. In the embodiment illustrated in FIG. 2, two signalling call monitors 70 are provided, each of which is operative to monitor up to two signalling links.

As shown in FIG. 3, the monitor 70 typically includes a carrier interface/synchronizer 200 which interfaces between one or two, typically, signalling carriers to be monitored and between a signalling code formatting unit 210. Signalling code formatting unit 210 is operative to extract and format signalling codes such as CIC codes (channel identification codes), source codes and destination codes from the information arriving from the interface/synchronizer 200. Signalling code formatting unit 210 stores the formatted signalling data in a formatted signalling data memory 220.

It is appreciated that formatted signalling data memory 220 typically stores formatted signalling data for each of a multiplicity of telephone calls, only a small portion of which are being monitored by the monitoring module 30 to which the signalling channel monitor 70 of FIG. 3 belongs.

A signalling information filter and director 230 is operative to receive a "signalling information request" from LCU 24 or CAC 10 of FIG. 1, via the bus 54 of FIG. 2. The "signalling information request" comprises an indication of the CIC, source and destination codes of each of a plurality of telephone channels to be monitored as well as an indication of the channel monitor 60 assigned to monitoring each such channel, to which the signalling information is to be transmitted.

The "signalling information request" is typically stored in a call-associated parameter buffer 250. Call-associated parameter buffer 250 is operative to filter the formatted signalling data in memory 220, thereby to extract set-up (line) signalling information pertaining to each individual channel being monitored by each individual voiceband channel monitor 60. The set-up signalling information, once extracted, is directed by signalling information filter/director 230, via bus 54, to the voiceband channel monitor handling that call.

Set-up signalling information typically includes real time indications of the occurrences of critical telephone call events such as caller raising the handset (alert), dial tone received (response), dialing, establish connection, ringing, called party raising the handset (pick up), the telephone conversation itself (connected) and call termination (release).

Optionally, an alarm indicator 260 is provided in each signalling channel monitor, which is operative to provide an alarm if the channel to be monitored is of unacceptably poor quality. The alarm is typically provided to CAC 10 of FIG. 1 via signalling information filter/director 230.

Reference is now made to FIG. 4 which is a simplified block diagram of an individual voiceband channel monitor 60 forming part of the apparatus of FIG. 2. Each voiceband channel monitor 60 is operative to monitor, in parallel, a plurality of voiceband channels which may or may not include signalling information, depending on the signalling type. In channel-associated signalling, the voiceband channel monitor typically monitors signalling information as well as content (traffic and performance) information. In common-channel signalling, the voiceband channel typically does not include signalling information so the voiceband channel monitor typically monitors only content information, in accordance with set-up information provided by the signalling channel monitor 70. In FIG. 2, 5 voiceband channel monitors are provided, however, any suitable number of voiceband channel monitors may alternatively be provided.

Traffic information detected by each voiceband channel monitor 60 for each call preferably includes, inter alia, some or all of the following information:

a. Telephone signal carrier ID and channel number—typically at least 20 alphanumeric characters;
b. Start date and time;
c. Call duration;
d. Call type (voice, facsimile, or data);
e. Call direction;
f. Number of A (calling) party; and
g. Number of B (called) party;

Traffic information detected by each voiceband channel monitor 60 for each trunk preferably includes some or all of the following information:

h. Start time and stop time of monitor period;
i. ID of telephone signal carrier—at least 17 alphanumeric characters;
j. Total number of calls during monitor periods distributed over TX (transmitting) and RX (receiving);
k. Total occupancy time per day in proportion to actual capacity monitored, distributed over TX and RX;
l. Total occupancy time per day, distributed over call types and over TX and RX;
m. Busy hour and erlands indication, per day during the monitor period;
n. Average call duration for each call type (voice, data, fax) and, within call type, for each of TX and RX.
o. Total number of calls to various destinations, and the duration of each, for each of TX and RX;
p. Total number of incomplete calls to various destinations, and the duration of each, for each of TX and RX; and
q. Total number of rejected calls to various destinations, and the duration of each, for each of TX and RX.

The apparatus of FIG. 4 includes a carrier interface/synchronizer 300 which interfaces between a signal carrier to be monitored and between a synchronized carrier data memory 310. Interface/synchronizer 300 finds conventionally defined frames (e.g. as defined in the CCITT frame structure) and formats the incoming bit stream into channelized PCM samples which are then stored in memory 310.

A channel monitor function executor 320 performs at least one channel monitoring function, and preferably one or more selected channel monitoring functions from among a plurality of such functions supported by the system, on the data stored in memory 310. The flexible functionality which preferably characterizes executor 320 is typically provided by downloading software implementing the selected function/s from channel monitor operation controller 74 of FIG. 2 onto a program/data memory 330 which is associated with the function executor 320.

Each function performed by executor 320 may include more than one task. The tasks included in each of 6 sample functions are as follows:

FUNCTION 1
 a. Discriminate telephone number of calling party.
 b. Discriminate telephone number of called party.
FUNCTION 2
 a. Discriminate date and time at which call began.
 b. Discriminate time at which call ended and compute duration of call.
 c. Discriminate call completion status. For example, each call's status may be categorized as being one of the following: complete, called-party-busy, ring-no-answer; call misidentified by the call disposition discriminator as an incomplete call; network-busy call; and call rejected by network.
 d. Discriminate whether call initiating party is near or far.
 e. Discriminate whether call terminating party is near or far.
FUNCTION 3
 Discriminate type of call (voice, fax, modem, etc.).
FUNCTION 4
 Process channel associated signalling, if any.
FUNCTIONS 5 AND 6
 Call quality monitoring tasks.

Call quality may be monitored in a time-based mode or on a call-by-call based mode. In the time-based mode, an indication of the call quality provided by an individual channel over a particular time interval, which typically spans a multiplicity of calls, is provided. In the call-by-call based mode, a per-telephone call indication of call quality is provided.

As described above, one or more of the above 6 sample functions may be carried out by executor 320 once the appropriate software has been downloaded by channel monitor operation controller 74 onto memory 330, depending on the processing power available and the processing power required for each function. The above 6 sample functions are only representative of the possible functions and of the possible tasks which may be distributed in any suitable manner within the functions.

Optionally, an alarm indicator 340 is provided in each voiceband channel monitor, which is operative to provide an alarm if the voiceband channel to be monitored is of unacceptably poor quality. The alarm is typically provided to CAC 10 of FIG. 1 via channel monitor function executor 320.

Appendix 1 of the present specification is a netlist, including a parts list, of an individual one of the voiceband channel monitors 60 of FIGS. 1 and 4.

Appendix 2 of the present specification is a netlist, including a parts list, of the SS7 card 70 of FIG. 2.

Appendix 3 of the present specification is a netlist, including a parts list, of an individual one of the access switching sub-modules 40 of FIG. 1.

Appendix 4 of the present specification is a netlist, including a parts list, of the VF card 76 of FIG. 2.

One advantage of the system shown and described herein is that the operation of an individual channel monitor may be selectably modified thereby providing channel monitor flexibility in that the same channel monitor may be employed to perform more than one task. For example, the same channel monitor may be employed to monitor channels having any of a plurality of signalling types, such as any of the following signalling types: E & M, R2D, CCITT #7 and CCITT #5. Modification of the operation of an individual channel monitor is preferably provided by downloading suitable software implemented operations from the monitoring module 30 to an individual channel monitor. Typically, a new program is downloaded each time the operator-determined schedule received by the CAC 10 or LCU 24 calls for a change in the channel monitoring function/s to be performed by the individual channel monitor for the individual channel. Call monitor reconfiguration may be initiated locally at the local site or remotely from the central administrative console 10.

Another advantage of the system shown and described herein is that carriers over which information of more than one signalling type is being transmitted may be monitored. For example, if a plurality of signalling types is being employed to transmit information over a particular carrier, monitor process-power may be allocated to accommodate the "worst case" signalling type from among the plurality of signalling types.

Another advantage is that a customer can reduce the cost of his network monitoring configuration by providing a relatively small number of monitoring modules 30, together with an accessing switching submodule which allows telephone signal carriers to be variably monitored at different times of day, depending on the anticipated volume of communication activity. Most advantageously, each channel is monitored during periods of peak activity. For example, a customer may advantageously monitor telephone signal carriers to/from Japan and the United States by diverting monitoring resources to monitoring telephone signal carriers to/from Japan during periods in which Japanese activity is known to be high and U.S. activity is known to be low. During other periods, in which U.S. activity is known to be high and Japanese activity is known to be low, the customer may divert monitoring resources to monitoring carriers to/from the U.S.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow:

APPENDIX-1 : PARTS LIST AND NETLIST OF VOICEBAND CHANNEL MONITOR

PARTS LIST OF VOICEBAND CHANNEL MONITOR

| QTY | PART# | DESCRIPTION | MANUF | LOCATION |
|---|---|---|---|---|
| 1 | LT231B V4 BD | LT231B PCB | ADS | PCB1 |
| 1 | 74FCT138 | DIP | IDT | U13 |
| 3 | 74HCT374 | DIP | | U24 33 34 |
| 4 | 74HCT645 | DIP | | U38 39 40 41 |
| 2 | uA733 | AMPLIFIER DIP | | U10 28 |
| 1 | IDT7MP4036S25Z | 64KX32 RAM 64ZIP | IDT | U37  231 ONLY |
| 2 | PALC22V10B-15JC | PAL, 28-PLCC | CYPRS | U27 35 |
| 1 | AMPAL23S8-25PC | PAL, 20 PIN DIP | AMD | U36 |
| 1 | TMS320C30-GEL | DSP 181 PGA | TI | U19 |
| 1 | EPM5064LC | OTP 44PLCC 35nS | ALTER | U32 |
| 1 | EPM5128JC | ERASE 68PLCC 35nS | | ALTER   U31 |
| 3 | EP610LC-25 | OTP 28PLCC 25nS | ALTER | U16 23 25 |
| 2 | IDT7133S-55J | 2KX16 DPRAM 55nS | | IDT   U20 21 |
| 2 | IDT7134S-70J | 4KX DPRAM 70nS | IDT | U5 6 |
| 1 | CY7C429-25JC | 2K X9 FIFO 25nS | CYPRS | U29 |
| 2 | BT8069BKPJ | E1 LINE I/F | ROCKW | U9 18 |
| 2 | BT8070KPJ | E1 TRANSCEIVER | ROCKW | U7 26 |
| 2 | BT8075KPJ | CRC-4 CODEC | ROCKW | U8 17 |
| 2 | 814-AG11D-ESL | DIP 14 .3W | AUGAT | U10 28 |
| 1 | 820-AG11D-ESL | DIP 20 .3W | AUGAT | U36 |
| 7 | PCS-028A-1 | 28 PLCC SOCK. | AUGAT | U8 16 17 23 25 27 35 |
| 1 | PCS-032A-1 | 32 PLCC SOCK. | AUGAT | U29 |
| 3 | PCS-044A-1 | 44 PLCC SOCK. | AUGAT | U9 18 32 |
| 2 | PCS-052A-1 | 52 PLCC SOCK. | AUGAT | U5 6 |
| 5 | PCS-068A-1 | 68 PLCC SOCK. | AUGAT | U7 20 21 26 31 |
| 1 | MPAS-181-ZSGT-15 | 181 PGA SOCK. | SMTEC | U19 |
| 8 | T356K226K035AS | T226K .2 35V 22uF | KEMET | C2 11 31 48 51 C52 53 55 |
| 2 | T356K476K025AS | T476K .2 25V 47uF | KEMET | C9 28 |
| 2 | TAP685K016CCS | T685K .2 16V 6.8uF | AVX | C63 64 |
| 2 | TAP686K016CCS | T686K .2 16V 68uF | AVX | C61 62 |
| 1 | NRE100-25 | M 100uF 25V MICA | | C60 |
| 6 | CK05BX103K | 103K .01 uF .2LS | KEMET | C19 20 21 38 39 40 |
| 4 | CK05BX104K | 104K .1 uF .2LS | KEMET | C7 8 26 27 |
| 4 | RPB113X7R105K050V | 105K 1.0 uF .2LS | | C24 25 35 41 |
| 20 | C322C224K-5R5CA | 224K .22 uF .2LS | KEMET | C3 4 6 15-18 30 32 C33 45-47 49 50 54 C56-59 |
| 4 | CK05BX332K | 332K .2LS | KEMET | C22 23 36 37 |
| 2 | CK05BX470K | 470K 47 pF | | C10 29 |
| 1 | 123ADG | MICRO CAP | CIRCT | U19 |
| 2 | 253ADD | MICRO CAP | CIRCT | U5 6 |
| 5 | 503AHL | 0.6 GRID .05 uF | CIRCT | U7 20 21 26 31 |

| | | | | |
|---|---|---|---|---|
| 4 | 31-236 W/ICS | BNC CONNECTOR | AMPH | |
| 2 | RTT-87-02 | 2-BANTAM PCB | SWTCH | J1 2 |
| 9 | 1N914 | DIODE | | D01-09 |
| 2 | 800-1087-14 | 8.192 MHz 2 PIN | STDCR | X1 2 |
| 1 | STD-XTL or F1100E | 32.000 MHz 4 PIN | FOX | U11 |
| 1 | 814-030 | OSCILLATOR SPACER | | U11 |
| 7 | TQ2E-5V | 2C RELAY | AROMT | K1-7 |
| 2 | RESISTOR | 51 ohm 1/2W 5% | | R25 25 |
| 2 | RESISTOR | 20 ohm 1/4W 5% | | R23 27 |
| 2 | RESISTOR | 75 ohm 1/4W 5% | | R7 21 |
| 2 | RESISTOR | 120 ohm 1/4W 5% | | R8 22 |
| 4 | RESISTOR | 470 ohm 1/4 W 5% | | R1 2 10 11 |
| 4 | RESISTOR | 1 K ohm 1/4W 5% | | R12 13 14 15 |
| 4 | RESISTOR | 3 K ohm 1/4W 5% | | R3 5 17 19 |
| 4 | RESISTOR | 4.7K ohm 1/4W 5% | | R4 6 18 20 |
| 1 | RESISTOR | 10 K ohm 1/4W 5% | | R24 |
| 2 | 4310R-101-102 | S10-B-1 K ohm | BORNS | RN1 2 |
| 3 | BL01RN1-A62 | INDCTR 50mH 5% | MURAT | L1 2 3 |
| 2 | PE64943 | TRANSFORMER | PULSE ABLE | TX1 2 |
| | 1 END PLATE | | | |

NETLIST OF VOICEBAND CHANNEL MONITOR

| | | |
|---|---|---|
| +12 | JPR5 | 1 |
| +12 | L1 | 1 |
| +12 | L2 | 1 |
| +12 | P1B | 9 |
| +12 | R25 | 1 |
| +5-12 | D1 | 1 |
| +5-12 | D2 | 1 |
| +5-12 | D3 | 1 |
| +5-12 | D4 | 1 |
| +5-12 | D5 | 1 |
| +5-12 | D6 | 1 |
| +5-12 | D7 | 1 |
| +5-12 | JPR4 | 2 |
| +5-12 | JPR5 | 2 |
| +5-12 | K1 | 1 |
| +5-12 | K2 | 1 |
| +5-12 | K3 | 1 |
| +5-12 | K4 | 1 |
| +5-12 | K5 | 1 |
| +5-12 | K6 | 1 |
| +5-12 | K7 | 1 |
| +5V | C1 | 1 |
| +5V | C12 | 1 |
| +5V | C12 | 3 |
| +5V | C13 | 1 |
| +5V | C13 | 3 |
| +5V | C13 | 5 |
| +5V | C13 | 7 |
| +5V | C14 | 1 |
| +5V | C14 | 3 |
| +5V | C14 | 5 |
| +5V | C14 | 7 |
| +5V | C15 | 1 |
| +5V | C16 | 1 |
| +5V | C17 | 1 |
| +5V | C18 | 1 |
| +5V | C2 | 1 |
| +5V | C26 | 1 |
| +5V | C3 | 1 |
| +5V | C30 | 1 |
| +5V | C31 | 1 |
| +5V | C32 | 1 |
| +5V | C33 | 1 |
| +5V | C34 | 1 |
| +5V | C34 | 3 |
| +5V | C34 | 5 |
| +5V | C34 | 7 |
| +5V | C4 | 1 |
| +5V | C42 | 1 |
| +5V | C42 | 3 |
| +5V | C43 | 1 |

| | | |
|---|---|---|
| +5V | C43 | 3 |
| +5V | C43 | 5 |
| +5V | C43 | 7 |
| +5V | C44 | 1 |
| +5V | C44 | 3 |
| +5V | C44 | 5 |
| +5V | C44 | 7 |
| +5V | C45 | 1 |
| +5V | C46 | 1 |
| +5V | C47 | 1 |
| +5V | C48 | 1 |
| +5V | C49 | 1 |
| +5V | C5 | 1 |
| +5V | C5 | 3 |
| +5V | C5 | 5 |
| +5V | C5 | 7 |
| +5V | C50 | 1 |
| +5V | C51 | 1 |
| +5V | C55 | 1 |
| +5V | C56 | 1 |
| +5V | C57 | 1 |
| +5V | C58 | 1 |
| +5V | C59 | 1 |
| +5V | C6 | 1 |
| +5V | C60 | 1 |
| +5V | C61 | 1 |
| +5V | C62 | 1 |
| +5V | C7 | 1 |
| +5V | JPR4 | 1 |
| +5V | L3 | 2 |
| +5V | RN1 | 1 |
| +5V | RN2 | 1 |
| +5V | TP10 | 1 |
| +5V | TP11 | 1 |
| +5V | TP2 | 1 |
| +5V | TP4 | 1 |
| +5V | U1 | 12 |
| +5V | U1 | 53 |
| +5V | U11 | 14 |
| +5V | U12 | 16 |
| +5V | U13 | 16 |
| +5V | U14 | 52 |
| +5V | U15 | 52 |
| +5V | U16 | 1 |
| +5V | U16 | 28 |
| +5V | U17 | 8 |
| +5V | U18 | 13 |
| +5V | U19 | 49 |
| +5V | U19 | 53 |
| +5V | U19 | 57 |
| +5V | U19 | 65 |
| +5V | U19 | 74 |
| +5V | U19 | 89 |
| +5V | U19 | 90 |

| | | |
|---|---|---|
| +5V | U19 | 91 |
| +5V | U19 | 92 |
| +5V | U19 | 98 |
| +5V | U19 | 99 |
| +5V | U19 | 104 |
| +5V | U19 | 105 |
| +5V | U19 | 106 |
| +5V | U19 | 107 |
| +5V | U19 | 112 |
| +5V | U19 | 113 |
| +5V | U19 | 114 |
| +5V | U19 | 116 |
| +5V | U19 | 121 |
| +5V | U19 | 122 |
| +5V | U19 | 124 |
| +5V | U19 | 128 |
| +5V | U19 | 132 |
| +5V | U2 | 49 |
| +5V | U2 | 53 |
| +5V | U2 | 57 |
| +5V | U2 | 65 |
| +5V | U2 | 74 |
| +5V | U2 | 89 |
| +5V | U2 | 90 |
| +5V | U2 | 91 |
| +5V | U2 | 92 |
| +5V | U2 | 98 |
| +5V | U2 | 99 |
| +5V | U2 | 104 |
| +5V | U2 | 105 |
| +5V | U2 | 106 |
| +5V | U2 | 107 |
| +5V | U2 | 112 |
| +5V | U2 | 113 |
| +5V | U2 | 114 |
| +5V | U2 | 116 |
| +5V | U2 | 121 |
| +5V | U2 | 122 |
| +5V | U2 | 124 |
| +5V | U2 | 128 |
| +5V | U2 | 132 |
| +5V | U20 | 17 |
| +5V | U20 | 68 |
| +5V | U21 | 17 |
| +5V | U21 | 68 |
| +5V | U22 | 1 |
| +5V | U22 | 28 |
| +5V | U23 | 1 |
| +5V | U23 | 28 |
| +5V | U24 | 20 |
| +5V | U25 | 1 |
| +5V | U25 | 28 |
| +5V | U26 | 68 |
| +5V | U27 | 28 |

| | | |
|---|---|---|
| +5V | U29 | 32 |
| +5V | U3 | 17 |
| +5V | U3 | 68 |
| +5V | U30 | 32 |
| +5V | U31 | 3 |
| +5V | U31 | 20 |
| +5V | U31 | 37 |
| +5V | U31 | 54 |
| +5V | U32 | 3 |
| +5V | U32 | 14 |
| +5V | U32 | 25 |
| +5V | U32 | 36 |
| +5V | U33 | 20 |
| +5V | U34 | 20 |
| +5V | U35 | 28 |
| +5V | U36 | 20 |
| +5V | U37 | 12 |
| +5V | U37 | 53 |
| +5V | U38 | 20 |
| +5V | U39 | 1 |
| +5V | U39 | 20 |
| +5V | U4 | 17 |
| +5V | U4 | 68 |
| +5V | U40 | 1 |
| +5V | U40 | 20 |
| +5V | U41 | 20 |
| +5V | U5 | 52 |
| +5V | U6 | 52 |
| +5V | U7 | 68 |
| +5V | U8 | 8 |
| +5V | U9 | 13 |
| +5V-PC | L3 | 1 |
| +5V-PC | P1B | 3 |
| +5V-PC | P1B | 29 |
| +5V-PC | P2D | 16 |
| 0065061 | U22 | 8 |
| 1006042 | C22 | 1 |
| 1006042 | J1 | 5 |
| 1006042 | R7 | 2 |
| 1006042 | R8 | 2 |
| 1010039 | J1 | 3 |
| 1010039 | K4 | 3 |
| 1029038 | C23 | 1 |
| 1029038 | K3 | 3 |
| 1029038 | K4 | 4 |
| 1030064 | C37 | 1 |
| 1030064 | K3 | 8 |
| 1030064 | K4 | 7 |
| 1035068 | K3 | 4 |
| 1035068 | R8 | 1 |
| 1035069 | K3 | 7 |
| 1035069 | R22 | 1 |
| 1035075 | K3 | 9 |
| 1035075 | K6 | 8 |

| | | |
|---|---|---|
| 1036021 | C51 | 2 |
| 1036021 | D8 | 1 |
| 1036021 | D9 | 1 |
| 1036021 | R24 | 2 |
| 1036021 | U32 | 13 |
| 1036021 | U36 | 11 |
| 1046041 | C22 | 2 |
| 1046041 | K2 | 8 |
| 1047038 | C23 | 2 |
| 1047038 | K2 | 3 |
| 1053037 | K2 | 4 |
| 1053037 | R3 | 1 |
| 1053038 | K2 | 2 |
| 1053038 | R4 | 1 |
| 1053040 | K2 | 7 |
| 1053040 | R5 | 1 |
| 1053041 | K2 | 9 |
| 1053041 | R6 | 1 |
| 1053050 | K3 | 2 |
| 1053050 | K6 | 3 |
| 1056068 | J1 | 10 |
| 1056068 | TX1 | 6 |
| 1060037 | C10 | 1 |
| 1060037 | R1 | 2 |
| 1060037 | R3 | 2 |
| 1060037 | R4 | 2 |
| 1060037 | U10 | 1 |
| 1060042 | C10 | 2 |
| 1060042 | R2 | 2 |
| 1060042 | R5 | 2 |
| 1060042 | R6 | 2 |
| 1060042 | U10 | 14 |
| 1060065 | J1 | 8 |
| 1060065 | R27 | 1 |
| 1065062 | U22 | 9 |
| 1065063 | U22 | 10 |
| 1065064 | U22 | 12 |
| 1067065 | R27 | 2 |
| 1067065 | TX1 | 2 |
| 1073016 | U12 | 11 |
| 1077065 | C24 | 1 |
| 1077065 | TX1 | 1 |
| 1077067 | C25 | 1 |
| 1077067 | TX1 | 3 |
| 1080059 | U22 | 23 |
| 1093042 | R9 | 2 |
| 1093042 | U10 | 12 |
| 1099060 | K1 | 7 |
| 1099060 | R9 | 1 |
| 1102038 | C19 | 1 |
| 1102038 | U10 | 7 |
| 1102039 | C20 | 1 |
| 1102039 | U10 | 8 |
| 2008027 | C36 | 1 |

| | | |
|---|---|---|
| 2008027 | J2 | 5 |
| 2008027 | R21 | 2 |
| 2008027 | R22 | 2 |
| 2031051 | K6 | 4 |
| 2031051 | R7 | 1 |
| 2031052 | K6 | 7 |
| 2031052 | R21 | 1 |
| 2047024 | C37 | 2 |
| 2047024 | K5 | 3 |
| 2047027 | C36 | 2 |
| 2047027 | K5 | 8 |
| 2053023 | K5 | 4 |
| 2053023 | R17 | 1 |
| 2053024 | K5 | 2 |
| 2053024 | R18 | 1 |
| 2053026 | K5 | 7 |
| 2053026 | R19 | 1 |
| 2053027 | K5 | 9 |
| 2053027 | R20 | 1 |
| 2057064 | J2 | 10 |
| 2057064 | TX2 | 6 |
| 2060023 | C29 | 1 |
| 2060023 | R11 | 2 |
| 2060023 | R17 | 2 |
| 2060023 | R18 | 2 |
| 2060023 | U28 | 1 |
| 2060028 | C29 | 2 |
| 2060028 | R10 | 2 |
| 2060028 | R19 | 2 |
| 2060028 | R20 | 2 |
| 2060028 | U28 | 14 |
| 2061061 | J2 | 8 |
| 2061061 | R23 | 1 |
| 2068061 | R23 | 2 |
| 2068061 | TX2 | 2 |
| 2077061 | C35 | 1 |
| 2077061 | TX2 | 1 |
| 2077063 | C41 | 1 |
| 2077063 | TX2 | 3 |
| 2093028 | R16 | 2 |
| 2093028 | U28 | 12 |
| 2099046 | K7 | 7 |
| 2099046 | R16 | 1 |
| 2102024 | C38 | 1 |
| 2102024 | U28 | 7 |
| 2102025 | C39 | 1 |
| 2102025 | U28 | 8 |
| 3047036 | C52 | 1 |
| 3047036 | Q1 | 1 |
| 3047036 | R25 | 2 |
| 4011017 | U9 | 7 |
| 4011017 | X1 | 1 |
| 4011021 | U9 | 8 |
| 4011021 | X1 | 2 |

| | | |
|---|---|---|
| 4016025 | U8 | 3 |
| 4016025 | U9 | 22 |
| 4016026 | U8 | 2 |
| 4016026 | U9 | 23 |
| 4030010 | U8 | 16 |
| 4030010 | U9 | 26 |
| 4030011 | U8 | 17 |
| 4030011 | U9 | 27 |
| 4047005 | U7 | 20 |
| 4047005 | U8 | 5 |
| 5011017 | U18 | 7 |
| 5011017 | X2 | 1 |
| 5011021 | U18 | 8 |
| 5011021 | X2 | 2 |
| 5016025 | U17 | 3 |
| 5016025 | U18 | 22 |
| 5016026 | U17 | 2 |
| 5016026 | U18 | 23 |
| 5030010 | U17 | 16 |
| 5030010 | U18 | 26 |
| 5030011 | U17 | 17 |
| 5030011 | U18 | 27 |
| 5047005 | U17 | 5 |
| 5047005 | U26 | 20 |
| 9062039 | U23 | 6 |
| 9062042 | U23 | 10 |
| 9073016 | U13 | 11 |
| AEMU | RN1 | 4 |
| AEMU | U19 | 69 |
| AEMU | U19 | 75 |
| AEMU | U19 | 76 |
| AGND | C11 | 2 |
| AGND | C21 | 2 |
| AGND | C27 | 2 |
| AGND | C28 | 2 |
| AGND | C40 | 2 |
| AGND | C52 | 2 |
| AGND | C53 | 2 |
| AGND | C54 | 2 |
| AGND | C63 | 2 |
| AGND | C64 | 2 |
| AGND | C8 | 2 |
| AGND | C9 | 2 |
| AGND | Q1 | 2 |
| AGND | Q1 | 4 |
| AGND | R26 | 2 |
| AGND | TP5 | 1 |
| AGND | TP7 | 1 |
| AGND | TP8 | 1 |
| AGND | U10 | 5 |
| AGND | U18 | 34 |
| AGND | U18 | 35 |
| AGND | U28 | 5 |
| AGND | U9 | 34 |

| | | |
|---|---|---|
| AGND | U9 | 35 |
| AH1CLK | U19 | 18 |
| AH1CLK | U23 | 2 |
| AHOLDA- | U19 | 62 |
| AHOLDA- | U32 | 44 |
| AINTR0- | U13 | 12 |
| AINTR0- | U32 | 37 |
| AINTR1- | U12 | 13 |
| AINTR1- | U19 | 86 |
| AINTR2- | U19 | 96 |
| AINTR2- | U31 | 22 |
| AINTR3- | U19 | 97 |
| AINTR3- | U31 | 23 |
| AIOSTRB | U19 | 73 |
| AIOSTRB | U31 | 19 |
| APA0 | U19 | 77 |
| APA0 | U20 | 49 |
| APA0 | U21 | 49 |
| APA0 | U37 | 55 |
| APA1 | U19 | 82 |
| APA1 | U20 | 48 |
| APA1 | U21 | 48 |
| APA1 | U37 | 51 |
| APA10 | U19 | 111 |
| APA10 | U20 | 39 |
| APA10 | U21 | 39 |
| APA10 | U37 | 13 |
| APA11 | U19 | 100 |
| APA11 | U37 | 15 |
| APA12 | U19 | 110 |
| APA12 | U37 | 16 |
| APA13 | U19 | 120 |
| APA13 | U37 | 14 |
| APA14 | U19 | 109 |
| APA14 | U37 | 30 |
| APA15 | U19 | 119 |
| APA15 | U37 | 29 |
| APA16 | U19 | 135 |
| APA16 | U37 | 36 |
| APA17 | U19 | 108 |
| APA17 | U37 | 35 |
| APA2 | U19 | 83 |
| APA2 | U20 | 47 |
| APA2 | U21 | 47 |
| APA2 | U37 | 52 |
| APA20 | U13 | 1 |
| APA20 | U19 | 150 |
| APA21 | U13 | 2 |
| APA21 | U19 | 133 |
| APA22 | U13 | 3 |
| APA22 | U19 | 117 |
| APA23 | U13 | 4 |
| APA23 | U19 | 149 |
| APA3 | U19 | 84 |

| | | |
|---|---|---|
| APA3 | U20 | 46 |
| APA3 | U21 | 46 |
| APA3 | U37 | 49 |
| APA4 | U19 | 85 |
| APA4 | U20 | 45 |
| APA4 | U21 | 45 |
| APA4 | U37 | 54 |
| APA5 | U19 | 95 |
| APA5 | U20 | 44 |
| APA5 | U21 | 44 |
| APA5 | U37 | 17 |
| APA6 | U19 | 94 |
| APA6 | U20 | 43 |
| APA6 | U21 | 43 |
| APA6 | U37 | 48 |
| APA7 | U19 | 103 |
| APA7 | U20 | 42 |
| APA7 | U21 | 42 |
| APA7 | U37 | 50 |
| APA8 | U19 | 102 |
| APA8 | U20 | 41 |
| APA8 | U21 | 41 |
| APA8 | U37 | 18 |
| APA9 | U19 | 101 |
| APA9 | U20 | 40 |
| APA9 | U21 | 40 |
| APA9 | U37 | 47 |
| APBUS0- | RN1 | 3 |
| APBUS0- | U20 | 50 |
| APBUS0- | U21 | 50 |
| APBUS0- | U23 | 4 |
| APCS0- | U13 | 15 |
| APCS0- | U20 | 51 |
| APCS0- | U21 | 51 |
| APCS0- | U23 | 3 |
| APD0 | U19 | 34 |
| APD0 | U21 | 19 |
| APD0 | U37 | 63 |
| APD1 | U19 | 50 |
| APD1 | U21 | 20 |
| APD1 | U37 | 61 |
| APD10 | U19 | 5 |
| APD10 | U21 | 29 |
| APD10 | U37 | 41 |
| APD11 | U19 | 21 |
| APD11 | U21 | 30 |
| APD11 | U37 | 43 |
| APD12 | U19 | 52 |
| APD12 | U21 | 31 |
| APD12 | U37 | 11 |
| APD13 | U19 | 6 |
| APD13 | U21 | 32 |
| APD13 | U37 | 44 |
| APD14 | U19 | 37 |

| | | |
|---|---|---|
| APD14 | U21 | 33 |
| APD14 | U37 | 45 |
| APD15 | U19 | 22 |
| APD15 | U21 | 34 |
| APD15 | U37 | 46 |
| APD16 | U19 | 7 |
| APD16 | U20 | 19 |
| APD16 | U37 | 26 |
| APD17 | U19 | 8 |
| APD17 | U20 | 20 |
| APD17 | U37 | 23 |
| APD18 | U19 | 23 |
| APD18 | U20 | 21 |
| APD18 | U37 | 40 |
| APD19 | U19 | 9 |
| APD19 | U20 | 22 |
| APD19 | U37 | 24 |
| APD2 | U19 | 2 |
| APD2 | U21 | 21 |
| APD2 | U37 | 62 |
| APD20 | U19 | 24 |
| APD20 | U20 | 23 |
| APD20 | U37 | 9 |
| APD21 | U19 | 39 |
| APD21 | U20 | 24 |
| APD21 | U37 | 7 |
| APD22 | U19 | 10 |
| APD22 | U20 | 25 |
| APD22 | U37 | 21 |
| APD23 | U19 | 54 |
| APD23 | U20 | 26 |
| APD23 | U37 | 5 |
| APD24 | U19 | 25 |
| APD24 | U20 | 27 |
| APD24 | U37 | 10 |
| APD25 | U19 | 11 |
| APD25 | U20 | 28 |
| APD25 | U37 | 22 |
| APD26 | U19 | 40 |
| APD26 | U20 | 29 |
| APD26 | U37 | 8 |
| APD27 | U19 | 26 |
| APD27 | U20 | 30 |
| APD27 | U37 | 25 |
| APD28 | U19 | 12 |
| APD28 | U20 | 31 |
| APD28 | U37 | 19 |
| APD29 | U19 | 55 |
| APD29 | U20 | 32 |
| APD29 | U37 | 4 |
| APD3 | U19 | 3 |
| APD3 | U21 | 22 |
| APD3 | U37 | 59 |
| APD30 | U19 | 41 |

| | | |
|---|---|---|
| APD30 | U20 | 33 |
| APD30 | U37 | 6 |
| APD31 | U19 | 27 |
| APD31 | U20 | 34 |
| APD31 | U37 | 20 |
| APD4 | U19 | 19 |
| APD4 | U21 | 23 |
| APD4 | U37 | 60 |
| APD5 | U19 | 35 |
| APD5 | U21 | 24 |
| APD5 | U37 | 57 |
| APD6 | U19 | 51 |
| APD6 | U21 | 25 |
| APD6 | U37 | 58 |
| APD7 | U19 | 4 |
| APD7 | U21 | 26 |
| APD7 | U37 | 56 |
| APD8 | U19 | 20 |
| APD8 | U21 | 27 |
| APD8 | U37 | 42 |
| APD9 | U19 | 36 |
| APD9 | U21 | 28 |
| APD9 | U37 | 39 |
| APMSEL- | U13 | 14 |
| APMSEL- | U23 | 9 |
| APMSEL- | U37 | 31 |
| APMSEL- | U37 | 32 |
| APMSEL- | U37 | 33 |
| APMSEL- | U37 | 34 |
| APMSRB- | RN1 | 9 |
| APMSRB- | U13 | 5 |
| APMSRB- | U19 | 71 |
| APR-W- | U19 | 81 |
| APR-W- | U20 | 36 |
| APR-W- | U20 | 37 |
| APR-W- | U21 | 36 |
| APR-W- | U21 | 37 |
| APR-W- | U37 | 28 |
| ARDY- | U19 | 61 |
| ARDY- | U23 | 12 |
| ARESET- | U19 | 70 |
| ARESET- | U19 | 72 |
| ARESET- | U23 | 13 |
| ARESET- | U31 | 1 |
| ARESET- | U32 | 4 |
| ATCLK0 | R15 | 1 |
| ATCLK0 | U19 | 154 |
| ATCLK1 | R13 | 1 |
| ATCLK1 | U19 | 140 |
| AVCC | C11 | 1 |
| AVCC | C27 | 1 |
| AVCC | C28 | 1 |
| AVCC | C53 | 1 |
| AVCC | C54 | 1 |

| | | |
|---|---|---|
| AVCC | C63 | 1 |
| AVCC | C64 | 1 |
| AVCC | C8 | 1 |
| AVCC | C9 | 1 |
| AVCC | Q1 | 3 |
| AVCC | R1 | 1 |
| AVCC | R10 | 1 |
| AVCC | R11 | 1 |
| AVCC | R2 | 1 |
| AVCC | TP6 | 1 |
| AVCC | U18 | 1 |
| AVCC | U18 | 2 |
| AVCC | U9 | 1 |
| AVCC | U9 | 2 |
| AXA0 | U19 | 13 |
| AXA0 | U31 | 65 |
| AXA0 | U5 | 7 |
| AXA0 | U6 | 7 |
| AXA1 | U19 | 14 |
| AXA1 | U31 | 66 |
| AXA1 | U5 | 8 |
| AXA1 | U6 | 8 |
| AXA10 | U19 | 45 |
| AXA10 | U5 | 5 |
| AXA10 | U6 | 5 |
| AXA11 | U19 | 59 |
| AXA11 | U5 | 4 |
| AXA11 | U6 | 4 |
| AXA12 | U19 | 67 |
| AXA12 | U31 | 2 |
| AXA2 | U19 | 56 |
| AXA2 | U31 | 68 |
| AXA2 | U5 | 9 |
| AXA2 | U6 | 9 |
| AXA3 | U19 | 42 |
| AXA3 | U5 | 10 |
| AXA3 | U6 | 10 |
| AXA4 | U19 | 28 |
| AXA4 | U5 | 11 |
| AXA4 | U6 | 11 |
| AXA5 | U19 | 15 |
| AXA5 | U5 | 12 |
| AXA5 | U6 | 12 |
| AXA6 | U19 | 30 |
| AXA6 | U5 | 13 |
| AXA6 | U6 | 13 |
| AXA7 | U19 | 44 |
| AXA7 | U5 | 14 |
| AXA7 | U6 | 14 |
| AXA8 | U19 | 66 |
| AXA8 | U5 | 15 |
| AXA8 | U6 | 15 |
| AXA9 | U19 | 58 |
| AXA9 | U5 | 16 |

| | | |
|---|---|---|
| AXA9 | U6 | 16 |
| AXCS1- | U31 | 38 |
| AXCS1- | U5 | 1 |
| AXCS2- | U31 | 39 |
| AXCS2- | U6 | 1 |
| AXD0 | U19 | 169 |
| AXD0 | U29 | 7 |
| AXD0 | U31 | 63 |
| AXD0 | U34 | 3 |
| AXD0 | U36 | 2 |
| AXD0 | U5 | 17 |
| AXD0 | U6 | 17 |
| AXD1 | U19 | 155 |
| AXD1 | U29 | 6 |
| AXD1 | U31 | 64 |
| AXD1 | U34 | 4 |
| AXD1 | U36 | 3 |
| AXD1 | U5 | 18 |
| AXD1 | U6 | 18 |
| AXD10 | U19 | 158 |
| AXD10 | U24 | 7 |
| AXD10 | U33 | 7 |
| AXD11 | U19 | 173 |
| AXD11 | U24 | 8 |
| AXD11 | U33 | 8 |
| AXD12 | U19 | 174 |
| AXD12 | U24 | 13 |
| AXD12 | U33 | 13 |
| AXD13 | U19 | 159 |
| AXD13 | U24 | 14 |
| AXD13 | U33 | 14 |
| AXD14 | U19 | 144 |
| AXD14 | U24 | 17 |
| AXD14 | U33 | 17 |
| AXD15 | U19 | 175 |
| AXD15 | U24 | 18 |
| AXD15 | U33 | 18 |
| AXD2 | U19 | 141 |
| AXD2 | U29 | 5 |
| AXD2 | U31 | 4 |
| AXD2 | U34 | 7 |
| AXD2 | U36 | 4 |
| AXD2 | U5 | 19 |
| AXD2 | U6 | 19 |
| AXD3 | U19 | 170 |
| AXD3 | U29 | 4 |
| AXD3 | U31 | 5 |
| AXD3 | U34 | 8 |
| AXD3 | U36 | 5 |
| AXD3 | U5 | 20 |
| AXD3 | U6 | 20 |
| AXD4 | U19 | 156 |
| AXD4 | U29 | 31 |
| AXD4 | U31 | 12 |

| | | |
|---|---|---|
| AXD4 | U34 | 13 |
| AXD4 | U36 | 6 |
| AXD4 | U5 | 21 |
| AXD4 | U6 | 21 |
| AXD5 | U19 | 127 |
| AXD5 | U29 | 30 |
| AXD5 | U31 | 13 |
| AXD5 | U34 | 14 |
| AXD5 | U36 | 7 |
| AXD5 | U5 | 22 |
| AXD5 | U6 | 22 |
| AXD6 | U19 | 171 |
| AXD6 | U29 | 29 |
| AXD6 | U31 | 24 |
| AXD6 | U34 | 17 |
| AXD6 | U36 | 8 |
| AXD6 | U5 | 23 |
| AXD6 | U6 | 23 |
| AXD7 | U19 | 142 |
| AXD7 | U29 | 28 |
| AXD7 | U31 | 25 |
| AXD7 | U34 | 18 |
| AXD7 | U36 | 9 |
| AXD7 | U5 | 24 |
| AXD7 | U6 | 24 |
| AXD8 | U19 | 157 |
| AXD8 | U24 | 3 |
| AXD8 | U33 | 3 |
| AXD9 | U19 | 172 |
| AXD9 | U24 | 4 |
| AXD9 | U33 | 4 |
| AXDLAT1 | U31 | 48 |
| AXDLAT1 | U33 | 11 |
| AXDLAT1 | U36 | 1 |
| AXDLAT2 | U24 | 11 |
| AXDLAT2 | U31 | 49 |
| AXDLAT2 | U34 | 11 |
| AXF0 | U19 | 79 |
| AXF0 | U27 | 12 |
| AXR-W- | U19 | 46 |
| AXR-W- | U31 | 21 |
| AXR-W- | U5 | 2 |
| AXR-W- | U6 | 2 |
| AXSTRB- | U19 | 63 |
| AXSTRB- | U31 | 18 |
| BALE | P1B | 28 |
| BALE | U35 | 13 |
| BCLKR0 | U19 | 125 |
| BCLKR0 | U2 | 139 |
| BCLKX0 | U19 | 139 |
| BCLKX0 | U2 | 125 |
| BDR0 | U19 | 168 |
| BDR0 | U2 | 166 |
| BDR1 | U19 | 152 |

| | | |
|---|---|---|
| BDR1 | U2 | 136 |
| BDX0 | U19 | 166 |
| BDX0 | U2 | 168 |
| BDX1 | U19 | 136 |
| BDX1 | U2 | 152 |
| BEMU | RN1 | 8 |
| BEMU | U2 | 69 |
| BEMU | U2 | 75 |
| BEMU | U2 | 76 |
| BFSR0 | U19 | 167 |
| BFSR0 | U2 | 153 |
| BFSR1 | U19 | 151 |
| BFSR1 | U2 | 123 |
| BFSX0 | U19 | 153 |
| BFSX0 | U2 | 167 |
| BFSX1 | U19 | 123 |
| BFSX1 | U2 | 151 |
| BH1CLK | U2 | 18 |
| BH1CLK | U23 | 16 |
| BHOLDA- | U2 | 62 |
| BHOLDA- | U22 | 7 |
| BHOLDA- | U32 | 39 |
| BINTR0- | U12 | 12 |
| BINTR0- | U32 | 38 |
| BINTR1- | U13 | 13 |
| BINTR1- | U2 | 86 |
| BINTR2- | U2 | 96 |
| BINTR2- | U31 | 30 |
| BINTR3- | U2 | 97 |
| BINTR3- | U31 | 31 |
| BIOTRB- | U2 | 73 |
| BIOTRB- | U22 | 3 |
| BOARDCS | U32 | 11 |
| BOARDCS | U35 | 21 |
| BPA0 | U1 | 55 |
| BPA0 | U2 | 77 |
| BPA0 | U3 | 49 |
| BPA0 | U4 | 49 |
| BPA1 | U1 | 51 |
| BPA1 | U2 | 82 |
| BPA1 | U3 | 48 |
| BPA1 | U4 | 48 |
| BPA10 | U1 | 13 |
| BPA10 | U2 | 111 |
| BPA10 | U3 | 39 |
| BPA10 | U4 | 39 |
| BPA11 | U1 | 15 |
| BPA11 | U2 | 100 |
| BPA12 | U1 | 16 |
| BPA12 | U2 | 110 |
| BPA13 | U1 | 14 |
| BPA13 | U2 | 120 |
| BPA14 | U1 | 30 |
| BPA14 | U2 | 109 |

| | | |
|---|---|---|
| BPA15 | U1 | 29 |
| BPA15 | U2 | 119 |
| BPA16 | U1 | 36 |
| BPA16 | U2 | 135 |
| BPA17 | U1 | 35 |
| BPA17 | U2 | 108 |
| BPA2 | U1 | 52 |
| BPA2 | U2 | 83 |
| BPA2 | U3 | 47 |
| BPA2 | U4 | 47 |
| BPA20 | U12 | 1 |
| BPA20 | U2 | 150 |
| BPA21 | U12 | 2 |
| BPA21 | U2 | 133 |
| BPA22 | U12 | 3 |
| BPA22 | U2 | 117 |
| BPA23 | U12 | 4 |
| BPA23 | U2 | 149 |
| BPA3 | U1 | 49 |
| BPA3 | U2 | 84 |
| BPA3 | U3 | 46 |
| BPA3 | U4 | 46 |
| BPA4 | U1 | 54 |
| BPA4 | U2 | 85 |
| BPA4 | U3 | 45 |
| BPA4 | U4 | 45 |
| BPA5 | U1 | 17 |
| BPA5 | U2 | 95 |
| BPA5 | U3 | 44 |
| BPA5 | U4 | 44 |
| BPA6 | U1 | 48 |
| BPA6 | U2 | 94 |
| BPA6 | U3 | 43 |
| BPA6 | U4 | 43 |
| BPA7 | U1 | 50 |
| BPA7 | U2 | 103 |
| BPA7 | U3 | 42 |
| BPA7 | U4 | 42 |
| BPA8 | U1 | 18 |
| BPA8 | U2 | 102 |
| BPA8 | U3 | 41 |
| BPA8 | U4 | 41 |
| BPA9 | U1 | 47 |
| BPA9 | U2 | 101 |
| BPA9 | U3 | 40 |
| BPA9 | U4 | 40 |
| BPBUS0- | RN1 | 6 |
| BPBUS0- | U23 | 25 |
| BPBUS0- | U3 | 50 |
| BPBUS0- | U4 | 50 |
| BPCS0- | U12 | 15 |
| BPCS0- | U23 | 26 |
| BPCS0- | U3 | 51 |
| BPCS0- | U4 | 51 |

| | | |
|---|---|---|
| BPD0 | U1 | 63 |
| BPD0 | U2 | 34 |
| BPD0 | U4 | 19 |
| BPD1 | U1 | 62 |
| BPD1 | U2 | 50 |
| BPD1 | U4 | 20 |
| BPD10 | U1 | 44 |
| BPD10 | U2 | 5 |
| BPD10 | U4 | 29 |
| BPD11 | U1 | 46 |
| BPD11 | U2 | 21 |
| BPD11 | U4 | 30 |
| BPD12 | U1 | 42 |
| BPD12 | U2 | 52 |
| BPD12 | U4 | 31 |
| BPD13 | U1 | 41 |
| BPD13 | U2 | 6 |
| BPD13 | U4 | 32 |
| BPD14 | U1 | 40 |
| BPD14 | U2 | 37 |
| BPD14 | U4 | 33 |
| BPD15 | U1 | 39 |
| BPD15 | U2 | 22 |
| BPD15 | U4 | 34 |
| BPD16 | U1 | 4 |
| BPD16 | U2 | 7 |
| BPD16 | U3 | 19 |
| BPD17 | U1 | 5 |
| BPD17 | U2 | 8 |
| BPD17 | U3 | 20 |
| BPD18 | U1 | 6 |
| BPD18 | U2 | 23 |
| BPD18 | U3 | 21 |
| BPD19 | U1 | 9 |
| BPD19 | U2 | 9 |
| BPD19 | U3 | 22 |
| BPD2 | U1 | 61 |
| BPD2 | U2 | 2 |
| BPD2 | U4 | 21 |
| BPD20 | U1 | 10 |
| BPD20 | U2 | 24 |
| BPD20 | U3 | 23 |
| BPD21 | U1 | 7 |
| BPD21 | U2 | 39 |
| BPD21 | U3 | 24 |
| BPD22 | U1 | 11 |
| BPD22 | U2 | 10 |
| BPD22 | U3 | 25 |
| BPD23 | U1 | 8 |
| BPD23 | U2 | 54 |
| BPD23 | U3 | 26 |
| BPD24 | U1 | 26 |
| BPD24 | U2 | 25 |
| BPD24 | U3 | 27 |

| | | |
|---|---|---|
| BPD25 | U1 | 25 |
| BPD25 | U2 | 11 |
| BPD25 | U3 | 28 |
| BPD26 | U1 | 24 |
| BPD26 | U2 | 40 |
| BPD26 | U3 | 29 |
| BPD27 | U1 | 23 |
| BPD27 | U2 | 26 |
| BPD27 | U3 | 30 |
| BPD28 | U1 | 22 |
| BPD28 | U2 | 12 |
| BPD28 | U3 | 31 |
| BPD29 | U1 | 21 |
| BPD29 | U2 | 55 |
| BPD29 | U3 | 32 |
| BPD3 | U1 | 60 |
| BPD3 | U2 | 3 |
| BPD3 | U4 | 22 |
| BPD30 | U1 | 20 |
| BPD30 | U2 | 41 |
| BPD30 | U3 | 33 |
| BPD31 | U1 | 19 |
| BPD31 | U2 | 27 |
| BPD31 | U3 | 34 |
| BPD4 | U1 | 59 |
| BPD4 | U2 | 19 |
| BPD4 | U4 | 23 |
| BPD5 | U1 | 58 |
| BPD5 | U2 | 35 |
| BPD5 | U4 | 24 |
| BPD6 | U1 | 57 |
| BPD6 | U2 | 51 |
| BPD6 | U4 | 25 |
| BPD7 | U1 | 45 |
| BPD7 | U2 | 4 |
| BPD7 | U4 | 26 |
| BPD8 | U1 | 43 |
| BPD8 | U2 | 20 |
| BPD8 | U4 | 27 |
| BPD9 | U1 | 56 |
| BPD9 | U2 | 36 |
| BPD9 | U4 | 28 |
| BPMSEL- | U1 | 31 |
| BPMSEL- | U1 | 32 |
| BPMSEL- | U1 | 33 |
| BPMSEL- | U1 | 34 |
| BPMSEL- | U12 | 14 |
| BPMSEL- | U23 | 17 |
| BPMSEL- | U23 | 20 |
| BPMSRB- | RN1 | 10 |
| BPMSRB- | U12 | 5 |
| BPMSRB- | U2 | 71 |
| BPR-W- | U1 | 28 |
| BPR-W- | U2 | 81 |

| | | |
|---|---|---|
| BPR-W- | U3 | 36 |
| BPR-W- | U3 | 37 |
| BPR-W- | U4 | 36 |
| BPR-W- | U4 | 37 |
| BPV-1 | U31 | 35 |
| BPV-1 | U8 | 7 |
| BPV-2 | U17 | 7 |
| BPV-2 | U31 | 36 |
| BRDY- | U2 | 61 |
| BRDY- | U23 | 18 |
| BRESET- | U2 | 70 |
| BRESET- | U2 | 72 |
| BRESET- | U23 | 27 |
| BRESET- | U32 | 42 |
| BTCLK0 | R14 | 1 |
| BTCLK0 | U2 | 154 |
| BTCLK1 | R12 | 1 |
| BTCLK1 | U2 | 140 |
| BXA0 | U14 | 7 |
| BXA0 | U15 | 7 |
| BXA0 | U2 | 13 |
| BXA0 | U22 | 6 |
| BXA1 | U14 | 8 |
| BXA1 | U15 | 8 |
| BXA1 | U2 | 14 |
| BXA10 | U14 | 5 |
| BXA10 | U15 | 5 |
| BXA10 | U2 | 45 |
| BXA11 | U14 | 4 |
| BXA11 | U15 | 4 |
| BXA11 | U2 | 59 |
| BXA12 | U2 | 67 |
| BXA12 | U22 | 27 |
| BXA2 | U14 | 9 |
| BXA2 | U15 | 9 |
| BXA2 | U2 | 56 |
| BXA3 | U14 | 10 |
| BXA3 | U15 | 10 |
| BXA3 | U2 | 42 |
| BXA4 | U14 | 11 |
| BXA4 | U15 | 11 |
| BXA4 | U2 | 28 |
| BXA5 | U14 | 12 |
| BXA5 | U15 | 12 |
| BXA5 | U2 | 15 |
| BXA6 | U14 | 13 |
| BXA6 | U15 | 13 |
| BXA6 | U2 | 30 |
| BXA7 | U14 | 14 |
| BXA7 | U15 | 14 |
| BXA7 | U2 | 44 |
| BXA8 | U14 | 15 |
| BXA8 | U15 | 15 |
| BXA8 | U2 | 66 |

| | | |
|---|---|---|
| BXA9 | U14 | 16 |
| BXA9 | U15 | 16 |
| BXA9 | U2 | 58 |
| BXCS1- | U15 | 1 |
| BXCS1- | U22 | 26 |
| BXCS2- | U14 | 1 |
| BXCS2- | U22 | 25 |
| BXD0 | U14 | 17 |
| BXD0 | U15 | 17 |
| BXD0 | U2 | 169 |
| BXD0 | U22 | 4 |
| BXD0 | U30 | 7 |
| BXD1 | U14 | 18 |
| BXD1 | U15 | 18 |
| BXD1 | U2 | 155 |
| BXD1 | U22 | 5 |
| BXD1 | U30 | 6 |
| BXD2 | U14 | 19 |
| BXD2 | U15 | 19 |
| BXD2 | U2 | 141 |
| BXD2 | U30 | 5 |
| BXD3 | U14 | 20 |
| BXD3 | U15 | 20 |
| BXD3 | U2 | 170 |
| BXD3 | U30 | 4 |
| BXD4 | U14 | 21 |
| BXD4 | U15 | 21 |
| BXD4 | U2 | 156 |
| BXD4 | U30 | 31 |
| BXD5 | U14 | 22 |
| BXD5 | U15 | 22 |
| BXD5 | U2 | 127 |
| BXD5 | U30 | 30 |
| BXD6 | U14 | 23 |
| BXD6 | U15 | 23 |
| BXD6 | U2 | 171 |
| BXD6 | U30 | 29 |
| BXD7 | U14 | 24 |
| BXD7 | U15 | 24 |
| BXD7 | U2 | 142 |
| BXD7 | U30 | 28 |
| BXF0 | U2 | 79 |
| BXF0 | U27 | 13 |
| BXR-W- | U14 | 2 |
| BXR-W- | U15 | 2 |
| BXR-W- | U2 | 46 |
| BXR-W- | U22 | 13 |
| BXSTRB- | U2 | 63 |
| BXSTRB- | U22 | 17 |
| CB-1 | U33 | 19 |
| CB-1 | U9 | 36 |
| CB-2 | U18 | 36 |
| CB-2 | U34 | 2 |
| CHGND | J1 | 1 |

| | | |
|---|---|---|
| CHGND | J1 | 6 |
| CHGND | J2 | 1 |
| CHGND | J2 | 6 |
| CHGND | MT1 | 1 |
| CHGND | MT2 | 1 |
| CLKIN | U11 | 8 |
| CLKIN | U19 | 16 |
| CLKIN | U2 | 16 |
| CRCEN-1 | U17 | 13 |
| CRCEN-1 | U33 | 5 |
| CRCEN-1 | U8 | 13 |
| CRCER-1 | U31 | 8 |
| CRCER-1 | U8 | 9 |
| CRCER-2 | U17 | 9 |
| CRCER-2 | U31 | 9 |
| CTEN-1 | U16 | 17 |
| CTEN-1 | U31 | 58 |
| CTEN-2 | U25 | 17 |
| CTEN-2 | U31 | 57 |
| DP-CS1- | U15 | 51 |
| DP-CS1- | U16 | 24 |
| DP-CS1- | U5 | 51 |
| DP-CS2- | U14 | 51 |
| DP-CS2- | U25 | 24 |
| DP-CS2- | U6 | 51 |
| DPA0-1 | U15 | 45 |
| DPA0-1 | U16 | 4 |
| DPA0-1 | U5 | 45 |
| DPA0-2 | U14 | 45 |
| DPA0-2 | U25 | 4 |
| DPA0-2 | U6 | 45 |
| DPA1-1 | U15 | 44 |
| DPA1-1 | U16 | 5 |
| DPA1-1 | U5 | 44 |
| DPA1-2 | U14 | 44 |
| DPA1-2 | U25 | 5 |
| DPA1-2 | U6 | 44 |
| DPA10-1 | U15 | 47 |
| DPA10-1 | U16 | 21 |
| DPA10-1 | U5 | 47 |
| DPA10-2 | U14 | 47 |
| DPA10-2 | U25 | 21 |
| DPA10-2 | U6 | 47 |
| DPA11-1 | U15 | 48 |
| DPA11-1 | U16 | 22 |
| DPA11-1 | U5 | 48 |
| DPA11-2 | U14 | 48 |
| DPA11-2 | U25 | 22 |
| DPA11-2 | U6 | 48 |
| DPA2-1 | U15 | 43 |
| DPA2-1 | U16 | 6 |
| DPA2-1 | U5 | 43 |
| DPA2-2 | U14 | 43 |
| DPA2-2 | U25 | 6 |

| | | |
|---|---|---|
| DPA2-2 | U6 | 43 |
| DPA3-1 | U15 | 42 |
| DPA3-1 | U16 | 7 |
| DPA3-1 | U5 | 42 |
| DPA3-2 | U14 | 42 |
| DPA3-2 | U25 | 7 |
| DPA3-2 | U6 | 42 |
| DPA4-1 | U15 | 41 |
| DPA4-1 | U16 | 8 |
| DPA4-1 | U5 | 41 |
| DPA4-2 | U14 | 41 |
| DPA4-2 | U25 | 8 |
| DPA4-2 | U6 | 41 |
| DPA5-1 | U15 | 40 |
| DPA5-1 | U16 | 9 |
| DPA5-1 | U5 | 40 |
| DPA5-2 | U14 | 40 |
| DPA5-2 | U25 | 9 |
| DPA5-2 | U6 | 40 |
| DPA6-1 | U15 | 39 |
| DPA6-1 | U16 | 10 |
| DPA6-1 | U5 | 39 |
| DPA6-2 | U14 | 39 |
| DPA6-2 | U25 | 10 |
| DPA6-2 | U6 | 39 |
| DPA7-1 | U15 | 38 |
| DPA7-1 | U16 | 12 |
| DPA7-1 | U5 | 38 |
| DPA7-2 | U14 | 38 |
| DPA7-2 | U25 | 12 |
| DPA7-2 | U6 | 38 |
| DPA8-1 | U15 | 37 |
| DPA8-1 | U16 | 18 |
| DPA8-1 | U5 | 37 |
| DPA8-2 | U14 | 37 |
| DPA8-2 | U25 | 18 |
| DPA8-2 | U6 | 37 |
| DPA9-1 | U15 | 36 |
| DPA9-1 | U16 | 20 |
| DPA9-1 | U5 | 36 |
| DPA9-2 | U14 | 36 |
| DPA9-2 | U25 | 20 |
| DPA9-2 | U6 | 36 |
| EF-1 | U22 | 21 |
| EF-1 | U29 | 24 |
| EF-1 | U31 | 46 |
| EF-2 | U22 | 18 |
| EF-2 | U30 | 24 |
| EF-2 | U31 | 44 |
| ELS1-1 | U18 | 38 |
| ELS1-1 | U33 | 6 |
| ELS1-1 | U9 | 38 |
| ES0-1 | U31 | 40 |
| ES0-1 | U9 | 29 |

| | | |
|---|---|---|
| ES0-2 | U18 | 29 |
| ES0-2 | U31 | 42 |
| ES1-1 | U31 | 41 |
| ES1-1 | U9 | 30 |
| ES1-2 | U18 | 30 |
| ES1-2 | U31 | 43 |
| FIFO-R1 | U29 | 18 |
| FIFO-R1 | U31 | 14 |
| FIFO-R2 | U30 | 18 |
| FIFO-R2 | U31 | 15 |
| FIFO-RS | U29 | 25 |
| FIFO-RS | U30 | 25 |
| FIFO-RS | U31 | 53 |
| FIFO-W1 | U29 | 2 |
| FIFO-W1 | U31 | 17 |
| FIFO-W2 | U22 | 24 |
| FIFO-W2 | U30 | 2 |
| G2B1 | K1 | 8 |
| G2B1 | U10 | 3 |
| G2B2 | K7 | 8 |
| G2B2 | U28 | 3 |
| GND | C1 | 2 |
| GND | C12 | 2 |
| GND | C12 | 4 |
| GND | C13 | 2 |
| GND | C13 | 4 |
| GND | C13 | 6 |
| GND | C13 | 8 |
| GND | C14 | 2 |
| GND | C14 | 4 |
| GND | C14 | 6 |
| GND | C14 | 8 |
| GND | C15 | 2 |
| GND | C16 | 2 |
| GND | C17 | 2 |
| GND | C18 | 2 |
| GND | C2 | 2 |
| GND | C25 | 2 |
| GND | C26 | 2 |
| GND | C3 | 2 |
| GND | C30 | 2 |
| GND | C31 | 2 |
| GND | C32 | 2 |
| GND | C33 | 2 |
| GND | C34 | 2 |
| GND | C34 | 4 |
| GND | C34 | 6 |
| GND | C34 | 8 |
| GND | C4 | 2 |
| GND | C41 | 2 |
| GND | C42 | 2 |
| GND | C42 | 4 |
| GND | C43 | 2 |
| GND | C43 | 4 |

| | | |
|---|---|---|
| GND | C43 | 6 |
| GND | C43 | 8 |
| GND | C44 | 2 |
| GND | C44 | 4 |
| GND | C44 | 6 |
| GND | C44 | 8 |
| GND | C45 | 2 |
| GND | C46 | 2 |
| GND | C47 | 2 |
| GND | C48 | 2 |
| GND | C49 | 2 |
| GND | C5 | 2 |
| GND | C5 | 4 |
| GND | C5 | 6 |
| GND | C5 | 8 |
| GND | C50 | 2 |
| GND | C55 | 2 |
| GND | C56 | 2 |
| GND | C57 | 2 |
| GND | C58 | 2 |
| GND | C59 | 2 |
| GND | C6 | 2 |
| GND | C60 | 2 |
| GND | C61 | 2 |
| GND | C62 | 2 |
| GND | C7 | 2 |
| GND | D9 | 2 |
| GND | JPR1 | 2 |
| GND | JPR2 | 2 |
| GND | JPR3 | 2 |
| GND | MT3 | 1 |
| GND | MT4 | 1 |
| GND | MT6 | 1 |
| GND | P1B | 1 |
| GND | P1B | 10 |
| GND | P1B | 31 |
| GND | P2D | 18 |
| GND | R24 | 1 |
| GND | R26 | 1 |
| GND | TP1 | 1 |
| GND | TP12 | 1 |
| GND | TP3 | 1 |
| GND | TP9 | 1 |
| GND | U1 | 1 |
| GND | U1 | 27 |
| GND | U1 | 37 |
| GND | U1 | 38 |
| GND | U1 | 64 |
| GND | U11 | 7 |
| GND | U12 | 8 |
| GND | U13 | 8 |
| GND | U14 | 6 |
| GND | U14 | 26 |
| GND | U14 | 46 |

| | | |
|---|---|---|
| GND | U14 | 50 |
| GND | U15 | 6 |
| GND | U15 | 26 |
| GND | U15 | 46 |
| GND | U15 | 50 |
| GND | U16 | 14 |
| GND | U16 | 15 |
| GND | U17 | 22 |
| GND | U18 | 12 |
| GND | U19 | 17 |
| GND | U19 | 29 |
| GND | U19 | 33 |
| GND | U19 | 38 |
| GND | U19 | 43 |
| GND | U19 | 47 |
| GND | U19 | 60 |
| GND | U19 | 64 |
| GND | U19 | 88 |
| GND | U19 | 93 |
| GND | U19 | 138 |
| GND | U19 | 143 |
| GND | U19 | 148 |
| GND | U19 | 164 |
| GND | U2 | 17 |
| GND | U2 | 29 |
| GND | U2 | 33 |
| GND | U2 | 38 |
| GND | U2 | 43 |
| GND | U2 | 47 |
| GND | U2 | 60 |
| GND | U2 | 64 |
| GND | U2 | 88 |
| GND | U2 | 93 |
| GND | U2 | 138 |
| GND | U2 | 143 |
| GND | U2 | 148 |
| GND | U2 | 164 |
| GND | U20 | 18 |
| GND | U20 | 35 |
| GND | U20 | 38 |
| GND | U21 | 18 |
| GND | U21 | 35 |
| GND | U21 | 38 |
| GND | U22 | 2 |
| GND | U22 | 14 |
| GND | U22 | 15 |
| GND | U22 | 16 |
| GND | U23 | 14 |
| GND | U23 | 15 |
| GND | U24 | 1 |
| GND | U24 | 10 |
| GND | U25 | 14 |
| GND | U25 | 15 |
| GND | U26 | 12 |

| | | |
|---|---|---|
| GND | U26 | 14 |
| GND | U26 | 15 |
| GND | U26 | 35 |
| GND | U26 | 42 |
| GND | U26 | 55 |
| GND | U26 | 56 |
| GND | U27 | 14 |
| GND | U29 | 3 |
| GND | U29 | 8 |
| GND | U29 | 16 |
| GND | U3 | 18 |
| GND | U3 | 35 |
| GND | U3 | 38 |
| GND | U30 | 3 |
| GND | U30 | 8 |
| GND | U30 | 16 |
| GND | U31 | 16 |
| GND | U31 | 33 |
| GND | U31 | 50 |
| GND | U31 | 67 |
| GND | U32 | 10 |
| GND | U32 | 21 |
| GND | U32 | 32 |
| GND | U32 | 43 |
| GND | U33 | 1 |
| GND | U33 | 10 |
| GND | U34 | 1 |
| GND | U34 | 10 |
| GND | U35 | 14 |
| GND | U36 | 10 |
| GND | U37 | 1 |
| GND | U37 | 27 |
| GND | U37 | 37 |
| GND | U37 | 38 |
| GND | U37 | 64 |
| GND | U38 | 10 |
| GND | U39 | 10 |
| GND | U39 | 19 |
| GND | U4 | 18 |
| GND | U4 | 35 |
| GND | U4 | 38 |
| GND | U40 | 10 |
| GND | U40 | 19 |
| GND | U41 | 10 |
| GND | U5 | 6 |
| GND | U5 | 26 |
| GND | U5 | 46 |
| GND | U5 | 50 |
| GND | U6 | 6 |
| GND | U6 | 26 |
| GND | U6 | 46 |
| GND | U6 | 50 |
| GND | U7 | 12 |
| GND | U7 | 14 |

| | | |
|---|---|---|
| GND | U7 | 15 |
| GND | U7 | 35 |
| GND | U7 | 42 |
| GND | U7 | 55 |
| GND | U7 | 56 |
| GND | U8 | 22 |
| GND | U9 | 12 |
| HF-1 | U22 | 22 |
| HF-1 | U29 | 23 |
| HF-1 | U31 | 47 |
| HF-2 | U22 | 20 |
| HF-2 | U30 | 23 |
| HF-2 | U31 | 45 |
| IA-1 | U26 | 5 |
| IA-1 | U34 | 16 |
| IA-1 | U7 | 5 |
| IB-1 | U26 | 6 |
| IB-1 | U34 | 19 |
| IB-1 | U7 | 6 |
| IC-1 | U24 | 2 |
| IC-1 | U26 | 61 |
| IC-1 | U7 | 61 |
| ID-1 | U24 | 5 |
| ID-1 | U26 | 7 |
| ID-1 | U7 | 7 |
| IN1+ | C19 | 2 |
| IN1+ | U9 | 31 |
| IN1- | C20 | 2 |
| IN1- | U9 | 32 |
| IN2+ | C38 | 2 |
| IN2+ | U18 | 31 |
| IN2- | C39 | 2 |
| IN2- | U18 | 32 |
| IOR | P1B | 14 |
| IOR | U40 | 8 |
| IOR- | U32 | 34 |
| IOR- | U40 | 12 |
| IORDY | P1A | 10 |
| IORDY | U27 | 27 |
| IOW | P1B | 13 |
| IOW | U40 | 9 |
| IOW- | U32 | 35 |
| IOW- | U40 | 11 |
| IRQ7 | P1B | 21 |
| IRQ7 | U27 | 23 |
| ISO-J1 | J2 | 3 |
| ISO-J1 | K4 | 8 |
| LOP69-1 | U33 | 15 |
| LOP69-1 | U9 | 19 |
| LOP69-2 | U18 | 19 |
| LOP69-2 | U33 | 16 |
| LOP75-1 | U17 | 1 |
| LOP75-1 | U33 | 2 |
| LOP75-1 | U8 | 1 |

| | | |
|---|---|---|
| LOWMEM- | U32 | 9 |
| LOWMEM- | U35 | 23 |
| M2-1 | U24 | 6 |
| M2-1 | U7 | 13 |
| M2-2 | U24 | 9 |
| M2-2 | U26 | 13 |
| MEMCS16 | P2D | 1 |
| MEMCS16 | U35 | 27 |
| MEMR- | P2C | 9 |
| MEMR- | U27 | 11 |
| MEMW- | P2C | 10 |
| MEMW- | U27 | 9 |
| MODE69-.1 | U33 | 9 |
| MODE69-.1 | U9 | 20 |
| MODE69-.2 | U18 | 20 |
| MODE69-.2 | U33 | 12 |
| OC-1 | U31 | 55 |
| OC-1 | U7 | 32 |
| OC-2 | U26 | 32 |
| OC-2 | U31 | 56 |
| OD-1 | U31 | 6 |
| OD-1 | U7 | 31 |
| OD-2 | U26 | 31 |
| OD-2 | U31 | 7 |
| PCA0 | P1A | 31 |
| PCA0 | U27 | 7 |
| PCA0 | U39 | 2 |
| PCA0- | U32 | 33 |
| PCA0- | U39 | 18 |
| PCA1 | P1A | 30 |
| PCA1 | U27 | 3 |
| PCA1 | U39 | 3 |
| PCA1- | U32 | 31 |
| PCA1- | U39 | 17 |
| PCA10 | P1A | 21 |
| PCA10 | U40 | 4 |
| PCA10- | U20 | 62 |
| PCA10- | U21 | 62 |
| PCA10- | U3 | 62 |
| PCA10- | U32 | 2 |
| PCA10- | U4 | 62 |
| PCA10- | U40 | 16 |
| PCA11 | P1A | 20 |
| PCA11 | U40 | 5 |
| PCA11- | U20 | 63 |
| PCA11- | U21 | 63 |
| PCA11- | U3 | 63 |
| PCA11- | U32 | 1 |
| PCA11- | U4 | 63 |
| PCA11- | U40 | 15 |
| PCA12 | P1A | 19 |
| PCA12 | U40 | 6 |
| PCA12- | U20 | 64 |
| PCA12- | U21 | 64 |

| | | |
|---|---|---|
| PCA12- | U3 | 64 |
| PCA12- | U32 | 41 |
| PCA12- | U4 | 64 |
| PCA12- | U40 | 14 |
| PCA13 | P1A | 18 |
| PCA13 | U27 | 10 |
| PCA13- | U27 | 17 |
| PCA13- | U32 | 40 |
| PCA14 | P1A | 17 |
| PCA14 | U35 | 12 |
| PCA15 | P1A | 16 |
| PCA15 | U35 | 11 |
| PCA16 | P1A | 15 |
| PCA16 | U35 | 10 |
| PCA17 | P1A | 14 |
| PCA17 | U35 | 9 |
| PCA18 | P1A | 13 |
| PCA18 | U35 | 7 |
| PCA19 | P1A | 12 |
| PCA19 | U35 | 6 |
| PCA2 | P1A | 29 |
| PCA2 | U39 | 4 |
| PCA2- | U20 | 54 |
| PCA2- | U21 | 54 |
| PCA2- | U3 | 54 |
| PCA2- | U32 | 30 |
| PCA2- | U39 | 16 |
| PCA2- | U4 | 54 |
| PCA20 | P2C | 8 |
| PCA21 | P2C | 7 |
| PCA22 | P2C | 6 |
| PCA23 | P2C | 5 |
| PCA23 | U35 | 5 |
| PCA24 | P2C | 4 |
| PCA24 | U35 | 4 |
| PCA25 | P2C | 3 |
| PCA25 | U35 | 3 |
| PCA26 | P2C | 2 |
| PCA26 | U35 | 2 |
| PCA3 | P1A | 28 |
| PCA3 | U39 | 5 |
| PCA3- | U20 | 55 |
| PCA3- | U21 | 55 |
| PCA3- | U3 | 55 |
| PCA3- | U32 | 29 |
| PCA3- | U39 | 15 |
| PCA3- | U4 | 55 |
| PCA4 | P1A | 27 |
| PCA4 | U39 | 6 |
| PCA4- | U20 | 56 |
| PCA4- | U21 | 56 |
| PCA4- | U3 | 56 |
| PCA4- | U39 | 14 |
| PCA4- | U4 | 56 |

| | | |
|---|---|---|
| PCA5 | P1A | 26 |
| PCA5 | U39 | 7 |
| PCA5- | U20 | 57 |
| PCA5- | U21 | 57 |
| PCA5- | U27 | 5 |
| PCA5- | U3 | 57 |
| PCA5- | U39 | 13 |
| PCA5- | U4 | 57 |
| PCA6 | P1A | 25 |
| PCA6 | U39 | 8 |
| PCA6- | U20 | 58 |
| PCA6- | U21 | 58 |
| PCA6- | U27 | 4 |
| PCA6- | U3 | 58 |
| PCA6- | U39 | 12 |
| PCA6- | U4 | 58 |
| PCA7 | P1A | 24 |
| PCA7 | U39 | 9 |
| PCA7- | U20 | 59 |
| PCA7- | U21 | 59 |
| PCA7- | U3 | 59 |
| PCA7- | U32 | 28 |
| PCA7- | U39 | 11 |
| PCA7- | U4 | 59 |
| PCA8 | P1A | 23 |
| PCA8 | U40 | 2 |
| PCA8- | U20 | 60 |
| PCA8- | U21 | 60 |
| PCA8- | U3 | 60 |
| PCA8- | U32 | 27 |
| PCA8- | U4 | 60 |
| PCA8- | U40 | 18 |
| PCA9 | P1A | 22 |
| PCA9 | U40 | 3 |
| PCA9- | U20 | 61 |
| PCA9- | U21 | 61 |
| PCA9- | U3 | 61 |
| PCA9- | U32 | 26 |
| PCA9- | U4 | 61 |
| PCA9- | U40 | 17 |
| PCACS0- | U21 | 52 |
| PCACS0- | U27 | 21 |
| PCACS1- | U20 | 52 |
| PCACS1- | U27 | 20 |
| PCBCS0- | U27 | 19 |
| PCBCS0- | U4 | 52 |
| PCBCS1- | U27 | 18 |
| PCBCS1- | U3 | 52 |
| PCBUS- | RN1 | 7 |
| PCBUS- | U20 | 53 |
| PCBUS- | U21 | 53 |
| PCBUS- | U27 | 2 |
| PCBUS- | U3 | 53 |
| PCBUS- | U4 | 53 |

| | | |
|---|---|---|
| PCD0 | P1A | 9 |
| PCD0 | U41 | 2 |
| PCD0- | U20 | 1 |
| PCD0- | U21 | 1 |
| PCD0- | U3 | 1 |
| PCD0- | U32 | 23 |
| PCD0- | U4 | 1 |
| PCD0- | U41 | 18 |
| PCD1 | P1A | 8 |
| PCD1 | U41 | 3 |
| PCD1- | U20 | 2 |
| PCD1- | U21 | 2 |
| PCD1- | U3 | 2 |
| PCD1- | U32 | 22 |
| PCD1- | U4 | 2 |
| PCD1- | U41 | 17 |
| PCD10 | P2C | 13 |
| PCD10 | U38 | 4 |
| PCD10- | U20 | 11 |
| PCD10- | U21 | 11 |
| PCD10- | U3 | 11 |
| PCD10- | U38 | 16 |
| PCD10- | U4 | 11 |
| PCD11 | P2C | 14 |
| PCD11 | U38 | 5 |
| PCD11- | U20 | 12 |
| PCD11- | U21 | 12 |
| PCD11- | U3 | 12 |
| PCD11- | U38 | 15 |
| PCD11- | U4 | 12 |
| PCD12 | P2C | 15 |
| PCD12 | U38 | 6 |
| PCD12- | U20 | 13 |
| PCD12- | U21 | 13 |
| PCD12- | U3 | 13 |
| PCD12- | U38 | 14 |
| PCD12- | U4 | 13 |
| PCD13 | P2C | 16 |
| PCD13 | U38 | 7 |
| PCD13- | U20 | 14 |
| PCD13- | U21 | 14 |
| PCD13- | U3 | 14 |
| PCD13- | U38 | 13 |
| PCD13- | U4 | 14 |
| PCD14 | P2C | 17 |
| PCD14 | U38 | 8 |
| PCD14- | U20 | 15 |
| PCD14- | U21 | 15 |
| PCD14- | U3 | 15 |
| PCD14- | U38 | 12 |
| PCD14- | U4 | 15 |
| PCD15 | P2C | 18 |
| PCD15 | U38 | 9 |
| PCD15- | U20 | 16 |

| | | |
|---|---|---|
| PCD15- | U21 | 16 |
| PCD15- | U3 | 16 |
| PCD15- | U38 | 11 |
| PCD15- | U4 | 16 |
| PCD2 | P1A | 7 |
| PCD2 | U41 | 4 |
| PCD2- | U20 | 3 |
| PCD2- | U21 | 3 |
| PCD2- | U3 | 3 |
| PCD2- | U32 | 20 |
| PCD2- | U4 | 3 |
| PCD2- | U41 | 16 |
| PCD3 | P1A | 6 |
| PCD3 | U41 | 5 |
| PCD3- | U20 | 4 |
| PCD3- | U21 | 4 |
| PCD3- | U3 | 4 |
| PCD3- | U32 | 19 |
| PCD3- | U4 | 4 |
| PCD3- | U41 | 15 |
| PCD4 | P1A | 5 |
| PCD4 | U41 | 6 |
| PCD4- | U20 | 5 |
| PCD4- | U21 | 5 |
| PCD4- | U3 | 5 |
| PCD4- | U4 | 5 |
| PCD4- | U41 | 14 |
| PCD5 | P1A | 4 |
| PCD5 | U41 | 7 |
| PCD5- | U20 | 6 |
| PCD5- | U21 | 6 |
| PCD5- | U3 | 6 |
| PCD5- | U4 | 6 |
| PCD5- | U41 | 13 |
| PCD6 | P1A | 3 |
| PCD6 | U41 | 8 |
| PCD6- | U20 | 7 |
| PCD6- | U21 | 7 |
| PCD6- | U3 | 7 |
| PCD6- | U4 | 7 |
| PCD6- | U41 | 12 |
| PCD7 | P1A | 2 |
| PCD7 | U41 | 9 |
| PCD7- | U20 | 8 |
| PCD7- | U21 | 8 |
| PCD7- | U3 | 8 |
| PCD7- | U4 | 8 |
| PCD7- | U41 | 11 |
| PCD8 | P2C | 11 |
| PCD8 | U38 | 2 |
| PCD8- | U20 | 9 |
| PCD8- | U21 | 9 |
| PCD8- | U3 | 9 |
| PCD8- | U38 | 18 |

| | | |
|---|---|---|
| PCD8- | U4 | 9 |
| PCD9 | P2C | 12 |
| PCD9 | U38 | 3 |
| PCD9- | U20 | 10 |
| PCD9- | U21 | 10 |
| PCD9- | U3 | 10 |
| PCD9- | U38 | 17 |
| PCD9- | U4 | 10 |
| PCOE- | U20 | 65 |
| PCOE- | U21 | 65 |
| PCOE- | U27 | 24 |
| PCOE- | U3 | 65 |
| PCOE- | U32 | 24 |
| PCOE- | U4 | 65 |
| PCR-WH- | U20 | 67 |
| PCR-WH- | U21 | 67 |
| PCR-WH- | U27 | 25 |
| PCR-WH- | U3 | 67 |
| PCR-WH- | U4 | 67 |
| PCR-WL- | U20 | 66 |
| PCR-WL- | U21 | 66 |
| PCR-WL- | U27 | 26 |
| PCR-WL- | U3 | 66 |
| PCR-WL- | U4 | 66 |
| PU-01 | RN1 | 2 |
| PU-01 | U13 | 6 |
| PU-02 | RN1 | 5 |
| PU-02 | U12 | 6 |
| PU-10 | RN2 | 2 |
| PU-10 | U8 | 20 |
| PU-10 | U8 | 21 |
| PU-11 | RN2 | 3 |
| PU-11 | U7 | 34 |
| PU-11 | U7 | 44 |
| PU-12 | RN2 | 4 |
| PU-12 | U29 | 26 |
| PU-12 | U30 | 26 |
| PU-20 | RN2 | 5 |
| PU-20 | U17 | 20 |
| PU-20 | U17 | 21 |
| PU-21 | RN2 | 6 |
| PU-21 | U26 | 34 |
| PU-21 | U26 | 44 |
| PU-69 | RN2 | 10 |
| PU-69 | U18 | 40 |
| PU-69 | U18 | 41 |
| PU-69 | U9 | 40 |
| PU-69 | U9 | 41 |
| PU-OPT1 | JPR2 | 1 |
| PU-OPT1 | RN2 | 7 |
| PU-OPT1 | U32 | 12 |
| PU-OPT2 | JPR3 | 1 |
| PU-OPT2 | RN2 | 8 |
| PU-OPT2 | U32 | 8 |

| | | |
|---|---|---|
| PU-OPT3 | JPR1 | 1 |
| PU-OPT3 | RN2 | 9 |
| PU-OPT3 | U32 | 7 |
| PUP-1 | U24 | 12 |
| PUP-1 | U7 | 41 |
| PUP-2 | U24 | 15 |
| PUP-2 | U26 | 41 |
| RCHCLK-.1 | R14 | 2 |
| RCHCLK-.1 | R15 | 2 |
| RCHCLK-.1 | U16 | 2 |
| RCHCLK-.1 | U16 | 3 |
| RCHCLK-.1 | U16 | 16 |
| RCHCLK-.1 | U7 | 27 |
| RCHCLK-.2 | R12 | 2 |
| RCHCLK-.2 | R13 | 2 |
| RCHCLK-.2 | U25 | 2 |
| RCHCLK-.2 | U25 | 3 |
| RCHCLK-.2 | U25 | 16 |
| RCHCLK-.2 | U26 | 27 |
| RCLK-1 | U23 | 7 |
| RCLK-1 | U31 | 32 |
| RCLK-1 | U7 | 59 |
| RCLK-1 | U8 | 15 |
| RCLK-1 | U9 | 42 |
| RCLK-2 | U17 | 15 |
| RCLK-2 | U18 | 42 |
| RCLK-2 | U23 | 22 |
| RCLK-2 | U26 | 59 |
| RCLK-2 | U31 | 34 |
| RD1-1 | U15 | 27 |
| RD1-1 | U5 | 27 |
| RD1-1 | U7 | 45 |
| RD1-2 | U14 | 27 |
| RD1-2 | U26 | 45 |
| RD1-2 | U6 | 27 |
| RD2-1 | U15 | 28 |
| RD2-1 | U5 | 28 |
| RD2-1 | U7 | 46 |
| RD2-2 | U14 | 28 |
| RD2-2 | U26 | 46 |
| RD2-2 | U6 | 28 |
| RD3-1 | U15 | 29 |
| RD3-1 | U5 | 29 |
| RD3-1 | U7 | 47 |
| RD3-2 | U14 | 29 |
| RD3-2 | U26 | 47 |
| RD3-2 | U6 | 29 |
| RD4-1 | U15 | 30 |
| RD4-1 | U5 | 30 |
| RD4-1 | U7 | 48 |
| RD4-2 | U14 | 30 |
| RD4-2 | U26 | 48 |
| RD4-2 | U6 | 30 |
| RD5-1 | U15 | 31 |

| | | |
|---|---|---|
| RD5-1 | U5 | 31 |
| RD5-1 | U7 | 49 |
| RD5-2 | U14 | 31 |
| RD5-2 | U26 | 49 |
| RD5-2 | U6 | 31 |
| RD6-1 | U15 | 32 |
| RD6-1 | U5 | 32 |
| RD6-1 | U7 | 50 |
| RD6-2 | U14 | 32 |
| RD6-2 | U26 | 50 |
| RD6-2 | U6 | 32 |
| RD7-1 | U15 | 33 |
| RD7-1 | U5 | 33 |
| RD7-1 | U7 | 51 |
| RD7-2 | U14 | 33 |
| RD7-2 | U26 | 51 |
| RD7-2 | U6 | 33 |
| RD8-1 | U15 | 34 |
| RD8-1 | U5 | 34 |
| RD8-1 | U7 | 52 |
| RD8-2 | U14 | 34 |
| RD8-2 | U26 | 52 |
| RD8-2 | U6 | 34 |
| RELAY1- | D4 | 2 |
| RELAY1- | K1 | 10 |
| RELAY1- | U36 | 12 |
| RELAY2- | D1 | 2 |
| RELAY2- | K2 | 10 |
| RELAY2- | U36 | 13 |
| RELAY3- | D2 | 2 |
| RELAY3- | K3 | 10 |
| RELAY3- | U36 | 14 |
| RELAY4- | D3 | 2 |
| RELAY4- | K4 | 10 |
| RELAY4- | U36 | 15 |
| RELAY5- | D5 | 2 |
| RELAY5- | K5 | 10 |
| RELAY5- | U36 | 16 |
| RELAY6- | D6 | 2 |
| RELAY6- | K6 | 10 |
| RELAY6- | U36 | 17 |
| RELAY7- | D7 | 2 |
| RELAY7- | K7 | 10 |
| RELAY7- | U36 | 18 |
| RESET | P1B | 2 |
| RESET | U40 | 7 |
| RESET- | D8 | 2 |
| RESET- | U40 | 13 |
| RNRZ | U23 | 5 |
| RNRZ | U8 | 14 |
| RNRZFAR | U17 | 14 |
| RNRZFAR | U23 | 24 |
| RNRZFAR.2 | U23 | 21 |
| RNRZFAR.2 | U26 | 57 |

| | | |
|---|---|---|
| RNRZFAR.2 | U26 | 58 |
| RNRZNER | U23 | 8 |
| RNRZNER | U7 | 57 |
| RNRZNER | U7 | 58 |
| RRED-1 | U31 | 61 |
| RRED-1 | U7 | 40 |
| RRED-2 | U26 | 40 |
| RRED-2 | U31 | 62 |
| RST-1 | U24 | 16 |
| RST-1 | U9 | 16 |
| RST-2 | U18 | 16 |
| RST-2 | U24 | 19 |
| RSYNC-1 | U16 | 13 |
| RSYNC-1 | U31 | 51 |
| RSYNC-1 | U7 | 39 |
| RSYNC-1 | U8 | 12 |
| RSYNC-2 | U17 | 12 |
| RSYNC-2 | U25 | 13 |
| RSYNC-2 | U26 | 39 |
| RSYNC-2 | U31 | 52 |
| RWIHBT-.1 | U16 | 27 |
| RWIHBT-.1 | U7 | 29 |
| RWIHBT-.2 | U25 | 27 |
| RWIHBT-.2 | U26 | 29 |
| RYEL-1 | U31 | 60 |
| RYEL-1 | U7 | 54 |
| RYEL-2 | U26 | 54 |
| RYEL-2 | U31 | 59 |
| SBHE- | P2C | 1 |
| SBHE- | U27 | 6 |
| SEL1-1 | U32 | 18 |
| SEL1-1 | U35 | 16 |
| SEL1-2 | U32 | 17 |
| SEL1-2 | U35 | 17 |
| SEL2-1 | U32 | 15 |
| SEL2-1 | U35 | 19 |
| SEL2-2 | U32 | 16 |
| SEL2-2 | U35 | 18 |
| SELEN | U27 | 16 |
| SELEN | U32 | 5 |
| SELEN | U35 | 25 |
| SELEN | U38 | 19 |
| SELEN | U41 | 19 |
| SRDY- | P1B | 8 |
| SRDY- | U35 | 26 |
| TCHCLK-.1 | U7 | 24 |
| TCHCLK-.2 | U26 | 24 |
| TCLK-1 | U31 | 26 |
| TCLK-1 | U7 | 10 |
| TCLK-1 | U8 | 23 |
| TCLK-1 | U9 | 44 |
| TCLK-2 | U17 | 23 |
| TCLK-2 | U18 | 44 |
| TCLK-2 | U26 | 10 |

| | | |
|---|---|---|
| TCLK-2 | U31 | 27 |
| TD1-1 | U26 | 62 |
| TD1-1 | U29 | 10 |
| TD1-1 | U30 | 10 |
| TD1-1 | U7 | 62 |
| TD2-1 | U26 | 63 |
| TD2-1 | U29 | 11 |
| TD2-1 | U30 | 11 |
| TD2-1 | U7 | 63 |
| TD3-1 | U26 | 64 |
| TD3-1 | U29 | 13 |
| TD3-1 | U30 | 13 |
| TD3-1 | U7 | 64 |
| TD4-1 | U26 | 65 |
| TD4-1 | U29 | 14 |
| TD4-1 | U30 | 14 |
| TD4-1 | U7 | 65 |
| TD5-1 | U26 | 66 |
| TD5-1 | U29 | 19 |
| TD5-1 | U30 | 19 |
| TD5-1 | U7 | 66 |
| TD6-1 | U26 | 67 |
| TD6-1 | U29 | 20 |
| TD6-1 | U30 | 20 |
| TD6-1 | U7 | 67 |
| TD7-1 | U26 | 1 |
| TD7-1 | U29 | 21 |
| TD7-1 | U30 | 21 |
| TD7-1 | U7 | 1 |
| TD8-1 | U26 | 2 |
| TD8-1 | U29 | 22 |
| TD8-1 | U30 | 22 |
| TD8-1 | U7 | 2 |
| TFMSYNC | U26 | 3 |
| TFMSYNC | U26 | 4 |
| TFMSYNC | U31 | 11 |
| TFMSYNC | U7 | 3 |
| TFMSYNC | U7 | 4 |
| TIDLE-1 | U26 | 16 |
| TIDLE-1 | U34 | 12 |
| TIDLE-1 | U7 | 16 |
| TLOOP-1 | U26 | 17 |
| TLOOP-1 | U34 | 9 |
| TLOOP-1 | U7 | 17 |
| TMAX-1 | U31 | 28 |
| TMAX-1 | U7 | 11 |
| TMAX-1 | U8 | 24 |
| TMAX-2 | U17 | 24 |
| TMAX-2 | U26 | 11 |
| TMAX-2 | U31 | 29 |
| TOUTN1 | TX1 | 5 |
| TOUTN1 | U9 | 15 |
| TOUTN2 | TX2 | 5 |
| TOUTN2 | U18 | 15 |

| | | |
|---|---|---|
| TOUTP1 | C24 | 2 |
| TOUTP1 | U9 | 10 |
| TOUTP2 | C35 | 2 |
| TOUTP2 | U18 | 10 |
| TYEL-1 | U26 | 8 |
| TYEL-1 | U34 | 15 |
| TYEL-1 | U7 | 8 |
| U18-P5 | U18 | 5 |
| U32P6 | U32 | 6 |
| U32P6 | U38 | 1 |
| U32P6 | U41 | 1 |
| U9-P5 | U9 | 5 |
| VPP1 | C21 | 1 |
| VPP1 | L1 | 2 |
| VPP1 | U10 | 10 |
| VPP2 | C40 | 1 |
| VPP2 | L2 | 2 |
| VPP2 | U28 | 10 |

APPENDIX-2 : PARTS LIST AND NETLIST OF SS7 CARD

PARTS LIST OF SS7 CARD

| QTY | PART# | DESCRIPTION | MANUF | LOCATION |
|---|---|---|---|---|
| 1 | 10 LAYER BD | PC BOARD rev. C | ADS | PCB1 |
| 1 | 74 LS 244 | CHIP | | U14 |
| 5 | 74 LS 541 | CHIP | | U15 17 26 27 28 |
| 4 | 74 LS 645 | CHIP | | U22 24 25 29 |
| 2 | 74 ALS 841 | CHIP | | U28 |
| 1 | MAX231CPD | RS232 INTERFACE | MAXIM | U6 |
| 4 | HA3-5020-5 | VIDEOAMP | HARRIS | U113 114 115 116 |
| 4 | MK5025Q 10/08rev3 | HDLC CONTRLER | SGS | U3 4 5 13 |
| 1 | EMP5064LC PLCC | MAX EPLD 35ns | ALTER | U103 |
| 5 | EPM5192LC PLCC | MAX EPLD 35ns | ALTER | U19 20 21 101 109 |
| 4 | TC551001APL-85 | 128Kx8 SRAM | TOSH | U9 16 18 23 |
| 1 | XR-T5675CP | L LINE DRIVER | EXAR | U112 117 |
| 1 | MIC5800BN | RLY DRVR DIP PK | MICEL | U107 |
| 1 | IDT7133S-70J | CHIP PLCC | IDT | U12 |
| 1 | TN80C186EB PLCC | 20Mhz 16-BIT uP | INTEL | U10 |
| 1 | DIP 14 PIN .3W | DIP 14 PIN .3W | | RN105 |
| 2 | DIP 16 PIN .3W | DIP 16 PIN .3W | | U104 108 |
| 2 | DIP 28 PIN .3W | DIP 28 PIN .3W | | U1 7 |
| 5 | PLCC 44 PIN | PLCC 44 PIN | | U102 103 106 110 111 |
| 4 | PLCC 52 PIN | PLCC 52 PIN | | U3 4 5 13 |
| 1 | PLCC 68 PIN | PLCC 68 PIN | | U12 |
| 6 | PLCC 84 PIN | PLCC 84 PIN | | U10 19 20 21 101 109 |
| 9 | MONO 103 .1 LS | 0.01uF 50V | | C13 14 15 16 17 C12X |
| 1 | MONO 104 .1 LS | 0.1uF 50V | | C3 |
| 2 | T105K .1 35V | 1uF .1LS 35V | | C1 2 |
| 1 | T106K .1 16V | 10uF .1LS 16V | | C6 |
| 2 | T106K .1 25V | 10uF .1LS 25V | | C11 12 |
| 9 | 123ADG MICRO-C | 4 LEGS | CIRCUT | C3X 4X 5X 13X 102X C103X 106X 110X C111X |
| 10 | 303A20 MICRO-C | 20 PIN | CIRCUT | C14X 15X 17X 22X C24X-29X |
| 2 | 303A2A MICRO-C | 24 PIN | CIRCUT | C2X 8X |
| 2 | 303AJK MICRO-C | 28 PIN | CIRCUT | C1X 7X |
| 4 | 303AFU MICRO-C | 32 PIN | CIRCUT | C9X 16X 18X 23X |
| 6 | 703ADE MICRO-C | 8 LEGS | CIRCUT | C10X 19X 20X 21X C101X 109X |
| 3 | TP105-40-00 | BLK LOOP TP | SOURCE | AGND GND1 GND2 |
| 2 | TP105-40-02 | RED LOOP TP | SOURCE | TP123 125 |
| 2 | TP105-40-06 | GRN LOOP TP | SOURCE | TP124 126 |
| 26 | TP105-40-04 | YEL LOOP TP | SOURCE | TP1-4 101-121 |
| 1 | VF75 32.256 MHz | 32.256 MHz | VALPEY | U11 |
| 8 | TN2E-12V | 12V RLY 2xC FORM | AROMAT | IN1 IN2 IN3 IN3 KT1 KM1 KT2 KM2 |

| | | | | |
|---|---|---|---|---|
| 2 | 330 ohm 1/4w 5% | 330 ohm 1/4w 5% | | R1 4 |
| 2 | 560 ohm 1/4w 5% | 560 ohm 1/4w 5% | | R2 3 |
| 4 | MSP10A-01-102 | S10-1K -BUSSED | DALE | RN2 3 6 8 |
| 1 | MSP10A-01-331 | S10-330 -BUSSED | DALE | RN7 |
| 2 | MSP10A-01-561 | S10-560 -BUSSED | DALE | RN5 14 |
| 3 | MSP10A-01-472 | S10-4.7K-BUSSED | DALE | RN4 12 13 |
| 1 | MSP08A-03-560 | S08-56 -ISOLTD | DALE | RN19 |
| 2 | MSP08A-03-111 | S08-110 -ISOLTD | DALE | RN16 18 |
| 1 | MSP08A-03-102 | S08-1K -ISOLTD | DALE | RN11 |
| 1 | 76PSB05 | 5-SWITCH | | S1 |
| 1 | 115090 | DUAL 1:2CT | SCHT | OUT11 |
| 4 | PE64954 | 1:2CT, 1:1 | PULSE | T11 T12 T13 T14 |

NETLIST OF SS7 CARD

| | | |
|---|---|---|
| +12VDC | C11 | 1 |
| +12VDC | C13 | 1 |
| +12VDC | IN11 | 1 |
| +12VDC | IN12 | 1 |
| +12VDC | IN13 | 1 |
| +12VDC | IN14 | 1 |
| +12VDC | KM11 | 1 |
| +12VDC | KM12 | 1 |
| +12VDC | KT11 | 1 |
| +12VDC | P1B | 9 |
| +12VDC | U107 | 8 |
| +12VDC | U113 | 7 |
| +12VDC | U114 | 7 |
| +12VDC | U115 | 7 |
| +12VDC | U116 | 7 |
| +12VDC | U6 | 14 |
| +5V | C101X | 1 |
| +5V | C101X | 3 |
| +5V | C101X | 5 |
| +5V | C101X | 7 |
| +5V | C102X | 1 |
| +5V | C102X | 3 |
| +5V | C103X | 1 |
| +5V | C103X | 3 |
| +5V | C106X | 1 |
| +5V | C106X | 3 |
| +5V | C109X | 1 |
| +5V | C109X | 3 |
| +5V | C109X | 5 |
| +5V | C109X | 7 |
| +5V | C10X | 1 |
| +5V | C10X | 3 |
| +5V | C10X | 5 |
| +5V | C10X | 7 |
| +5V | C110X | 1 |
| +5V | C110X | 3 |
| +5V | C111X | 1 |
| +5V | C111X | 3 |
| +5V | C12X | 1 |
| +5V | C12X | 3 |
| +5V | C12X | 5 |
| +5V | C12X | 7 |
| +5V | C13X | 1 |
| +5V | C13X | 3 |
| +5V | C14X | 1 |
| +5V | C14X | 3 |
| +5V | C15 | 1 |
| +5V | C16 | 1 |
| +5V | C17 | 1 |
| +5V | C19X | 1 |
| +5V | C19X | 3 |

| | | |
|---|---|---|
| +5V | C19X | 5 |
| +5V | C19X | 7 |
| +5V | C20X | 1 |
| +5V | C20X | 3 |
| +5V | C20X | 5 |
| +5V | C20X | 7 |
| +5V | C21X | 1 |
| +5V | C21X | 3 |
| +5V | C21X | 5 |
| +5V | C21X | 7 |
| +5V | C3 | 1 |
| +5V | C3X | 1 |
| +5V | C3X | 3 |
| +5V | C4X | 1 |
| +5V | C4X | 3 |
| +5V | C6 | 1 |
| +5V | OUT1 | 2 |
| +5V | OUT1 | 9 |
| +5V | P1B | 3 |
| +5V | P1B | 29 |
| +5V | P2D | 16 |
| +5V | R1 | 1 |
| +5V | R4 | 1 |
| +5V | RN1 | 1 |
| +5V | RN12 | 1 |
| +5V | RN13 | 1 |
| +5V | RN14 | 1 |
| +5V | RN2 | 1 |
| +5V | RN4 | 1 |
| +5V | RN6 | 1 |
| +5V | RN7 | 1 |
| +5V | RN8 | 1 |
| +5V | U1 | 28 |
| +5V | U10 | 1 |
| +5V | U10 | 23 |
| +5V | U10 | 42 |
| +5V | U10 | 64 |
| +5V | U101 | 3 |
| +5V | U101 | 24 |
| +5V | U101 | 45 |
| +5V | U101 | 66 |
| +5V | U102 | 44 |
| +5V | U103 | 3 |
| +5V | U103 | 14 |
| +5V | U103 | 25 |
| +5V | U103 | 36 |
| +5V | U104 | 3 |
| +5V | U105 | 8 |
| +5V | U106 | 44 |
| +5V | U107 | 13 |
| +5V | U108 | 3 |
| +5V | U109 | 3 |
| +5V | U109 | 24 |
| +5V | U109 | 45 |

| | | |
|---|---|---|
| +5V | U109 | 66 |
| +5V | U11 | 8 |
| +5V | U110 | 44 |
| +5V | U111 | 44 |
| +5V | U112 | 8 |
| +5V | U117 | 8 |
| +5V | U12 | 17 |
| +5V | U12 | 68 |
| +5V | U13 | 52 |
| +5V | U14 | 20 |
| +5V | U15 | 20 |
| +5V | U16 | 32 |
| +5V | U17 | 20 |
| +5V | U18 | 32 |
| +5V | U19 | 3 |
| +5V | U19 | 24 |
| +5V | U19 | 45 |
| +5V | U19 | 66 |
| +5V | U2 | 24 |
| +5V | U20 | 3 |
| +5V | U20 | 24 |
| +5V | U20 | 45 |
| +5V | U20 | 66 |
| +5V | U21 | 3 |
| +5V | U21 | 24 |
| +5V | U21 | 45 |
| +5V | U21 | 66 |
| +5V | U22 | 20 |
| +5V | U23 | 32 |
| +5V | U24 | 20 |
| +5V | U25 | 20 |
| +5V | U26 | 20 |
| +5V | U27 | 20 |
| +5V | U28 | 20 |
| +5V | U29 | 20 |
| +5V | U3 | 52 |
| +5V | U4 | 52 |
| +5V | U5 | 52 |
| +5V | U6 | 13 |
| +5V | U7 | 28 |
| +5V | U8 | 24 |
| +5V | U9 | 32 |
| -12VDC | C12 | 2 |
| -12VDC | C14 | 2 |
| -12VDC | P1B | 7 |
| -12VDC | U113 | 4 |
| -12VDC | U114 | 4 |
| -12VDC | U115 | 4 |
| -12VDC | U116 | 4 |
| -5VDC | P1B | 5 |
| 3009004 | 11TX | 1 |
| 3009004 | E11 | 8 |
| 3009004 | IN11 | 3 |
| 3009005 | 11TX | 2 |

| | | |
|---|---|---|
| 3009005 | 1TG | 1 |
| 3009005 | E11 | 10 |
| 3009005 | IN11 | 8 |
| 3010022 | 11RX | 1 |
| 3010022 | E11 | 3 |
| 3010022 | IN12 | 3 |
| 3010023 | 11RX | 2 |
| 3010023 | 1RG | 1 |
| 3010023 | E11 | 5 |
| 3010023 | IN12 | 8 |
| 3010044 | E12 | 8 |
| 3010044 | IN13 | 3 |
| 3010044 | W3 | 1 |
| 3010045 | 12TX | 2 |
| 3010045 | 2TG | 1 |
| 3010045 | E12 | 10 |
| 3010045 | IN13 | 8 |
| 3011060 | 12RX | 1 |
| 3011060 | IN14 | 3 |
| 3011060 | W3 | 3 |
| 3011061 | 12RX | 2 |
| 3011061 | 2RG | 1 |
| 3011061 | E12 | 5 |
| 3011061 | IN14 | 8 |
| 3021012 | IN11 | 4 |
| 3021012 | T11 | 5 |
| 3021014 | IN11 | 7 |
| 3021014 | T11 | 7 |
| 3021021 | IN12 | 4 |
| 3021021 | T12 | 5 |
| 3021023 | IN12 | 7 |
| 3021023 | T12 | 7 |
| 3022047 | IN13 | 4 |
| 3022047 | T13 | 5 |
| 3022049 | IN13 | 7 |
| 3022049 | T13 | 7 |
| 3022055 | IN14 | 4 |
| 3022055 | T14 | 5 |
| 3022057 | IN14 | 7 |
| 3022057 | T14 | 7 |
| 3023018 | RN16 | 8 |
| 3023018 | T12 | 14 |
| 3024003 | RN16 | 2 |
| 3024003 | T11 | 14 |
| 3024055 | RN18 | 8 |
| 3024055 | T14 | 14 |
| 3025038 | RN18 | 2 |
| 3025038 | T13 | 14 |
| 3032022 | RN15 | 2 |
| 3032022 | T12 | 10 |
| 3032022 | U114 | 3 |
| 3033012 | RN15 | 1 |
| 3033012 | T11 | 10 |
| 3033012 | U113 | 3 |

| | | |
|---|---|---|
| 3033049 | RN15 | 3 |
| 3033049 | T13 | 10 |
| 3033049 | U115 | 3 |
| 3033059 | RN15 | 4 |
| 3033059 | T14 | 10 |
| 3033059 | U116 | 3 |
| 3036006 | KT11 | 4 |
| 3036006 | RN11 | 1 |
| 3036006 | RN15 | 14 |
| 3036011 | KT11 | 7 |
| 3036011 | RN11 | 3 |
| 3036011 | RN15 | 13 |
| 3037042 | KT12 | 4 |
| 3037042 | RN11 | 5 |
| 3037042 | RN15 | 12 |
| 3038047 | KT12 | 7 |
| 3038047 | RN11 | 7 |
| 3038047 | RN15 | 11 |
| 3042008 | KT11 | 2 |
| 3042008 | RN11 | 2 |
| 3042013 | KT11 | 9 |
| 3042013 | RN11 | 4 |
| 3042017 | KM11 | 3 |
| 3042017 | RN16 | 4 |
| 3042019 | KM11 | 8 |
| 3042019 | RN16 | 6 |
| 3042044 | KT12 | 2 |
| 3042044 | RN11 | 6 |
| 3042049 | KT12 | 9 |
| 3042049 | RN11 | 8 |
| 3044053 | KM12 | 3 |
| 3044053 | RN18 | 4 |
| 3044055 | KM12 | 8 |
| 3044055 | RN18 | 6 |
| 3049017 | KM11 | 4 |
| 3049017 | RN17 | 1 |
| 3049017 | U113 | 2 |
| 3049019 | KM11 | 7 |
| 3049019 | RN17 | 3 |
| 3049019 | U114 | 2 |
| 3051053 | KM12 | 4 |
| 3051053 | RN17 | 5 |
| 3051053 | U115 | 2 |
| 3051055 | KM12 | 7 |
| 3051055 | RN17 | 7 |
| 3051055 | U116 | 2 |
| 3061015 | RN16 | 1 |
| 3061015 | RN17 | 2 |
| 3061015 | U113 | 6 |
| 3061050 | RN17 | 6 |
| 3061050 | RN18 | 1 |
| 3061050 | U115 | 6 |
| 3062026 | RN16 | 7 |
| 3062026 | RN17 | 4 |

| | | |
|---|---|---|
| 3062026 | U114 | 6 |
| 3062060 | RN17 | 8 |
| 3062060 | RN18 | 7 |
| 3062060 | U116 | 6 |
| 4041041 | RN19 | 3 |
| 4041041 | U112 | 3 |
| 4041051 | RN19 | 7 |
| 4041051 | U117 | 3 |
| 4049042 | RN19 | 1 |
| 4049042 | U112 | 5 |
| 4049052 | RN19 | 5 |
| 4049052 | U117 | 5 |
| 4056042 | OUT1 | 1 |
| 4056042 | RN19 | 2 |
| 4056044 | OUT1 | 3 |
| 4056044 | RN19 | 4 |
| 4056052 | OUT1 | 10 |
| 4056052 | RN19 | 6 |
| 4056054 | OUT1 | 8 |
| 4056054 | RN19 | 8 |
| 4XRATE | U101 | 25 |
| 4XRATE | U104 | 11 |
| 4XRATE | U105 | 5 |
| 4XRATE | U108 | 11 |
| 4XRATE | U109 | 25 |
| ABPV | U101 | 9 |
| ABPV | U102 | 41 |
| ACLOS | U101 | 10 |
| ACLOS | U102 | 40 |
| AEN | P1A | 11 |
| AFER | U101 | 11 |
| AFER | U102 | 42 |
| AGND | 1RG | 2 |
| AGND | 1TG | 2 |
| AGND | 2RG | 2 |
| AGND | 2TG | 2 |
| AGND | AGND1 | 1 |
| AGND | C11 | 2 |
| AGND | C12 | 1 |
| AGND | C13 | 2 |
| AGND | C14 | 1 |
| AGND | KT11 | 3 |
| AGND | KT11 | 8 |
| AGND | KT12 | 3 |
| AGND | KT12 | 8 |
| AGND | PAD2 | 1 |
| AGND | RN16 | 3 |
| AGND | RN16 | 5 |
| AGND | RN18 | 3 |
| AGND | RN18 | 5 |
| AGND | T11 | 8 |
| AGND | T11 | 13 |
| AGND | T12 | 8 |
| AGND | T12 | 13 |

| | | |
|---|---|---|
| AGND | T13 | 8 |
| AGND | T13 | 13 |
| AGND | T14 | 8 |
| AGND | T14 | 13 |
| AGND | U104 | 8 |
| AGND | U104 | 13 |
| AGND | U104 | 16 |
| AGND | U108 | 8 |
| AGND | U108 | 13 |
| AGND | U108 | 16 |
| AMLOS | U101 | 27 |
| AMLOS | U102 | 43 |
| AP17 | U101 | 79 |
| AP17 | U102 | 17 |
| AP19 | RN13 | 7 |
| AP19 | U101 | 33 |
| AP19 | U102 | 19 |
| ARCHCK | U101 | 28 |
| ARCHCK | U102 | 29 |
| ARDMA | U101 | 30 |
| ARDMA | U102 | 24 |
| ARFSC | U101 | 54 |
| ARFSC | U102 | 31 |
| ARMSA | U101 | 15 |
| ARMSA | U102 | 3 |
| ARMSC | TP101 | 1 |
| ARMSC | U101 | 55 |
| ARMSC | U102 | 32 |
| ARRA | U101 | 56 |
| ARRA | U102 | 23 |
| ARSER | U101 | 57 |
| ARSER | U102 | 30 |
| ATCHCK | U101 | 37 |
| ATCHCK | U102 | 5 |
| ATMO | TP109 | 1 |
| ATMO | U101 | 38 |
| ATMO | U102 | 8 |
| ATMSC | U101 | 49 |
| ATMSC | U102 | 1 |
| ATNEG | U102 | 15 |
| ATNEG | U112 | 6 |
| ATOB | U19 | 11 |
| ATOB | U21 | 68 |
| ATOC | RN8 | 10 |
| ATOC | U20 | 9 |
| ATOC | U21 | 21 |
| ATPOS | U102 | 14 |
| ATPOS | U112 | 2 |
| ATSER | TP111 | 1 |
| ATSER | U101 | 50 |
| ATSER | U102 | 7 |
| ATSER | U102 | 11 |
| ATXSEL | TP110 | 1 |
| ATXSEL | U101 | 26 |

| | | |
|---|---|---|
| BALE | P1B | 28 |
| BALE | U21 | 46 |
| BBPV | U101 | 51 |
| BBPV | U106 | 41 |
| BCLK | P1B | 20 |
| BCLK | U21 | 84 |
| BCLOS | U101 | 52 |
| BCLOS | U106 | 40 |
| BCON1 | RN12 | 6 |
| BCON1 | U10 | 50 |
| BCON1 | U101 | 7 |
| BCON1 | U109 | 7 |
| BCON2 | RN12 | 5 |
| BCON2 | U10 | 49 |
| BCON2 | U101 | 8 |
| BCON2 | U109 | 8 |
| BFER | U101 | 53 |
| BFER | U106 | 42 |
| BMLOS | U101 | 80 |
| BMLOS | U106 | 43 |
| BP17 | U101 | 77 |
| BP17 | U106 | 17 |
| BP19 | RN13 | 8 |
| BP19 | U101 | 34 |
| BP19 | U106 | 19 |
| BRCHCK | U101 | 59 |
| BRCHCK | U106 | 29 |
| BRDMA | U101 | 63 |
| BRDMA | U106 | 24 |
| BRFSC | U101 | 70 |
| BRFSC | U106 | 31 |
| BRMSA | U101 | 20 |
| BRMSA | U106 | 3 |
| BRMSC | TP104 | 1 |
| BRMSC | U101 | 71 |
| BRMSC | U106 | 32 |
| BRRA | U101 | 72 |
| BRRA | U106 | 23 |
| BRSER | U101 | 23 |
| BRSER | U106 | 30 |
| BTOA | U19 | 20 |
| BTOA | U21 | 4 |
| BTOC | U19 | 21 |
| BTOC | U20 | 10 |
| BUS1A0 | U14 | 2 |
| BUS1A0 | U19 | 84 |
| BUS1A0 | U21 | 83 |
| BUS1A0 | U26 | 14 |
| BUS1A1 | U12 | 54 |
| BUS1A1 | U14 | 4 |
| BUS1A1 | U19 | 83 |
| BUS1A1 | U21 | 44 |
| BUS1A1 | U26 | 13 |
| BUS1A10 | U12 | 63 |

| | | |
|---|---|---|
| BUS1A10 | U15 | 8 |
| BUS1A10 | U21 | 11 |
| BUS1A10 | U27 | 12 |
| BUS1A11 | U12 | 64 |
| BUS1A11 | U15 | 9 |
| BUS1A11 | U21 | 12 |
| BUS1A11 | U27 | 11 |
| BUS1A12 | U17 | 2 |
| BUS1A12 | U21 | 52 |
| BUS1A12 | U28 | 18 |
| BUS1A13 | U17 | 3 |
| BUS1A13 | U21 | 53 |
| BUS1A13 | U28 | 17 |
| BUS1A14 | U17 | 4 |
| BUS1A14 | U21 | 22 |
| BUS1A14 | U28 | 16 |
| BUS1A15 | U17 | 5 |
| BUS1A15 | U21 | 23 |
| BUS1A15 | U28 | 15 |
| BUS1A16 | U17 | 6 |
| BUS1A16 | U21 | 25 |
| BUS1A16 | U28 | 14 |
| BUS1A17 | U17 | 7 |
| BUS1A17 | U21 | 26 |
| BUS1A17 | U28 | 13 |
| BUS1A18 | U17 | 8 |
| BUS1A18 | U21 | 27 |
| BUS1A18 | U28 | 12 |
| BUS1A19 | U17 | 9 |
| BUS1A19 | U21 | 28 |
| BUS1A19 | U28 | 11 |
| BUS1A2 | U12 | 55 |
| BUS1A2 | U14 | 6 |
| BUS1A2 | U19 | 44 |
| BUS1A2 | U21 | 43 |
| BUS1A2 | U26 | 12 |
| BUS1A3 | U12 | 56 |
| BUS1A3 | U14 | 8 |
| BUS1A3 | U19 | 43 |
| BUS1A3 | U21 | 42 |
| BUS1A3 | U26 | 11 |
| BUS1A4 | U12 | 57 |
| BUS1A4 | U15 | 2 |
| BUS1A4 | U21 | 41 |
| BUS1A4 | U27 | 18 |
| BUS1A5 | U12 | 58 |
| BUS1A5 | U15 | 3 |
| BUS1A5 | U21 | 47 |
| BUS1A5 | U27 | 17 |
| BUS1A6 | U12 | 59 |
| BUS1A6 | U15 | 4 |
| BUS1A6 | U21 | 48 |
| BUS1A6 | U27 | 16 |
| BUS1A7 | U12 | 60 |

| | | |
|---|---|---|
| BUS1A7 | U15 | 5 |
| BUS1A7 | U21 | 49 |
| BUS1A7 | U27 | 15 |
| BUS1A8 | U12 | 61 |
| BUS1A8 | U15 | 6 |
| BUS1A8 | U21 | 50 |
| BUS1A8 | U27 | 14 |
| BUS1A9 | U12 | 62 |
| BUS1A9 | U15 | 7 |
| BUS1A9 | U21 | 51 |
| BUS1A9 | U27 | 13 |
| BUS1D0 | U12 | 1 |
| BUS1D0 | U21 | 69 |
| BUS1D0 | U22 | 2 |
| BUS1D0 | U29 | 18 |
| BUS1D1 | U12 | 2 |
| BUS1D1 | U21 | 70 |
| BUS1D1 | U22 | 3 |
| BUS1D1 | U29 | 17 |
| BUS1D10 | U12 | 11 |
| BUS1D10 | U19 | 76 |
| BUS1D10 | U24 | 4 |
| BUS1D10 | U25 | 16 |
| BUS1D11 | U12 | 12 |
| BUS1D11 | U19 | 50 |
| BUS1D11 | U24 | 5 |
| BUS1D11 | U25 | 15 |
| BUS1D12 | U12 | 13 |
| BUS1D12 | U19 | 34 |
| BUS1D12 | U24 | 6 |
| BUS1D12 | U25 | 14 |
| BUS1D13 | U12 | 14 |
| BUS1D13 | U19 | 51 |
| BUS1D13 | U24 | 7 |
| BUS1D13 | U25 | 13 |
| BUS1D14 | U12 | 15 |
| BUS1D14 | U19 | 77 |
| BUS1D14 | U24 | 8 |
| BUS1D14 | U25 | 12 |
| BUS1D15 | U12 | 16 |
| BUS1D15 | U19 | 35 |
| BUS1D15 | U24 | 9 |
| BUS1D15 | U25 | 11 |
| BUS1D2 | U12 | 3 |
| BUS1D2 | U21 | 71 |
| BUS1D2 | U22 | 4 |
| BUS1D2 | U29 | 16 |
| BUS1D3 | U12 | 4 |
| BUS1D3 | U21 | 33 |
| BUS1D3 | U22 | 5 |
| BUS1D3 | U29 | 15 |
| BUS1D4 | U12 | 5 |
| BUS1D4 | U21 | 34 |
| BUS1D4 | U22 | 6 |

| | | |
|---|---|---|
| BUS1D4 | U29 | 14 |
| BUS1D5 | U12 | 6 |
| BUS1D5 | U21 | 65 |
| BUS1D5 | U22 | 7 |
| BUS1D5 | U29 | 13 |
| BUS1D6 | U12 | 7 |
| BUS1D6 | U21 | 72 |
| BUS1D6 | U22 | 8 |
| BUS1D6 | U29 | 12 |
| BUS1D7 | U12 | 8 |
| BUS1D7 | U21 | 67 |
| BUS1D7 | U22 | 9 |
| BUS1D7 | U29 | 11 |
| BUS1D8 | U12 | 9 |
| BUS1D8 | U19 | 7 |
| BUS1D8 | U24 | 2 |
| BUS1D8 | U25 | 18 |
| BUS1D9 | U12 | 10 |
| BUS1D9 | U19 | 8 |
| BUS1D9 | U24 | 3 |
| BUS1D9 | U25 | 17 |
| BUS2A0 | U14 | 18 |
| BUS2A1 | U1 | 10 |
| BUS2A1 | U101 | 84 |
| BUS2A1 | U109 | 84 |
| BUS2A1 | U12 | 49 |
| BUS2A1 | U14 | 16 |
| BUS2A1 | U16 | 12 |
| BUS2A1 | U18 | 12 |
| BUS2A1 | U2 | 22 |
| BUS2A1 | U23 | 12 |
| BUS2A1 | U7 | 10 |
| BUS2A1 | U9 | 12 |
| BUS2A10 | U1 | 1 |
| BUS2A10 | U12 | 40 |
| BUS2A10 | U15 | 12 |
| BUS2A10 | U16 | 26 |
| BUS2A10 | U18 | 26 |
| BUS2A10 | U23 | 26 |
| BUS2A10 | U7 | 1 |
| BUS2A10 | U8 | 23 |
| BUS2A10 | U9 | 26 |
| BUS2A11 | U1 | 27 |
| BUS2A11 | U12 | 39 |
| BUS2A11 | U15 | 11 |
| BUS2A11 | U16 | 23 |
| BUS2A11 | U18 | 23 |
| BUS2A11 | U23 | 23 |
| BUS2A11 | U7 | 27 |
| BUS2A11 | U8 | 22 |
| BUS2A11 | U9 | 23 |
| BUS2A12 | U1 | 26 |
| BUS2A12 | U16 | 25 |
| BUS2A12 | U17 | 18 |

| | | |
|---|---|---|
| BUS2A12 | U18 | 25 |
| BUS2A12 | U23 | 25 |
| BUS2A12 | U7 | 26 |
| BUS2A12 | U8 | 21 |
| BUS2A12 | U9 | 25 |
| BUS2A13 | U1 | 25 |
| BUS2A13 | U16 | 4 |
| BUS2A13 | U17 | 17 |
| BUS2A13 | U18 | 4 |
| BUS2A13 | U23 | 4 |
| BUS2A13 | U7 | 25 |
| BUS2A13 | U8 | 20 |
| BUS2A13 | U9 | 4 |
| BUS2A14 | U1 | 24 |
| BUS2A14 | U16 | 28 |
| BUS2A14 | U17 | 16 |
| BUS2A14 | U18 | 28 |
| BUS2A14 | U23 | 28 |
| BUS2A14 | U7 | 24 |
| BUS2A14 | U8 | 19 |
| BUS2A14 | U9 | 28 |
| BUS2A15 | U1 | 23 |
| BUS2A15 | U16 | 3 |
| BUS2A15 | U17 | 15 |
| BUS2A15 | U18 | 3 |
| BUS2A15 | U23 | 3 |
| BUS2A15 | U7 | 23 |
| BUS2A15 | U8 | 18 |
| BUS2A15 | U9 | 3 |
| BUS2A16 | U16 | 31 |
| BUS2A16 | U17 | 14 |
| BUS2A16 | U18 | 31 |
| BUS2A16 | U23 | 31 |
| BUS2A16 | U8 | 17 |
| BUS2A16 | U9 | 31 |
| BUS2A17 | U16 | 2 |
| BUS2A17 | U17 | 13 |
| BUS2A17 | U18 | 2 |
| BUS2A17 | U23 | 2 |
| BUS2A17 | U8 | 16 |
| BUS2A17 | U9 | 2 |
| BUS2A18 | U17 | 12 |
| BUS2A18 | U19 | 15 |
| BUS2A18 | U20 | 15 |
| BUS2A18 | U8 | 15 |
| BUS2A18 | W1 | 1 |
| BUS2A19 | U17 | 11 |
| BUS2A19 | U19 | 28 |
| BUS2A19 | U20 | 54 |
| BUS2A19 | U8 | 14 |
| BUS2A19 | W2 | 1 |
| BUS2A2 | U1 | 9 |
| BUS2A2 | U101 | 83 |
| BUS2A2 | U109 | 83 |

| | | |
|---|---|---|
| BUS2A2 | U12 | 48 |
| BUS2A2 | U14 | 14 |
| BUS2A2 | U16 | 11 |
| BUS2A2 | U18 | 11 |
| BUS2A2 | U2 | 21 |
| BUS2A2 | U23 | 11 |
| BUS2A2 | U7 | 9 |
| BUS2A2 | U9 | 11 |
| BUS2A3 | U1 | 8 |
| BUS2A3 | U101 | 44 |
| BUS2A3 | U109 | 44 |
| BUS2A3 | U12 | 47 |
| BUS2A3 | U14 | 12 |
| BUS2A3 | U16 | 10 |
| BUS2A3 | U18 | 10 |
| BUS2A3 | U2 | 20 |
| BUS2A3 | U23 | 10 |
| BUS2A3 | U7 | 8 |
| BUS2A3 | U9 | 10 |
| BUS2A4 | U1 | 7 |
| BUS2A4 | U12 | 46 |
| BUS2A4 | U15 | 18 |
| BUS2A4 | U16 | 9 |
| BUS2A4 | U18 | 9 |
| BUS2A4 | U2 | 19 |
| BUS2A4 | U23 | 9 |
| BUS2A4 | U7 | 7 |
| BUS2A4 | U9 | 9 |
| BUS2A5 | U1 | 6 |
| BUS2A5 | U12 | 45 |
| BUS2A5 | U15 | 17 |
| BUS2A5 | U16 | 8 |
| BUS2A5 | U18 | 8 |
| BUS2A5 | U2 | 18 |
| BUS2A5 | U23 | 8 |
| BUS2A5 | U7 | 6 |
| BUS2A5 | U9 | 8 |
| BUS2A6 | U1 | 5 |
| BUS2A6 | U12 | 44 |
| BUS2A6 | U15 | 16 |
| BUS2A6 | U16 | 7 |
| BUS2A6 | U18 | 7 |
| BUS2A6 | U2 | 17 |
| BUS2A6 | U23 | 7 |
| BUS2A6 | U7 | 5 |
| BUS2A6 | U9 | 7 |
| BUS2A7 | U1 | 4 |
| BUS2A7 | U12 | 43 |
| BUS2A7 | U15 | 15 |
| BUS2A7 | U16 | 6 |
| BUS2A7 | U18 | 6 |
| BUS2A7 | U2 | 16 |
| BUS2A7 | U23 | 6 |
| BUS2A7 | U7 | 4 |

| | | |
|---|---|---|
| BUS2A7 | U9 | 6 |
| BUS2A8 | U1 | 3 |
| BUS2A8 | U12 | 42 |
| BUS2A8 | U15 | 14 |
| BUS2A8 | U16 | 5 |
| BUS2A8 | U18 | 5 |
| BUS2A8 | U2 | 15 |
| BUS2A8 | U23 | 5 |
| BUS2A8 | U7 | 3 |
| BUS2A8 | U9 | 5 |
| BUS2A9 | U1 | 2 |
| BUS2A9 | U12 | 41 |
| BUS2A9 | U15 | 13 |
| BUS2A9 | U16 | 27 |
| BUS2A9 | U18 | 27 |
| BUS2A9 | U2 | 14 |
| BUS2A9 | U23 | 27 |
| BUS2A9 | U7 | 2 |
| BUS2A9 | U9 | 27 |
| BUS2AJ1.8 | RN2 | 9 |
| BUS2AJ1.8 | U16 | 30 |
| BUS2AJ1.8 | U18 | 30 |
| BUS2AJ1.8 | U23 | 30 |
| BUS2AJ1.8 | U9 | 30 |
| BUS2AJ1.8 | W1 | 2 |
| BUS2AJ1.9 | U16 | 1 |
| BUS2AJ1.9 | U18 | 1 |
| BUS2AJ1.9 | U23 | 1 |
| BUS2AJ1.9 | U9 | 1 |
| BUS2AJ1.9 | W2 | 2 |
| BUS2ALE | U2 | 13 |
| BUS2ALE | U20 | 46 |
| BUS2ALE | U8 | 13 |
| BUS2D0 | U1 | 11 |
| BUS2D0 | U10 | 61 |
| BUS2D0 | U101 | 12 |
| BUS2D0 | U103 | 24 |
| BUS2D0 | U107 | 3 |
| BUS2D0 | U12 | 19 |
| BUS2D0 | U13 | 10 |
| BUS2D0 | U19 | 9 |
| BUS2D0 | U2 | 2 |
| BUS2D0 | U20 | 5 |
| BUS2D0 | U22 | 18 |
| BUS2D0 | U23 | 13 |
| BUS2D0 | U3 | 10 |
| BUS2D0 | U4 | 10 |
| BUS2D0 | U5 | 10 |
| BUS2D0 | U9 | 13 |
| BUS2D1 | U1 | 12 |
| BUS2D1 | U10 | 66 |
| BUS2D1 | U101 | 13 |
| BUS2D1 | U103 | 26 |
| BUS2D1 | U107 | 4 |

| | | |
|---|---|---|
| BUS2D1 | U12 | 20 |
| BUS2D1 | U13 | 9 |
| BUS2D1 | U19 | 10 |
| BUS2D1 | U2 | 3 |
| BUS2D1 | U20 | 6 |
| BUS2D1 | U22 | 17 |
| BUS2D1 | U23 | 14 |
| BUS2D1 | U3 | 9 |
| BUS2D1 | U4 | 9 |
| BUS2D1 | U5 | 9 |
| BUS2D1 | U9 | 14 |
| BUS2D10 | U10 | 69 |
| BUS2D10 | U109 | 16 |
| BUS2D10 | U12 | 29 |
| BUS2D10 | U13 | 49 |
| BUS2D10 | U16 | 15 |
| BUS2D10 | U18 | 15 |
| BUS2D10 | U24 | 16 |
| BUS2D10 | U3 | 49 |
| BUS2D10 | U4 | 49 |
| BUS2D10 | U5 | 49 |
| BUS2D10 | U7 | 13 |
| BUS2D10 | U8 | 2 |
| BUS2D11 | U10 | 71 |
| BUS2D11 | U109 | 22 |
| BUS2D11 | U12 | 30 |
| BUS2D11 | U13 | 48 |
| BUS2D11 | U16 | 17 |
| BUS2D11 | U18 | 17 |
| BUS2D11 | U24 | 15 |
| BUS2D11 | U3 | 48 |
| BUS2D11 | U4 | 48 |
| BUS2D11 | U5 | 48 |
| BUS2D11 | U7 | 15 |
| BUS2D11 | U8 | 3 |
| BUS2D12 | U10 | 73 |
| BUS2D12 | U109 | 69 |
| BUS2D12 | U12 | 31 |
| BUS2D12 | U13 | 47 |
| BUS2D12 | U16 | 18 |
| BUS2D12 | U18 | 18 |
| BUS2D12 | U24 | 14 |
| BUS2D12 | U3 | 47 |
| BUS2D12 | U4 | 47 |
| BUS2D12 | U5 | 47 |
| BUS2D12 | U7 | 16 |
| BUS2D12 | U8 | 4 |
| BUS2D13 | U10 | 75 |
| BUS2D13 | U109 | 17 |
| BUS2D13 | U12 | 32 |
| BUS2D13 | U13 | 46 |
| BUS2D13 | U16 | 19 |
| BUS2D13 | U18 | 19 |
| BUS2D13 | U24 | 13 |

| | | |
|---|---|---|
| BUS2D13 | U3 | 46 |
| BUS2D13 | U4 | 46 |
| BUS2D13 | U5 | 46 |
| BUS2D13 | U7 | 17 |
| BUS2D13 | U8 | 5 |
| BUS2D14 | U10 | 77 |
| BUS2D14 | U109 | 73 |
| BUS2D14 | U12 | 33 |
| BUS2D14 | U13 | 45 |
| BUS2D14 | U16 | 20 |
| BUS2D14 | U18 | 20 |
| BUS2D14 | U24 | 12 |
| BUS2D14 | U3 | 45 |
| BUS2D14 | U4 | 45 |
| BUS2D14 | U5 | 45 |
| BUS2D14 | U7 | 18 |
| BUS2D14 | U8 | 6 |
| BUS2D15 | U10 | 79 |
| BUS2D15 | U109 | 46 |
| BUS2D15 | U12 | 34 |
| BUS2D15 | U13 | 44 |
| BUS2D15 | U16 | 21 |
| BUS2D15 | U18 | 21 |
| BUS2D15 | U24 | 11 |
| BUS2D15 | U3 | 44 |
| BUS2D15 | U4 | 44 |
| BUS2D15 | U5 | 44 |
| BUS2D15 | U7 | 19 |
| BUS2D15 | U8 | 7 |
| BUS2D16 | U10 | 80 |
| BUS2D16 | U13 | 43 |
| BUS2D16 | U3 | 43 |
| BUS2D16 | U4 | 43 |
| BUS2D16 | U5 | 43 |
| BUS2D16 | U8 | 8 |
| BUS2D17 | U10 | 81 |
| BUS2D17 | U13 | 42 |
| BUS2D17 | U3 | 42 |
| BUS2D17 | U4 | 42 |
| BUS2D17 | U5 | 42 |
| BUS2D17 | U8 | 9 |
| BUS2D18 | U10 | 82 |
| BUS2D18 | U13 | 41 |
| BUS2D18 | U3 | 41 |
| BUS2D18 | U4 | 41 |
| BUS2D18 | U5 | 41 |
| BUS2D18 | U8 | 10 |
| BUS2D19 | U10 | 83 |
| BUS2D19 | U13 | 40 |
| BUS2D19 | U3 | 40 |
| BUS2D19 | U4 | 40 |
| BUS2D19 | U5 | 40 |
| BUS2D19 | U8 | 11 |
| BUS2D2 | U1 | 13 |

| | | |
|---|---|---|
| BUS2D2 | U10 | 68 |
| BUS2D2 | U101 | 16 |
| BUS2D2 | U107 | 5 |
| BUS2D2 | U12 | 21 |
| BUS2D2 | U13 | 8 |
| BUS2D2 | U19 | 78 |
| BUS2D2 | U2 | 4 |
| BUS2D2 | U20 | 7 |
| BUS2D2 | U22 | 16 |
| BUS2D2 | U23 | 15 |
| BUS2D2 | U3 | 8 |
| BUS2D2 | U4 | 8 |
| BUS2D2 | U5 | 8 |
| BUS2D2 | U9 | 15 |
| BUS2D3 | U1 | 15 |
| BUS2D3 | U10 | 70 |
| BUS2D3 | U101 | 22 |
| BUS2D3 | U12 | 22 |
| BUS2D3 | U13 | 6 |
| BUS2D3 | U19 | 52 |
| BUS2D3 | U2 | 5 |
| BUS2D3 | U20 | 8 |
| BUS2D3 | U22 | 15 |
| BUS2D3 | U23 | 17 |
| BUS2D3 | U3 | 6 |
| BUS2D3 | U4 | 6 |
| BUS2D3 | U5 | 6 |
| BUS2D3 | U9 | 17 |
| BUS2D4 | U1 | 16 |
| BUS2D4 | U10 | 72 |
| BUS2D4 | U101 | 69 |
| BUS2D4 | U12 | 23 |
| BUS2D4 | U13 | 5 |
| BUS2D4 | U19 | 36 |
| BUS2D4 | U2 | 6 |
| BUS2D4 | U20 | 35 |
| BUS2D4 | U22 | 14 |
| BUS2D4 | U23 | 18 |
| BUS2D4 | U3 | 5 |
| BUS2D4 | U4 | 5 |
| BUS2D4 | U5 | 5 |
| BUS2D4 | U9 | 18 |
| BUS2D5 | U1 | 17 |
| BUS2D5 | U10 | 74 |
| BUS2D5 | U101 | 17 |
| BUS2D5 | U12 | 24 |
| BUS2D5 | U13 | 4 |
| BUS2D5 | U19 | 53 |
| BUS2D5 | U2 | 7 |
| BUS2D5 | U20 | 36 |
| BUS2D5 | U22 | 13 |
| BUS2D5 | U23 | 19 |
| BUS2D5 | U3 | 4 |
| BUS2D5 | U4 | 4 |

| | | |
|---|---|---|
| BUS2D5 | U5 | 4 |
| BUS2D5 | U9 | 19 |
| BUS2D6 | U1 | 18 |
| BUS2D6 | U10 | 76 |
| BUS2D6 | U101 | 73 |
| BUS2D6 | U12 | 25 |
| BUS2D6 | U13 | 3 |
| BUS2D6 | U19 | 79 |
| BUS2D6 | U2 | 8 |
| BUS2D6 | U20 | 37 |
| BUS2D6 | U22 | 12 |
| BUS2D6 | U23 | 20 |
| BUS2D6 | U3 | 3 |
| BUS2D6 | U4 | 3 |
| BUS2D6 | U5 | 3 |
| BUS2D6 | U9 | 20 |
| BUS2D7 | U1 | 19 |
| BUS2D7 | U10 | 78 |
| BUS2D7 | U101 | 46 |
| BUS2D7 | U12 | 26 |
| BUS2D7 | U13 | 2 |
| BUS2D7 | U19 | 37 |
| BUS2D7 | U2 | 9 |
| BUS2D7 | U20 | 38 |
| BUS2D7 | U22 | 11 |
| BUS2D7 | U23 | 21 |
| BUS2D7 | U3 | 2 |
| BUS2D7 | U4 | 2 |
| BUS2D7 | U5 | 2 |
| BUS2D7 | U9 | 21 |
| BUS2D8 | U10 | 62 |
| BUS2D8 | U103 | 27 |
| BUS2D8 | U107 | 6 |
| BUS2D8 | U109 | 12 |
| BUS2D8 | U12 | 27 |
| BUS2D8 | U13 | 51 |
| BUS2D8 | U16 | 13 |
| BUS2D8 | U18 | 13 |
| BUS2D8 | U2 | 10 |
| BUS2D8 | U24 | 18 |
| BUS2D8 | U3 | 51 |
| BUS2D8 | U4 | 51 |
| BUS2D8 | U5 | 51 |
| BUS2D8 | U7 | 11 |
| BUS2D9 | U10 | 67 |
| BUS2D9 | U103 | 28 |
| BUS2D9 | U109 | 13 |
| BUS2D9 | U12 | 28 |
| BUS2D9 | U13 | 50 |
| BUS2D9 | U16 | 14 |
| BUS2D9 | U18 | 14 |
| BUS2D9 | U2 | 11 |
| BUS2D9 | U24 | 17 |
| BUS2D9 | U3 | 50 |

| | | |
|---|---|---|
| BUS2D9 | U4 | 50 |
| BUS2D9 | U5 | 50 |
| BUS2D9 | U7 | 12 |
| BUS2GH | TP3 | 1 |
| BUS2GH | U20 | 47 |
| BUS2GMP | RN6 | 6 |
| BUS2GMP | TP1 | 1 |
| BUS2GMP | U19 | 29 |
| BUS2GPC | RN8 | 9 |
| BUS2GPC | TP2 | 1 |
| BUS2GPC | U20 | 64 |
| BUS2GPC | U21 | 29 |
| BUS2PCN | U14 | 1 |
| BUS2PCN | U15 | 1 |
| BUS2PCN | U17 | 1 |
| BUS2PCN | U21 | 5 |
| BUS2PCN | U22 | 19 |
| BUS2PCN | U24 | 19 |
| BUS2SS7.N | U2 | 1 |
| BUS2SS7.N | U21 | 6 |
| BUS2SS7.N | U8 | 1 |
| BUSYLN | RN8 | 2 |
| BUSYLN | U12 | 53 |
| BUSYLN | U21 | 10 |
| BUSYRN | RN8 | 8 |
| BUSYRN | U12 | 50 |
| BUSYRN | U19 | 27 |
| CBPV | U109 | 9 |
| CBPV | U110 | 41 |
| CCLOS | U109 | 10 |
| CCLOS | U110 | 40 |
| CFER | U109 | 11 |
| CFER | U110 | 42 |
| CGND | 11RX | 3 |
| CGND | E11 | 1 |
| CGND | E11 | 6 |
| CGND | E12 | 1 |
| CGND | E12 | 6 |
| CGND | W4 | 2 |
| CGND | W4 | 3 |
| CLK16MH.Z | R3 | 1 |
| CLK16MH.Z | R4 | 2 |
| CLK16MH.Z | U10 | 44 |
| CLK16MH.Z | U20 | 55 |
| CLK8MHZ | R1 | 2 |
| CLK8MHZ | R2 | 1 |
| CLK8MHZ | U13 | 31 |
| CLK8MHZ | U19 | 30 |
| CLK8MHZ | U20 | 65 |
| CLK8MHZ | U3 | 31 |
| CLK8MHZ | U4 | 31 |
| CLK8MHZ | U5 | 31 |
| CMLOS | U109 | 27 |
| CMLOS | U110 | 43 |

| | | |
|---|---|---|
| CP17 | U109 | 79 |
| CP17 | U110 | 17 |
| CP19 | RN13 | 9 |
| CP19 | U101 | 35 |
| CP19 | U110 | 19 |
| CRCHCK | U109 | 28 |
| CRCHCK | U110 | 29 |
| CRDMA | U109 | 30 |
| CRDMA | U110 | 24 |
| CRFSC | U109 | 54 |
| CRFSC | U110 | 31 |
| CRMSA | U109 | 15 |
| CRMSA | U110 | 3 |
| CRMSC | TP112 | 1 |
| CRMSC | U109 | 55 |
| CRMSC | U110 | 32 |
| CRRA | U109 | 56 |
| CRRA | U110 | 23 |
| CRSER | U109 | 57 |
| CRSER | U110 | 30 |
| CTCHCK | U109 | 37 |
| CTCHCK | U110 | 5 |
| CTMO | TP120 | 1 |
| CTMO | U109 | 38 |
| CTMO | U110 | 8 |
| CTMSC | U109 | 49 |
| CTMSC | U110 | 1 |
| CTNEG | U110 | 15 |
| CTNEG | U117 | 6 |
| CTOA | U20 | 12 |
| CTOA | U21 | 13 |
| CTOB | U19 | 12 |
| CTOB | U20 | 13 |
| CTPOS | U110 | 14 |
| CTPOS | U117 | 2 |
| CTSER | TP122 | 1 |
| CTSER | U109 | 50 |
| CTSER | U110 | 7 |
| CTSER | U110 | 11 |
| CTSP2 | RN13 | 6 |
| CTSP2 | U10 | 28 |
| CTSP2 | U10 | 56 |
| CTSP2 | U101 | 4 |
| CTSP2 | U109 | 4 |
| CTSP2 | U14 | 19 |
| CTXSEL | TP121 | 1 |
| CTXSEL | U109 | 26 |
| DACK0N | P2D | 8 |
| DACK1N | P1B | 17 |
| DACK2N | P1B | 26 |
| DACK3N | P1B | 15 |
| DACK5N | P2D | 10 |
| DACK6N | P2D | 12 |
| DACK7N | P2D | 14 |

| | | |
|---|---|---|
| DBPV | U109 | 51 |
| DBPV | U111 | 41 |
| DBRDCSN | U101 | 42 |
| DBRDCSN | U109 | 42 |
| DBRDCSN | U20 | 31 |
| DBRDINT.1 | RN12 | 7 |
| DBRDINT.1 | U10 | 33 |
| DBRDINT.1 | U102 | 16 |
| DBRDINT.1 | U106 | 16 |
| DBRDINT.1 | U109 | 36 |
| DBRDINT.1 | U110 | 16 |
| DBRDINT.1 | U111 | 16 |
| DBRDINT.2 | U10 | 34 |
| DBRDINT.2 | U101 | 67 |
| DBRDINT.2 | U109 | 67 |
| DBRDINT.3 | U10 | 35 |
| DBRDINT.3 | U14 | 7 |
| DBRDRDN | U101 | 41 |
| DBRDRDN | U109 | 41 |
| DBRDRDN | U20 | 32 |
| DBRDRES.N | U103 | 31 |
| DBRDRES.N | U19 | 73 |
| DBRDWRN | U101 | 1 |
| DBRDWRN | U109 | 1 |
| DBRDWRN | U20 | 33 |
| DCLOS | U109 | 52 |
| DCLOS | U111 | 40 |
| DFER | U109 | 53 |
| DFER | U111 | 42 |
| DMLOS | U109 | 80 |
| DMLOS | U111 | 43 |
| DP17 | U109 | 77 |
| DP17 | U111 | 17 |
| DP19 | RN13 | 10 |
| DP19 | U101 | 36 |
| DP19 | U111 | 19 |
| DRCHCK | U109 | 59 |
| DRCHCK | U111 | 29 |
| DRDMA | U109 | 63 |
| DRDMA | U111 | 24 |
| DRFSC | U109 | 70 |
| DRFSC | U111 | 31 |
| DRMSA | U109 | 20 |
| DRMSA | U111 | 3 |
| DRMSC | TP115 | 1 |
| DRMSC | U109 | 71 |
| DRMSC | U111 | 32 |
| DRQ0 | P2D | 9 |
| DRQ1 | P1B | 18 |
| DRQ2 | P1B | 6 |
| DRQ3 | P1B | 16 |
| DRQ5 | P2D | 11 |
| DRQ6 | P2D | 13 |
| DRQ7 | P2D | 15 |

```
DRRA     U109     72
DRRA     U111     23
DRSER    U109     23
DRSER    U111     30
E102-3   12TX      1
E102-3   E12       3
E102-3   W3        2
E1RR     RN14      2
E1RR     U103     38
E1RR     U104      9
E1RRCK   U103     11
E1RRCK   U104      5
E1RT     RN14      3
E1RT     U103     16
E1RT     U104     10
E1TR     RN14      4
E1TR     U103     37
E1TR     U104      7
E1TRCK   U103      9
E1TRCK   U104      4
E1TT     RN14      5
E1TT     U103     15
E1TT     U104      6
E2RR     RN14      7
E2RR     U103     40
E2RR     U108      9
E2RRCK   U103     13
E2RRCK   U108      5
E2RT     RN14      8
E2RT     U103     18
E2RT     U108     10
E2TR     RN14      9
E2TR     U103     39
E2TR     U108      7
E2TRCK   U103     12
E2TRCK   U108      4
E2TT     RN14     10
E2TT     U103     17
E2TT     U108      6
EMEMRDN  RN5       6
EMEMRDN  RN7       6
EMEMRDN  U1       21
EMEMRDN  U16      24
EMEMRDN  U18      24
EMEMRDN  U19      22
EMEMRDN  U20      73
EMEMRDN  U21      73
EMEMRDN  U23      24
EMEMRDN  U7       21
EMEMRDN  U9       24
EMEMWRN  RN5       2
EMEMWRN  RN7       2
EMEMWRN  U16      29
EMEMWRN  U18      29
```

| | | |
|---|---|---|
| EMEMWRN | U19 | 23 |
| EMEMWRN | U20 | 74 |
| EMEMWRN | U21 | 74 |
| EMEMWRN | U23 | 29 |
| EMEMWRN | U9 | 29 |
| FRACK | U101 | 29 |
| FRACK | U102 | 27 |
| FRACK | U103 | 4 |
| FRANEG | U102 | 39 |
| FRANEG | U103 | 41 |
| FRAPOS | U102 | 38 |
| FRAPOS | U103 | 19 |
| FRBCK | U101 | 62 |
| FRBCK | U103 | 5 |
| FRBCK | U106 | 27 |
| FRBNEG | U103 | 42 |
| FRBNEG | U106 | 39 |
| FRBPOS | U103 | 20 |
| FRBPOS | U106 | 38 |
| FRCCK | U103 | 6 |
| FRCCK | U109 | 29 |
| FRCCK | U110 | 27 |
| FRCNEG | U103 | 44 |
| FRCNEG | U110 | 39 |
| FRCPOS | U103 | 22 |
| FRCPOS | U110 | 38 |
| FRDCK | U103 | 7 |
| FRDCK | U109 | 62 |
| FRDCK | U111 | 27 |
| FRDNEG | U103 | 1 |
| FRDNEG | U111 | 39 |
| FRDPOS | U103 | 23 |
| FRDPOS | U111 | 38 |
| FRMODE | U102 | 21 |
| FRMODE | U106 | 21 |
| FRMODE | U109 | 31 |
| FRMODE | U110 | 21 |
| FRMODE | U111 | 21 |
| GND | C1 | 2 |
| GND | C101X | 2 |
| GND | C101X | 4 |
| GND | C101X | 6 |
| GND | C101X | 8 |
| GND | C102X | 2 |
| GND | C102X | 4 |
| GND | C103X | 2 |
| GND | C103X | 4 |
| GND | C106X | 2 |
| GND | C106X | 4 |
| GND | C109X | 2 |
| GND | C109X | 4 |
| GND | C109X | 6 |
| GND | C109X | 8 |
| GND | C10X | 2 |

| | | |
|---|---|---|
| GND | C10X | 4 |
| GND | C10X | 6 |
| GND | C10X | 8 |
| GND | C110X | 2 |
| GND | C110X | 4 |
| GND | C111X | 2 |
| GND | C111X | 4 |
| GND | C12X | 2 |
| GND | C12X | 4 |
| GND | C12X | 6 |
| GND | C12X | 8 |
| GND | C13X | 2 |
| GND | C13X | 4 |
| GND | C14X | 2 |
| GND | C14X | 4 |
| GND | C15 | 2 |
| GND | C16 | 2 |
| GND | C17 | 2 |
| GND | C19X | 2 |
| GND | C19X | 4 |
| GND | C19X | 6 |
| GND | C19X | 8 |
| GND | C20X | 2 |
| GND | C20X | 4 |
| GND | C20X | 6 |
| GND | C20X | 8 |
| GND | C21X | 2 |
| GND | C21X | 4 |
| GND | C21X | 6 |
| GND | C21X | 8 |
| GND | C3 | 2 |
| GND | C3X | 2 |
| GND | C3X | 4 |
| GND | C4X | 2 |
| GND | C4X | 4 |
| GND | C6 | 2 |
| GND | E3 | 1 |
| GND | GND1 | 1 |
| GND | GND2 | 1 |
| GND | P1B | 1 |
| GND | P1B | 10 |
| GND | P1B | 31 |
| GND | P2D | 18 |
| GND | PAD1 | 1 |
| GND | R2 | 2 |
| GND | R3 | 2 |
| GND | RN3 | 1 |
| GND | RN5 | 1 |
| GND | S1 | 1 |
| GND | S1 | 2 |
| GND | S1 | 3 |
| GND | S1 | 4 |
| GND | S1 | 5 |
| GND | TX | 4 |

| | | |
|---|---|---|
| GND | TX | 5 |
| GND | TX | 6 |
| GND | U1 | 14 |
| GND | U1 | 20 |
| GND | U10 | 2 |
| GND | U10 | 17 |
| GND | U10 | 22 |
| GND | U10 | 43 |
| GND | U10 | 63 |
| GND | U10 | 65 |
| GND | U10 | 84 |
| GND | U101 | 18 |
| GND | U101 | 19 |
| GND | U101 | 39 |
| GND | U101 | 40 |
| GND | U101 | 60 |
| GND | U101 | 61 |
| GND | U101 | 81 |
| GND | U101 | 82 |
| GND | U102 | 2 |
| GND | U102 | 22 |
| GND | U103 | 10 |
| GND | U103 | 21 |
| GND | U103 | 32 |
| GND | U103 | 43 |
| GND | U105 | 4 |
| GND | U106 | 1 |
| GND | U106 | 2 |
| GND | U106 | 4 |
| GND | U106 | 7 |
| GND | U106 | 9 |
| GND | U106 | 11 |
| GND | U106 | 12 |
| GND | U106 | 22 |
| GND | U107 | 7 |
| GND | U107 | 14 |
| GND | U109 | 18 |
| GND | U109 | 19 |
| GND | U109 | 39 |
| GND | U109 | 40 |
| GND | U109 | 43 |
| GND | U109 | 60 |
| GND | U109 | 61 |
| GND | U109 | 81 |
| GND | U109 | 82 |
| GND | U11 | 4 |
| GND | U110 | 2 |
| GND | U110 | 22 |
| GND | U111 | 1 |
| GND | U111 | 2 |
| GND | U111 | 4 |
| GND | U111 | 7 |
| GND | U111 | 9 |
| GND | U111 | 11 |

| | | |
|---|---|---|
| GND | U111 | 12 |
| GND | U111 | 22 |
| GND | U112 | 4 |
| GND | U117 | 4 |
| GND | U12 | 18 |
| GND | U12 | 35 |
| GND | U13 | 1 |
| GND | U13 | 26 |
| GND | U14 | 10 |
| GND | U15 | 10 |
| GND | U15 | 19 |
| GND | U16 | 16 |
| GND | U17 | 10 |
| GND | U17 | 19 |
| GND | U18 | 16 |
| GND | U19 | 18 |
| GND | U19 | 19 |
| GND | U19 | 39 |
| GND | U19 | 40 |
| GND | U19 | 60 |
| GND | U19 | 61 |
| GND | U19 | 81 |
| GND | U19 | 82 |
| GND | U2 | 12 |
| GND | U20 | 18 |
| GND | U20 | 19 |
| GND | U20 | 39 |
| GND | U20 | 40 |
| GND | U20 | 60 |
| GND | U20 | 61 |
| GND | U20 | 81 |
| GND | U20 | 82 |
| GND | U21 | 18 |
| GND | U21 | 19 |
| GND | U21 | 39 |
| GND | U21 | 40 |
| GND | U21 | 60 |
| GND | U21 | 61 |
| GND | U21 | 81 |
| GND | U21 | 82 |
| GND | U22 | 10 |
| GND | U23 | 16 |
| GND | U24 | 10 |
| GND | U25 | 10 |
| GND | U26 | 1 |
| GND | U26 | 10 |
| GND | U26 | 19 |
| GND | U27 | 1 |
| GND | U27 | 10 |
| GND | U27 | 19 |
| GND | U28 | 1 |
| GND | U28 | 10 |
| GND | U28 | 19 |
| GND | U29 | 10 |

| | | |
|---|---|---|
| GND | U3 | 1 |
| GND | U3 | 26 |
| GND | U4 | 1 |
| GND | U4 | 26 |
| GND | U5 | 1 |
| GND | U5 | 26 |
| GND | U6 | 12 |
| GND | U7 | 14 |
| GND | U7 | 20 |
| GND | U8 | 12 |
| GND | U9 | 16 |
| GND | W4 | 1 |
| H1CSN | U20 | 69 |
| H1CSN | U5 | 22 |
| H1HLDAN | U20 | 68 |
| H1HLDAN | U5 | 21 |
| H1HOLDN | RN6 | 5 |
| H1HOLDN | U20 | 84 |
| H1HOLDN | U5 | 19 |
| H1RCLKN | TP103 | 1 |
| H1RCLKN | U101 | 74 |
| H1RCLKN | U5 | 30 |
| H1RDATA | TP102 | 1 |
| H1RDATA | U101 | 75 |
| H1RDATA | U101 | 76 |
| H1RDATA | U5 | 34 |
| H1RESET.N | U19 | 4 |
| H1RESET.N | U5 | 25 |
| H1TCLKN | TP108 | 1 |
| H1TCLKN | U101 | 47 |
| H1TCLKN | U4 | 28 |
| H1TCLKN | U5 | 28 |
| H1TDATA | TP107 | 1 |
| H1TDATA | U101 | 5 |
| H1TDATA | U5 | 32 |
| H2CSN | U20 | 70 |
| H2CSN | U4 | 22 |
| H2HLDAN | U20 | 51 |
| H2HLDAN | U4 | 21 |
| H2HOLDN | RN6 | 4 |
| H2HOLDN | U20 | 83 |
| H2HOLDN | U4 | 19 |
| H2RCLKN | TP106 | 1 |
| H2RCLKN | U101 | 64 |
| H2RCLKN | U4 | 30 |
| H2RDATA | TP105 | 1 |
| H2RDATA | U101 | 65 |
| H2RDATA | U101 | 68 |
| H2RDATA | U4 | 34 |
| H2RESET.N | U19 | 5 |
| H2RESET.N | U4 | 25 |
| H2TDATA | U101 | 58 |
| H2TDATA | U4 | 32 |
| H3CSN | U20 | 71 |

| | | |
|---|---|---|
| H3CSN | U3 | 22 |
| H3HLDAN | U20 | 76 |
| H3HLDAN | U3 | 21 |
| H3HOLDN | RN6 | 2 |
| H3HOLDN | U20 | 44 |
| H3HOLDN | U3 | 19 |
| H3RCLKN | TP114 | 1 |
| H3RCLKN | U109 | 74 |
| H3RCLKN | U3 | 30 |
| H3RDATA | TP113 | 1 |
| H3RDATA | U109 | 75 |
| H3RDATA | U109 | 76 |
| H3RDATA | U3 | 34 |
| H3RESET.N | U19 | 74 |
| H3RESET.N | U3 | 25 |
| H3TCLKN | TP119 | 1 |
| H3TCLKN | U109 | 47 |
| H3TCLKN | U13 | 28 |
| H3TCLKN | U3 | 28 |
| H3TDATA | TP118 | 1 |
| H3TDATA | U109 | 5 |
| H3TDATA | U3 | 32 |
| H4CSN | U13 | 22 |
| H4CSN | U20 | 72 |
| H4HLDAN | U13 | 21 |
| H4HLDAN | U20 | 52 |
| H4HOLDN | RN6 | 3 |
| H4HOLDN | U13 | 19 |
| H4HOLDN | U20 | 43 |
| H4RCLKN | TP117 | 1 |
| H4RCLKN | U109 | 64 |
| H4RCLKN | U13 | 30 |
| H4RDATA | TP116 | 1 |
| H4RDATA | U109 | 65 |
| H4RDATA | U109 | 68 |
| H4RDATA | U13 | 34 |
| H4RESET.N | U13 | 25 |
| H4RESET.N | U19 | 75 |
| H4TDATA | U109 | 58 |
| H4TDATA | U13 | 32 |
| HADRN | U13 | 23 |
| HADRN | U20 | 4 |
| HADRN | U3 | 23 |
| HADRN | U4 | 23 |
| HADRN | U5 | 23 |
| HALE | RN6 | 9 |
| HALE | U13 | 20 |
| HALE | U20 | 56 |
| HALE | U3 | 20 |
| HALE | U4 | 20 |
| HALE | U5 | 20 |
| HBM1N | U13 | 18 |
| HBM1N | U20 | 58 |
| HBM1N | U3 | 18 |

| | | |
|---|---|---|
| HBM1N | U4 | 18 |
| HBM1N | U5 | 18 |
| HBUSREL.N | U13 | 16 |
| HBUSREL.N | U20 | 57 |
| HBUSREL.N | U3 | 16 |
| HBUSREL.N | U4 | 16 |
| HBUSREL.N | U5 | 16 |
| HDALI | U13 | 13 |
| HDALI | U20 | 16 |
| HDALI | U3 | 13 |
| HDALI | U4 | 13 |
| HDALI | U5 | 13 |
| HDALO | U13 | 14 |
| HDALO | U20 | 17 |
| HDALO | U3 | 14 |
| HDALO | U4 | 14 |
| HDALO | U5 | 14 |
| HDASN | RN6 | 7 |
| HDASN | U13 | 15 |
| HDASN | U20 | 49 |
| HDASN | U3 | 15 |
| HDASN | U4 | 15 |
| HDASN | U5 | 15 |
| HINTR | U10 | 32 |
| HINTR | U20 | 67 |
| HINTRN | RN6 | 10 |
| HINTRN | U13 | 12 |
| HINTRN | U20 | 59 |
| HINTRN | U3 | 12 |
| HINTRN | U4 | 12 |
| HINTRN | U5 | 12 |
| HREADYN | RN6 | 8 |
| HREADYN | U13 | 24 |
| HREADYN | U20 | 75 |
| HREADYN | U3 | 24 |
| HREADYN | U4 | 24 |
| HREADYN | U5 | 24 |
| HRPWN | U13 | 11 |
| HRPWN | U20 | 50 |
| HRPWN | U3 | 11 |
| HRPWN | U4 | 11 |
| HRPWN | U5 | 11 |
| INN | IN11 | 10 |
| INN | IN12 | 10 |
| INN | IN13 | 10 |
| INN | IN14 | 10 |
| INN | U107 | 12 |
| IOCHCLK.N | P1A | 1 |
| IOCHRDY.N | P1A | 10 |
| IOCHRDY.N | U21 | 64 |
| IOCS16N | P2D | 2 |
| IOCS16N | U21 | 31 |
| IORN | P1B | 14 |
| IORN | U26 | 4 |

| | | |
|---|---|---|
| IORPCN | U19 | 54 |
| IORPCN | U21 | 30 |
| IORPCN | U26 | 16 |
| IOWN | P1B | 13 |
| IOWN | U26 | 5 |
| IOWPCN | U19 | 55 |
| IOWPCN | U21 | 2 |
| IOWPCN | U26 | 15 |
| IRQ03 | P1B | 25 |
| IRQ04 | P1B | 24 |
| IRQ05 | P1B | 23 |
| IRQ05 | U19 | 46 |
| IRQ06 | P1B | 22 |
| IRQ07 | P1B | 21 |
| IRQ07 | U19 | 47 |
| IRQ09 | P1B | 4 |
| IRQ10 | P2D | 3 |
| IRQ11 | P2D | 4 |
| IRQ11 | U19 | 48 |
| IRQ12 | P2D | 5 |
| IRQ14 | P2D | 7 |
| IRQ15 | P2D | 6 |
| IRQ15 | U19 | 49 |
| LA17 | P2C | 8 |
| LA18 | P2C | 7 |
| LA19 | P2C | 6 |
| LA20 | P2C | 5 |
| LA20 | U21 | 54 |
| LA21 | P2C | 4 |
| LA21 | U21 | 55 |
| LA22 | P2C | 3 |
| LA22 | U21 | 56 |
| LA23 | P2C | 2 |
| LA23 | U21 | 57 |
| LHLBCSN | RN5 | 9 |
| LHLBCSN | RN7 | 9 |
| LHLBCSN | U19 | 64 |
| LHLBCSN | U20 | 77 |
| LHLBCSN | U21 | 75 |
| LHLBCSN | U23 | 22 |
| LHUBCSN | RN5 | 10 |
| LHUBCSN | RN7 | 10 |
| LHUBCSN | U18 | 22 |
| LHUBCSN | U19 | 69 |
| LHUBCSN | U20 | 78 |
| LHUBCSN | U21 | 76 |
| LINK1 | RN13 | 5 |
| LINK1 | U101 | 43 |
| MASTERN | P2D | 17 |
| MCLK-10 | U10 | 41 |
| MCLK-10 | U11 | 5 |
| MEMCS16.N | P2D | 1 |
| MEMCS16.N | U21 | 32 |
| MEMRN | P2C | 9 |

| | | |
|---|---|---|
| MEMRN | U21 | 58 |
| MEMWN | P2C | 10 |
| MEMWN | U21 | 59 |
| MON0N | KM11 | 10 |
| MON0N | KM12 | 10 |
| MON0N | U107 | 9 |
| MPALE | U10 | 6 |
| MPALE | U19 | 56 |
| MPALE | U20 | 42 |
| MPBHEN | RN2 | 4 |
| MPBHEN | U10 | 7 |
| MPBHEN | U19 | 57 |
| MPBHEN | U20 | 11 |
| MPDENN | RN2 | 2 |
| MPDENN | U10 | 11 |
| MPDENN | U19 | 58 |
| MPDENN | U20 | 62 |
| MPGCS2N | U10 | 26 |
| MPGCS3N | U10 | 25 |
| MPGCS3N | U20 | 20 |
| MPGCS4N | U10 | 24 |
| MPGCS4N | U19 | 13 |
| MPGCS5N | U10 | 21 |
| MPGCS5N | U19 | 42 |
| MPGCS5N | U20 | 41 |
| MPGCS6N | U10 | 20 |
| MPGCS6N | U19 | 59 |
| MPGCS7N | U10 | 19 |
| MPGCS7N | U19 | 62 |
| MPHLDA | U10 | 12 |
| MPHLDA | U20 | 63 |
| MPHOLD | U10 | 13 |
| MPHOLD | U20 | 53 |
| MPRDN | RN2 | 6 |
| MPRDN | U10 | 4 |
| MPRDN | U19 | 63 |
| MPRDN | U20 | 2 |
| MPREADY | RN2 | 8 |
| MPREADY | U10 | 18 |
| MPREADY | U19 | 70 |
| MPREADY | U20 | 34 |
| MPRESN | U10 | 37 |
| MPRESN | U19 | 6 |
| MPRXD | RN4 | 7 |
| MPRXD | U10 | 57 |
| MPRXD | U14 | 9 |
| MPS02N | RN2 | 3 |
| MPS02N | U10 | 8 |
| MPS02N | U19 | 16 |
| MPS02N | U20 | 27 |
| MPUCSN | U10 | 30 |
| MPUCSN | U19 | 17 |
| MPWPRN | RN2 | 7 |
| MPWPRN | U10 | 16 |

| | | |
|---|---|---|
| MPWPRN | U19 | 14 |
| MPWPRN | U20 | 21 |
| MPWRN | RN2 | 5 |
| MPWRN | U10 | 5 |
| MPWRN | U19 | 41 |
| MPWRN | U20 | 1 |
| MRAMCSL.N | U12 | 52 |
| MRAMCSL.N | U21 | 77 |
| MRAMCSR.N | U12 | 51 |
| MRAMCSR.N | U19 | 71 |
| MRAMRDL.N | U12 | 65 |
| MRAMRDL.N | U21 | 78 |
| MRAMRDR.N | U12 | 38 |
| MRAMRDR.N | U19 | 31 |
| MRAMWLR.N | U12 | 37 |
| MRAMWLR.N | U19 | 32 |
| MRAMWRL.N | U12 | 66 |
| MRAMWRL.N | U12 | 67 |
| MRAMWRL.N | U21 | 79 |
| MRAMWUR.N | U12 | 36 |
| MRAMWUR.N | U19 | 33 |
| MTG-GND | MT3 | 1 |
| MTG-GND | MT4 | 1 |
| MTG-GND | W4 | 4 |
| N00001 | U10 | 52 |
| N00001 | U6 | 8 |
| N00002 | U10 | 53 |
| N00002 | U6 | 9 |
| N00007 | C2 | 1 |
| N00007 | U6 | 1 |
| N00008 | C1 | 1 |
| N00008 | U6 | 3 |
| N00009 | C2 | 2 |
| N00009 | U6 | 2 |
| N00105 | P1B | 27 |
| NATCK | U101 | 48 |
| NATCK | U102 | 4 |
| NATCK | U112 | 1 |
| NATCK | U112 | 7 |
| NCTCK | U109 | 48 |
| NCTCK | U110 | 4 |
| NCTCK | U117 | 1 |
| NCTCK | U117 | 7 |
| NT1 | RN13 | 2 |
| NT1 | TX | 1 |
| NT1 | U101 | 14 |
| NT1 | U102 | 36 |
| NT1 | U106 | 36 |
| NT1 | U109 | 14 |
| NT1 | U110 | 36 |
| NT1 | U111 | 36 |
| OR1 | OUT1 | 12 |
| OR1 | TP124 | 1 |
| OR2 | OUT1 | 7 |

| | | |
|---|---|---|
| OR2 | TP126 | 1 |
| OSC | P1B | 30 |
| OT1 | OUT1 | 14 |
| OT1 | TP123 | 1 |
| OT2 | OUT1 | 5 |
| OT2 | TP125 | 1 |
| OWS | P1B | 8 |
| PCHOLD | U19 | 80 |
| PCHOLD | U20 | 28 |
| PCINTR | U10 | 31 |
| PCINTR | U19 | 38 |
| POR | U103 | 8 |
| POR | U107 | 1 |
| PORN | U101 | 6 |
| PORN | U102 | 37 |
| PORN | U103 | 2 |
| PORN | U106 | 37 |
| PORN | U109 | 6 |
| PORN | U110 | 37 |
| PORN | U111 | 37 |
| PROGA04 | RN8 | 6 |
| PROGA04 | S1 | 6 |
| PROGA04 | U21 | 62 |
| PROGA05 | RN8 | 7 |
| PROGA05 | S1 | 7 |
| PROGA05 | U21 | 63 |
| PROGA06 | RN8 | 4 |
| PROGA06 | S1 | 8 |
| PROGA06 | U21 | 16 |
| PROGA07 | RN8 | 3 |
| PROGA07 | S1 | 9 |
| PROGA07 | U21 | 17 |
| PROGA08 | RN8 | 5 |
| PROGA08 | S1 | 10 |
| PROGA08 | U21 | 20 |
| PROMLCS.N | RN5 | 5 |
| PROMLCS.N | RN7 | 5 |
| PROMLCS.N | U1 | 22 |
| PROMLCS.N | U19 | 65 |
| PROMLCS.N | U21 | 80 |
| PROMUCS.N | RN5 | 3 |
| PROMUCS.N | RN7 | 3 |
| PROMUCS.N | U19 | 67 |
| PROMUCS.N | U21 | 7 |
| PROMUCS.N | U7 | 22 |
| R2IN | RN4 | 6 |
| R2IN | U6 | 5 |
| R2OUT | RN3 | 7 |
| R2OUT | U6 | 6 |
| REFRESH.N | P1B | 19 |
| REFRESH.N | U21 | 14 |
| RESET | P1B | 2 |
| RESET | U26 | 3 |
| RESETPC | U19 | 2 |

| | | |
|---|---|---|
| RESETPC | U20 | 29 |
| RESETPC | U21 | 1 |
| RESETPC | U26 | 17 |
| RR101 | T11 | 3 |
| RR101 | U104 | 2 |
| RR102 | T12 | 3 |
| RR102 | U104 | 14 |
| RR103 | T13 | 3 |
| RR103 | U108 | 2 |
| RR104 | T14 | 3 |
| RR104 | U108 | 14 |
| RXIN232 | E2 | 1 |
| RXIN232 | U6 | 10 |
| SA0 | P1A | 31 |
| SA0 | U26 | 6 |
| SA1 | P1A | 30 |
| SA1 | U26 | 7 |
| SA10 | P1A | 21 |
| SA10 | U27 | 8 |
| SA11 | P1A | 20 |
| SA11 | U27 | 9 |
| SA12 | P1A | 19 |
| SA12 | U28 | 2 |
| SA13 | P1A | 18 |
| SA13 | U28 | 3 |
| SA14 | P1A | 17 |
| SA14 | U28 | 4 |
| SA15 | P1A | 16 |
| SA15 | U28 | 5 |
| SA16 | P1A | 15 |
| SA16 | U28 | 6 |
| SA17 | P1A | 14 |
| SA17 | U28 | 7 |
| SA18 | P1A | 13 |
| SA18 | U28 | 8 |
| SA19 | P1A | 12 |
| SA19 | U28 | 9 |
| SA2 | P1A | 29 |
| SA2 | U26 | 8 |
| SA3 | P1A | 28 |
| SA3 | U26 | 9 |
| SA4 | P1A | 27 |
| SA4 | U27 | 2 |
| SA5 | P1A | 26 |
| SA5 | U27 | 3 |
| SA6 | P1A | 25 |
| SA6 | U27 | 4 |
| SA7 | P1A | 24 |
| SA7 | U27 | 5 |
| SA8 | P1A | 23 |
| SA8 | U27 | 6 |
| SA9 | P1A | 22 |
| SA9 | U27 | 7 |
| SBME | P2C | 1 |

| | | |
|---|---|---|
| SCLK | RN12 | 10 |
| SCLK | U102 | 20 |
| SCLK | U106 | 20 |
| SCLK | U109 | 33 |
| SCLK | U110 | 20 |
| SCLK | U111 | 20 |
| SCLK | U14 | 5 |
| SD0 | P1A | 9 |
| SD0 | U29 | 2 |
| SD1 | P1A | 8 |
| SD1 | U29 | 3 |
| SD10 | P2C | 13 |
| SD10 | U25 | 4 |
| SD11 | P2C | 14 |
| SD11 | U25 | 5 |
| SD12 | P2C | 15 |
| SD12 | U25 | 6 |
| SD13 | P2C | 16 |
| SD13 | U25 | 7 |
| SD14 | P2C | 17 |
| SD14 | U25 | 8 |
| SD15 | P2C | 18 |
| SD15 | U25 | 9 |
| SD2 | P1A | 7 |
| SD2 | U29 | 4 |
| SD3 | P1A | 6 |
| SD3 | U29 | 5 |
| SD4 | P1A | 5 |
| SD4 | U29 | 6 |
| SD5 | P1A | 4 |
| SD5 | U29 | 7 |
| SD6 | P1A | 3 |
| SD6 | U29 | 8 |
| SD7 | P1A | 2 |
| SD7 | U29 | 9 |
| SD8 | P2C | 11 |
| SD8 | U25 | 2 |
| SD9 | P2C | 12 |
| SD9 | U25 | 3 |
| SDI | U101 | 21 |
| SDI | U109 | 21 |
| SDI | U14 | 3 |
| SDO | RN12 | 9 |
| SDO | U102 | 18 |
| SDO | U106 | 18 |
| SDO | U109 | 34 |
| SDO | U110 | 18 |
| SDO | U111 | 18 |
| SDO | U14 | 11 |
| SELACN | U101 | 78 |
| SELACN | U103 | 30 |
| SELBDN | U101 | 31 |
| SELBDN | U103 | 29 |
| SERCLK | U10 | 58 |

| | | |
|---|---|---|
| SERCLK | U14 | 15 |
| SINT1-1.0 | U10 | 55 |
| SINT1-1.0 | U14 | 13 |
| SMEMRN | P1B | 12 |
| SMEMWN | P1B | 11 |
| SPARIN1 | RN4 | 10 |
| SPARIN1 | U26 | 2 |
| SPAROUT.1 | RN4 | 3 |
| SPAROUT.1 | U26 | 18 |
| SPAROUT.2 | RN4 | 4 |
| SPAROUT.2 | U2 | 23 |
| SS7SELN | U19 | 1 |
| SS7SELN | U21 | 36 |
| SS7SELN | U25 | 19 |
| SS7SELN | U29 | 19 |
| SS7WPRN | U21 | 37 |
| SS7WPRN | U22 | 1 |
| SS7WPRN | U24 | 1 |
| SS7WPRN | U25 | 1 |
| SS7WPRN | U29 | 1 |
| T2IN | RN4 | 8 |
| T2IN | U6 | 7 |
| T2OUT | RN3 | 6 |
| T2OUT | U6 | 4 |
| TERMN | KT11 | 10 |
| TERMN | KT12 | 10 |
| TERMN | U107 | 11 |
| TEST0 | RN12 | 3 |
| TEST0 | U103 | 34 |
| TEST1 | RN12 | 2 |
| TEST1 | U103 | 35 |
| TESTN | RN12 | 4 |
| TESTN | U101 | 2 |
| TESTN | U103 | 33 |
| TESTN | U109 | 2 |
| TIND | RN13 | 4 |
| TIND | TX | 2 |
| TIND | U102 | 12 |
| TIND | U110 | 12 |
| TMRK1TP | TP4 | 1 |
| TMRK1TP | U20 | 22 |
| TT101 | T11 | 1 |
| TT101 | U104 | 1 |
| TT102 | T12 | 1 |
| TT102 | U104 | 15 |
| TT103 | T13 | 1 |
| TT103 | U108 | 1 |
| TT104 | T14 | 1 |
| TT104 | U108 | 15 |
| TXD | RN13 | 3 |
| TXD | TX | 3 |
| TXD | U102 | 9 |
| TXD | U110 | 9 |
| TXOU232 | E1 | 1 |

```
TXOU232   U6         11
UHLBCSN   RN5         7
UHLBCSN   RN7         7
UHLBCSN   U19        68
UHLBCSN   U20        79
UHLBCSN   U21         8
UHLBCSN   U9         22
UHUBCSN   RN5         8
UHUBCSN   RN7         8
UHUBCSN   U16        22
UHUBCSN   U19        72
UHUBCSN   U20        80
UHUBCSN   U21         9
WRRLYN    U101       32
WRRLYN    U107        2
```

APPENDIX-3 : PARTS LIST AND NETLIST OF ACCESS SWITCH SUB-MODULE

PARTS LIST OF ACCESS SWITCH SUB-MODULE

| QTY | PART# | DESCRIPTION | MANUF | LOCATION |
|---|---|---|---|---|
| 1 | LOGIC D REV B | PCB 12 LAYERS | ADS | PCB1 |
| 1 | 74 HCT 573 | OCTAL LATCH | | U46 |
| 7 | 74 HCT 574 | OCTAL FLIP FLOP | | U10 15 17 18 26 |
| | | | | U31 88 |
| 10 | 74 FCT 640 | INV OCT BUS TRN | | U48 50 51 89-95 |
| 1 | H11L1 | 6 P DIP OPTO | MOTO | U9 |
| 1 | MAX231CPD | RS231 DRVR/RCVR | MAXIM | U14 |
| 20 | LXT313JE | E1 REPEATER | LEVEL1 | U58-63 96 99 102 105 |
| | | | | U108 111 113 117 120 |
| | | | | U123 126 129 132 135 |
| 12 | M3494-B2 | CR PNT SWTCH | SGS | U76-87 |
| 40 | HA3-5020-5 | VIDEO AMP | HARRIS | U64-75 97 98 100 101 |
| | | | | U103 104 106 107 109 |
| | | | | U110 112 114-116 118 |
| | | | | U119 121 122 124 125 |
| | | | | U127 128 130 131 133 |
| | | | | U134 136 137 |
| 2 | EPM5192-35LC | OTP PLD 84 PLCC | ALTERA | U7 24 |
| 31 | XR-T5675CP | DL LINE DRIVER | EXAR | U1 4-6 11-13 19-22 |
| | | | | U27-29 32-35 38-45 |
| | | | | U49 52-55 |
| 6 | MIC5801CN | OCT LAT DRIVR | MICREL | U3 8 16 25 30 37 |
| 1 | MAX706CPA | PFI & WDI PLUSE | MAXIM | U47 |
| 1 | CY7C199-55PC | 32Kx8-CMOS SRAM | CYPRS | U57 |
| 1 | CY7C271-55PC | 32Kx8 OTP | CYPRS | U56 |
| 1 | SAB8032B-P | 12 Mhz PROC | SEIMEN | U36 |
| 1 | 28-3518-10 | 28 DIP .3w | CIRCUT | U56 |
| 2 | PCS-084A-1 | PLCC 84 PIN | AUGAT | U7 24 |
| 6 | RPE110X7R103K | C103K .1 50V .1uF | | |
| 37 | RPE121X7R104K | C104K .1 50V .1uF | | C1 2 C4-11 C14-25 |
| | | | | C28-31 C33-38 40 47 |
| | | | | C52 56 71 |
| 4 | T105K | T105K .1 35V 1.0uF | KEMET | C12 13 26 55 |
| 14 | T106K | T106K .1 35V 10uF | KEMET | C3 27 39 41-43 |
| | | | | C51 54 55 58 72 73 |
| | | | | C75 76 |
| 20 | TSW136-08-T-D | 2 X 1 .1 HEADER | SAMTEC | JG1-20 |
| 1 | TSW136-08-T-D | 2 X 3 .1 HEADER | SAMTEC | J1 |
| 1 | TP105-40-00 BLK | LOOP TEST POINT | SOURC | TDGND |
| 1 | TP105-40-02 RED | LOOP TEST POINT | SOURC | T+5 |
| 1 | TP105-40-03 ORG | LOOP TEST POINT | SOURC | T+12 |
| 1 | TP105-40-05 GRN | LOOP TEST POINT | SOURC | TAGND |

| | | | | |
|---|---|---|---|---|
| 1 | TP105-40-06 BLU | LOOP TEST POINT | SOURC | T-12 |
| 1 | 26-48-1045 | .156" HDR 4 WIRE | MOLEX | AVOL |
| 1 | 26-48-1105 | .156" HDR 10 WIRE | MOLEX | PWR |
| 1 | 501-1037ES | 10 IDC PC LTCH | T&B | RS233 |
| 1 | 501-1637ES | 16 IDC PC LTCH | T&B | ALMRLY |
| 3 | 501-2037ES | 20 IDC PC LTCH | T&B | OUT1 OUT2 OUT3 |
| 4 | 501-4037ES | 40 IDC PC LTCH | T&B | IN1 IN2 IN3 IN4 |
| 1 | 501-5037ES | 50 IDC PC LTCH | T&B | LED |
| 1 | 1N5226B | ZENER 3.3V 1/4W | MOTO | CR1 |
| 1 | VFHS85B 8.192MHZ | HCMOS 50 PPM (E1) | | VALPEY U23 |
| 1 | XO-43B-59 | 11.0592MHZ | DALE | U2 |
| 49 | TN2E-12 | RELAY | AROMAT | K1-9 KM1-20 KT1-20 |
| 2 | 0 OHM 1/4 W 5% | RESISTOR | | R1 R4 |
| 1 | 150 OHM 1/4 W 5% | RESISTOR | | R5 |
| 1 | 10 K OHM 1/4 W 5% | RESISTOR | | R3 |
| 1 | 15 K OHM 1/4 W 5% | RESISTOR | | R2 |
| 10 | MDP1403-750G | D14-I-75 ohm | DALE | RN27 28 33 49 52-57 |
| 5 | MDP1603-681G | D16-I-680 ohm | DALE | RN2 5 6 8 13 |
| 15 | MSP08A03-560G | S08-I-56 ohm | DALE | RN1 3 4 7 10-12 RN15-18 21 22 |
| 20 | MSP08A03-111G | S08-I-110 ohm | DALE | RN36-41 50 58 60 62 RN64 66 68 70 72 74 RN76 78 80 82 |
| 12 | MSP10A01-471 | S10-B-470 ohm | DALE | RN19 23-26 42-48 |
| 22 | MSP08A03-102G | S08-I-1 K ohm | DALE | RN9 20 29-32 34 35 RN51 59 61 63 65 67 RN69 71 73 75 77 79 RN81 83 |
| 1 | MSP10A01-472 | S10-B-4.7K ohm | DALE | RN14 |
| 40 | PE64954 | TRANSFORMER | PULSE | FT1-20 NT1-20 |
| 15 | 68 11509 0 | 2x 1:2CT XR T1/E1 | SCHOTT | OT1-OT15 |

NETLIST OF ACCESS SWITCH SUB-MODULE

| | | | | |
|---|---|---|---|---|
| 1 | +12 | C101-1 | C104-1 | C106-1 |
| | | C108-1 | C110-1 | C112-1 |
| | | C114-1 | C116-1 | C32-1 |
| | | C52-1 | C54-1 | C56-1 |
| | | C58-1 | C59-1 | C61-1 |
| | | C63-1 | C65-1 | C67-1 |
| | | C69-1 | C71-1 | C73-1 |
| | | C76-1 | C91-1 | C93-1 |
| | | C95-1 | C97-1 | C99-1 |
| | | K1-1 | K2-1 | K3-1 |
| | | K4-1 | K5-1 | K6-1 |
| | | K7-1 | K8-1 | K9-1 |
| | | KM1-1 | KM10-1 | KM11-1 |
| | | KM12-1 | KM13-1 | KM14-1 |
| | | KM15-1 | KM16-1 | KM17-1 |
| | | KM18-1 | KM19-1 | KM2-1 |
| | | KM20-1 | KM3-1 | KM4-1 |
| | | KM5-1 | KM6-1 | KM7-1 |
| | | KM8-1 | KM9-1 | KT1-1 |
| | | KT10-1 | KT11-1 | KT12-1 |
| | | KT13-1 | KT14-1 | KT15-1 |
| | | KT16-1 | KT17-1 | KT18-1 |
| | | KT19-1 | KT2-1 | KT20-1 |
| | | KT3-1 | KT4-1 | KT5-1 |
| | | KT6-1 | KT7-1 | KT8-1 |
| | | KT9-1 | PWR-5 | PWR-6 |
| | | R1-L | T+12-1 | U100-07 |
| | | U101-07 | U103-07 | U104-07 |
| | | U106-07 | U107-07 | U109-07 |
| | | U110-07 | U112-07 | U114-07 |
| | | U115-07 | U116-07 | U118-07 |
| | | U119-07 | U121-07 | U122-07 |
| | | U124-07 | U125-07 | U127-07 |
| | | U128-07 | U130-07 | U131-07 |
| | | U133-07 | U134-07 | U136-07 |
| | | U137-07 | U16-12 | U25-12 |
| | | U3-12 | U30-12 | U37-12 |
| | | U64-07 | U65-07 | U66-07 |
| | | U67-07 | U68-07 | U69-07 |
| | | U70-07 | U71-07 | U72-07 |
| | | U73-07 | U74-07 | U75-07 |
| | | U76-40 | U77-40 | U78-40 |
| | | U79-40 | U8-12 | U80-40 |
| | | U81-40 | U82-40 | U83-40 |
| | | U84-40 | U85-40 | U86-40 |
| | | U87-40 | U9-6 | U97-07 |
| | | U98-07 | | |
| 2 | +5 | C1-2 | C10-2 | C11-1 |

| | | |
|---|---|---|
| C12-1 | C14-2 | C16-2 |
| C17-2 | C18-2 | C19-2 |
| C2-2 | C20-2 | C21-2 |
| C22-2 | C23-2 | C24-2 |
| C25-2 | C27-1 | C3-1 |
| C30-2 | C31-2 | C33-2 |
| C34-2 | C35-2 | C36-2 |
| C37-2 | C38-2 | C39-1 |
| C4-2 | C40-1 | C41-1 |
| C42-1 | C43-1 | C44-1 |
| C45-1 | C46-1 | C47-1 |
| C48-1 | C49-1 | C5-2 |
| C50-1 | C6-2 | C7-2 |
| C77-1 | C78-1 | C79-1 |
| C8-2 | C80-1 | C81-1 |
| C82-1 | C83-1 | C84-1 |
| C85-1 | C86-1 | C87-1 |
| C88-1 | C89-1 | C9-1 |
| C90-1 | CR1-1 | K2-4 |
| OT1-02 | OT1-09 | OT10-02 |
| OT10-09 | OT12-02 | OT12-09 |
| OT13-02 | OT13-09 | OT14-02 |
| OT14-09 | OT15-02 | OT15-09 |
| OT2-02 | OT2-09 | OT3-02 |
| OT3-09 | OT4-02 | OT4-09 |
| OT5-02 | OT6-02 | OT6-09 |
| OT7-02 | OT7-09 | OT8-02 |
| OT8-09 | OT9-02 | OT9-09 |
| PWR-2 | PWR-3 | RN14-1 |
| RN19-1 | RN25-1 | RN26-1 |
| RN42-1 | RN43-1 | RN44-1 |
| RN45-1 | RN46-1 | RN47-1 |
| RN48-1 | T+5-1 | U1-1 |
| U1-7 | U1-8 | U10-20 |
| U100-08 | U101-08 | U102-03 |
| U103-08 | U104-08 | U105-03 |
| U106-08 | U107-08 | U108-03 |
| U109-08 | U11-1 | U11-7 |
| U11-8 | U110-08 | U111-03 |
| U112-08 | U113-03 | U114-08 |
| U115-08 | U116-08 | U117-03 |
| U118-08 | U119-08 | U12-1 |
| U12-7 | U12-8 | U120-03 |
| U121-08 | U122-08 | U123-03 |
| U124-08 | U125-08 | U126-03 |
| U127-08 | U128-08 | U129-03 |
| U13-1 | U13-7 | U13-8 |
| U130-08 | U131-08 | U132-03 |
| U133-08 | U134-08 | U135-03 |
| U136-08 | U137-08 | U14-13 |
| U15-20 | U16-21 | U17-20 |
| U18-20 | U19-1 | U19-7 |
| U19-8 | U2-14 | U20-1 |
| U20-7 | U20-8 | U21-1 |

|   |         |         |         |         |
|---|---------|---------|---------|---------|
|   |         | U21-7   | U21-8   | U22-1   |
|   |         | U22-7   | U22-8   | U23-08  |
|   |         | U24-24  | U24-3   | U24-45  |
|   |         | U24-66  | U25-21  | U26-20  |
|   |         | U27-1   | U27-7   | U27-8   |
|   |         | U28-1   | U28-7   | U28-8   |
|   |         | U29-1   | U29-7   | U29-8   |
|   |         | U3-21   | U30-21  | U31-20  |
|   |         | U32-1   | U32-7   | U32-8   |
|   |         | U33-1   | U33-7   | U33-8   |
|   |         | U34-1   | U34-7   | U34-8   |
|   |         | U35-1   | U35-7   | U35-8   |
|   |         | U36-40  | U37-21  | U38-1   |
|   |         | U38-7   | U38-8   | U39-1   |
|   |         | U39-7   | U39-8   | U4-1    |
|   |         | U4-7    | U4-8    | U40-1   |
|   |         | U40-7   | U40-8   | U41-1   |
|   |         | U41-7   | U41-8   | U42-1   |
|   |         | U42-7   | U42-8   | U43-1   |
|   |         | U43-7   | U43-8   | U44-1   |
|   |         | U44-7   | U44-8   | U45-1   |
|   |         | U45-7   | U45-8   | U46-20  |
|   |         | U47-2   | U48-1   | U48-20  |
|   |         | U49-1   | U49-7   | U49-8   |
|   |         | U5-1    | U5-7    | U5-8    |
|   |         | U50-1   | U50-20  | U51-1   |
|   |         | U51-20  | U52-1   | U52-7   |
|   |         | U52-8   | U53-1   | U53-7   |
|   |         | U53-8   | U54-1   | U54-7   |
|   |         | U54-8   | U55-1   | U55-7   |
|   |         | U55-8   | U56-21  | U56-28  |
|   |         | U57-28  | U58-03  | U59-03  |
|   |         | U6-1    | U6-7    | U6-8    |
|   |         | U60-03  | U61-03  | U62-03  |
|   |         | U63-03  | U64-08  | U65-08  |
|   |         | U66-08  | U67-08  | U68-08  |
|   |         | U69-08  | U7-24   | U7-3    |
|   |         | U7-45   | U7-66   | U70-08  |
|   |         | U71-08  | U72-08  | U73-08  |
|   |         | U74-08  | U75-08  | U8-21   |
|   |         | U88-20  | U89-1   | U89-20  |
|   |         | U90-1   | U90-20  | U91-1   |
|   |         | U91-20  | U92-1   | U92-20  |
|   |         | U93-1   | U93-20  | U94-1   |
|   |         | U94-20  | U95-1   | U95-20  |
|   |         | U96-03  | U97-08  | U98-08  |
|   |         | U99-03  |         |         |
| 3 | +5LGND  | K2-7    | K6-7    |         |
| 4 | -12     | C100-1  | C102-1  | C103-1  |
|   |         | C105-1  | C107-1  | C109-1  |
|   |         | C111-1  | C113-1  | C115-1  |
|   |         | C117-1  | C51-2   | C57-2   |

|   |   |   |
|---|---|---|
| C60-1 | C62-1 | C64-1 |
| C66-1 | C68-1 | C70-1 |
| C72-2 | C75-2 | C92-1 |
| C94-1 | C96-1 | C98-1 |
| PWR-8 | T-12-1 | U100-04 |
| U101-04 | U103-04 | U104-04 |
| U106-04 | U107-04 | U109-04 |
| U110-04 | U112-04 | U114-04 |
| U115-04 | U116-04 | U118-04 |
| U119-04 | U121-04 | U122-04 |
| U124-04 | U125-04 | U127-04 |
| U128-04 | U130-04 | U131-04 |
| U133-04 | U134-04 | U136-04 |
| U137-04 | U64-04 | U65-04 |
| U66-04 | U67-04 | U68-04 |
| U69-04 | U70-04 | U71-04 |
| U72-04 | U73-04 | U74-04 |
| U75-04 | U97-04 | U98-04 |

| | | | |
|---|---|---|---|
| 5 | 01046067 | ALMRLY-10 | JING-1 |
| 6 | 01FR | FT14-07 | IN2-7 |
| 7 | 01FRING | FT14-03 | U96-14 |
| 8 | 01FRTIP | FT14-01 | U96-15 |
| 9 | 01FT | FT14-05 | IN2-5 |
| 10 | 01NR | IN2-3 | NT14-07 |
| 11 | 01NRING | NT14-03 | U96-02 |
| 12 | 01NRTIP | NT14-01 | U96-01 |
| 13 | 01NT | IN2-1 | NT14-05 |
| 14 | 02FR | FT7-07 | IN3-7 |
| 15 | 02FRING | FT7-03 | U99-14 |
| 16 | 02FRTIP | FT7-01 | U99-15 |
| 17 | 02FT | FT7-05 | IN3-5 |
| 18 | 02NR | IN2-35 | NT7-07 |
| 19 | 02NRING | NT7-03 | U99-02 |
| 20 | 02NRTIP | NT7-01 | U99-01 |
| 21 | 02NT | IN2-33 | NT7-05 |
| 22 | 03005026 | FT14-14 | RN70-7 |

| 23 | 03005060 | FT7-14 | RN50-7 | |
|----|----------|--------|--------|---|
| 24 | 03008004 | NT14-14 | RN70-1 | |
| 25 | 03008038 | NT7-14 | RN50-1 | |
| 26 | 03017015 | NT14-10 | RN49-1 | U97-03 |
| 27 | 03017030 | FT14-10 | RN49-2 | U98-03 |
| 28 | 03017050 | NT7-10 | RN49-3 | U100-03 |
| 29 | 03017064 | FT7-10 | RN49-4 | U101-03 |
| 30 | 03027017 | KT14-9 | RN49-13 | RN71-3 |
| 31 | 03028004 | RN70-2 | RN71-6 | U97-06 |
| 32 | 03028052 | KT7-9 | RN49-11 | RN51-3 |
| 33 | 03029034 | RN70-8 | RN71-8 | U98-06 |
| 34 | 03029038 | RN50-2 | RN51-6 | U100-06 |
| 35 | 03031014 | KT14-2 | RN49-14 | RN71-1 |
| 36 | 03031069 | RN50-8 | RN51-8 | U101-06 |
| 37 | 03032017 | KT14-7 | RN71-4 | |
| 38 | 03033014 | KT14-4 | RN71-2 | |
| 39 | 03033049 | KT7-2 | RN49-12 | RN51-1 |
| 40 | 03034024 | KM14-3 | RN70-4 | |
| 41 | 03034026 | KM14-8 | RN70-6 | |
| 42 | 03034052 | KT7-7 | RN51-4 | |
| 43 | 03035048 | KT7-4 | RN51-2 | |
| 44 | 03035058 | KM7-3 | RN50-4 | |
| 45 | 03035060 | KM7-8 | RN50-6 | |
| 46 | 03040024 | KM14-2 | RN71-5 | U97-02 |
| 47 | 03040026 | KM14-9 | RN71-7 | U98-02 |
| 48 | 03042059 | KM7-2 | RN51-5 | U100-02 |
| 49 | 03042061 | KM7-9 | RN51-7 | U101-02 |

| | | | | |
|---|---|---|---|---|
| 50 | 03071015 | RN42-2 | U89-9 | U96-06 |
| 51 | 03071016 | RN42-3 | U89-8 | U96-07 |
| 52 | 03071019 | RN42-4 | U89-7 | U96-10 |
| 53 | 03071020 | RN42-5 | U89-6 | U96-09 |
| 54 | 03071049 | RN42-6 | U89-5 | U99-06 |
| 55 | 03071050 | RN42-7 | U89-4 | U99-07 |
| 56 | 03071053 | RN42-8 | U89-3 | U99-10 |
| 57 | 03071054 | RN42-9 | U89-2 | U99-09 |
| 58 | 03FR | FT15-07 | IN4-7 | |
| 59 | 03FRING | FT15-03 | U102-14 | |
| 60 | 03FRTIP | FT15-01 | U102-15 | |
| 61 | 03FT | FT15-05 | IN4-5 | |
| 62 | 03NR | IN3-27 | NT15-07 | |
| 63 | 03NRING | NT15-03 | U102-02 | |
| 64 | 03NRTIP | NT15-01 | U102-01 | |
| 65 | 03NT | IN3-25 | NT15-05 | |
| 66 | 04004026 | FT15-14 | RN72-7 | |
| 67 | 04005060 | FT8-14 | RN58-7 | |
| 68 | 04008004 | NT15-14 | RN72-1 | |
| 69 | 04008038 | NT8-14 | RN58-1 | |
| 70 | 04016030 | FT15-10 | RN52-2 | U104-03 |
| 71 | 04017015 | NT15-10 | RN52-1 | U103-03 |
| 72 | 04017050 | NT8-10 | RN52-3 | U106-03 |
| 73 | 04017064 | FT8-10 | RN52-4 | U107-03 |
| 74 | 04025017 | KT15-9 | RN52-13 | RN73-3 |
| 75 | 04026004 | RN72-2 | RN73-6 | U103-06 |
| 76 | 04027052 | KT8-9 | RN52-11 | RN59-3 |

| | | | | |
|---|---|---|---|---|
| 77 | 04028034 | RN72-8 | RN73-8 | U104-06 |
| 78 | 04028038 | RN58-2 | RN59-6 | U106-06 |
| 79 | 04029069 | RN58-8 | RN59-8 | U107-06 |
| 80 | 04030014 | KT15-2 | RN52-14 | RN73-1 |
| 81 | 04031017 | KT15-7 | RN73-4 | |
| 82 | 04032014 | KT15-4 | RN73-2 | |
| 83 | 04032024 | KM15-3 | RN72-4 | |
| 84 | 04032026 | KM15-8 | RN72-6 | |
| 85 | 04032049 | KT8-2 | RN52-12 | RN59-1 |
| 86 | 04032052 | KT8-7 | RN59-4 | |
| 87 | 04033048 | KT8-4 | RN59-2 | |
| 88 | 04034058 | KM8-3 | RN58-4 | |
| 89 | 04034060 | KM8-8 | RN58-6 | |
| 90 | 04039024 | KM15-2 | RN73-5 | U103-02 |
| 91 | 04039026 | KM15-9 | RN73-7 | U104-02 |
| 92 | 04040059 | KM8-2 | RN59-5 | U106-02 |
| 93 | 04040061 | KM8-9 | RN59-7 | U107-02 |
| 94 | 04071015 | RN43-2 | U102-06 | U90-9 |
| 95 | 04071016 | RN43-3 | U102-07 | U90-8 |
| 96 | 04071019 | RN43-4 | U102-10 | U90-7 |
| 97 | 04071020 | RN43-5 | U102-09 | U90-6 |
| 98 | 04071049 | RN43-6 | U105-06 | U90-5 |
| 99 | 04071050 | RN43-7 | U105-07 | U90-4 |
| 100 | 04071053 | RN43-8 | U105-10 | U90-3 |
| 101 | 04071054 | RN43-9 | U105-09 | U90-2 |
| 102 | 04FR | FT8-07 | 1N4-35 | |
| 103 | 04FRING | FT8-03 | U105-14 | |

| | | | | |
|---|---|---|---|---|
| 104 | 04FRTIP | FT8-01 | U105-15 | |
| 105 | 04FT | FT8-05 | IN4-33 | |
| 106 | 04NR | IN4-19 | NT8-07 | |
| 107 | 04NRING | NT8-03 | U105-02 | |
| 108 | 04NRTIP | NT8-01 | U105-01 | |
| 109 | 04NT | IN4-17 | NT8-05 | |
| 110 | 05005026 | FT16-14 | RN74-7 | |
| 111 | 05005060 | FT9-14 | RN60-7 | |
| 112 | 05008004 | NT16-14 | RN74-1 | |
| 113 | 05008038 | NT9-14 | RN60-1 | |
| 114 | 05017015 | NT16-10 | RN53-1 | U109-03 |
| 115 | 05017030 | FT16-10 | RN53-2 | U110-03 |
| 116 | 05017050 | NT9-10 | RN53-3 | U112-03 |
| 117 | 05017064 | FT9-10 | RN53-4 | U114-03 |
| 118 | 05027017 | KT16-9 | RN53-13 | RN75-3 |
| 119 | 05028004 | RN74-2 | RN75-6 | U109-06 |
| 120 | 05028052 | KT9-9 | RN53-11 | RN61-3 |
| 121 | 05029034 | RN74-8 | RN75-8 | U110-06 |
| 122 | 05029038 | RN60-2 | RN61-6 | U112-06 |
| 123 | 05031069 | RN60-8 | RN61-8 | U114-06 |
| 124 | 05032014 | KT16-2 | RN53-14 | RN75-1 |
| 125 | 05032017 | KT16-7 | RN75-4 | |
| 126 | 05033014 | KT16-4 | RN75-2 | |
| 127 | 05033049 | KT9-2 | RN53-12 | RN61-1 |
| 128 | 05034024 | KM16-3 | RN74-4 | |
| 129 | 05034026 | KM16-8 | RN74-6 | |
| 130 | 05034052 | KT9-7 | RN61-4 | |

| | | | | |
|---|---|---|---|---|
| 131 | 05035048 | KT9-4 | RN61-2 | |
| 132 | 05035058 | KM9-3 | RN60-4 | |
| 133 | 05035060 | KM9-8 | RN60-6 | |
| 134 | 05040024 | KM16-2 | RN75-5 | U109-02 |
| 135 | 05040026 | KM16-9 | RN75-7 | U110-02 |
| 136 | 05042059 | KM9-2 | RN61-5 | U112-02 |
| 137 | 05042061 | KM9-9 | RN61-7 | U114-02 |
| 138 | 05071015 | RN44-2 | U108-06 | U91-9 |
| 139 | 05071016 | RN44-3 | U108-07 | U91-8 |
| 140 | 05071019 | RN44-4 | U108-10 | U91-7 |
| 141 | 05071020 | RN44-5 | U108-09 | U91-6 |
| 142 | 05071049 | RN44-6 | U111-06 | U91-5 |
| 143 | 05071050 | RN44-7 | U111-07 | U91-4 |
| 144 | 05071053 | RN44-8 | U111-10 | U91-3 |
| 145 | 05071054 | RN44-9 | U111-09 | U91-2 |
| 146 | 05FR | FT16-07 | IN1-27 | |
| 147 | 05FRING | FT16-03 | U108-14 | |
| 148 | 05FRTIP | FT16-01 | U108-15 | |
| 149 | 05FT | FT16-05 | IN1-25 | |
| 150 | 05NR | IN1-11 | NT16-07 | |
| 151 | 05NRING | NT16-03 | U108-02 | |
| 152 | 05NRTIP | NT16-01 | U108-01 | |
| 153 | 05NT | IN1-9 | NT16-05 | |
| 154 | 06005026 | FT17-14 | RN76-7 | |
| 155 | 06005060 | FT10-14 | RN62-7 | |
| 156 | 06008004 | NT17-14 | RN76-1 | |
| 157 | 06008038 | NT10-14 | RN62-1 | |

| | | | | |
|---|---|---|---|---|
| 158 | 06016064 | FT10-10 | RN54-4 | U119-03 |
| 159 | 06017015 | NT17-10 | RN54-1 | U115-03 |
| 160 | 06017030 | FT17-10 | RN54-2 | U116-03 |
| 161 | 06017050 | NT10-10 | RN54-3 | U118-03 |
| 162 | 06027017 | KT17-9 | RN54-13 | RN77-3 |
| 163 | 06028004 | RN76-2 | RN77-6 | U115-06 |
| 164 | 06028052 | KT10-9 | RN54-11 | RN63-3 |
| 165 | 06029034 | RN76-8 | RN77-8 | U116-06 |
| 166 | 06029038 | RN62-2 | RN63-6 | U118-06 |
| 167 | 06031069 | RN62-8 | RN63-8 | U119-06 |
| 168 | 06032014 | KT17-2 | RN54-14 | RN77-1 |
| 169 | 06032017 | KT17-7 | RN77-4 | |
| 170 | 06033014 | KT17-4 | RN77-2 | |
| 171 | 06033049 | KT10-2 | RN54-12 | RN63-1 |
| 172 | 06034024 | KM17-3 | RN76-4 | |
| 173 | 06034026 | KM17-8 | RN76-6 | |
| 174 | 06034052 | KT10-7 | RN63-4 | |
| 175 | 06035048 | KT10-4 | RN63-2 | |
| 176 | 06035058 | KM10-3 | RN62-4 | |
| 177 | 06035060 | KM10-8 | RN62-6 | |
| 178 | 06040024 | KM17-2 | RN77-5 | U115-02 |
| 179 | 06040026 | KM17-9 | RN77-7 | U116-02 |
| 180 | 06042059 | KM10-2 | RN63-5 | U118-02 |
| 181 | 06042061 | KM10-9 | RN63-7 | U119-02 |
| 182 | 06071015 | RN45-2 | U113-06 | U92-9 |
| 183 | 06071016 | RN45-3 | U113-07 | U92-8 |
| 184 | 06071019 | RN45-4 | U113-10 | U92-7 |

| | | | | |
|---|---|---|---|---|
| 185 | 06071020 | RN45-5 | U113-09 | U92-6 |
| 186 | 06071049 | RN45-6 | U117-06 | U92-5 |
| 187 | 06071050 | RN45-7 | U117-07 | U92-4 |
| 188 | 06071053 | RN45-8 | U117-10 | U92-3 |
| 189 | 06071054 | RN45-9 | U117-09 | U92-2 |
| 190 | 06FR | FT9-07 | IN2-15 | |
| 191 | 06FRING | FT9-03 | U111-14 | |
| 192 | 06FRTIP | FT9-01 | U111-15 | |
| 193 | 06FT | FT9-05 | IN2-13 | |
| 194 | 06NR | IN2-11 | NT9-07 | |
| 195 | 06NRING | NT9-03 | U111-02 | |
| 196 | 06NRTIP | NT9-01 | U111-01 | |
| 197 | 06NT | IN2-9 | NT9-05 | |
| 198 | 07005026 | FT18-14 | RN78-7 | |
| 199 | 07006060 | FT11-14 | RN64-7 | |
| 200 | 07008004 | NT18-14 | RN78-1 | |
| 201 | 07008038 | NT11-14 | RN64-1 | |
| 202 | 07017015 | NT18-10 | RN55-1 | U121-03 |
| 203 | 07017030 | FT18-10 | RN55-2 | U122-03 |
| 204 | 07017050 | NT11-10 | RN55-3 | U124-03 |
| 205 | 07017064 | FT11-10 | RN55-4 | U125-03 |
| 206 | 07027017 | KT18-9 | RN55-13 | RN79-3 |
| 207 | 07028004 | RN78-2 | RN79-6 | U121-06 |
| 208 | 07028052 | KT11-9 | RN55-11 | RN65-3 |
| 209 | 07029034 | RN78-8 | RN79-8 | U122-06 |
| 210 | 07029038 | RN64-2 | RN65-6 | U124-06 |
| 211 | 07031069 | RN64-8 | RN65-8 | U125-06 |

| | | | | |
|---|---|---|---|---|
| 212 | 07032014 | KT18-2 | RN55-14 | RN79-1 |
| 213 | 07032017 | KT18-7 | RN79-4 | |
| 214 | 07033014 | KT18-4 | RN79-2 | |
| 215 | 07033049 | KT11-2 | RN55-12 | RN65-1 |
| 216 | 07034024 | KM18-3 | RN78-4 | |
| 217 | 07034026 | KM18-8 | RN78-6 | |
| 218 | 07034052 | KT11-7 | RN65-4 | |
| 219 | 07035048 | KT11-4 | RN65-2 | |
| 220 | 07035058 | KM11-3 | RN64-4 | |
| 221 | 07035060 | KM11-8 | RN64-6 | |
| 222 | 07040024 | KM18-2 | RN79-5 | U121-02 |
| 223 | 07040026 | KM18-9 | RN79-7 | U122-02 |
| 224 | 07042059 | KM11-2 | RN65-5 | U124-02 |
| 225 | 07042061 | KM11-9 | RN65-7 | U125-02 |
| 226 | 07071015 | RN46-2 | U120-06 | U93-9 |
| 227 | 07071016 | RN46-3 | U120-07 | U93-8 |
| 228 | 07071019 | RN46-4 | U120-10 | U93-7 |
| 229 | 07071020 | RN46-5 | U120-09 | U93-6 |
| 230 | 07071049 | RN46-6 | U123-06 | U93-5 |
| 231 | 07071050 | RN46-7 | U123-07 | U93-4 |
| 232 | 07071053 | RN46-8 | U123-10 | U93-3 |
| 233 | 07071054 | RN46-9 | U123-09 | U93-2 |
| 234 | 07FR | FT17-07 | IN3-15 | |
| 235 | 07FRING | FT17-03 | U113-14 | |
| 236 | 07FRTIP | FT17-01 | U113-15 | |
| 237 | 07FT | FT17-05 | IN3-13 | |
| 238 | 07NR | IN2-39 | NT17-07 | |

| | | | | |
|---|---|---|---|---|
| 239 | 07NRING | NT17-03 | U113-02 | |
| 240 | 07NRTIP | NT17-01 | U113-01 | |
| 241 | 07NT | IN2-37 | NT17-05 | |
| 242 | 08005026 | FT19-14 | RN80-7 | |
| 243 | 08006060 | FT12-14 | RN66-7 | |
| 244 | 08008004 | NT19-14 | RN80-1 | |
| 245 | 08008038 | NT12-14 | RN66-1 | |
| 246 | 08017015 | NT19-10 | RN56-1 | U127-03 |
| 247 | 08017030 | FT19-10 | RN56-2 | U128-03 |
| 248 | 08017050 | NT12-10 | RN56-3 | U130-03 |
| 249 | 08018064 | FT12-10 | RN56-4 | U131-03 |
| 250 | 08027017 | KT19-9 | RN56-13 | RN81-3 |
| 251 | 08028004 | RN80-2 | RN81-6 | U127-06 |
| 252 | 08028052 | KT12-9 | RN56-11 | RN67-3 |
| 253 | 08029034 | RN80-8 | RN81-8 | U128-06 |
| 254 | 08029038 | RN66-2 | RN67-6 | U130-06 |
| 255 | 08031069 | RN66-8 | RN67-8 | U131-06 |
| 256 | 08032014 | KT19-2 | RN56-14 | RN81-1 |
| 257 | 08032017 | KT19-7 | RN81-4 | |
| 258 | 08033014 | KT19-4 | RN81-2 | |
| 259 | 08033049 | KT12-2 | RN56-12 | RN67-1 |
| 260 | 08034024 | KM19-3 | RN80-4 | |
| 261 | 08034026 | KM19-8 | RN80-6 | |
| 262 | 08034052 | KT12-7 | RN67-4 | |
| 263 | 08035048 | KT12-4 | RN67-2 | |
| 264 | 08035058 | KM12-3 | RN66-4 | |

|     |          |         |         |         |
| --- | -------- | ------- | ------- | ------- |
| 265 | 08035060 | KM12-8  | RN66-6  |         |
| 266 | 08040024 | KM19-2  | RN81-5  | U127-02 |
| 267 | 08040026 | KM19-9  | RN81-7  | U128-02 |
| 268 | 08042059 | KM12-2  | RN67-5  | U130-02 |
| 269 | 08042061 | KM12-9  | RN67-7  | U131-02 |
| 270 | 08071015 | RN47-2  | U126-06 | U94-9   |
| 271 | 08071016 | RN47-3  | U126-07 | U94-8   |
| 272 | 08071019 | RN47-4  | U126-10 | U94-7   |
| 273 | 08071020 | RN47-5  | U126-09 | U94-6   |
| 274 | 08071049 | RN47-6  | U129-06 | U94-5   |
| 275 | 08071050 | RN47-7  | U129-07 | U94-4   |
| 276 | 08071053 | RN47-8  | U129-10 | U94-3   |
| 277 | 08071054 | RN47-9  | U129-09 | U94-2   |
| 278 | 08FR     | FT10-07 | IN4-11  |         |
| 279 | 08FRING  | FT10-03 | U117-14 |         |
| 280 | 08FRTIP  | FT10-01 | U117-15 |         |
| 281 | 08FT     | FT10-05 | IN4-9   |         |
| 282 | 08NR     | IN3-35  | NT10-07 |         |
| 283 | 08NRING  | NT10-03 | U117-02 |         |
| 284 | 08NRTIP  | NT10-01 | U117-01 |         |
| 285 | 08NT     | IN3-33  | NT10-05 |         |
| 286 | 09005026 | FT20-14 | RN82-7  |         |
| 287 | 09005060 | FT13-14 | RN68-7  |         |
| 288 | 09008004 | NT20-14 | RN82-1  |         |
| 289 | 09008038 | NT13-14 | RN68-1  |         |
| 290 | 09016064 | FT13-10 | RN57-4  | U137-03 |
| 291 | 09017015 | NT20-10 | RN57-1  | U133-03 |

| | | | | |
|---|---|---|---|---|
| 292 | 09017030 | FT20-10 | RN57-2 | U134-03 |
| 293 | 09017050 | NT13-10 | RN57-3 | U136-03 |
| 294 | 09027017 | KT20-9 | RN57-13 | RN83-3 |
| 295 | 09028004 | RN82-2 | RN83-6 | U133-06 |
| 296 | 09028052 | KT13-9 | RN57-11 | RN69-3 |
| 297 | 09029034 | RN82-8 | RN83-8 | U134-06 |
| 298 | 09029038 | RN68-2 | RN69-6 | U136-06 |
| 299 | 09031069 | RN68-8 | RN69-8 | U137-06 |
| 300 | 09032014 | KT20-2 | RN57-14 | RN83-1 |
| 301 | 09032017 | KT20-7 | RN83-4 | |
| 302 | 09033014 | KT20-4 | RN83-2 | |
| 303 | 09033049 | KT13-2 | RN57-12 | RN69-1 |
| 304 | 09034024 | KM20-3 | RN82-4 | |
| 305 | 09034026 | KM20-8 | RN82-6 | |
| 306 | 09034052 | KT13-7 | RN69-4 | |
| 307 | 09035048 | KT13-4 | RN69-2 | |
| 308 | 09035058 | KM13-3 | RN68-4 | |
| 309 | 09035060 | KM13-8 | RN68-6 | |
| 310 | 09040024 | KM20-2 | RN83-5 | U133-02 |
| 311 | 09040026 | KM20-9 | RN83-7 | U134-02 |
| 312 | 09042059 | KM13-2 | RN69-5 | U136-02 |
| 313 | 09042061 | KM13-9 | RN69-7 | U137-02 |
| 314 | 09071015 | RN48-2 | U132-06 | U95-9 |
| 315 | 09071016 | RN48-3 | U132-07 | U95-8 |
| 316 | 09071019 | RN48-4 | U132-10 | U95-7 |
| 317 | 09071020 | RN48-5 | U132-09 | U95-6 |
| 318 | 09071049 | RN48-6 | U135-06 | U95-5 |

| | | | | |
|---|---|---|---|---|
| 319 | 09071050 | RN48-7 | U135-07 | U95-4 |
| 320 | 09071053 | RN48-8 | U135-10 | U95-3 |
| 321 | 09071054 | RN48-9 | U135-09 | U95-2 |
| 322 | 09FR | FT18-07 | IN4-39 | |
| 323 | 09FRING | FT18-03 | U120-14 | |
| 324 | 09FRTIP | FT18-01 | U120-15 | |
| 325 | 09FT | FT18-05 | IN4-37 | |
| 326 | 09NR | IN4-31 | NT18-07 | |
| 327 | 09NRING | NT18-03 | U120-02 | |
| 328 | 09NRTIP | NT18-01 | U120-01 | |
| 329 | 09NT | IN4-29 | NT18-05 | |
| 330 | 10005026 | FT4-14 | RN36-7 | |
| 331 | 10005060 | FT1-14 | RN37-7 | |
| 332 | 10008004 | NT4-14 | RN36-1 | |
| 333 | 10008038 | NT1-14 | RN37-1 | |
| 334 | 10017015 | NT4-10 | RN27-1 | U64-03 |
| 335 | 10017030 | FT4-10 | RN27-2 | U65-03 |
| 336 | 10017050 | NT1-10 | RN27-3 | U66-03 |
| 337 | 10017064 | FT1-10 | RN27-4 | U67-03 |
| 338 | 10027017 | KT4-9 | RN27-13 | RN29-3 |
| 339 | 10028004 | RN29-6 | RN36-2 | U64-06 |
| 340 | 10028052 | KT1-9 | RN27-11 | RN30-3 |
| 341 | 10029034 | RN29-8 | RN36-8 | U65-06 |
| 342 | 10029038 | RN30-6 | RN37-2 | U66-06 |
| 343 | 10031069 | RN30-8 | RN37-8 | U67-06 |
| 344 | 10032014 | KT4-2 | RN27-14 | RN29-1 |
| 345 | 10032017 | KT4-7 | RN29-4 | |

| | | | | |
|---|---|---|---|---|
| 346 | 10033014 | KT4-4 | RN29-2 | |
| 347 | 10033049 | KT1-2 | RN27-12 | RN30-1 |
| 348 | 10034024 | KM4-3 | RN36-4 | |
| 349 | 10034026 | KM4-8 | RN36-6 | |
| 350 | 10034052 | KT1-7 | RN30-4 | |
| 351 | 10035048 | KT1-4 | RN30-2 | |
| 352 | 10035058 | KM1-3 | RN37-4 | |
| 353 | 10035060 | KM1-8 | RN37-6 | |
| 354 | 10040024 | KM4-2 | RN29-5 | U64-02 |
| 355 | 10040026 | KM4-9 | RN29-7 | U65-02 |
| 356 | 10042059 | KM1-2 | RN30-5 | U66-02 |
| 357 | 10042061 | KM1-9 | RN30-7 | U67-02 |
| 358 | 10071015 | RN25-2 | U48-9 | U58-06 |
| 359 | 10071016 | RN25-3 | U48-8 | U58-07 |
| 360 | 10071019 | RN25-4 | U48-7 | U58-10 |
| 361 | 10071020 | RN25-5 | U48-6 | U58-09 |
| 362 | 10071049 | RN25-6 | U48-5 | U59-06 |
| 363 | 10071050 | RN25-7 | U48-4 | U59-07 |
| 364 | 10071053 | RN25-8 | U48-3 | U59-10 |
| 365 | 10071054 | RN25-9 | U48-2 | U59-09 |
| 366 | 10FR | FT11-07 | IN1-39 | |
| 367 | 10FRING | FT11-03 | U123-14 | |
| 368 | 10FRTIP | FT11-01 | U123-15 | |
| 369 | 10FT | FT11-05 | IN1-37 | |
| 370 | 10NR | IN1-23 | NT11-07 | |
| 371 | 10NRING | NT11-03 | U123-02 | |
| 372 | 10NRTIP | NT11-01 | U123-01 | |

| | | | | |
|---|---|---|---|---|
| 373 | 10NT | IN1-21 | NT11-05 | |
| 374 | 11005026 | FT5-14 | RN38-7 | |
| 375 | 11005060 | FT2-14 | RN39-7 | |
| 376 | 11008004 | NT5-14 | RN38-1 | |
| 377 | 11008038 | NT2-14 | RN39-1 | |
| 378 | 11017015 | NT5-10 | RN33-1 | U68-03 |
| 379 | 11017030 | FT5-10 | RN33-2 | U69-03 |
| 380 | 11017050 | NT2-10 | RN33-3 | U70-03 |
| 381 | 11017064 | FT2-10 | RN33-4 | U71-03 |
| 382 | 11027017 | KT5-9 | RN31-3 | RN33-13 |
| 383 | 11028004 | RN31-6 | RN38-2 | U68-06 |
| 384 | 11028052 | KT2-9 | RN32-3 | RN33-11 |
| 385 | 11029034 | RN31-8 | RN38-8 | U69-06 |
| 386 | 11029038 | RN32-6 | RN39-2 | U70-06 |
| 387 | 11031069 | RN32-8 | RN39-8 | U71-06 |
| 388 | 11032014 | KT5-2 | RN31-1 | RN33-14 |
| 389 | 11032017 | KT5-7 | RN31-4 | |
| 390 | 11033014 | KT5-4 | RN31-2 | |
| 391 | 11033049 | KT2-2 | RN32-1 | RN33-12 |
| 392 | 11034024 | KM5-3 | RN38-4 | |
| 393 | 11034026 | KM5-8 | RN38-6 | |
| 394 | 11034052 | KT2-7 | RN32-4 | |
| 395 | 11035048 | KT2-4 | RN32-2 | |
| 396 | 11035058 | KM2-3 | RN39-4 | |
| 397 | 11035060 | KM2-8 | RN39-6 | |
| 398 | 11040024 | KM5-2 | RN31-5 | U68-02 |
| 399 | 11040026 | KM5-9 | RN31-7 | U69-02 |

| | | | | |
|---|---|---|---|---|
| 400 | 11042059 | KM2-2 | RN32-5 | U70-02 |
| 401 | 11042061 | KM2-9 | RN32-7 | U71-02 |
| 402 | 11071015 | RN19-2 | U50-9 | U60-06 |
| 403 | 11071016 | RN19-3 | U50-8 | U60-07 |
| 404 | 11071019 | RN19-4 | U50-7 | U60-10 |
| 405 | 11071020 | RN19-5 | U50-6 | U60-09 |
| 406 | 11071049 | RN19-6 | U50-5 | U61-06 |
| 407 | 11071050 | RN19-7 | U50-4 | U61-07 |
| 408 | 11071053 | RN19-8 | U50-3 | U61-10 |
| 409 | 11071054 | RN19-9 | U50-2 | U61-09 |
| 410 | 11FR | FT19-07 | IN2-23 | |
| 411 | 11FRING | FT19-03 | U126-14 | |
| 412 | 11FRTIP | FT19-01 | U126-15 | |
| 413 | 11FT | FT19-05 | IN2-21 | |
| 414 | 11NR | IN2-19 | NT19-07 | |
| 415 | 11NRING | NT19-03 | U126-02 | |
| 416 | 11NRTIP | NT19-01 | U126-01 | |
| 417 | 11NT | IN2-17 | NT19-05 | |
| 418 | 12005026 | FT6-14 | RN40-7 | |
| 419 | 12006060 | FT3-14 | RN41-7 | |
| 420 | 12008004 | NT6-14 | RN40-1 | |
| 421 | 12008038 | NT3-14 | RN41-1 | |
| 422 | 12017015 | NT6-10 | RN28-1 | U72-03 |
| 423 | 12017030 | FT6-10 | RN28-2 | U73-03 |
| 424 | 12017050 | NT3-10 | RN28-3 | U74-03 |
| 425 | 12017064 | FT3-10 | RN28-4 | U75-03 |
| 426 | 12027017 | KT6-9 | RN28-13 | RN34-3 |

| | | | | |
|---|---|---|---|---|
| 427 | 12028004 | RN34-6 | RN40-2 | U72-06 |
| 428 | 12028052 | KT3-9 | RN28-11 | RN35-3 |
| 429 | 12029034 | RN34-8 | RN40-8 | U73-06 |
| 430 | 12029038 | RN35-6 | RN41-2 | U74-06 |
| 431 | 12031069 | RN35-8 | RN41-8 | U75-06 |
| 432 | 12032014 | KT6-2 | RN28-14 | RN34-1 |
| 433 | 12032017 | KT6-7 | RN34-4 | |
| 434 | 12033014 | KT6-4 | RN34-2 | |
| 435 | 12033049 | KT3-2 | RN28-12 | RN35-1 |
| 436 | 12034024 | KM6-3 | RN40-4 | |
| 437 | 12034026 | KM6-8 | RN40-6 | |
| 438 | 12034052 | KT3-7 | RN35-4 | |
| 439 | 12035048 | KT3-4 | RN35-2 | |
| 440 | 12035058 | KM3-3 | RN41-4 | |
| 441 | 12035060 | KM3-8 | RN41-6 | |
| 442 | 12040024 | KM6-2 | RN34-5 | U72-02 |
| 443 | 12040026 | KM6-9 | RN34-7 | U73-02 |
| 444 | 12042059 | KM3-2 | RN35-5 | U74-02 |
| 445 | 12042061 | KM3-9 | RN35-7 | U75-02 |
| 446 | 12071015 | RN26-2 | U51-9 | U62-06 |
| 447 | 12071016 | RN26-3 | U51-8 | U62-07 |
| 448 | 12071019 | RN26-4 | U51-7 | U62-10 |
| 449 | 12071020 | RN26-5 | U51-6 | U62-09 |
| 450 | 12071049 | RN26-6 | U51-5 | U63-06 |
| 451 | 12071050 | RN26-7 | U51-4 | U63-07 |
| 452 | 12071053 | RN26-8 | U51-3 | U63-10 |
| 453 | 12071054 | RN26-9 | U51-2 | U63-09 |

| | | | |
|---|---|---|---|
| 454 | 12FR | FT12-07 | IN3-19 |
| 455 | 12FRING | FT12-03 | U129-14 |
| 456 | 12FRTIP | FT12-01 | U129-15 |
| 457 | 12FT | FT12-05 | IN3-17 |
| 458 | 12NR | IN3-3 | NT12-07 |
| 459 | 12NRING | NT12-03 | U129-02 |
| 460 | 12NRTIP | NT12-01 | U129-01 |
| 461 | 12NT | IN3-1 | NT12-05 |
| 462 | 13064009 | NDP-1 | U87-15 |
| 463 | 13064010 | NDP-2 | U87-17 |
| 464 | 13064011 | NDP-3 | U87-19 |
| 465 | 13065040 | NDN-1 | U84-15 |
| 466 | 13065041 | NDN-2 | U84-17 |
| 467 | 13065042 | NDN-3 | U84-19 |
| 468 | 13FR | FT20-07 | IN4-15 |
| 469 | 13FRING | FT20-03 | U132-14 |
| 470 | 13FRTIP | FT20-01 | U132-15 |
| 471 | 13FT | FT20-05 | IN4-13 |
| 472 | 13NR | IN3-39 | NT20-07 |
| 473 | 13NRING | NT20-03 | U132-02 |
| 474 | 13NRTIP | NT20-01 | U132-01 |
| 475 | 13NT | IN3-37 | NT20-05 |
| 476 | 14064009 | FDP-1 | U79-15 |
| 477 | 14064010 | FDP-2 | U79-17 |
| 478 | 14064011 | FDP-3 | U79-19 |
| 479 | 14065040 | FDN-1 | U78-15 |
| 480 | 14065041 | FDN-2 | U78-17 |

| | | | |
|---|---|---|---|
| 481 | 14065042 | FDN-3 | U78-19 |
| 482 | 14FR | FT13-07 | IN1-3 |
| 483 | 14FRING | FT13-03 | U135-14 |
| 484 | 14FRTIP | FT13-01 | U135-15 |
| 485 | 14FT | FT13-05 | IN1-1 |
| 486 | 14NR | IN4-27 | NT13-07 |
| 487 | 14NRING | NT13-03 | U135-02 |
| 488 | 14NRTIP | NT13-01 | U135-01 |
| 489 | 14NT | IN4-25 | NT13-05 |
| 490 | 15013030 | RN7-3 | U11-3 |
| 491 | 15013038 | RN7-7 | U19-3 |
| 492 | 15013048 | RN16-3 | U20-3 |
| 493 | 15014057 | RN16-7 | U39-3 |
| 494 | 15016012 | RN1-3 | U1-3 |
| 495 | 15016021 | RN1-7 | U4-3 |
| 496 | 15020031 | RN7-1 | U11-5 |
| 497 | 15021039 | RN7-5 | U19-5 |
| 498 | 15021049 | RN16-1 | U20-5 |
| 499 | 15022058 | RN16-5 | U39-5 |
| 500 | 15024013 | RN1-1 | U1-5 |
| 501 | 15024022 | RN1-5 | U4-5 |
| 502 | 15027027 | OT2-01 | RN7-2 |
| 503 | 15027032 | OT2-03 | RN7-4 |
| 504 | 15028035 | OT2-10 | RN7-6 |
| 505 | 15028041 | OT2-08 | RN7-8 |
| 506 | 15028044 | OT11-01 | RN16-2 |
| 507 | 15028047 | C28-2 | OT11-02 |

| | | | |
|---|---|---|---|
| 508 | 15028051 | OT11-03 | RN16-4 |
| 509 | 15029053 | OT11-10 | RN16-6 |
| 510 | 15029056 | C29-2 | OT11-09 |
| 511 | 15029060 | OT11-08 | RN16-8 |
| 512 | 15031009 | OT1-01 | RN1-2 |
| 513 | 15031015 | OT1-03 | RN1-4 |
| 514 | 15031018 | OT1-10 | RN1-6 |
| 515 | 15031024 | OT1-08 | RN1-8 |
| 516 | 15053017 | RN10-3 | U27-3 |
| 517 | 15053027 | RN10-7 | U32-3 |
| 518 | 15053039 | RN15-3 | U38-3 |
| 519 | 15053049 | RN15-7 | U33-3 |
| 520 | 15060018 | RN10-1 | U27-5 |
| 521 | 15060028 | RN10-5 | U32-5 |
| 522 | 15060040 | RN15-1 | U38-5 |
| 523 | 15060050 | RN15-5 | U33-5 |
| 524 | 15067014 | OT5-01 | RN10-2 |
| 525 | 15067027 | C15-2 | OT5-09 |
| 526 | 15068020 | OT5-03 | RN10-4 |
| 527 | 15068024 | OT5-10 | RN10-6 |
| 528 | 15068030 | OT5-08 | RN10-8 |
| 529 | 15069036 | OT8-01 | RN15-2 |
| 530 | 15069042 | OT8-03 | RN15-4 |
| 531 | 15069046 | OT8-10 | RN15-6 |
| 532 | 15069052 | OT8-08 | RN15-8 |
| 533 | 15FR | FT4-07 | IN1-31 |
| 534 | 15FRING | FT4-03 | U58-14 |

| | | | |
|---|---|---|---|
| 535 | 15FRTIP | FT4-01 | U58-15 |
| 536 | 15FT | FT4-05 | IN1-29 |
| 537 | 15NR | IN1-15 | NT4-07 |
| 538 | 15NRING | NT4-03 | U58-02 |
| 539 | 15NRTIP | NT4-01 | U58-01 |
| 540 | 15NT | IN1-13 | NT4-05 |
| 541 | 16013031 | RN11-3 | U21-3 |
| 542 | 16013039 | RN11-7 | U28-3 |
| 543 | 16013048 | RN21-3 | U41-3 |
| 544 | 16013056 | RN21-7 | U52-3 |
| 545 | 16016013 | RN3-3 | U5-3 |
| 546 | 16016022 | RN3-7 | U12-3 |
| 547 | 16020032 | RN11-1 | U21-5 |
| 548 | 16021040 | RN11-5 | U28-5 |
| 549 | 16021049 | RN21-1 | U41-5 |
| 550 | 16021057 | RN21-5 | U52-5 |
| 551 | 16024014 | RN3-1 | U5-5 |
| 552 | 16024023 | RN3-5 | U12-5 |
| 553 | 16027028 | OT6-01 | RN11-2 |
| 554 | 16027033 | OT6-03 | RN11-4 |
| 555 | 16028036 | OT6-10 | RN11-6 |
| 556 | 16028042 | OT6-08 | RN11-8 |
| 557 | 16028045 | OT12-01 | RN21-2 |
| 558 | 16028050 | OT12-03 | RN21-4 |
| 559 | 16028053 | OT12-10 | RN21-6 |
| 560 | 16028059 | OT12-08 | RN21-8 |
| 561 | 16031009 | OT3-01 | RN3-2 |

| | | | |
|---|---|---|---|
| 562 | 16031015 | OT3-03 | RN3-4 |
| 563 | 16031018 | OT3-10 | RN3-6 |
| 564 | 16031024 | OT3-08 | RN3-8 |
| 565 | 16053036 | RN22-3 | U42-3 |
| 566 | 16053045 | RN22-7 | U53-3 |
| 567 | 16056017 | RN17-3 | U34-3 |
| 568 | 16056027 | RN17-7 | U40-3 |
| 569 | 16060037 | RN22-1 | U42-5 |
| 570 | 16060046 | RN22-5 | U53-5 |
| 571 | 16063017 | RN17-1 | U34-6 |
| 572 | 16063027 | RN17-5 | U40-6 |
| 573 | 16067033 | OT14-01 | RN22-2 |
| 574 | 16067039 | OT14-03 | RN22-4 |
| 575 | 16067042 | OT14-10 | RN22-6 |
| 576 | 16067047 | OT14-08 | RN22-8 |
| 577 | 16070014 | OT9-01 | RN17-2 |
| 578 | 16070020 | OT9-03 | RN17-4 |
| 579 | 16070024 | OT9-10 | RN17-6 |
| 580 | 16070030 | OT9-08 | RN17-8 |
| 581 | 16FR | FT1-07 | IN2-31 |
| 582 | 16FRING | FT1-03 | U59-14 |
| 583 | 16FRTIP | FT1-01 | U59-15 |
| 584 | 16FT | FT1-05 | IN2-29 |
| 585 | 16NR | IN2-27 | NT1-07 |
| 586 | 16NRING | NT1-03 | U59-02 |
| 587 | 16NRTIP | NT1-01 | U59-01 |
| 588 | 16NT | IN2-25 | NT1-05 |

| | | | |
|---|---|---|---|
| 589 | 17013011 | RN18-3 | U35-3 |
| 590 | 17013019 | RN18-7 | U43-3 |
| 591 | 17013028 | RN23-3 | U44-3 |
| 592 | 17013036 | RN23-7 | U54-3 |
| 593 | 17013045 | RN24-3 | U45-3 |
| 594 | 17013053 | RN24-7 | U55-3 |
| 595 | 17021012 | RN18-1 | U35-5 |
| 596 | 17021020 | RN18-5 | U43-5 |
| 597 | 17021029 | RN23-1 | U44-5 |
| 598 | 17021037 | RN23-5 | U54-5 |
| 599 | 17021046 | RN24-1 | U45-5 |
| 600 | 17021054 | RN24-5 | U55-5 |
| 601 | 17028008 | OT10-01 | RN18-2 |
| 602 | 17028013 | OT10-03 | RN18-4 |
| 603 | 17028016 | OT10-10 | RN18-6 |
| 604 | 17028022 | OT10-08 | RN18-8 |
| 605 | 17028025 | OT13-01 | RN23-2 |
| 606 | 17028030 | OT13-03 | RN23-4 |
| 607 | 17028033 | OT13-10 | RN23-6 |
| 608 | 17028039 | OT13-08 | RN23-8 |
| 609 | 17028042 | OT15-01 | RN24-2 |
| 610 | 17028047 | OT15-03 | RN24-4 |
| 611 | 17028050 | OT15-10 | RN24-6 |
| 612 | 17028056 | OT15-08 | RN24-8 |
| 613 | 17053011 | RN4-3 | U6-3 |
| 614 | 17053019 | RN4-7 | U13-3 |
| 615 | 17053029 | RN12-3 | U22-3 |

| | | | |
|---|---|---|---|
| 616 | 17053039 | RN12-7 | U29-3 |
| 617 | 17061012 | RN4-1 | U6-5 |
| 618 | 17061020 | RN4-5 | U13-5 |
| 619 | 17061030 | RN12-1 | U22-5 |
| 620 | 17061040 | RN12-5 | U29-5 |
| 621 | 17067008 | OT4-01 | RN4-2 |
| 622 | 17067013 | OT4-03 | RN4-4 |
| 623 | 17067016 | OT4-10 | RN4-6 |
| 624 | 17067022 | OT4-08 | RN4-8 |
| 625 | 17067025 | OT7-01 | RN12-2 |
| 626 | 17067036 | OT7-10 | RN12-6 |
| 627 | 17067042 | OT7-08 | RN12-8 |
| 628 | 17068031 | OT7-03 | RN12-4 |
| 629 | 17FR | FT5-07 | IN3-23 |
| 630 | 17FRING | FT5-03 | U60-14 |
| 631 | 17FRTIP | FT5-01 | U60-15 |
| 632 | 17FT | FT5-05 | IN3-21 |
| 633 | 17NR | IN3-11 | NT5-07 |
| 634 | 17NRING | NT5-03 | U60-02 |
| 635 | 17NRTIP | NT5-01 | U60-01 |
| 636 | 17NT | IN3-9 | NT5-05 |
| 637 | 18FR | FT2-07 | IN4-3 |
| 638 | 18FRING | FT2-03 | U61-14 |
| 639 | 18FRTIP | FT2-01 | U61-15 |
| 640 | 18FT | FT2-05 | IN4-1 |
| 641 | 18NR | IN3-31 | NT2-07 |
| 642 | 18NRING | NT2-03 | U61-02 |

| | | | | |
|---|---|---|---|---|
| 643 | 18NRTIP | NT2-01 | U61-01 | |
| 644 | 18NT | IN3-29 | NT2-05 | |
| 645 | 19035010 | K9-2 | RN9-1 | |
| 646 | 19035017 | K8-4 | RN20-1 | |
| 647 | 19058009 | K5-4 | RN9-3 | |
| 648 | 19058017 | K4-4 | RN9-5 | |
| 649 | 19058024 | K3-4 | RN9-7 | |
| 650 | 19071032 | K1-2 | RN20-8 | |
| 651 | 19073021 | K2-2 | R3-2 | |
| 652 | 19077015 | R2-R | U9-1 | |
| 653 | 19FR | FT6-07 | IN1-7 | |
| 654 | 19FRING | FT6-03 | U62-14 | |
| 655 | 19FRTIP | FT6-01 | U62-15 | |
| 656 | 19FT | FT6-05 | IN1-5 | |
| 657 | 19NR | IN4-23 | NT6-07 | |
| 658 | 19NRING | NT6-03 | U62-02 | |
| 659 | 19NRTIP | NT6-01 | U62-01 | |
| 660 | 19NT | IN4-21 | NT6-05 | |
| 661 | 20009007 | C26-2 | U14-03 | |
| 662 | 20014011 | C55-1 | U14-01 | |
| 663 | 20014014 | C55-2 | U14-02 | |
| 664 | 20018019 | RS232IN-1 | U14-05 | |
| 665 | 20023031 | U2-8 | U7-01 | |
| 666 | 20024005 | C13-1 | R1-R | U14-14 |
| 667 | 20024021 | RS232IN-2 | U14-08 | |
| 668 | 20027017 | U14-07 | U36-11 | |
| 669 | 20027018 | U14-09 | U36-10 | |

| | | | |
|---|---|---|---|
| 670 | 20038013 | U36-18 | UPOSC-01 |
| 671 | 20041029 | TMR-01 | U36-15 |
| 672 | 20053030 | U36-30 | U46-11 |
| 673 | 20FR | FT3-07 | IN1-35 |
| 674 | 20FRING | FT3-03 | U63-14 |
| 675 | 20FRTIP | FT3-01 | U63-15 |
| 676 | 20FT | FT3-05 | IN1-33 |
| 677 | 20NR | IN1-19 | NT3-07 |
| 678 | 20NRING | NT3-03 | U63-02 |
| 679 | 20NRTIP | NT3-01 | U63-01 |
| 680 | 20NT | IN1-17 | NT3-05 |
| 681 | 2uPCK | U36-19 | U7-55 |
| 682 | A10F | LED-39 | RN5-5 |
| 683 | A10N | LED-40 | RN5-6 |
| 684 | A11F | LED-07 | RN5-3 |
| 685 | A11N | LED-08 | RN5-4 |
| 686 | A12F | LED-15 | RN5-1 |
| 687 | A12N | LED-16 | RN5-2 |
| 688 | A13F | LED-21 | RN6-7 |
| 689 | A13N | LED-22 | RN6-8 |
| 690 | A14F | LED-29 | RN6-5 |
| 691 | A14N | LED-30 | RN6-6 |
| 692 | A15F | LED-37 | RN6-3 |
| 693 | A15N | LED-38 | RN6-4 |
| 694 | A16F | LED-09 | RN6-1 |
| 695 | A16N | LED-10 | RN6-2 |
| 696 | A17F | LED-17 | RN13-7 |

| | | | |
|---|---|---|---|
| 697 | A17N | LED-18 | RN13-8 |
| 698 | A18P | LED-19 | RN13-5 |
| 699 | A18N | LED-20 | RN13-6 |
| 700 | A19P | LED-27 | RN13-3 |
| 701 | A19N | LED-28 | RN13-4 |
| 702 | A1F | LED-03 | RN2-7 |
| 703 | A1N | LED-04 | RN2-8 |
| 704 | A20P | LED-35 | RN13-1 |
| 705 | A20N | LED-36 | RN13-2 |
| 706 | A232 | LED-45 | RN20-2 |
| 707 | A2F | LED-11 | RN2-5 |
| 708 | A2N | LED-12 | RN2-6 |
| 709 | A3F | LED-23 | RN2-3 |
| 710 | A3N | LED-24 | RN2-4 |
| 711 | A4F | LED-33 | RN2-1 |
| 712 | A4N | LED-34 | RN2-2 |
| 713 | A5F | LED-41 | RN8-7 |
| 714 | A5N | LED-42 | RN8-8 |
| 715 | A6F | LED-05 | RN8-5 |
| 716 | A6N | LED-06 | RN8-6 |
| 717 | A7F | LED-13 | RN8-3 |
| 718 | A7N | LED-14 | RN8-4 |
| 719 | A8F | LED-25 | RN8-1 |
| 720 | A8N | LED-26 | RN8-2 |
| 721 | A95HD | LED-44 | RN9-4 |
| 722 | A9F | LED-31 | RN5-7 |
| 723 | A9N | LED-32 | RN5-8 |

724 AGND A/DGND-1 A/DGND-2 A/DGND-3
A/DGND-4 C100-2 C101-2
C102-2 C103-2 C104-2
C105-2 C106-2 C107-2
C108-2 C109-2 C110-2
C111-2 C112-2 C113-2
C114-2 C115-2 C116-2
C117-2 C32-2 C51-1
C54-2 C57-1 C58-2
C59-2 C60-2 C61-2
C62-2 C63-2 C64-2
C65-2 C66-2 C67-2
C68-2 C69-2 C70-2
C72-1 C73-2 C75-1
C76-2 C91-2 C92-2
C93-2 C94-2 C95-2
C96-2 C97-2 C98-2
C99-2 FT1-08 FT1-13
FT10-08 FT10-13 FT11-08
FT11-13 FT12-08 FT12-13
FT13-08 FT13-13 FT14-08
FT14-13 FT15-08 FT15-13
FT16-08 FT16-13 FT17-08
FT17-13 FT18-08 FT18-13
FT19-08 FT19-13 FT2-08
FT2-13 FT20-08 FT20-13
FT3-08 FT3-13 FT4-08
FT4-13 FT5-08 FT5-13
FT6-08 FT6-13 FT7-08
FT7-13 FT8-08 FT8-13
FT9-08 FT9-13 JG1-1
JG10-1 JG11-1 JG12-1
JG13-1 JG14-1 JG15-1
JG16-1 JG17-1 JG18-1
JG19-1 JG2-1 JG20-1
JG3-1 JG4-1 JG5-1
JG6-1 JG7-1 JG8-1
JG9-1 KT1-3 KT1-8
KT10-3 KT10-8 KT11-3
KT11-8 KT12-3 KT12-8
KT13-3 KT13-8 KT14-3
KT14-8 KT15-3 KT15-8
KT16-3 KT16-8 KT17-3
KT17-8 KT18-3 KT18-8
KT19-3 KT19-8 KT2-3
KT2-8 KT20-3 KT20-8
KT3-3 KT3-8 KT4-3
KT4-8 KT5-3 KT5-8
KT6-3 KT6-8 KT7-3
KT7-8 KT8-3 KT8-8
KT9-3 KT9-8 NT1-08
NT1-13 NT10-08 NT10-13
NT11-08 NT11-13 NT12-08
NT12-13 NT13-08 NT13-13

|  |  |  |  |
|---|---|---|---|
| | NT14-08 | NT14-13 | NT15-08 |
| | NT15-13 | NT16-08 | NT16-13 |
| | NT17-08 | NT17-13 | NT18-08 |
| | NT18-13 | NT19-08 | NT19-13 |
| | NT2-08 | NT2-13 | NT20-08 |
| | NT20-13 | NT3-08 | NT3-13 |
| | NT4-08 | NT4-13 | NT5-08 |
| | NT5-13 | NT6-08 | NT6-13 |
| | NT7-08 | NT7-13 | NT8-08 |
| | NT8-13 | NT9-08 | NT9-13 |
| | PWR-7 | PWR-9 | RN36-3 |
| | RN36-5 | RN37-3 | RN37-5 |
| | RN38-3 | RN38-5 | RN39-3 |
| | RN39-5 | RN40-3 | RN40-5 |
| | RN41-3 | RN41-5 | RN50-3 |
| | RN50-5 | RN58-3 | RN58-5 |
| | RN60-3 | RN60-5 | RN62-3 |
| | RN62-5 | RN64-3 | RN64-5 |
| | RN66-3 | RN66-5 | RN68-3 |
| | RN68-5 | RN70-3 | RN70-5 |
| | RN72-3 | RN72-5 | RN74-3 |
| | RN74-5 | RN76-3 | RN76-5 |
| | RN78-3 | RN78-5 | RN80-3 |
| | RN80-5 | RN82-3 | RN82-5 |
| | TAGND-1 | U102-16 | U105-16 |
| | U108-16 | U111-16 | U113-16 |
| | U117-13 | U117-16 | U120-16 |
| | U123-16 | U126-16 | U129-16 |
| | U132-16 | U135-16 | U58-16 |
| | U59-16 | U60-16 | U61-16 |
| | U62-16 | U63-16 | U96-16 |
| | U99-16 | | |

| | | | | | |
|---|---|---|---|---|---|
| 725 | ALMV+ | AVOL-1 | AVOL-2 | R2-L | |
| | R3-1 | | | | |
| 726 | ALMV- | AVOL-3 | AVOL-4 | K2-9 | |
| | U9-2 | | | | |
| 727 | APCB | LED-43 | RN9-2 | | |
| 728 | APRO | LED-46 | RN9-8 | | |
| 729 | APS | LED-48 | RN20-7 | | |
| 730 | AR0STB | U37-02 | U7-20 | | |
| 731 | ASWCL | LED-47 | RN9-6 | | |
| 732 | AX0 | U76-5 | U77-5 | U78-5 | |
| | | U79-5 | U80-5 | U81-5 | |
| | | U82-5 | U83-5 | U84-5 | |
| | | U85-5 | U86-5 | U87-5 | |
| | | U88-19 | | | |

| | | | | |
|---|---|---|---|---|
| 733 | AX1 | U76-22 | U77-22 | U78-22 |
| | | U79-22 | U80-22 | U81-22 |
| | | U82-22 | U83-22 | U84-22 |
| | | U85-22 | U86-22 | U87-22 |
| | | U88-18 | | |
| 734 | AX2 | U76-23 | U77-23 | U78-23 |
| | | U79-23 | U80-23 | U81-23 |
| | | U82-23 | U83-23 | U84-23 |
| | | U85-23 | U86-23 | U87-23 |
| | | U88-17 | | |
| 735 | AX3 | U76-4 | U77-4 | U78-4 |
| | | U79-4 | U80-4 | U81-4 |
| | | U82-4 | U83-4 | U84-4 |
| | | U85-4 | U86-4 | U87-4 |
| | | U88-16 | | |
| 736 | AY0 | U76-24 | U77-24 | U78-24 |
| | | U79-24 | U80-24 | U81-24 |
| | | U82-24 | U83-24 | U84-24 |
| | | U85-24 | U86-24 | U87-24 |
| | | U88-15 | | |
| 737 | AY1 | U76-25 | U77-25 | U78-25 |
| | | U79-25 | U80-25 | U81-25 |
| | | U82-25 | U83-25 | U84-25 |
| | | U85-25 | U86-25 | U87-25 |
| | | U88-14 | | |
| 738 | AY2 | U76-2 | U77-2 | U78-2 |
| | | U79-2 | U80-2 | U81-2 |
| | | U82-2 | U83-2 | U84-2 |
| | | U85-2 | U86-2 | U87-2 |
| | | U88-13 | | |
| 739 | C232 | ALMRLY-5 | K8-7 | |
| 740 | C95HD | ALMRLY-7 | K5-7 | |
| 741 | CA1 | ALMRLY-6 | K7-7 | |
| 742 | CPCB | ALMRLY-13 | K9-9 | |
| 743 | CPRO | ALMRLY-11 | K3-7 | |
| 744 | CPS | ALMRLY-9 | K1-9 | |
| 745 | CSWCL | ALMRLY-3 | K4-7 | |
| 746 | DGND | A/DGND-5 | A/DGND-6 | A/DGND-7 |
| | | A/DGND-8 | PWR-1 | PWR-10 |
| | | PWR-4 | TDGND-1 | |

| | | | | |
|---|---|---|---|---|
| 747 | DNTST | U24-62 | U78-21 | U84-21 |
| 748 | DPTST | U24-63 | U79-21 | U87-21 |
| 749 | FDN01 | U76-35 | U89-14 | |
| 750 | FDN02 | U76-37 | U89-18 | |
| 751 | FDN03 | U76-39 | U90-14 | |
| 752 | FDN04 | U76-1 | U90-18 | |
| 753 | FDN05 | U76-21 | U91-14 | |
| 754 | FDN06 | U76-19 | U91-18 | |
| 755 | FDN07 | U76-17 | U92-14 | |
| 756 | FDN08 | U76-15 | U92-18 | |
| 757 | FDN09 | U77-35 | U93-14 | |
| 758 | FDN10 | U77-37 | U93-18 | |
| 759 | FDN11 | U77-39 | U94-14 | |
| 760 | FDN12 | U77-1 | U94-18 | |
| 761 | FDN13 | U77-21 | U95-14 | |
| 762 | FDN14 | U77-19 | U95-18 | |
| 763 | FDN15 | U48-14 | U77-17 | |
| 764 | FDN16 | U48-18 | U77-15 | |
| 765 | FDN17 | U50-14 | U78-35 | |
| 766 | FDN18 | U50-18 | U78-37 | |
| 767 | FDN19 | U51-14 | U78-39 | |
| 768 | FDN20 | U51-18 | U78-1 | |
| 769 | FDP01 | U24-20 | U80-35 | U89-13 |
| 770 | FDP02 | U24-37 | U80-37 | U89-17 |
| 771 | FDP03 | U24-54 | U80-39 | U90-13 |
| 772 | FDP04 | U24-79 | U80-1 | U90-17 |
| 773 | FDP05 | U24-17 | U80-21 | U91-13 |

| | | | | |
|---|---|---|---|---|
| 774 | FDP06 | U24-36 | U80-19 | U91-17 |
| 775 | FDP07 | U24-55 | U80-17 | U92-13 |
| 776 | FDP08 | U24-78 | U80-15 | U92-17 |
| 777 | FDP09 | U24-16 | U81-35 | U93-13 |
| 778 | FDP10 | U24-35 | U81-37 | U93-17 |
| 779 | FDP11 | U24-56 | U81-39 | U94-13 |
| 780 | FDP12 | U24-77 | U81-1 | U94-17 |
| 781 | FDP13 | U24-15 | U81-21 | U95-13 |
| 782 | FDP14 | U24-34 | U81-19 | U95-17 |
| 783 | FDP15 | U24-64 | U48-13 | U81-17 |
| 784 | FDP16 | U24-76 | U48-17 | U81-15 |
| 785 | FDP17 | U24-14 | U50-13 | U79-35 |
| 786 | FDP18 | U24-33 | U50-17 | U79-37 |
| 787 | FDP19 | U24-65 | U51-13 | U79-39 |
| 788 | FDP20 | U24-75 | U51-17 | U79-1 |
| 789 | GND | C1-1 | C10-1 | C11-2 |
| | | C12-2 | C13-2 | C14-1 |
| | | C15-1 | C16-1 | C17-1 |
| | | C18-1 | C19-1 | C2-1 |
| | | C20-1 | C21-1 | C22-1 |
| | | C23-1 | C24-1 | C25-1 |
| | | C26-1 | C27-2 | C28-1 |
| | | C29-1 | C3-2 | C30-1 |
| | | C31-1 | C33-1 | C34-1 |
| | | C35-1 | C36-1 | C37-1 |
| | | C38-1 | C39-2 | C4-1 |
| | | C40-2 | C41-2 | C42-2 |
| | | C43-2 | C44-2 | C45-2 |
| | | C46-2 | C47-2 | C48-2 |
| | | C49-2 | C5-1 | C50-2 |
| | | C52-2 | C56-2 | C6-1 |
| | | C7-1 | C71-2 | C77-2 |
| | | C78-2 | C79-2 | C8-1 |
| | | C80-2 | C81-2 | C82-2 |
| | | C83-2 | C84-2 | C85-2 |
| | | C86-2 | C87-2 | C88-2 |
| | | C89-2 | C9-2 | C90-2 |
| | | IN1-10 | IN1-12 | IN1-14 |

| | | |
|---|---|---|
| IN1-16 | IN1-18 | IN1-2 |
| IN1-20 | IN1-22 | IN1-24 |
| IN1-26 | IN1-28 | IN1-30 |
| IN1-32 | IN1-34 | IN1-36 |
| IN1-38 | IN1-4 | IN1-40 |
| IN1-6 | IN1-8 | IN2-10 |
| IN2-12 | IN2-14 | IN2-16 |
| IN2-18 | IN2-2 | IN2-20 |
| IN2-22 | IN2-24 | IN2-26 |
| IN2-28 | IN2-30 | IN2-32 |
| IN2-34 | IN2-36 | IN2-38 |
| IN2-4 | IN2-40 | IN2-6 |
| IN2-8 | IN3-10 | IN3-12 |
| IN3-14 | IN3-16 | IN3-18 |
| IN3-2 | IN3-20 | IN3-22 |
| IN3-24 | IN3-26 | IN3-28 |
| IN3-30 | IN3-32 | IN3-34 |
| IN3-36 | IN3-38 | IN3-4 |
| IN3-40 | IN3-6 | IN3-8 |
| IN4-10 | IN4-12 | IN4-14 |
| IN4-16 | IN4-18 | IN4-2 |
| IN4-20 | IN4-22 | IN4-24 |
| IN4-26 | IN4-28 | IN4-30 |
| IN4-32 | IN4-34 | IN4-36 |
| IN4-38 | IN4-4 | IN4-40 |
| IN4-6 | IN4-8 | JG1-2 |
| JG10-2 | JG11-2 | JG12-2 |
| JG13-2 | JG14-2 | JG15-2 |
| JG16-2 | JG17-2 | JG18-2 |
| JG19-2 | JG2-2 | JG20-2 |
| JG3-2 | JG4-2 | JG5-2 |
| JG6-2 | JG7-2 | JG8-2 |
| JG9-2 | JING-2 | JPRGM-3 |
| JPRGM-4 | K6-3 | K6-8 |
| K7-3 | K8-3 | RS-2 |
| RS233-5 | U1-4 | U10-10 |
| U102-08 | U102-13 | U105-08 |
| U105-13 | U108-08 | U108-13 |
| U11-4 | U111-08 | U111-13 |
| U113-08 | U113-13 | U117-08 |
| U12-4 | U120-08 | U120-13 |
| U123-08 | U123-13 | U126-08 |
| U126-13 | U129-08 | U129-13 |
| U13-4 | U132-08 | U132-13 |
| U135-08 | U135-13 | U14-12 |
| U15-1 | U15-10 | U16-01 |
| U16-11 | U16-22 | U17-10 |
| U18-10 | U19-4 | U2-7 |
| U20-4 | U21-4 | U22-4 |
| U23-04 | U24-18 | U24-19 |
| U24-39 | U24-40 | U24-60 |
| U24-61 | U24-81 | U24-82 |
| U25-01 | U25-11 | U25-22 |
| U26-10 | U27-4 | U28-4 |

|     |       |         |         |         |
| --- | ----- | ------- | ------- | ------- |
|     |       | U29-4   | U3-01   | U3-11   |
|     |       | U3-22   | U30-01  | U30-11  |
|     |       | U30-22  | U31-10  | U32-4   |
|     |       | U33-4   | U34-4   | U35-4   |
|     |       | U36-20  | U37-03  | U37-04  |
|     |       | U37-11  | U37-22  | U38-4   |
|     |       | U39-4   | U4-4    | U40-4   |
|     |       | U41-4   | U42-4   | U43-4   |
|     |       | U44-4   | U45-4   | U46-1   |
|     |       | U46-10  | U47-3   | U48-10  |
|     |       | U48-19  | U49-4   | U5-4    |
|     |       | U50-10  | U50-19  | U51-10  |
|     |       | U51-19  | U52-4   | U53-4   |
|     |       | U54-4   | U55-4   | U56-14  |
|     |       | U56-20  | U57-14  | U58-08  |
|     |       | U58-13  | U59-08  | U59-13  |
|     |       | U6-4    | U60-08  | U60-13  |
|     |       | U61-08  | U61-13  | U62-08  |
|     |       | U62-13  | U63-08  | U63-13  |
|     |       | U7-18   | U7-19   | U7-39   |
|     |       | U7-40   | U7-60   | U7-61   |
|     |       | U7-81   | U7-82   | U76-16  |
|     |       | U76-20  | U77-16  | U77-20  |
|     |       | U78-16  | U78-20  | U79-16  |
|     |       | U79-20  | U8-01   | U8-11   |
|     |       | U8-22   | U80-16  | U80-20  |
|     |       | U81-16  | U81-20  | U82-16  |
|     |       | U82-20  | U83-16  | U83-20  |
|     |       | U84-16  | U84-20  | U85-16  |
|     |       | U85-20  | U86-16  | U86-20  |
|     |       | U87-16  | U87-20  | U88-1   |
|     |       | U88-10  | U89-10  | U89-19  |
|     |       | U9-5    | U90-10  | U90-19  |
|     |       | U91-10  | U91-19  | U92-10  |
|     |       | U92-19  | U93-10  | U93-19  |
|     |       | U94-10  | U94-19  | U95-10  |
|     |       | U95-19  | U96-08  | U96-13  |
|     |       | U99-08  | U99-13  |         |
| 790 | I232D | J1-1    | J1-6    | U14-10  |
| 791 | ID0   | U15-19  | U16-10  | U25-10  |
|     |       | U3-10   | U30-10  | U37-10  |
|     |       | U8-10   |         |         |
| 792 | ID1   | U15-18  | U16-09  | U25-09  |
|     |       | U3-09   | U30-09  | U37-09  |
|     |       | U8-09   |         |         |
| 793 | ID2   | U15-17  | U16-08  | U25-08  |
|     |       | U3-08   | U30-08  | U37-08  |
|     |       | U8-08   |         |         |
| 794 | ID3   | U15-16  | U16-07  | U25-07  |

|     |         |                          |                          |         |
|-----|---------|--------------------------|--------------------------|---------|
|     |         | U3-07<br>U8-07           | U30-07                   | U37-07  |
| 795 | ID4     | U15-15<br>U3-06<br>U8-06 | U16-06<br>U30-06         | U25-06<br>U37-06 |
| 796 | ID5     | U15-14<br>U3-05<br>U8-05 | U16-05<br>U30-05         | U25-05<br>U37-05 |
| 797 | ID6     | U15-13<br>U3-04          | U16-04<br>U30-04         | U25-04<br>U8-04  |
| 798 | ID7     | U15-12<br>U3-03          | U16-03<br>U30-03         | U25-03<br>U8-03  |
| 799 | IN1     | ALMRLY-8                 | RN14-2                   | U36-08  |
| 800 | INR0STB | U7-17                    | U8-02                    |         |
| 801 | INR1STB | U3-02                    | U7-25                    |         |
| 802 | INR2STB | U30-02                   | U7-28                    |         |
| 803 | INR3STB | U25-02                   | U7-09                    |         |
| 804 | INR4STB | U16-02                   | U7-07                    |         |
| 805 | LED+    | K2-3                     | R4-R                     |         |
| 806 | LEDCOM+ | LED-01<br>LED-50         | LED-02<br>R4-L           | LED-49  |
| 807 | LEDGND  | K1-3<br>K4-3             | K2-8<br>K5-3             | K3-3<br>K9-3 |
| 808 | LXTCK   | U23-05                   | U7-57                    |         |
| 809 | MCLK01  | U24-01                   | U7-62                    |         |
| 810 | MCLK02  | U102-11<br>U96-11        | U105-11<br>U99-11        | U7-63   |
| 811 | MCLK03  | U108-11<br>U117-11       | U111-11<br>U7-64         | U113-11 |
| 812 | MCLK04  | U120-11<br>U129-11       | U123-11<br>U7-65         | U126-11 |
| 813 | MCLK05  | U132-11<br>U59-11        | U135-11<br>U7-67         | U58-11  |
| 814 | MCLK06  | U60-11                   | U61-11                   | U62-11  |

|     |        | U63-11 | U7-68  |        |
| --- | ------ | ------ | ------ | ------ |
| 815 | NDN01  | U82-35 | U89-12 |        |
| 816 | NDN02  | U82-37 | U89-16 |        |
| 817 | NDN03  | U82-39 | U90-12 |        |
| 818 | NDN04  | U82-1  | U90-16 |        |
| 819 | NDN05  | U82-21 | U91-12 |        |
| 820 | NDN06  | U82-19 | U91-16 |        |
| 821 | NDN07  | U82-17 | U92-12 |        |
| 822 | NDN08  | U82-15 | U92-16 |        |
| 823 | NDN09  | U83-35 | U93-12 |        |
| 824 | NDN10  | U83-37 | U93-16 |        |
| 825 | NDN11  | U83-39 | U94-12 |        |
| 826 | NDN12  | U83-1  | U94-16 |        |
| 827 | NDN13  | U83-21 | U95-12 |        |
| 828 | NDN14  | U83-19 | U95-16 |        |
| 829 | NDN15  | U48-12 | U83-17 |        |
| 830 | NDN16  | U48-16 | U83-15 |        |
| 831 | NDN17  | U50-12 | U84-35 |        |
| 832 | NDN18  | U50-16 | U84-37 |        |
| 833 | NDN19  | U51-12 | U84-39 |        |
| 834 | NDN20  | U51-16 | U84-1  |        |
| 835 | NDP01  | U24-09 | U85-35 | U89-11 |
| 836 | NDP02  | U24-29 | U85-37 | U89-15 |
| 837 | NDP03  | U24-48 | U85-39 | U90-11 |
| 838 | NDP04  | U24-71 | U85-1  | U90-15 |
| 839 | NDP05  | U24-08 | U85-21 | U91-11 |
| 840 | NDP06  | U24-28 | U85-19 | U91-15 |

| | | | | |
|---|---|---|---|---|
| 841 | NDP07 | U24-49 | U85-17 | U92-11 |
| 842 | NDP08 | U24-70 | U85-15 | U92-15 |
| 843 | NDP09 | U24-07 | U86-35 | U93-11 |
| 844 | NDP10 | U24-27 | U86-37 | U93-15 |
| 845 | NDP11 | U24-50 | U86-39 | U94-11 |
| 846 | NDP12 | U24-69 | U86-1 | U94-15 |
| 847 | NDP13 | U24-06 | U86-21 | U95-11 |
| 848 | NDP14 | U24-26 | U86-19 | U95-15 |
| 849 | NDP15 | U24-51 | U48-11 | U86-17 |
| 850 | NDP16 | U24-68 | U48-15 | U86-15 |
| 851 | NDP17 | U24-05 | U50-11 | U87-35 |
| 852 | NDP18 | U24-25 | U50-15 | U87-37 |
| 853 | NDP19 | U24-52 | U51-11 | U87-39 |
| 854 | NDP20 | U24-67 | U51-15 | U87-1 |
| 855 | O232D | J1-3 | J1-4 | U14-04 |
| 856 | ODNTST | U24-58<br>U78-7<br>U84-7 | U76-7<br>U82-7 | U77-7<br>U83-7 |
| 857 | ODPTST | U24-59<br>U81-7<br>U87-7 | U79-7<br>U85-7 | U80-7<br>U86-7 |
| 858 | OFDN01 | U4-6<br>U78-33 | U76-33 | U77-33 |
| 859 | OFDN02 | U19-6<br>U78-32 | U76-32 | U77-32 |
| 860 | OFDN03 | U32-6<br>U78-31 | U76-31 | U77-31 |
| 861 | OFDN04 | U33-6<br>U78-30 | U76-30 | U77-30 |
| 862 | OFDN05 | U39-6<br>U78-29 | U76-29 | U77-29 |
| 863 | OFDN06 | U12-6 | U76-28 | U77-28 |

| | | U78-28 | | |
|---|---|---|---|---|
| 864 | OFDN07 | U28-6<br>U78-8 | U76-8 | U77-8 |
| 865 | OFDN08 | U40-5<br>U78-9 | U76-9 | U77-9 |
| 866 | OFDN09 | U13-6<br>U78-10 | U76-10 | U77-10 |
| 867 | OFDN10 | U29-6<br>U78-11 | U76-11 | U77-11 |
| 868 | OFDN11 | U52-6<br>U78-12 | U76-12 | U77-12 |
| 869 | OFDN12 | U53-6<br>U78-13 | U76-13 | U77-13 |
| 870 | OFDN13 | U43-6<br>U78-27 | U76-27 | U77-27 |
| 871 | OFDN14 | U54-6<br>U78-26 | U76-26 | U77-26 |
| 872 | OFDN15 | U55-6<br>U78-6 | U76-6 | U77-6 |
| 873 | OFDP01 | U4-2<br>U81-33 | U79-33 | U80-33 |
| 874 | OFDP02 | U19-2<br>U81-32 | U79-32 | U80-32 |
| 875 | OFDP03 | U32-2<br>U81-31 | U79-31 | U80-31 |
| 876 | OFDP04 | U33-2<br>U81-30 | U79-30 | U80-30 |
| 877 | OFDP05 | U39-2<br>U81-29 | U79-29 | U80-29 |
| 878 | OFDP06 | U12-2<br>U81-28 | U79-28 | U80-28 |
| 879 | OFDP07 | U28-2<br>U81-8 | U79-8 | U80-8 |
| 880 | OFDP08 | U40-2<br>U81-9 | U79-9 | U80-9 |
| 881 | OFDP09 | U13-2 | U79-10 | U80-10 |

| | | U81-10 | | |
|---|---|---|---|---|
| 882 | OFDP10 | U29-2 | U79-11 | U80-11 |
| | | U81-11 | | |
| 883 | OFDP11 | U52-2 | U79-12 | U80-12 |
| | | U81-12 | | |
| 884 | OFDP12 | U53-2 | U79-13 | U80-13 |
| | | U81-13 | | |
| 885 | OFDP13 | U43-2 | U79-27 | U80-27 |
| | | U81-27 | | |
| 886 | OFDP14 | U54-2 | U79-26 | U80-26 |
| | | U81-26 | | |
| 887 | OFDP15 | U55-2 | U79-6 | U80-6 |
| | | U81-6 | | |
| 888 | OFR1 | OT1-07 | OUT3-4 | |
| 889 | OFR10 | OT7-07 | OUT2-16 | |
| 890 | OFR11 | OT12-07 | OUT1-8 | |
| 891 | OFR12 | OT14-07 | OUT1-16 | |
| 892 | OFR13 | OT10-07 | OUT2-4 | |
| 893 | OFR14 | OT13-07 | OUT2-12 | |
| 894 | OFR15 | OT15-07 | OUT2-20 | |
| 895 | OFR2 | OT2-07 | OUT3-8 | |
| 896 | OFR3 | OT5-07 | OUT3-12 | |
| 897 | OFR4 | OT8-07 | OUT3-16 | |
| 898 | OFR5 | OT11-07 | OUT3-20 | |
| 899 | OFR6 | OT3-07 | OUT1-4 | |
| 900 | OFR7 | OT6-07 | OUT1-12 | |
| 901 | OFR8 | OT9-07 | OUT1-20 | |
| 902 | OFR9 | OT4-07 | OUT2-8 | |
| 903 | OFT1 | OT1-05 | OUT3-3 | |
| 904 | OFT10 | OT7-05 | OUT2-15 | |

| | | | | |
|---|---|---|---|---|
| 905 | OFT11 | OT12-05 | OUT1-7 | |
| 906 | OFT12 | OT14-05 | OUT1-15 | |
| 907 | OFT13 | OT10-05 | OUT2-3 | |
| 908 | OFT14 | OT13-05 | OUT2-11 | |
| 909 | OFT15 | OT15-05 | OUT2-19 | |
| 910 | OFT2 | OT2-05 | OUT3-7 | |
| 911 | OFT3 | OT5-05 | OUT3-11 | |
| 912 | OFT4 | OT8-05 | OUT3-15 | |
| 913 | OFT5 | OT11-05 | OUT3-19 | |
| 914 | OFT6 | OT3-05 | OUT1-3 | |
| 915 | OFT7 | OT6-05 | OUT1-11 | |
| 916 | OFT8 | OT9-05 | OUT1-19 | |
| 917 | OFT9 | OT4-05 | OUT2-7 | |
| 918 | ONDN01 | U1-6<br>U84-33 | U82-33 | U83-33 |
| 919 | ONDN02 | U11-6<br>U84-32 | U82-32 | U83-32 |
| 920 | ONDN03 | U27-6<br>U84-31 | U82-31 | U83-31 |
| 921 | ONDN04 | U38-6<br>U84-30 | U82-30 | U83-30 |
| 922 | ONDN05 | U20-6<br>U84-29 | U82-29 | U83-29 |
| 923 | ONDN06 | U5-6<br>U84-28 | U82-28 | U83-28 |
| 924 | ONDN07 | U21-6<br>U84-8 | U82-8 | U83-8 |
| 925 | ONDN08 | U34-5<br>U84-9 | U82-9 | U83-9 |
| 926 | ONDN09 | U6-6<br>U84-10 | U82-10 | U83-10 |
| 927 | ONDN10 | U22-6 | U82-11 | U83-11 |

| | | | | |
|---|---|---|---|---|
| | | U84-11 | | |
| 928 | ONDN11 | U41-6 U84-12 | U82-12 | U83-12 |
| 929 | ONDN12 | U42-6 U84-13 | U82-13 | U83-13 |
| 930 | ONDN13 | U35-6 U84-27 | U82-27 | U83-27 |
| 931 | ONDN14 | U44-6 U84-26 | U82-26 | U83-26 |
| 932 | ONDN15 | U45-6 U84-6 | U82-6 | U83-6 |
| 933 | ONDP01 | U1-2 U87-33 | U85-33 | U86-33 |
| 934 | ONDP02 | U11-2 U87-32 | U85-32 | U86-32 |
| 935 | ONDP03 | U27-2 U87-31 | U85-31 | U86-31 |
| 936 | ONDP04 | U38-2 U87-30 | U85-30 | U86-30 |
| 937 | ONDP05 | U20-2 U87-29 | U85-29 | U86-29 |
| 938 | ONDP06 | U5-2 U87-28 | U85-28 | U86-28 |
| 939 | ONDP07 | U21-2 U87-8 | U85-8 | U86-8 |
| 940 | ONDP08 | U34-2 U87-9 | U85-9 | U86-9 |
| 941 | ONDP09 | U6-2 U87-10 | U85-10 | U86-10 |
| 942 | ONDP10 | U22-2 U87-11 | U85-11 | U86-11 |
| 943 | ONDP11 | U41-2 U87-12 | U85-12 | U86-12 |
| 944 | ONDP12 | U42-2 U87-13 | U85-13 | U86-13 |
| 945 | ONDP13 | U35-2 | U85-27 | U86-27 |

| | | | | |
|---|---|---|---|---|
| | | U87-27 | | |
| 946 | ONDP14 | U44-2 | U85-26 | U86-26 |
| | | U87-26 | | |
| 947 | ONDP15 | U45-2 | U85-6 | U86-6 |
| | | U87-6 | | |
| 948 | ONR1 | OT1-12 | OUT3-2 | |
| 949 | ONR10 | OT7-12 | OUT2-14 | |
| 950 | ONR11 | OT12-12 | OUT1-6 | |
| 951 | ONR12 | OT14-12 | OUT1-14 | |
| 952 | ONR13 | OT10-12 | OUT2-2 | |
| 953 | ONR14 | OT13-12 | OUT2-10 | |
| 954 | ONR15 | OT15-12 | OUT2-18 | |
| 955 | ONR2 | OT2-12 | OUT3-6 | |
| 956 | ONR3 | OT5-12 | OUT3-10 | |
| 957 | ONR4 | OT8-12 | OUT3-14 | |
| 958 | ONR5 | OT11-12 | OUT3-18 | |
| 959 | ONR6 | OT3-12 | OUT1-2 | |
| 960 | ONR7 | OT6-12 | OUT1-10 | |
| 961 | ONR8 | OT9-12 | OUT1-18 | |
| 962 | ONR9 | OT4-12 | OUT2-6 | |
| 963 | ONT1 | OT1-14 | OUT3-1 | |
| 964 | ONT10 | OT7-14 | OUT2-13 | |
| 965 | ONT11 | OT12-14 | OUT1-5 | |
| 966 | ONT12 | OT14-14 | OUT1-13 | |
| 967 | ONT13 | OT10-14 | OUT2-1 | |
| 968 | ONT14 | OT13-14 | OUT2-9 | |
| 969 | ONT15 | OT15-14 | OUT2-17 | |
| 970 | ONT2 | OT2-14 | OUT3-5 | |

| | | | | |
|---|---|---|---|---|
| 971 | ONT3 | OT5-14 | OUT3-9 | |
| 972 | ONT4 | OT8-14 | OUT3-13 | |
| 973 | ONT5 | OT11-14 | OUT3-17 | |
| 974 | ONT6 | OT3-14 | OUT1-1 | |
| 975 | ONT7 | OT6-14 | OUT1-9 | |
| 976 | ONT8 | OT9-14 | OUT1-17 | |
| 977 | ONT9 | OT4-14 | OUT2-5 | |
| 978 | PIF | CR1-2 | R5-1 | U47-4 |
| 979 | PIN2 | J1-2 | RS233-2 | |
| 980 | PIN3 | J1-5 | RS233-3 | |
| 981 | POR | U37-01 | U7-77 | |
| 982 | PRGM/nRUN | JPRGM-1 | RN14-8 | U7-80 |
| 983 | PSOK | RN14-4 U49-6 | U24-31 | U47-5 |
| 984 | RLYCOM | ALMRLY-4 K4-8 K8-8 | K1-8 K5-8 K9-8 | K3-8 K7-8 |
| 985 | SW0STB | U7-16 U82-18 | U76-18 U85-18 | U80-18 |
| 986 | SW1STB | U7-22 U83-18 | U77-18 U86-18 | U81-18 |
| 987 | SW2STB | U7-27 U84-18 | U78-18 U87-18 | U79-18 |
| 988 | SWCS0 | U7-59 U82-36 | U76-36 U85-36 | U80-36 |
| 989 | SWCS1 | U7-71 U83-36 | U77-36 U86-36 | U81-36 |
| 990 | SWCS2 | U7-14 U84-36 | U78-36 U87-36 | U79-36 |
| 991 | SWDATA | U76-38 U79-38 U82-38 U85-38 U88-12 | U77-38 U80-38 U83-38 U86-38 | U78-38 U81-38 U84-38 U87-38 |

| | | | | |
|---|---|---|---|---|
| 992 | SWPOR | U7-69 | U76-3 | U77-3 |
| | U78-3 | U79-3 | U80-3 | |
| | U81-3 | U82-3 | U83-3 | |
| | U84-3 | U85-3 | U86-3 | |
| | U87-3 | | | |
| 993 | n01BRDG | KT14-10 | U8-13 | |
| 994 | n01MONO | KM14-10 | U8-14 | |
| 995 | n02BRDG | KT7-10 | U8-15 | |
| 996 | n02MONO | KM7-10 | U8-16 | |
| 997 | n03BRDG | KT15-10 | U8-17 | |
| 998 | n03MONO | KM15-10 | U8-18 | |
| 999 | n04BRDG | KT8-10 | U8-19 | |
| 1000 | n04MONO | KM8-10 | U8-20 | |
| 1001 | n05BRDG | KT16-10 | U25-13 | |
| 1002 | n05MONO | KM16-10 | U25-14 | |
| 1003 | n06BRDG | KT9-10 | U25-15 | |
| 1004 | n06MONO | KM9-10 | U25-16 | |
| 1005 | n07BRDG | KT17-10 | U25-17 | |
| 1006 | n07MONO | KM17-10 | U25-18 | |
| 1007 | n08BRDG | KT10-10 | U25-19 | |
| 1008 | n08MONO | KM10-10 | U25-20 | |
| 1009 | n09BRDG | KT18-10 | U16-13 | |
| 1010 | n09MONO | KM18-10 | U16-14 | |
| 1011 | n10BRDG | KT11-10 | U16-15 | |
| 1012 | n10MONO | KM11-10 | U16-16 | |
| 1013 | n11BRDG | KT19-10 | U16-17 | |
| 1014 | n11MONO | KM19-10 | U16-18 | |
| 1015 | n12BRDG | KT12-10 | U16-19 | |
| 1016 | n12MONO | KM12-10 | U16-20 | |

| | | | |
|---|---|---|---|
| 1017 | n13BRDG | KT20-10 | U30-13 |
| 1018 | n13MONO | KM20-10 | U30-14 |
| 1019 | n14BRDG | KT13-10 | U30-15 |
| 1020 | n14MONO | KM13-10 | U30-16 |
| 1021 | n15BRDG | KT4-10 | U30-17 |
| 1022 | n15MONO | KM4-10 | U30-18 |
| 1023 | n16BRDG | KT1-10 | U30-19 |
| 1024 | n16MONO | KM1-10 | U30-20 |
| 1025 | n17BRDG | KT5-10 | U3-13 |
| 1026 | n17MONO | KM5-10 | U3-14 |
| 1027 | n18BRDG | KT2-10 | U3-15 |
| 1028 | n18MONO | KM2-10 | U3-16 |
| 1029 | n19BRDG | KT6-10 | U3-17 |
| 1030 | n19MONO | KM6-10 | U3-18 |
| 1031 | n20BRDG | KT3-10 | U3-19 |
| 1032 | n20MONO | KM3-10 | U3-20 |
| 1033 | nA1 | K7-10 | U37-17 |
| 1034 | nA10F | RN5-12 | U17-16 |
| 1035 | nA10N | RN5-11 | U17-17 |
| 1036 | nA11F | RN5-14 | U17-14 |
| 1037 | nA11N | RN5-13 | U17-15 |
| 1038 | nA12F | RN5-16 | U17-12 |
| 1039 | nA12N | RN5-15 | U17-13 |
| 1040 | nA13F | RN6-10 | U18-18 |
| 1041 | nA13N | RN6-9 | U18-19 |
| 1042 | nA14F | RN6-12 | U18-16 |
| 1043 | nA14N | RN6-11 | U18-17 |

| | | | |
|---|---|---|---|
| 1044 | nA15F | RN6-14 | U18-14 |
| 1045 | nA15N | RN6-13 | U18-15 |
| 1046 | nA16F | RN6-16 | U18-12 |
| 1047 | nA16N | RN6-15 | U18-13 |
| 1048 | nA17F | RN13-10 | U31-18 |
| 1049 | nA17N | RN13-9 | U31-19 |
| 1050 | nA18F | RN13-12 | U31-16 |
| 1051 | nA18N | RN13-11 | U31-17 |
| 1052 | nA19F | RN13-14 | U31-14 |
| 1053 | nA19N | RN13-13 | U31-15 |
| 1054 | nA1F | RN2-10 | U10-18 |
| 1055 | nA1N | RN2-9 | U10-19 |
| 1056 | nA20F | RN13-16 | U31-12 |
| 1057 | nA20N | RN13-15 | U31-13 |
| 1058 | nA2F | RN2-12 | U10-16 |
| 1059 | nA2N | RN2-11 | U10-17 |
| 1060 | nA3F | RN2-14 | U10-14 |
| 1061 | nA3N | RN2-13 | U10-15 |
| 1062 | nA4F | RN2-16 | U10-12 |
| 1063 | nA4N | RN2-15 | U10-13 |
| 1064 | nA5F | RN8-10 | U26-18 |
| 1065 | nA5N | RN8-9 | U26-19 |
| 1066 | nA6F | RN8-12 | U26-16 |
| 1067 | nA6N | RN8-11 | U26-17 |
| 1068 | nA7F | RN8-14 | U26-14 |
| 1069 | nA7N | RN8-13 | U26-15 |
| 1070 | nA8F | RN8-16 | U26-12 |

| | | | | |
|---|---|---|---|---|
| 1071 | nA8N | RN8-15 | U26-13 | |
| 1072 | nA9F | RN5-10 | U17-18 | |
| 1073 | nA9N | RN5-9 | U17-19 | |
| 1074 | nALED0 | U10-11 | U7-21 | |
| 1075 | nALED1 | U26-11 | U7-26 | |
| 1076 | nALED2 | U17-11 | U7-12 | |
| 1077 | nALED3 | U18-11 | U7-10 | U7-29 |
| 1078 | nALED4 | U31-11 | U7-08 | |
| 1079 | nAPRO | K3-10 | U37-14 | |
| 1080 | nAR232 | K8-10 | U37-13 | |
| 1081 | nAVOK | K6-10 | U37-19 | U9-4 |
| 1082 | nCSALM | U24-84 | U7-06 | |
| 1083 | nCSRAM | U57-20 | U7-51 | |
| 1084 | nCSuP | U47-6 | U7-30 | |
| 1085 | nEA | U36-31 | U7-73 | |
| 1086 | nHD95 | K5-10 | U37-15 | |
| 1087 | nINRDATA | U15-11 | U7-23 | |
| 1088 | nINT0 | RN14-9 | U36-12 | U7-72 |
| 1089 | nINT1 | RN14-10 | U24-73 | U36-13 |
| 1090 | nLEDEn | K6-4 | RN14-3 | U10-1 |
| | U17-1 | U18-1 | U26-1 | |
| | U31-1 | | | |
| 1091 | nMR | U47-1 | U7-78 | |
| 1092 | nPCB | K9-10 | U49-3 | |
| 1093 | nPOR | RN14-6 | U24-44 | U47-7 |
| | U7-84 | | | |
| 1094 | nPROMCS | U56-22 | U7-52 | |
| 1095 | nPSEN | U36-29 | U7-53 | |

| | | | | |
|---|---|---|---|---|
| 1096 | nPSGOOD | K1-10 | K2-10 | U37-20 |
| | U49-5 | | | |
| 1097 | nRD | U24-02 | U36-17 | U57-22 |
| | U7-83 | | | |
| 1098 | nSWCL | K4-10 | U37-16 | |
| 1099 | nSWDATA | U7-13 | U88-11 | |
| 1100 | nTEST | JPRGM-2 | RN14-7 | U7-79 |
| 1101 | nWR | U24-83 | U36-16 | U57-27 |
| | U7-02 | | | |
| 1102 | uPA00 | U24-41 | U46-19 | U56-10 |
| | U57-21 | U7-44 | | |
| 1103 | uPA01 | U24-42 | U46-18 | U56-09 |
| | U57-23 | U7-43 | | |
| 1104 | uPA02 | U24-43 | U46-17 | U56-08 |
| | U57-24 | U7-42 | | |
| 1105 | uPA03 | U46-16 | U56-07 | U57-25 |
| | U7-41 | | | |
| 1106 | uPA04 | U46-15 | U56-06 | U57-26 |
| | U7-38 | | | |
| 1107 | uPA05 | U46-14 | U56-05 | U57-01 |
| | U7-37 | | | |
| 1108 | uPA06 | U46-13 | U56-04 | U57-02 |
| | U7-36 | | | |
| 1109 | uPA07 | U46-12 | U56-03 | U57-03 |
| | U7-35 | | | |
| 1110 | uPA08 | U36-21 | U56-02 | U57-04 |
| | U7-34 | | | |
| 1111 | uPA09 | U36-22 | U56-01 | U57-05 |
| | U7-33 | | | |
| 1112 | uPA10 | U36-23 | U56-27 | U57-06 |
| | U7-31 | | | |
| 1113 | uPA11 | U36-24 | U56-26 | U57-07 |
| | U7-46 | | | |
| 1114 | uPA12 | U36-25 | U56-25 | U57-08 |
| | U7-47 | | | |

| | | | | |
|---|---|---|---|---|
| 1115 | uPA13 | U36-26 | U56-24 | U57-09 |
| | | U7-48 | | |
| 1116 | uPA14 | U36-27 | U56-23 | U57-10 |
| | | U7-49 | | |
| 1117 | uPA15 | U36-28 | U7-50 | |
| 1118 | uPD0 | U10-2 | U15-2 | U17-2 |
| | | U18-2 | U24-10 | U26-2 |
| | | U31-2 | U36-39 | U46-2 |
| | | U56-11 | U57-11 | U7-58 |
| | | U88-2 | | |
| 1119 | uPD1 | U10-3 | U15-3 | U17-3 |
| | | U18-3 | U24-21 | U26-3 |
| | | U31-3 | U36-38 | U46-3 |
| | | U56-12 | U57-12 | U7-70 |
| | | U88-3 | | |
| 1120 | uPD2 | U10-4 | U15-4 | U17-4 |
| | | U18-4 | U24-30 | U26-4 |
| | | U31-4 | U36-37 | U46-4 |
| | | U56-13 | U57-13 | U7-15 |
| | | U88-4 | | |
| 1121 | uPD3 | U10-5 | U15-5 | U17-5 |
| | | U18-5 | U24-38 | U26-5 |
| | | U31-5 | U36-36 | U46-5 |
| | | U56-15 | U57-15 | U88-5 |
| 1122 | uPD4 | U10-6 | U15-6 | U17-6 |
| | | U18-6 | U24-47 | U26-6 |
| | | U31-6 | U36-35 | U46-6 |
| | | U56-16 | U57-16 | U88-6 |
| 1123 | uPD5 | U10-7 | U15-7 | U17-7 |
| | | U18-7 | U24-57 | U26-7 |
| | | U31-7 | U36-34 | U46-7 |
| | | U56-17 | U57-17 | U88-7 |
| 1124 | uPD6 | U10-8 | U15-8 | U17-8 |
| | | U18-8 | U24-72 | U26-8 |
| | | U31-8 | U36-33 | U46-8 |
| | | U56-18 | U57-18 | U88-8 |
| 1125 | uPD7 | U10-9 | U15-9 | U17-9 |
| | | U18-9 | U24-80 | U26-9 |
| | | U31-9 | U36-32 | U46-9 |
| | | U56-19 | U57-19 | U88-9 |
| 1126 | uPOK | RN14-5 | U24-13 | U47-8 |
| | | U49-2 | | |

| 1127 | uPRST | U36-09 | U7-76 |
| 1128 | uPTO | U36-14 | U7-56 |

APPENDIX-4 : PARTS LIST AND NETLIST OF VF CARD

PARTS LIST OF VF VARD

| QTY | PART# | DESCRIPTION | MANUF | LOCATION |
|---|---|---|---|---|
| 1 | 74PCT138 | DIP | IDT | U13 |
| 3 | 74HCT374 | DIP | | U24 33 34 |
| 4 | 74HCT645 | DIP | | U38 39 40 41 |
| 2 | uA733 | AMPLIFIER DIP | | U10 28 |
| 3 | LM1458 | DIP CAP | | U204 205 208 |
| 1 | IDT7MP4036S25Z | 64KX32 RAM 64ZIP | IDT | U37 |
| 2 | PALC22V10B-15JC | PAL, 28-PLCC | CYPRS | U27 35 |
| 1 | DS2249PH | CHIP | DALLS | U207 |
| 1 | AMPAL23S8-25PC | PAL, 20 PIN DIP | AMD | U36 |
| 2 | TCM2913 | CHIP | INTL | U202 203 |
| 1 | TMS320C30-GEL | DSP 181 PGA | TI | U19 |
| 1 | EPM5064LC | OTP 44PLCC 35nS | ALTER | U32 |
| 2 | EPM5128JC | 68PLCC 35nS | ALTER | U31 200 |
| 3 | EP610LC-25 | OTP 28PLCC 25nS | ALTER | U16 23 25 |
| 2 | IDT7133S-55J | 2KX16 DPRAM 55nSIDT | | U20 21 |
| 2 | IDT7134S-70J | 4KX DPRAM 70nS | IDT | U5 6 |
| 1 | CY7C429-25JC | 2K X9 FIFO 25nS | CYPRS | U29 |
| 2 | BT8069BKPJ | E1 LINE I/F | ROCKW | U9 18 |
| 2 | BT8070KPJ | E1 TRANSCEIVER | ROCKW | U25 26 |
| 2 | BT8075KPJ | CRC-4 CODEC | ROCKW | U8 17 |
| 1 | MH88610 | CHIP | MITEL | U206 |
| 2 | 814-AG11D-ESL | DIP 14 .3W | AUGAT | U10 28 |
| 1 | 820-AG11D-ESL | DIP 20 .3W | AUGAT | U36 |
| 7 | PCS-028A-1 | 28 PLCC SOCK. | AUGAT | U8 16 17 23 25 27 35 |
| 1 | PCS-032A-1 | 32 PLCC SOCK. | AUGAT | U29 |
| 3 | PCS-044A-1 | 44 PLCC SOCK. | AUGAT | U9 18 32 |
| 2 | PCS-052A-1 | 52 PLCC SOCK. | AUGAT | U5 6 |
| 6 | PCS-068A-1 | 68 PLCC SOCK. | AUGAT | U7 20 21 26 31 X200 |
| 1 | MPAS-181-ZSGT-15 | 181 PGA SOCK. | SMTEC | U19 |
| 1 | 821828-2 | SIMM SOCKET | AMP | X207 |
| 4 | TAP106K025SCS | 10uF 25V .1LS | | C250-253 |
| 8 | T356K226K035AS | 226K 22 uF TANT | KEMET | C2 11 31 48 51 C52 53 55 |
| 4 | TAP335K025SCS | 3.3uF 25V | | C202 205 206 207 |
| 2 | T356K476K025AS | T476K 47 uF | KEMET | C9 28 |
| 2 | TAP685K016CCS | T685K 16V .2LS | AVX | C63 64 |
| 2 | TAP686K016CCS | T686K 16V .2LS | AVX | C61 62 |
| 1 | UDN2596A | DIP CAP | SPRAG | U201 |
| 1 | NRE100-25 | 100uF 25V MICA | | C60 |
| 4 | RPE110X7R102K | .001uF 25V | | C200 201 203 204 |
| 15 | CK05BX103K | 103K .01 uF .2LS | KEMET | C19 20 21 38 39 40 |
| 4 | CK05BX104K | 104K .1 uF .2LS | KEMET | C7 8 26 27 |
| 4 | RPE113X7R105K | 105K 1.0 uF .2LS | | C24 25 35 41 |
| 20 | C322C224K-5R5CA | 224K .22 uF .2LS | KEMET | C3 4 6 15-18 30 32 C33 45-47 49 50 54 56-59 |
| 6 | CK05BX332K | 332K .2LS | KEMET | C22 23 36 37 |

| Qty | Part | Description | Mfr | Ref |
|---|---|---|---|---|
| 2 | CK05BX470K | 470K 47 pF | | C10 29 |
| 1 | RPE110X7R471K | 470pF 25V | | C210 |
| 5 | 503AHL | 0.6 GRID .05 uF | ROGRS | U7 26 20 21 |
| 1 | 123ADG | | ROGRS | U19 |
| 2 | RTT-87-02 | DUAL BANTAM | PCE | SWTCH J1 2 |
| 1 | 154-UL6443 | HANDSET RJ11 | MOUSR | J200 |
| 1 | 154-UL6643 | HANDSET RJ11 | MOUSR | J201 |
| 9 | 1N914 | DIODE | | D01-09 |
| 1 | 1N4003 | DIODE | MOTO | D200 |
| 1 | 1N4740 | DIODE | MOTO | D201 |
| 2 | 800-1087 | 8.192 MHz 2 PIN | STDCR | X1 2 |
| 1 | STD-XTL or F1100E | 32,000 MHz 4PIN | FOX | U11 |
| 1 | 814-030 | OSCILL SPACER | | U11 |
| 7 | TQ2E-5V | 2C RELAY | AROMT | K1-7 |
| 8 | TN2E-12V | RELAY | AROMT | K200-207 |
| 2 | RESISTOR | 51 ohm 1/2W 5% | | R25 25 |
| 1 | RESISTOR | 600ohm 1/2w | | R200 |
| 2 | RESISTOR | 0 ohm 1/4w 5% | | R500 501 |
| 2 | RESISTOR | 20 ohm 1/4W 5% | | R23 27 |
| 2 | RESISTOR | 75 ohm 1/4W 5% | | R7 21 |
| 2 | RESISTOR | 120 ohm 1/4W 5% | | R8 22 |
| 1 | RESISTOR | 330 ohm 1/4w | | R201 |
| 4 | RESISTOR | 470 ohm 1/4 W 5% | | R1 2 10 11 |
| 1 | RESISTOR | 560 ohm 1/4w | | R202 |
| 1 | RESISTOR | 600 ohm 1/4w | | R211 |
| 14 | RESISTOR | 1 K ohm 1/4W 5% | | R12 13 14 15 |
| 4 | RESISTOR | 3 K ohm 1/4W 5% | | R3 5 17 19 |
| 4 | RESISTOR | 4.7K ohm 1/4W 5% | | R4 6 18 20 |
| 13 | RESISTOR | 10 K ohm 1/4W 5% | | R24 |
| 4 | RESISTOR | 51K ohm 1/4w | | R229 231 233 234 |
| 1 | RESISTOR | 1 M ohm 1/4w | | R232 |
| 5 | 3266W-1-503 | 50K TRIM POT | | VR200-204 |
| 2 | 4310R-101-102 | S10-B-1 K ohm | BORNS | RN1 2 |
| 3 | BL01RN1-A62 | INDTR 50mH 5% | MURAT | L1 2 3 |
| 2 | PE64943 | TRANSFORMER | PULSE | TX1 2 |
| 2 | 671-1934 | TRANSFORMER | MIDCOM | T200 201 |
| 1 | | VARISTOR | | Z200 |
| 1 | LT2 | END PLATE | ABLE | |

NETLIST OF VF CARD

| | | |
|---|---|---|
| +12V | C252 | 1 |
| +12V | C259 | 1 |
| +12V | C260 | 1 |
| +12V | JPR5 | 1 |
| +12V | K200 | 1 |
| +12V | K201 | 1 |
| +12V | K202 | 1 |
| +12V | K203 | 1 |
| +12V | K204 | 1 |
| +12V | K205 | 1 |
| +12V | K206 | 1 |
| +12V | K207 | 1 |
| +12V | L1 | 1 |
| +12V | L2 | 1 |
| +12V | P1B | 9 |
| +12V | R25 | 1 |
| +12V | U201 | 10 |
| +12V | U204 | 8 |
| +12V | U205 | 8 |
| +12V | U208 | 8 |
| +5-12 | D1 | 1 |
| +5-12 | D2 | 1 |
| +5-12 | D3 | 1 |
| +5-12 | D4 | 1 |
| +5-12 | D5 | 1 |
| +5-12 | D6 | 1 |
| +5-12 | D7 | 1 |
| +5-12 | JPR4 | 2 |
| +5-12 | JPR5 | 2 |
| +5-12 | K1 | 1 |
| +5-12 | K2 | 1 |
| +5-12 | K3 | 1 |
| +5-12 | K4 | 1 |
| +5-12 | K5 | 1 |
| +5-12 | K6 | 1 |
| +5-12 | K7 | 1 |
| +5V | C1 | 1 |
| +5V | C13 | 1 |
| +5V | C13 | 3 |
| +5V | C13 | 5 |
| +5V | C13 | 7 |
| +5V | C16 | 1 |
| +5V | C17 | 1 |
| +5V | C18 | 1 |
| +5V | C2 | 1 |
| +5V | C250 | 1 |
| +5V | C254 | 1 |
| +5V | C255 | 1 |
| +5V | C256 | 1 |
| +5V | C257 | 1 |
| +5V | C26 | 1 |

| | | |
|---|---|---|
| +5V | C30 | 1 |
| +5V | C31 | 1 |
| +5V | C31X | 1 |
| +5V | C31X | 3 |
| +5V | C31X | 5 |
| +5V | C31X | 7 |
| +5V | C32X | 1 |
| +5V | C32X | 3 |
| +5V | C33 | 1 |
| +5V | C34 | 1 |
| +5V | C34 | 3 |
| +5V | C34 | 5 |
| +5V | C34 | 7 |
| +5V | C4 | 1 |
| +5V | C42 | 1 |
| +5V | C42 | 3 |
| +5V | C43 | 1 |
| +5V | C43 | 3 |
| +5V | C43 | 5 |
| +5V | C43 | 7 |
| +5V | C44 | 1 |
| +5V | C44 | 3 |
| +5V | C44 | 5 |
| +5V | C44 | 7 |
| +5V | C45 | 1 |
| +5V | C46 | 1 |
| +5V | C47 | 1 |
| +5V | C48 | 1 |
| +5V | C49 | 1 |
| +5V | C5 | 1 |
| +5V | C5 | 3 |
| +5V | C5 | 5 |
| +5V | C5 | 7 |
| +5V | C50 | 1 |
| +5V | C51 | 1 |
| +5V | C55 | 1 |
| +5V | C56 | 1 |
| +5V | C57 | 1 |
| +5V | C58 | 1 |
| +5V | C59 | 1 |
| +5V | C6 | 1 |
| +5V | C60 | 1 |
| +5V | C61 | 1 |
| +5V | C62 | 1 |
| +5V | C7 | 1 |
| +5V | JPR4 | 1 |
| +5V | L3 | 2 |
| +5V | R201 | 1 |
| +5V | R228 | 1 |
| +5V | R28 | 1 |
| +5V | RN1 | 1 |
| +5V | RN2 | 1 |
| +5V | RN3 | 8 |
| +5V | TP10 | 1 |

| | | |
|---|---|---|
| +5V | TP11 | 1 |
| +5V | TP2 | 1 |
| +5V | TP4 | 1 |
| +5V | U11 | 14 |
| +5V | U13 | 16 |
| +5V | U16 | 1 |
| +5V | U16 | 28 |
| +5V | U17 | 8 |
| +5V | U18 | 13 |
| +5V | U19 | 49 |
| +5V | U19 | 53 |
| +5V | U19 | 57 |
| +5V | U19 | 65 |
| +5V | U19 | 74 |
| +5V | U19 | 89 |
| +5V | U19 | 90 |
| +5V | U19 | 91 |
| +5V | U19 | 92 |
| +5V | U19 | 98 |
| +5V | U19 | 99 |
| +5V | U19 | 104 |
| +5V | U19 | 105 |
| +5V | U19 | 106 |
| +5V | U19 | 107 |
| +5V | U19 | 112 |
| +5V | U19 | 113 |
| +5V | U19 | 114 |
| +5V | U19 | 116 |
| +5V | U19 | 121 |
| +5V | U19 | 122 |
| +5V | U19 | 124 |
| +5V | U19 | 128 |
| +5V | U19 | 132 |
| +5V | U20 | 17 |
| +5V | U20 | 68 |
| +5V | U200 | 3 |
| +5V | U200 | 20 |
| +5V | U200 | 37 |
| +5V | U200 | 54 |
| +5V | U201 | 20 |
| +5V | U202 | 5 |
| +5V | U202 | 6 |
| +5V | U202 | 20 |
| +5V | U203 | 5 |
| +5V | U203 | 6 |
| +5V | U203 | 20 |
| +5V | U206 | 12 |
| +5V | U207 | 10 |
| +5V | U207 | 17 |
| +5V | U207 | 20 |
| +5V | U21 | 17 |
| +5V | U21 | 68 |
| +5V | U23 | 1 |
| +5V | U23 | 28 |
| +5V | TP11 | 1 |
| +5V | TP2 | 1 |

| | | |
|---|---|---|
| +5V | U24 | 20 |
| +5V | U25 | 1 |
| +5V | U25 | 28 |
| +5V | U26 | 68 |
| +5V | U27 | 28 |
| +5V | U29 | 32 |
| +5V | U31 | 3 |
| +5V | U31 | 20 |
| +5V | U31 | 37 |
| +5V | U31 | 54 |
| +5V | U32 | 3 |
| +5V | U32 | 14 |
| +5V | U32 | 25 |
| +5V | U32 | 36 |
| +5V | U33 | 20 |
| +5V | U34 | 20 |
| +5V | U35 | 28 |
| +5V | U36 | 20 |
| +5V | U37 | 12 |
| +5V | U37 | 53 |
| +5V | U38 | 20 |
| +5V | U39 | 1 |
| +5V | U39 | 20 |
| +5V | U40 | 1 |
| +5V | U40 | 20 |
| +5V | U41 | 20 |
| +5V | U5 | 52 |
| +5V | U6 | 52 |
| +5V | U7 | 68 |
| +5V | U8 | 8 |
| +5V | U9 | 13 |
| +5V-PC | L3 | 1 |
| +5V-PC | P1B | 3 |
| +5V-PC | P1B | 29 |
| +5V-PC | P2D | 16 |
| -12V | C253 | 1 |
| -12V | C261 | 1 |
| -12V | C262 | 1 |
| -12V | P1B | 7 |
| -12V | R226 | 1 |
| -12V | U204 | 4 |
| -12V | U205 | 4 |
| -12V | U206 | 18 |
| -12V | U208 | 4 |
| -5V | C251 | 1 |
| -5V | C258 | 1 |
| -5V | P1B | 5 |
| -5V | R28 | 2 |
| -5V | U202 | 1 |
| -5V | U202 | 7 |
| -5V | U202 | 15 |
| -5V | U203 | 1 |
| -5V | U203 | 7 |
| -5V | U203 | 15 |

| | | |
|---|---|---|
| -5V | U206 | 5 |
| 1006042 | C22 | 1 |
| 1006042 | J1 | 5 |
| 1006042 | J3 | 4 |
| 1006042 | R7 | 2 |
| 1006042 | R8 | 2 |
| 1010039 | J1 | 3 |
| 1010039 | J3 | 5 |
| 1010039 | K4 | 3 |
| 1029038 | C23 | 1 |
| 1029038 | K3 | 3 |
| 1029038 | K4 | 4 |
| 1030064 | C37 | 1 |
| 1030064 | K3 | 8 |
| 1030064 | K4 | 7 |
| 1035068 | K3 | 4 |
| 1035068 | R8 | 1 |
| 1035069 | K3 | 7 |
| 1035069 | R22 | 1 |
| 1035075 | K3 | 9 |
| 1035075 | K6 | 8 |
| 1036021 | C51 | 2 |
| 1036021 | D8 | 1 |
| 1036021 | D9 | 1 |
| 1036021 | R24 | 2 |
| 1036021 | U32 | 13 |
| 1036021 | U36 | 11 |
| 1046041 | C22 | 2 |
| 1046041 | K2 | 8 |
| 1047038 | C23 | 2 |
| 1047038 | K2 | 3 |
| 1053037 | K2 | 4 |
| 1053037 | R3 | 1 |
| 1053038 | K2 | 2 |
| 1053038 | R4 | 1 |
| 1053040 | K2 | 7 |
| 1053040 | R5 | 1 |
| 1053041 | K2 | 9 |
| 1053041 | R6 | 1 |
| 1053050 | K3 | 2 |
| 1053050 | K6 | 3 |
| 1056068 | J1 | 10 |
| 1056068 | J3 | 1 |
| 1056068 | TX1 | 6 |
| 1060037 | C10 | 1 |
| 1060037 | R1 | 2 |
| 1060037 | R3 | 2 |
| 1060037 | R4 | 2 |
| 1060037 | U10 | 1 |
| 1060042 | C10 | 2 |
| 1060042 | R2 | 2 |
| 1060042 | R5 | 2 |
| 1060042 | R6 | 2 |
| 1060042 | U10 | 14 |

| | | |
|---|---|---|
| 1060065 | J1 | 8 |
| 1060065 | J3 | 2 |
| 1060065 | R27 | 1 |
| 1067065 | R27 | 2 |
| 1067065 | TX1 | 2 |
| 1077065 | C24 | 1 |
| 1077065 | TX1 | 1 |
| 1077067 | C25 | 1 |
| 1077067 | TX1 | 3 |
| 1093042 | K1 | 7 |
| 1093042 | R9 | 1 |
| 1093042 | R9 | 2 |
| 1093042 | U10 | 12 |
| 1102038 | C19 | 1 |
| 1102038 | U10 | 7 |
| 1102039 | C20 | 1 |
| 1102039 | U10 | 8 |
| 2008027 | C36 | 1 |
| 2008027 | J2 | 5 |
| 2008027 | J3 | 9 |
| 2008027 | R21 | 2 |
| 2008027 | R22 | 2 |
| 2031051 | K6 | 4 |
| 2031051 | R7 | 1 |
| 2031052 | K6 | 7 |
| 2031052 | R21 | 1 |
| 2047024 | C37 | 2 |
| 2047024 | K5 | 3 |
| 2047027 | C36 | 2 |
| 2047027 | K5 | 8 |
| 2053023 | K5 | 4 |
| 2053023 | R17 | 1 |
| 2053024 | K5 | 2 |
| 2053024 | R18 | 1 |
| 2053026 | K5 | 7 |
| 2053026 | R19 | 1 |
| 2053027 | K5 | 9 |
| 2053027 | R20 | 1 |
| 2057064 | J2 | 10 |
| 2057064 | J3 | 6 |
| 2057064 | TX2 | 6 |
| 2060023 | C29 | 1 |
| 2060023 | R11 | 2 |
| 2060023 | R17 | 2 |
| 2060023 | R18 | 2 |
| 2060023 | U28 | 1 |
| 2060028 | C29 | 2 |
| 2060028 | R10 | 2 |
| 2060028 | R19 | 2 |
| 2060028 | R20 | 2 |
| 2060028 | U28 | 14 |
| 2061061 | J2 | 8 |
| 2061061 | J3 | 7 |
| 2061061 | R23 | 1 |

| | | |
|---|---|---|
| 2068061 | R23 | 2 |
| 2068061 | TX2 | 2 |
| 2077061 | C35 | 1 |
| 2077061 | TX2 | 1 |
| 2077063 | C41 | 1 |
| 2077063 | TX2 | 3 |
| 2093028 | K7 | 7 |
| 2093028 | R16 | 1 |
| 2093028 | R16 | 2 |
| 2093028 | U28 | 12 |
| 2102024 | C38 | 1 |
| 2102024 | U28 | 7 |
| 2102025 | C39 | 1 |
| 2102025 | U28 | 8 |
| 3047036 | C52 | 1 |
| 3047036 | R25 | 2 |
| 4011017 | U9 | 7 |
| 4011017 | X1 | 1 |
| 4011021 | U9 | 8 |
| 4011021 | X1 | 2 |
| 4016025 | U8 | 3 |
| 4016025 | U9 | 22 |
| 4016026 | U8 | 2 |
| 4016026 | U9 | 23 |
| 4030010 | U8 | 16 |
| 4030010 | U9 | 26 |
| 4030011 | U8 | 17 |
| 4030011 | U9 | 27 |
| 4047005 | U7 | 20 |
| 4047005 | U8 | 5 |
| 5011017 | U18 | 7 |
| 5011017 | X2 | 1 |
| 5011021 | U18 | 8 |
| 5011021 | X2 | 2 |
| 5016025 | U17 | 3 |
| 5016025 | U18 | 22 |
| 5016026 | U17 | 2 |
| 5016026 | U18 | 23 |
| 5030010 | U17 | 16 |
| 5030010 | U18 | 26 |
| 5030011 | U17 | 17 |
| 5030011 | U18 | 27 |
| 5047005 | U17 | 5 |
| 5047005 | U26 | 20 |
| 9062039 | U23 | 6 |
| 9062042 | U23 | 10 |
| 9073016 | U13 | 11 |
| AEMU | RN1 | 4 |
| AEMU | U19 | 69 |
| AEMU | U19 | 75 |
| AEMU | U19 | 76 |
| AGND | C11 | 2 |
| AGND | C201 | 2 |
| AGND | C204 | 2 |

| | | |
|---|---|---|
| AGND | C21 | 2 |
| AGND | C252 | 2 |
| AGND | C253 | 2 |
| AGND | C259 | 2 |
| AGND | C260 | 2 |
| AGND | C261 | 2 |
| AGND | C262 | 2 |
| AGND | C27 | 2 |
| AGND | C28 | 2 |
| AGND | C40 | 2 |
| AGND | C52 | 2 |
| AGND | C53 | 2 |
| AGND | C54 | 2 |
| AGND | C63 | 2 |
| AGND | C64 | 2 |
| AGND | C8 | 2 |
| AGND | C9 | 2 |
| AGND | E250 | 1 |
| AGND | R203 | 1 |
| AGND | R204 | 1 |
| AGND | R207 | 2 |
| AGND | R208 | 2 |
| AGND | R211 | 2 |
| AGND | R213 | 2 |
| AGND | R216 | 2 |
| AGND | R217 | 2 |
| AGND | R220 | 2 |
| AGND | R221 | 2 |
| AGND | R223 | 2 |
| AGND | R225 | 2 |
| AGND | R231 | 2 |
| AGND | R232 | 2 |
| AGND | R26 | 2 |
| AGND | T200 | 3 |
| AGND | T201 | 4 |
| AGND | TP5 | 1 |
| AGND | TP7 | 1 |
| AGND | TP8 | 1 |
| AGND | U10 | 5 |
| AGND | U18 | 34 |
| AGND | U18 | 35 |
| AGND | U202 | 16 |
| AGND | U203 | 16 |
| AGND | U206 | 6 |
| AGND | U207 | 5 |
| AGND | U28 | 5 |
| AGND | U9 | 34 |
| AGND | U9 | 35 |
| AH1CLK | R201 | 2 |
| AH1CLK | R202 | 1 |
| AH1CLK | U19 | 18 |
| AH1CLK | U200 | 25 |
| AH1CLK | U23 | 2 |
| AHOLDA- | U19 | 62 |

| | | |
|---|---|---|
| AHOLDA- | U32 | 44 |
| AINTR0- | U13 | 12 |
| AINTR0- | U32 | 37 |
| AINTR2- | U19 | 96 |
| AINTR2- | U31 | 22 |
| AINTR3- | U19 | 97 |
| AINTR3- | U31 | 23 |
| AIOSTRB | U19 | 73 |
| AIOSTRB | U31 | 19 |
| AOUT+1 | E200 | 1 |
| AOUT+1 | U202 | 2 |
| AOUT+1 | VR201 | 1 |
| AOUT+2 | E201 | 1 |
| AOUT+2 | U203 | 2 |
| AOUT+2 | VR203 | 1 |
| AOUT-1 | E200 | 3 |
| AOUT-1 | U202 | 3 |
| AOUT-1 | VR201 | 3 |
| AOUT-2 | E201 | 3 |
| AOUT-2 | U203 | 3 |
| AOUT-2 | VR203 | 3 |
| APA0 | U19 | 77 |
| APA0 | U20 | 49 |
| APA0 | U21 | 49 |
| APA0 | U37 | 55 |
| APA1 | U19 | 82 |
| APA1 | U20 | 48 |
| APA1 | U21 | 48 |
| APA1 | U37 | 51 |
| APA10 | U19 | 111 |
| APA10 | U20 | 39 |
| APA10 | U21 | 39 |
| APA10 | U37 | 13 |
| APA11 | U19 | 100 |
| APA11 | U37 | 15 |
| APA12 | U19 | 110 |
| APA12 | U37 | 16 |
| APA13 | U19 | 120 |
| APA13 | U37 | 14 |
| APA14 | U19 | 109 |
| APA14 | U37 | 30 |
| APA15 | U19 | 119 |
| APA15 | U37 | 29 |
| APA16 | U19 | 135 |
| APA16 | U37 | 36 |
| APA17 | U19 | 108 |
| APA17 | U37 | 35 |
| APA2 | U19 | 83 |
| APA2 | U20 | 47 |
| APA2 | U21 | 47 |
| APA2 | U37 | 52 |
| APA20 | U13 | 1 |
| APA20 | U19 | 150 |
| APA21 | U13 | 2 |

| | | |
|---|---|---|
| APA21 | U19 | 133 |
| APA22 | U13 | 3 |
| APA22 | U19 | 117 |
| APA23 | U13 | 4 |
| APA23 | U19 | 149 |
| APA3 | U19 | 84 |
| APA3 | U20 | 46 |
| APA3 | U21 | 46 |
| APA3 | U37 | 49 |
| APA4 | U19 | 85 |
| APA4 | U20 | 45 |
| APA4 | U21 | 45 |
| APA4 | U37 | 54 |
| APA5 | U19 | 95 |
| APA5 | U20 | 44 |
| APA5 | U21 | 44 |
| APA5 | U37 | 17 |
| APA6 | U19 | 94 |
| APA6 | U20 | 43 |
| APA6 | U21 | 43 |
| APA6 | U37 | 48 |
| APA7 | U19 | 103 |
| APA7 | U20 | 42 |
| APA7 | U21 | 42 |
| APA7 | U37 | 50 |
| APA8 | U19 | 102 |
| APA8 | U20 | 41 |
| APA8 | U21 | 41 |
| APA8 | U37 | 18 |
| APA9 | U19 | 101 |
| APA9 | U20 | 40 |
| APA9 | U21 | 40 |
| APA9 | U37 | 47 |
| APBUS0- | RN1 | 3 |
| APBUS0- | U20 | 50 |
| APBUS0- | U21 | 50 |
| APBUS0- | U23 | 4 |
| APCS0- | U13 | 15 |
| APCS0- | U20 | 51 |
| APCS0- | U21 | 51 |
| APCS0- | U23 | 3 |
| APD0 | U19 | 34 |
| APD0 | U21 | 19 |
| APD0 | U37 | 63 |
| APD1 | U19 | 50 |
| APD1 | U21 | 20 |
| APD1 | U37 | 61 |
| APD10 | U19 | 5 |
| APD10 | U21 | 29 |
| APD10 | U37 | 41 |
| APD11 | U19 | 21 |
| APD11 | U21 | 30 |
| APD11 | U37 | 43 |
| APD12 | U19 | 52 |

| | | |
|---|---|---|
| APD12 | U21 | 31 |
| APD12 | U37 | 11 |
| APD13 | U19 | 6 |
| APD13 | U21 | 32 |
| APD13 | U37 | 44 |
| APD14 | U19 | 37 |
| APD14 | U21 | 33 |
| APD14 | U37 | 45 |
| APD15 | U19 | 22 |
| APD15 | U21 | 34 |
| APD15 | U37 | 46 |
| APD16 | U19 | 7 |
| APD16 | U20 | 19 |
| APD16 | U37 | 26 |
| APD17 | U19 | 8 |
| APD17 | U20 | 20 |
| APD17 | U37 | 23 |
| APD18 | U19 | 23 |
| APD18 | U20 | 21 |
| APD18 | U37 | 40 |
| APD19 | U19 | 9 |
| APD19 | U20 | 22 |
| APD19 | U37 | 24 |
| APD2 | U19 | 2 |
| APD2 | U21 | 21 |
| APD2 | U37 | 62 |
| APD20 | U19 | 24 |
| APD20 | U20 | 23 |
| APD20 | U37 | 9 |
| APD21 | U19 | 39 |
| APD21 | U20 | 24 |
| APD21 | U37 | 7 |
| APD22 | U19 | 10 |
| APD22 | U20 | 25 |
| APD22 | U37 | 21 |
| APD23 | U19 | 54 |
| APD23 | U20 | 26 |
| APD23 | U37 | 5 |
| APD24 | U19 | 25 |
| APD24 | U20 | 27 |
| APD24 | U37 | 10 |
| APD25 | U19 | 11 |
| APD25 | U20 | 28 |
| APD25 | U37 | 22 |
| APD26 | U19 | 40 |
| APD26 | U20 | 29 |
| APD26 | U37 | 8 |
| APD27 | U19 | 26 |
| APD27 | U20 | 30 |
| APD27 | U37 | 25 |
| APD28 | U19 | 12 |
| APD28 | U20 | 31 |
| APD28 | U37 | 19 |
| APD29 | U19 | 55 |

| | | |
|---|---|---|
| APD29 | U20 | 32 |
| APD29 | U37 | 4 |
| APD3 | U19 | 3 |
| APD3 | U21 | 22 |
| APD3 | U37 | 59 |
| APD30 | U19 | 41 |
| APD30 | U20 | 33 |
| APD30 | U37 | 6 |
| APD31 | U19 | 27 |
| APD31 | U20 | 34 |
| APD31 | U37 | 20 |
| APD4 | U19 | 19 |
| APD4 | U21 | 23 |
| APD4 | U37 | 60 |
| APD5 | U19 | 35 |
| APD5 | U21 | 24 |
| APD5 | U37 | 57 |
| APD6 | U19 | 51 |
| APD6 | U21 | 25 |
| APD6 | U37 | 58 |
| APD7 | U19 | 4 |
| APD7 | U21 | 26 |
| APD7 | U37 | 56 |
| APD8 | U19 | 20 |
| APD8 | U21 | 27 |
| APD8 | U37 | 42 |
| APD9 | U19 | 36 |
| APD9 | U21 | 28 |
| APD9 | U37 | 39 |
| APMSEL- | U13 | 14 |
| APMSEL- | U23 | 9 |
| APMSEL- | U37 | 31 |
| APMSEL- | U37 | 32 |
| APMSEL- | U37 | 33 |
| APMSEL- | U37 | 34 |
| APMSRB- | RN1 | 9 |
| APMSRB- | U13 | 5 |
| APMSRB- | U19 | 71 |
| APR-W- | U19 | 81 |
| APR-W- | U20 | 36 |
| APR-W- | U20 | 37 |
| APR-W- | U21 | 36 |
| APR-W- | U21 | 37 |
| APR-W- | U37 | 28 |
| ARDY- | U19 | 61 |
| ARDY- | U23 | 12 |
| ARESET- | U19 | 70 |
| ARESET- | U19 | 72 |
| ARESET- | U23 | 13 |
| ARESET- | U31 | 1 |
| ARESET- | U32 | 4 |
| ATCLK0 | R15 | 1 |
| ATCLK0 | U19 | 154 |
| ATCLK1 | R13 | 1 |

| | | |
|---|---|---|
| ATCLK1 | U19 | 140 |
| AVCC | C11 | 1 |
| AVCC | C27 | 1 |
| AVCC | C28 | 1 |
| AVCC | C53 | 1 |
| AVCC | C54 | 1 |
| AVCC | C63 | 1 |
| AVCC | C64 | 1 |
| AVCC | C8 | 1 |
| AVCC | C9 | 1 |
| AVCC | R1 | 1 |
| AVCC | R10 | 1 |
| AVCC | R11 | 1 |
| AVCC | R2 | 1 |
| AVCC | TP6 | 1 |
| AVCC | U18 | 1 |
| AVCC | U18 | 2 |
| AVCC | U9 | 1 |
| AVCC | U9 | 2 |
| AXA0 | U19 | 13 |
| AXA0 | U31 | 65 |
| AXA0 | U5 | 7 |
| AXA0 | U6 | 7 |
| AXA1 | U19 | 14 |
| AXA1 | U31 | 66 |
| AXA1 | U5 | 8 |
| AXA1 | U6 | 8 |
| AXA10 | U19 | 45 |
| AXA10 | U5 | 5 |
| AXA10 | U6 | 5 |
| AXA11 | U19 | 59 |
| AXA11 | U5 | 4 |
| AXA11 | U6 | 4 |
| AXA12 | U19 | 67 |
| AXA12 | U31 | 2 |
| AXA2 | U19 | 56 |
| AXA2 | U31 | 68 |
| AXA2 | U5 | 9 |
| AXA2 | U6 | 9 |
| AXA3 | U19 | 42 |
| AXA3 | U5 | 10 |
| AXA3 | U6 | 10 |
| AXA4 | U19 | 28 |
| AXA4 | U5 | 11 |
| AXA4 | U6 | 11 |
| AXA5 | U19 | 15 |
| AXA5 | U5 | 12 |
| AXA5 | U6 | 12 |
| AXA6 | U19 | 30 |
| AXA6 | U5 | 13 |
| AXA6 | U6 | 13 |
| AXA7 | U19 | 44 |
| AXA7 | U5 | 14 |
| AXA7 | U6 | 14 |

| | | |
|---|---|---|
| AXA8 | U19 | 66 |
| AXA8 | U5 | 15 |
| AXA8 | U6 | 15 |
| AXA9 | U19 | 58 |
| AXA9 | U5 | 16 |
| AXA9 | U6 | 16 |
| AXCS1- | U31 | 38 |
| AXCS1- | U5 | 1 |
| AXCS2- | U31 | 39 |
| AXCS2- | U6 | 1 |
| AXD0 | U19 | 169 |
| AXD0 | U29 | 7 |
| AXD0 | U31 | 63 |
| AXD0 | U34 | 3 |
| AXD0 | U36 | 2 |
| AXD0 | U5 | 17 |
| AXD0 | U6 | 17 |
| AXD1 | U19 | 155 |
| AXD1 | U29 | 6 |
| AXD1 | U31 | 64 |
| AXD1 | U34 | 4 |
| AXD1 | U36 | 3 |
| AXD1 | U5 | 18 |
| AXD1 | U6 | 18 |
| AXD10 | U19 | 158 |
| AXD10 | U24 | 7 |
| AXD10 | U33 | 7 |
| AXD11 | U19 | 173 |
| AXD11 | U24 | 8 |
| AXD11 | U33 | 8 |
| AXD12 | U19 | 174 |
| AXD12 | U24 | 13 |
| AXD12 | U33 | 13 |
| AXD13 | U19 | 159 |
| AXD13 | U24 | 14 |
| AXD13 | U33 | 14 |
| AXD14 | U19 | 144 |
| AXD14 | U24 | 17 |
| AXD14 | U33 | 17 |
| AXD15 | U19 | 175 |
| AXD15 | U24 | 18 |
| AXD15 | U33 | 18 |
| AXD2 | U19 | 141 |
| AXD2 | U29 | 5 |
| AXD2 | U31 | 4 |
| AXD2 | U34 | 7 |
| AXD2 | U36 | 4 |
| AXD2 | U5 | 19 |
| AXD2 | U6 | 19 |
| AXD3 | U19 | 170 |
| AXD3 | U29 | 4 |
| AXD3 | U31 | 5 |
| AXD3 | U34 | 8 |
| AXD3 | U36 | 5 |

| | | |
|---|---|---|
| AXD3 | U5 | 20 |
| AXD3 | U6 | 20 |
| AXD4 | U19 | 156 |
| AXD4 | U29 | 31 |
| AXD4 | U31 | 12 |
| AXD4 | U34 | 13 |
| AXD4 | U36 | 6 |
| AXD4 | U5 | 21 |
| AXD4 | U6 | 21 |
| AXD5 | U19 | 127 |
| AXD5 | U29 | 30 |
| AXD5 | U31 | 13 |
| AXD5 | U34 | 14 |
| AXD5 | U36 | 7 |
| AXD5 | U5 | 22 |
| AXD5 | U6 | 22 |
| AXD6 | U19 | 171 |
| AXD6 | U29 | 29 |
| AXD6 | U31 | 24 |
| AXD6 | U34 | 17 |
| AXD6 | U36 | 8 |
| AXD6 | U5 | 23 |
| AXD6 | U6 | 23 |
| AXD7 | U19 | 142 |
| AXD7 | U29 | 28 |
| AXD7 | U31 | 25 |
| AXD7 | U34 | 18 |
| AXD7 | U36 | 9 |
| AXD7 | U5 | 24 |
| AXD7 | U6 | 24 |
| AXD8 | U19 | 157 |
| AXD8 | U24 | 3 |
| AXD8 | U33 | 3 |
| AXD9 | U19 | 172 |
| AXD9 | U24 | 4 |
| AXD9 | U33 | 4 |
| AXDLAT1 | U31 | 48 |
| AXDLAT1 | U33 | 11 |
| AXDLAT1 | U36 | 1 |
| AXDLAT2 | U24 | 11 |
| AXDLAT2 | U31 | 49 |
| AXDLAT2 | U34 | 11 |
| AXF0 | U19 | 79 |
| AXF0 | U27 | 12 |
| AXR-W- | U19 | 46 |
| AXR-W- | U31 | 21 |
| AXR-W- | U5 | 2 |
| AXR-W- | U6 | 2 |
| AXSTRB- | U19 | 63 |
| AXSTRB- | U31 | 18 |
| BALE | P1B | 28 |
| BALE | U35 | 13 |
| BDX0 | U19 | 166 |
| BEMU | RN1 | 8 |

| | | |
|---|---|---|
| BH1CLK | U23 | 16 |
| BHOLDA- | U32 | 39 |
| BINTR0- | U32 | 38 |
| BINTR1- | U13 | 13 |
| BINTR2- | U31 | 30 |
| BINTR3- | U31 | 31 |
| BOARDCS | U32 | 11 |
| BOARDCS | U35 | 21 |
| BPBUS0- | RN1 | 6 |
| BPBUS0- | U23 | 25 |
| BPCS0- | U23 | 26 |
| BPMSEL- | U23 | 17 |
| BPMSEL- | U23 | 20 |
| BPMSRB- | RN1 | 10 |
| BPV-1 | U31 | 35 |
| BPV-1 | U8 | 7 |
| BPV-2 | U17 | 7 |
| BPV-2 | U31 | 36 |
| BRDY- | U23 | 18 |
| BRESET- | U23 | 27 |
| BRESET- | U32 | 42 |
| BTCLK0 | R14 | 1 |
| BTCLK1 | R12 | 1 |
| BXF0 | U27 | 13 |
| C208-2 | C208 | 2 |
| C208-2 | R229 | 1 |
| C209-2 | C209 | 2 |
| C209-2 | R230 | 1 |
| CB-1 | U33 | 19 |
| CB-1 | U9 | 36 |
| CB-2 | U18 | 36 |
| CB-2 | U34 | 2 |
| CHGND | J1 | 1 |
| CHGND | J1 | 6 |
| CHGND | J2 | 1 |
| CHGND | J2 | 6 |
| CHGND | J3 | 3 |
| CHGND | J3 | 8 |
| CHGND | MT2 | 1 |
| CHGND | MT6 | 1 |
| CLKIN | U11 | 8 |
| CLKIN | U19 | 16 |
| CRCEN-1 | U17 | 13 |
| CRCEN-1 | U33 | 5 |
| CRCEN-1 | U8 | 13 |
| CRCER-1 | U31 | 8 |
| CRCER-1 | U8 | 9 |
| CRCER-2 | U17 | 9 |
| CRCER-2 | U31 | 9 |
| CTEN-1 | U16 | 17 |
| CTEN-1 | U31 | 58 |
| CTEN-2 | U25 | 17 |
| CTEN-2 | U31 | 57 |
| DP-CS1- | U16 | 24 |

| | | |
|---|---|---|
| DP-CS1- | U5 | 51 |
| DP-CS2- | U25 | 24 |
| DP-CS2- | U6 | 51 |
| DPA0-1 | U16 | 4 |
| DPA0-1 | U5 | 45 |
| DPA0-2 | U25 | 4 |
| DPA0-2 | U6 | 45 |
| DPA1-1 | U16 | 5 |
| DPA1-1 | U5 | 44 |
| DPA1-2 | U25 | 5 |
| DPA1-2 | U6 | 44 |
| DPA10-1 | U16 | 21 |
| DPA10-1 | U5 | 47 |
| DPA10-2 | U25 | 21 |
| DPA10-2 | U6 | 47 |
| DPA11-1 | U16 | 22 |
| DPA11-1 | U5 | 48 |
| DPA11-2 | U25 | 22 |
| DPA11-2 | U6 | 48 |
| DPA2-1 | U16 | 6 |
| DPA2-1 | U5 | 43 |
| DPA2-2 | U25 | 6 |
| DPA2-2 | U6 | 43 |
| DPA3-1 | U16 | 7 |
| DPA3-1 | U5 | 42 |
| DPA3-2 | U25 | 7 |
| DPA3-2 | U6 | 42 |
| DPA4-1 | U16 | 8 |
| DPA4-1 | U5 | 41 |
| DPA4-2 | U25 | 8 |
| DPA4-2 | U6 | 41 |
| DPA5-1 | U16 | 9 |
| DPA5-1 | U5 | 40 |
| DPA5-2 | U25 | 9 |
| DPA5-2 | U6 | 40 |
| DPA6-1 | U16 | 10 |
| DPA6-1 | U5 | 39 |
| DPA6-2 | U25 | 10 |
| DPA6-2 | U6 | 39 |
| DPA7-1 | U16 | 12 |
| DPA7-1 | U5 | 38 |
| DPA7-2 | U25 | 12 |
| DPA7-2 | U6 | 38 |
| DPA8-1 | U16 | 18 |
| DPA8-1 | U5 | 37 |
| DPA8-2 | U25 | 18 |
| DPA8-2 | U6 | 37 |
| DPA9-1 | U16 | 20 |
| DPA9-1 | U5 | 36 |
| DPA9-2 | U25 | 20 |
| DPA9-2 | U6 | 36 |
| DSPINTR | U19 | 86 |
| DSPINTR | U200 | 26 |
| E1CLK | U200 | 61 |

| | | |
|---|---|---|
| E1CLK | U202 | 11 |
| E1CLK | U203 | 11 |
| E1CLKF | U17 | 23 |
| E1CLKF | U18 | 44 |
| E1CLKF | U200 | 44 |
| E1CLKF | U26 | 10 |
| E1CLKF | U31 | 27 |
| E1CLKN | U200 | 46 |
| E1CLKN | U31 | 26 |
| E1CLKN | U7 | 10 |
| E1CLKN | U8 | 23 |
| E1CLKN | U9 | 44 |
| E202-3 | C202 | 2 |
| E202-3 | E202 | 3 |
| E202-3 | R207 | 1 |
| E203-2 | C205 | 2 |
| E203-2 | E203 | 2 |
| E203-2 | R216 | 1 |
| E205-2 | C208 | 1 |
| E205-2 | E205 | 2 |
| E206-2 | C209 | 1 |
| E206-2 | E206 | 2 |
| EF-1 | U29 | 24 |
| EF-1 | U31 | 46 |
| EF-2 | U31 | 44 |
| ELS1-1 | U18 | 38 |
| ELS1-1 | U33 | 6 |
| ELS1-1 | U9 | 38 |
| ES0-1 | U31 | 40 |
| ES0-1 | U9 | 29 |
| ES0-2 | U18 | 29 |
| ES0-2 | U31 | 42 |
| ES1-1 | U31 | 41 |
| ES1-1 | U9 | 30 |
| ES1-2 | U18 | 30 |
| ES1-2 | U31 | 43 |
| FIFO-R1 | RN3 | 4 |
| FIFO-R1 | U29 | 18 |
| FIFO-R1 | U31 | 14 |
| FIFO-R2 | RN3 | 6 |
| FIFO-R2 | U31 | 15 |
| FIFO-RS | RN3 | 3 |
| FIFO-RS | U29 | 25 |
| FIFO-RS | U31 | 53 |
| FIFO-W1 | RN3 | 2 |
| FIFO-W1 | U29 | 2 |
| FIFO-W1 | U31 | 17 |
| FIFO-W2 | RN3 | 7 |
| G2B1 | K1 | 8 |
| G2B1 | U10 | 3 |
| G2B2 | K7 | 8 |
| G2B2 | U28 | 3 |
| GND | C1 | 2 |
| GND | C13 | 2 |

| | | |
|---|---|---|
| GND | C13 | 4 |
| GND | C13 | 6 |
| GND | C13 | 8 |
| GND | C16 | 2 |
| GND | C17 | 2 |
| GND | C18 | 2 |
| GND | C2 | 2 |
| GND | C207 | 2 |
| GND | C25 | 2 |
| GND | C250 | 2 |
| GND | C251 | 2 |
| GND | C254 | 2 |
| GND | C255 | 2 |
| GND | C256 | 2 |
| GND | C257 | 2 |
| GND | C258 | 2 |
| GND | C26 | 2 |
| GND | C30 | 2 |
| GND | C31 | 2 |
| GND | C31X | 2 |
| GND | C31X | 4 |
| GND | C31X | 6 |
| GND | C31X | 8 |
| GND | C32X | 2 |
| GND | C32X | 4 |
| GND | C33 | 2 |
| GND | C34 | 2 |
| GND | C34 | 4 |
| GND | C34 | 6 |
| GND | C34 | 8 |
| GND | C4 | 2 |
| GND | C41 | 2 |
| GND | C42 | 2 |
| GND | C42 | 4 |
| GND | C43 | 2 |
| GND | C43 | 4 |
| GND | C43 | 6 |
| GND | C43 | 8 |
| GND | C44 | 2 |
| GND | C44 | 4 |
| GND | C44 | 6 |
| GND | C44 | 8 |
| GND | C45 | 2 |
| GND | C46 | 2 |
| GND | C47 | 2 |
| GND | C48 | 2 |
| GND | C49 | 2 |
| GND | C5 | 2 |
| GND | C5 | 4 |
| GND | C5 | 6 |
| GND | C5 | 8 |
| GND | C50 | 2 |
| GND | C55 | 2 |
| GND | C56 | 2 |

| | | |
|---|---|---|
| GND | C57 | 2 |
| GND | C58 | 2 |
| GND | C59 | 2 |
| GND | C6 | 2 |
| GND | C60 | 2 |
| GND | C61 | 2 |
| GND | C62 | 2 |
| GND | C7 | 2 |
| GND | D200 | 1 |
| GND | D201 | 1 |
| GND | D9 | 2 |
| GND | E204 | 2 |
| GND | E250 | 2 |
| GND | JPR1 | 2 |
| GND | JPR2 | 2 |
| GND | JPR3 | 2 |
| GND | MT3 | 1 |
| GND | MT4 | 1 |
| GND | P1B | 1 |
| GND | P1B | 10 |
| GND | P1B | 31 |
| GND | P2D | 18 |
| GND | R202 | 2 |
| GND | R227 | 1 |
| GND | R24 | 1 |
| GND | R26 | 1 |
| GND | RN3 | 1 |
| GND | TP1 | 1 |
| GND | TP12 | 1 |
| GND | TP3 | 1 |
| GND | TP9 | 1 |
| GND | U11 | 7 |
| GND | U13 | 8 |
| GND | U16 | 14 |
| GND | U16 | 15 |
| GND | U17 | 22 |
| GND | U18 | 12 |
| GND | U19 | 17 |
| GND | U19 | 29 |
| GND | U19 | 33 |
| GND | U19 | 38 |
| GND | U19 | 43 |
| GND | U19 | 47 |
| GND | U19 | 60 |
| GND | U19 | 64 |
| GND | U19 | 88 |
| GND | U19 | 93 |
| GND | U19 | 138 |
| GND | U19 | 143 |
| GND | U19 | 148 |
| GND | U19 | 164 |
| GND | U20 | 18 |
| GND | U20 | 35 |
| GND | U20 | 38 |

| | | |
|---|---|---|
| GND | U200 | 16 |
| GND | U200 | 33 |
| GND | U200 | 50 |
| GND | U200 | 67 |
| GND | U201 | 2 |
| GND | U201 | 12 |
| GND | U202 | 10 |
| GND | U203 | 10 |
| GND | U206 | 2 |
| GND | U207 | 1 |
| GND | U207 | 8 |
| GND | U207 | 9 |
| GND | U207 | 11 |
| GND | U207 | 19 |
| GND | U21 | 18 |
| GND | U21 | 35 |
| GND | U21 | 38 |
| GND | U23 | 14 |
| GND | U23 | 15 |
| GND | U24 | 1 |
| GND | U24 | 10 |
| GND | U25 | 14 |
| GND | U25 | 15 |
| GND | U26 | 12 |
| GND | U26 | 14 |
| GND | U26 | 15 |
| GND | U26 | 35 |
| GND | U26 | 42 |
| GND | U26 | 55 |
| GND | U26 | 56 |
| GND | U27 | 14 |
| GND | U29 | 3 |
| GND | U29 | 8 |
| GND | U29 | 16 |
| GND | U31 | 16 |
| GND | U31 | 33 |
| GND | U31 | 50 |
| GND | U31 | 67 |
| GND | U32 | 10 |
| GND | U32 | 21 |
| GND | U32 | 32 |
| GND | U32 | 43 |
| GND | U33 | 1 |
| GND | U33 | 10 |
| GND | U34 | 1 |
| GND | U34 | 10 |
| GND | U35 | 14 |
| GND | U36 | 10 |
| GND | U37 | 1 |
| GND | U37 | 27 |
| GND | U37 | 37 |
| GND | U37 | 38 |
| GND | U37 | 64 |
| GND | U38 | 10 |

| | | |
|---|---|---|
| GND | U39 | 10 |
| GND | U39 | 19 |
| GND | U40 | 10 |
| GND | U40 | 19 |
| GND | U41 | 10 |
| GND | U5 | 6 |
| GND | U5 | 26 |
| GND | U5 | 46 |
| GND | U5 | 50 |
| GND | U6 | 6 |
| GND | U6 | 26 |
| GND | U6 | 46 |
| GND | U6 | 50 |
| GND | U7 | 12 |
| GND | U7 | 14 |
| GND | U7 | 15 |
| GND | U7 | 35 |
| GND | U7 | 42 |
| GND | U7 | 55 |
| GND | U7 | 56 |
| GND | U8 | 22 |
| GND | U9 | 12 |
| HF-1 | U29 | 23 |
| HF-1 | U31 | 47 |
| HF-2 | U31 | 45 |
| IA-1 | U26 | 5 |
| IA-1 | U34 | 16 |
| IA-1 | U7 | 5 |
| IB-1 | U26 | 6 |
| IB-1 | U34 | 19 |
| IB-1 | U7 | 6 |
| IC-1 | U24 | 2 |
| IC-1 | U26 | 61 |
| IC-1 | U7 | 61 |
| ID-1 | U24 | 5 |
| ID-1 | U26 | 7 |
| ID-1 | U7 | 7 |
| IN1+ | C19 | 2 |
| IN1+ | U9 | 31 |
| IN1- | C20 | 2 |
| IN1- | U9 | 32 |
| IN2+ | C38 | 2 |
| IN2+ | U18 | 31 |
| IN2- | C39 | 2 |
| IN2- | U18 | 32 |
| IOR | P1B | 14 |
| IOR | U40 | 8 |
| IOR- | U32 | 34 |
| IOR- | U40 | 12 |
| IORDY | P1A | 10 |
| IORDY | U27 | 27 |
| IOW | P1B | 13 |
| IOW | U40 | 9 |
| IOW- | U32 | 35 |

| | | |
|---|---|---|
| IOW- | U40 | 11 |
| IRQ7 | P1B | 21 |
| IRQ7 | U27 | 23 |
| ISO-J1 | J2 | 3 |
| ISO-J1 | J3 | 10 |
| ISO-J1 | K4 | 8 |
| K200C-1 | K200 | 3 |
| K200C-1 | R210 | 2 |
| K200C-2 | K200 | 8 |
| K200C-2 | R211 | 1 |
| K200C-2 | R212 | 1 |
| K200NC1 | K200 | 2 |
| K200NC1 | T200 | 1 |
| K200NC2 | K200 | 9 |
| K200NC2 | T201 | 6 |
| K200NO | K200 | 4 |
| K200NO | K200 | 7 |
| K201NC | K201 | 2 |
| K201NC | K201 | 7 |
| K201NC | R219 | 2 |
| K202C | K202 | 3 |
| K202C | K203 | 4 |
| K202NC | K202 | 2 |
| K202NC | R224 | 2 |
| K202NC | R225 | 1 |
| K203C | C206 | 1 |
| K203C | K203 | 3 |
| K203NC | K203 | 2 |
| K203NC | R222 | 2 |
| K203NC | R223 | 1 |
| K204C-1 | E205 | 3 |
| K204C-1 | E206 | 3 |
| K204C-1 | K204 | 3 |
| K204C-1 | K205 | 4 |
| K204C-1 | K206 | 4 |
| K204C-1 | K207 | 2 |
| K204C-2 | E205 | 1 |
| K204C-2 | E206 | 1 |
| K204C-2 | K204 | 8 |
| K204C-2 | K205 | 7 |
| K204C-2 | K206 | 7 |
| K204C-2 | K207 | 9 |
| K206C-1 | K206 | 3 |
| K206C-1 | R200 | 1 |
| K206C-2 | K206 | 8 |
| K206C-2 | R200 | 2 |
| K207C-1 | K207 | 3 |
| K207C-1 | R500 | 1 |
| K207C-1 | Z200 | 1 |
| K207C-2 | K207 | 8 |
| K207C-2 | R501 | 1 |
| K207C-2 | Z200 | 2 |
| LB2WN | U200 | 42 |
| LB2WN | U201 | 18 |

| | | |
|---|---|---|
| LB4WN | U200 | 43 |
| LB4WN | U201 | 19 |
| LINRING | J201 | 3 |
| LINRING | R501 | 2 |
| LINTIP | J201 | 2 |
| LINTIP | R500 | 2 |
| LOP69-1 | U33 | 15 |
| LOP69-1 | U9 | 19 |
| LOP69-2 | U18 | 19 |
| LOP69-2 | U33 | 16 |
| LOP75-1 | U17 | 1 |
| LOP75-1 | U33 | 2 |
| LOP75-1 | U8 | 1 |
| LOPB2WN | K207 | 10 |
| LOPB2WN | U201 | 17 |
| LOPB4WN | K200 | 10 |
| LOPB4WN | U201 | 16 |
| LOWMEM- | U32 | 9 |
| LOWMEM- | U35 | 23 |
| M2-1 | U24 | 6 |
| M2-1 | U7 | 13 |
| M2-2 | U24 | 9 |
| M2-2 | U26 | 13 |
| MEMCS16 | P2D | 1 |
| MEMCS16 | U35 | 27 |
| MEMR- | P2C | 9 |
| MEMR- | U27 | 11 |
| MEMW- | P2C | 10 |
| MEMW- | U27 | 9 |
| MODE69-.1 | U33 | 9 |
| MODE69-.1 | U9 | 20 |
| MODE69-.2 | U18 | 20 |
| MODE69-.2 | U33 | 12 |
| OC-1 | U31 | 55 |
| OC-1 | U7 | 32 |
| OC-2 | U26 | 32 |
| OC-2 | U31 | 56 |
| OD-1 | U31 | 6 |
| OD-1 | U7 | 31 |
| OD-2 | U26 | 31 |
| OD-2 | U31 | 7 |
| PCA0 | P1A | 31 |
| PCA0 | U27 | 7 |
| PCA0 | U39 | 2 |
| PCA0- | U32 | 33 |
| PCA0- | U39 | 18 |
| PCA1 | P1A | 30 |
| PCA1 | U27 | 3 |
| PCA1 | U39 | 3 |
| PCA1- | U32 | 31 |
| PCA1- | U39 | 17 |
| PCA10 | P1A | 21 |
| PCA10 | U40 | 4 |
| PCA10- | U20 | 62 |

| | | |
|---|---|---|
| PCA10- | U21 | 62 |
| PCA10- | U32 | 2 |
| PCA10- | U40 | 16 |
| PCA11 | P1A | 20 |
| PCA11 | U40 | 5 |
| PCA11- | U20 | 63 |
| PCA11- | U21 | 63 |
| PCA11- | U32 | 1 |
| PCA11- | U40 | 15 |
| PCA12 | P1A | 19 |
| PCA12 | U40 | 6 |
| PCA12- | U20 | 64 |
| PCA12- | U21 | 64 |
| PCA12- | U32 | 41 |
| PCA12- | U40 | 14 |
| PCA13 | P1A | 18 |
| PCA13 | U27 | 10 |
| PCA13- | U27 | 17 |
| PCA13- | U32 | 40 |
| PCA14 | P1A | 17 |
| PCA14 | U35 | 12 |
| PCA15 | P1A | 16 |
| PCA15 | U35 | 11 |
| PCA16 | P1A | 15 |
| PCA16 | U35 | 10 |
| PCA17 | P1A | 14 |
| PCA17 | U35 | 9 |
| PCA18 | P1A | 13 |
| PCA18 | U35 | 7 |
| PCA19 | P1A | 12 |
| PCA19 | U35 | 6 |
| PCA2 | P1A | 29 |
| PCA2 | U39 | 4 |
| PCA2- | U20 | 54 |
| PCA2- | U21 | 54 |
| PCA2- | U32 | 30 |
| PCA2- | U39 | 16 |
| PCA20 | P2C | 8 |
| PCA21 | P2C | 7 |
| PCA22 | P2C | 6 |
| PCA23 | P2C | 5 |
| PCA23 | U35 | 5 |
| PCA24 | P2C | 4 |
| PCA24 | U35 | 4 |
| PCA25 | P2C | 3 |
| PCA25 | U35 | 3 |
| PCA26 | P2C | 2 |
| PCA26 | U35 | 2 |
| PCA3 | P1A | 28 |
| PCA3 | U39 | 5 |
| PCA3- | U20 | 55 |
| PCA3- | U21 | 55 |
| PCA3- | U32 | 29 |
| PCA3- | U39 | 15 |

| | | |
|---|---|---|
| PCA4 | P1A | 27 |
| PCA4 | U39 | 6 |
| PCA4- | U20 | 56 |
| PCA4- | U21 | 56 |
| PCA4- | U39 | 14 |
| PCA5 | P1A | 26 |
| PCA5 | U39 | 7 |
| PCA5- | U20 | 57 |
| PCA5- | U21 | 57 |
| PCA5- | U27 | 5 |
| PCA5- | U39 | 13 |
| PCA6 | P1A | 25 |
| PCA6 | U39 | 8 |
| PCA6- | U20 | 58 |
| PCA6- | U21 | 58 |
| PCA6- | U27 | 4 |
| PCA6- | U39 | 12 |
| PCA7 | P1A | 24 |
| PCA7 | U39 | 9 |
| PCA7- | U20 | 59 |
| PCA7- | U21 | 59 |
| PCA7- | U32 | 28 |
| PCA7- | U39 | 11 |
| PCA8 | P1A | 23 |
| PCA8 | U40 | 2 |
| PCA8- | U20 | 60 |
| PCA8- | U21 | 60 |
| PCA8- | U32 | 27 |
| PCA8- | U40 | 18 |
| PCA9 | P1A | 22 |
| PCA9 | U40 | 3 |
| PCA9- | U20 | 61 |
| PCA9- | U21 | 61 |
| PCA9- | U32 | 26 |
| PCA9- | U40 | 17 |
| PCACS0- | U21 | 52 |
| PCACS0- | U27 | 21 |
| PCACS1- | U20 | 52 |
| PCACS1- | U27 | 20 |
| PCBCS0- | U27 | 19 |
| PCBCS1- | U27 | 18 |
| PCBUS- | RN1 | 7 |
| PCBUS- | U20 | 53 |
| PCBUS- | U21 | 53 |
| PCBUS- | U27 | 2 |
| PCD0 | P1A | 9 |
| PCD0 | U41 | 2 |
| PCD0- | U20 | 1 |
| PCD0- | U21 | 1 |
| PCD0- | U32 | 23 |
| PCD0- | U41 | 18 |
| PCD1 | P1A | 8 |
| PCD1 | U41 | 3 |
| PCD1- | U20 | 2 |

| | | |
|---|---|---|
| PCD1- | U21 | 2 |
| PCD1- | U32 | 22 |
| PCD1- | U41 | 17 |
| PCD10 | P2C | 13 |
| PCD10 | U38 | 4 |
| PCD10- | U20 | 11 |
| PCD10- | U21 | 11 |
| PCD10- | U38 | 16 |
| PCD11 | P2C | 14 |
| PCD11 | U38 | 5 |
| PCD11- | U20 | 12 |
| PCD11- | U21 | 12 |
| PCD11- | U38 | 15 |
| PCD12 | P2C | 15 |
| PCD12 | U38 | 6 |
| PCD12- | U20 | 13 |
| PCD12- | U21 | 13 |
| PCD12- | U38 | 14 |
| PCD13 | P2C | 16 |
| PCD13 | U38 | 7 |
| PCD13- | U20 | 14 |
| PCD13- | U21 | 14 |
| PCD13- | U38 | 13 |
| PCD14 | P2C | 17 |
| PCD14 | U38 | 8 |
| PCD14- | U20 | 15 |
| PCD14- | U21 | 15 |
| PCD14- | U38 | 12 |
| PCD15 | P2C | 18 |
| PCD15 | U38 | 9 |
| PCD15- | U20 | 16 |
| PCD15- | U21 | 16 |
| PCD15- | U38 | 11 |
| PCD2 | P1A | 7 |
| PCD2 | U41 | 4 |
| PCD2- | U20 | 3 |
| PCD2- | U21 | 3 |
| PCD2- | U32 | 20 |
| PCD2- | U41 | 16 |
| PCD3 | P1A | 6 |
| PCD3 | U41 | 5 |
| PCD3- | U20 | 4 |
| PCD3- | U21 | 4 |
| PCD3- | U32 | 19 |
| PCD3- | U41 | 15 |
| PCD4 | P1A | 5 |
| PCD4 | U41 | 6 |
| PCD4- | U20 | 5 |
| PCD4- | U21 | 5 |
| PCD4- | U41 | 14 |
| PCD5 | P1A | 4 |
| PCD5 | U41 | 7 |
| PCD5- | U20 | 6 |
| PCD5- | U21 | 6 |

| | | |
|---|---|---|
| PCD5- | U41 | 13 |
| PCD6 | P1A | 3 |
| PCD6 | U41 | 8 |
| PCD6- | U20 | 7 |
| PCD6- | U21 | 7 |
| PCD6- | U41 | 12 |
| PCD7 | P1A | 2 |
| PCD7 | U41 | 9 |
| PCD7- | U20 | 8 |
| PCD7- | U21 | 8 |
| PCD7- | U41 | 11 |
| PCD8 | P2C | 11 |
| PCD8 | U38 | 2 |
| PCD8- | U20 | 9 |
| PCD8- | U21 | 9 |
| PCD8- | U38 | 18 |
| PCD9 | P2C | 12 |
| PCD9 | U38 | 3 |
| PCD9- | U20 | 10 |
| PCD9- | U21 | 10 |
| PCD9- | U38 | 17 |
| PCOE- | U20 | 65 |
| PCOE- | U21 | 65 |
| PCOE- | U27 | 24 |
| PCOE- | U32 | 24 |
| PCR-WH- | U20 | 67 |
| PCR-WH- | U21 | 67 |
| PCR-WH- | U27 | 25 |
| PCR-WL- | U20 | 66 |
| PCR-WL- | U21 | 66 |
| PCR-WL- | U27 | 26 |
| PU-01 | RN1 | 2 |
| PU-01 | U13 | 6 |
| PU-02 | RN1 | 5 |
| PU-10 | RN2 | 2 |
| PU-10 | U8 | 20 |
| PU-10 | U8 | 21 |
| PU-11 | RN2 | 3 |
| PU-11 | U7 | 34 |
| PU-11 | U7 | 44 |
| PU-12 | RN2 | 4 |
| PU-12 | U29 | 26 |
| PU-20 | RN2 | 5 |
| PU-20 | U17 | 20 |
| PU-20 | U17 | 21 |
| PU-21 | RN2 | 6 |
| PU-21 | U26 | 34 |
| PU-21 | U26 | 44 |
| PU-69 | RN2 | 10 |
| PU-69 | U18 | 40 |
| PU-69 | U18 | 41 |
| PU-69 | U9 | 40 |
| PU-69 | U9 | 41 |
| PU-OPT1 | JPR2 | 1 |

| | | |
|---|---|---|
| PU-OPT1 | RN2 | 7 |
| PU-OPT1 | U32 | 12 |
| PU-OPT2 | JPR3 | 1 |
| PU-OPT2 | RN2 | 8 |
| PU-OPT2 | U32 | 8 |
| PU-OPT3 | JPR1 | 1 |
| PU-OPT3 | RN2 | 9 |
| PU-OPT3 | U32 | 7 |
| PUP-1 | U24 | 12 |
| PUP-1 | U7 | 41 |
| PUP-2 | U24 | 15 |
| PUP-2 | U26 | 41 |
| R205-06 | C200 | 1 |
| R205-06 | R205 | 2 |
| R205-06 | R206 | 1 |
| R214-15 | C203 | 1 |
| R214-15 | R214 | 2 |
| R214-15 | R215 | 1 |
| RA2HYBI | R224 | 1 |
| RA2HYBI | U207 | 4 |
| RA2WBRD | C210 | 2 |
| RA2WBRD | K202 | 4 |
| RA2WBRD | R233 | 2 |
| RA2WBRD | U208 | 1 |
| RA2WSLI | R222 | 1 |
| RA2WSLI | U206 | 8 |
| RAHPBN | K202 | 10 |
| RAHPBN | U201 | 4 |
| RAHYPBR | U200 | 28 |
| RAHYPBR | U201 | 3 |
| RASIG2W | C206 | 2 |
| RASIG2W | U203 | 17 |
| RASIG4W | R212 | 2 |
| RASIG4W | R213 | 1 |
| RASIG4W | U202 | 17 |
| RASLPHB | U200 | 29 |
| RASLPHB | U201 | 8 |
| RASPHNB | K203 | 10 |
| RASPHNB | U201 | 6 |
| RCHCLK-.1 | R14 | 2 |
| RCHCLK-.1 | R15 | 2 |
| RCHCLK-.1 | U16 | 2 |
| RCHCLK-.1 | U16 | 3 |
| RCHCLK-.1 | U16 | 16 |
| RCHCLK-.1 | U7 | 27 |
| RCHCLK-.2 | R12 | 2 |
| RCHCLK-.2 | R13 | 2 |
| RCHCLK-.2 | U25 | 2 |
| RCHCLK-.2 | U25 | 3 |
| RCHCLK-.2 | U25 | 16 |
| RCHCLK-.2 | U26 | 27 |
| RCLK-1 | U23 | 7 |
| RCLK-1 | U31 | 32 |
| RCLK-1 | U7 | 59 |

| | | |
|---|---|---|
| RCLK-1 | U8 | 15 |
| RCLK-1 | U9 | 42 |
| RCLK-2 | U17 | 15 |
| RCLK-2 | U18 | 42 |
| RCLK-2 | U23 | 22 |
| RCLK-2 | U26 | 59 |
| RCLK-2 | U31 | 34 |
| RCLKP0 | U19 | 139 |
| RCLKP0 | U200 | 18 |
| RCLKP1 | U19 | 115 |
| RCLKP1 | U200 | 22 |
| RD1-1 | U5 | 27 |
| RD1-1 | U7 | 45 |
| RD1-2 | U26 | 45 |
| RD1-2 | U6 | 27 |
| RD2-1 | U5 | 28 |
| RD2-1 | U7 | 46 |
| RD2-2 | U26 | 46 |
| RD2-2 | U6 | 28 |
| RD3-1 | U5 | 29 |
| RD3-1 | U7 | 47 |
| RD3-2 | U26 | 47 |
| RD3-2 | U6 | 29 |
| RD4-1 | U5 | 30 |
| RD4-1 | U7 | 48 |
| RD4-2 | U26 | 48 |
| RD4-2 | U6 | 30 |
| RD5-1 | U5 | 31 |
| RD5-1 | U7 | 49 |
| RD5-2 | U26 | 49 |
| RD5-2 | U6 | 31 |
| RD6-1 | U5 | 32 |
| RD6-1 | U7 | 50 |
| RD6-2 | U26 | 50 |
| RD6-2 | U6 | 32 |
| RD7-1 | U5 | 33 |
| RD7-1 | U7 | 51 |
| RD7-2 | U26 | 51 |
| RD7-2 | U6 | 33 |
| RD8-1 | U5 | 34 |
| RD8-1 | U7 | 52 |
| RD8-2 | U26 | 52 |
| RD8-2 | U6 | 34 |
| RELAY1- | D4 | 2 |
| RELAY1- | K1 | 10 |
| RELAY1- | U36 | 12 |
| RELAY2- | D1 | 2 |
| RELAY2- | K2 | 10 |
| RELAY2- | U36 | 13 |
| RELAY3- | D2 | 2 |
| RELAY3- | K3 | 10 |
| RELAY3- | U36 | 14 |
| RELAY4- | D3 | 2 |
| RELAY4- | K4 | 10 |

| | | |
|---|---|---|
| RELAY4- | U36 | 15 |
| RELAY5- | D5 | 2 |
| RELAY5- | K5 | 10 |
| RELAY5- | U36 | 16 |
| RELAY6- | D6 | 2 |
| RELAY6- | K6 | 10 |
| RELAY6- | U36 | 17 |
| RELAY7- | D7 | 2 |
| RELAY7- | K7 | 10 |
| RELAY7- | U36 | 18 |
| RESET | P1B | 2 |
| RESET | U40 | 7 |
| RESET- | D8 | 2 |
| RESET- | U40 | 13 |
| RFS2WC | U200 | 52 |
| RFS2WC | U203 | 12 |
| RFS4WC | U200 | 59 |
| RFS4WC | U202 | 12 |
| RFSP0 | U19 | 153 |
| RFSP0 | U200 | 21 |
| RFSP1 | U19 | 123 |
| RFSP1 | U200 | 24 |
| RINGHYB | K205 | 8 |
| RINGHYB | U207 | 29 |
| RINGSL1 | K204 | 9 |
| RINGSL1 | U206 | 10 |
| RNRZ | U23 | 5 |
| RNRZ | U8 | 14 |
| RNRZFAR | U17 | 14 |
| RNRZFAR | U23 | 24 |
| RNRZFAR.2 | U23 | 21 |
| RNRZFAR.2 | U26 | 57 |
| RNRZFAR.2 | U26 | 58 |
| RNRZNER | U23 | 8 |
| RNRZNER | U7 | 57 |
| RNRZNER | U7 | 58 |
| RRED-1 | U31 | 61 |
| RRED-1 | U7 | 40 |
| RRED-2 | U26 | 40 |
| RRED-2 | U31 | 62 |
| RSERDP0 | U19 | 167 |
| RSERDP0 | U200 | 12 |
| RSERDP0 | U200 | 19 |
| RSERDP1 | U19 | 136 |
| RSERDP1 | U200 | 23 |
| RSRD2WC | U200 | 53 |
| RSRD2WC | U203 | 13 |
| RSRD4WC | U200 | 60 |
| RSRD4WC | U202 | 13 |
| RST-1 | U24 | 16 |
| RST-1 | U9 | 16 |
| RST-2 | U18 | 16 |
| RST-2 | U24 | 19 |
| RSYNC-1 | U16 | 13 |

| | | |
|---|---|---|
| RSYNC-1 | U31 | 51 |
| RSYNC-1 | U7 | 39 |
| RSYNC-1 | U8 | 12 |
| RSYNC-2 | U17 | 12 |
| RSYNC-2 | U25 | 13 |
| RSYNC-2 | U26 | 39 |
| RSYNC-2 | U31 | 52 |
| RWIHBT-.1 | U16 | 27 |
| RWIHBT-.1 | U7 | 29 |
| RWIHBT-.2 | U25 | 27 |
| RWIHBT-.2 | U26 | 29 |
| RYEL-1 | U31 | 60 |
| RYEL-1 | U7 | 54 |
| RYEL-2 | U26 | 54 |
| RYEL-2 | U31 | 59 |
| SBHE- | P2C | 1 |
| SBHE- | U27 | 6 |
| SEL1-1 | U32 | 18 |
| SEL1-1 | U35 | 16 |
| SEL1-2 | U32 | 17 |
| SEL1-2 | U35 | 17 |
| SEL2-1 | U32 | 15 |
| SEL2-1 | U35 | 19 |
| SEL2-2 | U32 | 16 |
| SEL2-2 | U35 | 18 |
| SELEN | U27 | 16 |
| SELEN | U32 | 5 |
| SELEN | U35 | 25 |
| SELEN | U38 | 19 |
| SELEN | U41 | 19 |
| SRDY- | P1B | 8 |
| SRDY- | U35 | 26 |
| T200-4 | J200 | 2 |
| T200-4 | T200 | 4 |
| T200P6 | J200 | 3 |
| T200P6 | T200 | 6 |
| T201P1 | J200 | 4 |
| T201P1 | T201 | 1 |
| T201P3 | J200 | 1 |
| T201P3 | T201 | 3 |
| TA2W | E201 | 2 |
| TA2W | E203 | 1 |
| TA2W | R214 | 1 |
| TA2WHYB | K201 | 8 |
| TA2WHYB | R221 | 1 |
| TA2WHYB | U207 | 3 |
| TA2WSLI | K201 | 3 |
| TA2WSLI | R220 | 1 |
| TA2WSLI | U206 | 3 |
| TA4W | E200 | 2 |
| TA4W | E202 | 1 |
| TA4W | R205 | 1 |
| TASLPHY | U200 | 27 |
| TASLPHY | U201 | 1 |

| | | |
|---|---|---|
| TASPHNY | K201 | 10 |
| TASPHNY | U201 | 5 |
| TCHCLK-.1 | U7 | 24 |
| TCHCLK-.2 | U26 | 24 |
| TCLKP0 | U19 | 125 |
| TCLKP0 | U200 | 10 |
| TCLKP1 | U19 | 137 |
| TCLKP1 | U200 | 14 |
| TD1-1 | U26 | 62 |
| TD1-1 | U29 | 10 |
| TD1-1 | U7 | 62 |
| TD2-1 | U26 | 63 |
| TD2-1 | U29 | 11 |
| TD2-1 | U7 | 63 |
| TD3-1 | U26 | 64 |
| TD3-1 | U29 | 13 |
| TD3-1 | U7 | 64 |
| TD4-1 | U26 | 65 |
| TD4-1 | U29 | 14 |
| TD4-1 | U7 | 65 |
| TD5-1 | U26 | 66 |
| TD5-1 | U29 | 19 |
| TD5-1 | U7 | 66 |
| TD6-1 | U26 | 67 |
| TD6-1 | U29 | 20 |
| TD6-1 | U7 | 67 |
| TD7-1 | U26 | 1 |
| TD7-1 | U29 | 21 |
| TD7-1 | U7 | 1 |
| TD8-1 | U26 | 2 |
| TD8-1 | U29 | 22 |
| TD8-1 | U7 | 2 |
| TFMSYNC | U26 | 3 |
| TFMSYNC | U26 | 4 |
| TFMSYNC | U31 | 11 |
| TFMSYNC | U7 | 3 |
| TFMSYNC | U7 | 4 |
| TFS2WC | U200 | 48 |
| TFS2WC | U203 | 9 |
| TFS4WC | U200 | 56 |
| TFS4WC | U202 | 9 |
| TFSP1 | U19 | 151 |
| TFSP1 | U200 | 17 |
| TIDLE-1 | U26 | 16 |
| TIDLE-1 | U34 | 12 |
| TIDLE-1 | U7 | 16 |
| TIPHYBR | K205 | 3 |
| TIPHYBR | U207 | 30 |
| TIPSLIC | K204 | 2 |
| TIPSLIC | U206 | 9 |
| TLOOP-1 | U26 | 17 |
| TLOOP-1 | U34 | 9 |
| TLOOP-1 | U7 | 17 |
| TMAX-1 | U31 | 28 |

| | | |
|---|---|---|
| TMAX-1 | U7 | 11 |
| TMAX-1 | U8 | 24 |
| TMAX-2 | U17 | 24 |
| TMAX-2 | U26 | 11 |
| TMAX-2 | U31 | 29 |
| TOUTN1 | TX1 | 5 |
| TOUTN1 | U9 | 15 |
| TOUTN2 | TX2 | 5 |
| TOUTN2 | U18 | 15 |
| TOUTP1 | C24 | 2 |
| TOUTP1 | U9 | 10 |
| TOUTP2 | C35 | 2 |
| TOUTP2 | U18 | 10 |
| TRBRTER | U200 | 41 |
| TRBRTER | U201 | 13 |
| TRBTERM | K206 | 10 |
| TRBTERM | U201 | 15 |
| TRHSELN | K205 | 10 |
| TRHSELN | U201 | 14 |
| TRHYSEL | U200 | 40 |
| TRHYSEL | U201 | 11 |
| TRSDISB | K204 | 10 |
| TRSDISB | U201 | 7 |
| TRSLDSB | U200 | 30 |
| TRSLDSB | U201 | 9 |
| TSERDP0 | U19 | 168 |
| TSERDP0 | U200 | 11 |
| TSERDP1 | U19 | 152 |
| TSERDP1 | U200 | 15 |
| TSRD2WC | U200 | 49 |
| TSRD2WC | U203 | 8 |
| TSRD4WC | U200 | 57 |
| TSRD4WC | U202 | 8 |
| TYEL-1 | U26 | 8 |
| TYEL-1 | U34 | 15 |
| TYEL-1 | U7 | 8 |
| U18-P5 | U18 | 5 |
| U202AIN | R203 | 2 |
| U202AIN | U202 | 18 |
| U202AIN | VR200 | 3 |
| U202GSR | U202 | 4 |
| U202GSR | VR201 | 2 |
| U202GSX | U202 | 19 |
| U202GSX | VR200 | 1 |
| U202GSX | VR200 | 2 |
| U203AIN | R204 | 2 |
| U203AIN | U203 | 18 |
| U203AIN | VR202 | 3 |
| U203GSR | U203 | 4 |
| U203GSR | VR203 | 2 |
| U203GSX | U203 | 19 |
| U203GSX | VR202 | 1 |
| U203GSX | VR202 | 2 |
| U204+1 | C201 | 1 |

| | | |
|---|---|---|
| U204+1 | R206 | 2 |
| U204+1 | U204 | 3 |
| U204+2 | E202 | 2 |
| U204+2 | U204 | 5 |
| U204-1 | C200 | 2 |
| U204-1 | C202 | 1 |
| U204-1 | U204 | 1 |
| U204-1 | U204 | 2 |
| U204-2 | R208 | 1 |
| U204-2 | R209 | 1 |
| U204-2 | U204 | 6 |
| U204OUT | R209 | 2 |
| U204OUT | R210 | 1 |
| U204OUT | U204 | 7 |
| U205+1 | C204 | 1 |
| U205+1 | R215 | 2 |
| U205+1 | U205 | 3 |
| U205+2 | E203 | 3 |
| U205+2 | U205 | 5 |
| U205-1 | C203 | 2 |
| U205-1 | C205 | 1 |
| U205-1 | U205 | 1 |
| U205-1 | U205 | 2 |
| U205-2 | R217 | 1 |
| U205-2 | R218 | 1 |
| U205-2 | U205 | 6 |
| U205OUT | R218 | 2 |
| U205OUT | R219 | 1 |
| U205OUT | U205 | 7 |
| U206RF | U206 | 11 |
| U206RF | U206 | 15 |
| U206TF | D200 | 2 |
| U206TF | U206 | 1 |
| U207D-Q | R227 | 2 |
| U207D-Q | U207 | 7 |
| U207GSR | E204 | 1 |
| U207GSR | R228 | 2 |
| U207GSR | U207 | 14 |
| U208+1 | R230 | 2 |
| U208+1 | R231 | 1 |
| U208+1 | U208 | 3 |
| U208-1 | C210 | 1 |
| U208-1 | R229 | 2 |
| U208-1 | R232 | 1 |
| U208-1 | R233 | 1 |
| U208-1 | U208 | 2 |
| U32P6 | U32 | 6 |
| U32P6 | U38 | 1 |
| U32P6 | U41 | 1 |
| U9-P5 | U9 | 5 |
| VPP1 | C21 | 1 |
| VPP1 | L1 | 2 |
| VPP1 | U10 | 10 |
| VPP2 | C40 | 1 |

| | | |
|---|---|---|
| VPP2 | L2 | 2 |
| VPP2 | U28 | 10 |
| VREF | C207 | 1 |
| VREF | D201 | 2 |
| VREF | R226 | 2 |
| VREF | U206 | 4 |

We claim:

1. A common channel signalling communication monitoring system comprising:

at least one in-service common channel signalling channel monitor operative to monitor a plurality of common channel signalling channels each carrying at least one signalling characteristic pertaining to each of a multiplicity of voiceband channels;

a voiceband channel signalling characteristic indicator operative to provide an output indication of at least one voiceband channel signalling characteristic carried on at least one of the common channel signalling channels;

at least one call quality monitor receiving signaling information from at least one of the in-service common channel signaling channel monitors and being operative to monitor call quality of a plurality of individual telephone calls;

a call type discriminator operative to determine the call type of each of the plurality of individual telephone calls; and a call quality output generator operative to generate an output indication of the call quality and of the type of call, for each of the plurality of telephone calls.

2. A system according to claim 1 wherein the call type of each individual telephone call may comprise any of the following group of call types:

voice;

fax;

digital data; and modem data.

3. A system according to claim 1 wherein the call quality output generator is operative to provide a general indication of call quality for a time interval including a multiplicity of calls.

4. A common channel signalling communication monitoring method comprising:

in-service monitoring of a plurality of individual telephone channels having common signalling;

providing an output indication of at least one characteristic of the plurality of individual telephone channels;

monitoring call quality of a plurality of individual telephone calls;

discriminating the call type of each of the plurality of individual telephone calls; and generating an output indication of the call quality and of the type of call, for each of the plurality of telephone calls.

5. A common channel signalling communication monitoring system comprising:

at least one in-service common channel signalling channel monitor operative to monitor a plurality of common channel signalling channels each carrying at least one signalling characteristic pertaining to each of a multiplicity of voiceband channels;

at least one voiceband channel monitor operative to monitor at least one voiceband channel; and a voiceband channel signalling characteristic indicator operative to provide an output indication of a signalling characteristic carried on at least one of the common channel signalling channels and pertaining to at least one individual voiceband channel to the voiceband channel monitor operative to monitor said at least one individual voiceband channel.

6. A channel monitoring system according to claim 5 wherein the voiceband channel monitor comprises a call quality monitor.

7. A channel monitoring system according to claim 5 wherein the voiceband channel monitor comprises a call type monitor.

8. A channel monitoring system according to claim 5 wherein the common channel signalling channel monitor is operative to monitor telephone calls employing channel associated signalling.

9. A channel monitoring system according to claim 5 wherein each said channel monitor is nonintrusive.

10. Apparatus according to claim 5 wherein said indicator comprises a signalling information filter and director operative to filter signalling data carried on at least one of the common channel signalling channels, to extract signalling information pertaining to at least one individual channel; and to direct said signalling information pertaining to at least one individual channel to a monitor handling said individual channel.

11. Apparatus according to claim 10 wherein said signalling information filter and director is operative to receive a signalling information request including an indication of at least one of the following codes identifying a voiceband channel to be monitored: a CIC code (circuit ID code); a source code; and a destination code.

12. Apparatus according to claim 5 wherein said common channel signalling channels comprise CCITT#7 channels.

13. A system according to claim 5 wherein the output indication of the signalling characteristic is generated by at least one of the common channel signalling channel monitors.

14. A system according to claim 5 wherein the common channel signalling channel monitor comprises a nonintrusive common channel signalling channel monitor.

15. A common channel signalling communication monitoring method comprising:

in-service monitoring of a plurality of common channel signalling channels each carrying at least one signalling characteristic pertaining to each of a multiplicity of voiceband channels;

providing a voiceband channel monitor operative to monitor at least one voiceband channel; and providing an output indication of a signalling characteristic carried on at least one of the common channel signalling channels and pertaining to at least one individual voiceband channel to the voiceband channel monitor operative to monitor said at least one individual voiceband channel.

16. A method according to claim 15 wherein the output indication of the signalling characteristic is generated by the in-service monitoring step.

17. A method according to claim 15 wherein the in-service monitoring step comprises a non-intrusive in-service monitoring step in which each of said plurality of channels is monitored nonintrusively.

18. A communication monitoring system comprising:

at least one in-service common channel signalling channel monitor operative to monitor at least one common channel signalling channel each carrying at least one signalling characteristic pertaining to each of a multiplicity of voiceband channels;

at least one voiceband channel monitor operative to monitor at least one voiceband channel; and a voiceband channel signalling characteristic indicator operative to provide an output indication of a signalling characteristic carried on at least one of the common channel signalling channels and pertaining to at least one individual voiceband channel to the voiceband channel monitor operative to monitor said at least one individual voiceband channel.

19. A communication monitoring method comprising:

in-service monitoring of at least one common channel signalling channel each carrying at least one signalling characteristic pertaining to each of a multiplicity of voiceband channels;

providing at least one voiceband channel monitor operative to monitor at least one voiceband channel; and providing an output indication of a signalling characteristic carried on at least one of the common channel signalling channels and pertaining to at least one individual voiceband channel to the voiceband channel monitor operative to monitor said at least one individual voiceband channel.

20. A system according to claim 1 wherein said call quality monitor comprises a voiceband channel call quality monitor.

* * * * *